United States Patent [19]

Hecker

[11] Patent Number: 4,709,329

[45] Date of Patent: Nov. 24, 1987

[54] INPUT/OUTPUT DEVICE CONTROLLER FOR A DATA PROCESSING SYSTEM

[75] Inventor: Mark B. Hecker, Northborough, Mass.

[73] Assignee: Data General Corporation, Westboro, Mass.

[21] Appl. No.: 624,062

[22] Filed: Jun. 25, 1984

[51] Int. Cl.[4] .............................................. G06F 13/12

[52] U.S. Cl. .................................... 364/200; 364/521

[58] Field of Search ... 364/200 MS File, 900 MS File, 364/521

[56] References Cited

U.S. PATENT DOCUMENTS

| | | | |
|---|---|---|---|
| 3,956,739 | 5/1976 | Ophir et al. | 364/900 |
| 4,200,913 | 4/1980 | Kuhar et al. | 364/900 |
| 4,434,472 | 2/1984 | Kachun | 364/900 |

*Primary Examiner*—Raulfe B. Zache

*Assistant Examiner*—Michael J. Ure

*Attorney, Agent, or Firm*—Jacob Frank; Joel Wall; Irving M. Kriegsman

[57] ABSTRACT

An input/output (I/O) device controller for a data processing which is implemented on a single printed circuit board, includes a terminal control section, an I/O control section, a processor section and a timing generator section. The terminal control section includes a keyboard interface, an RS232 interface for transmitting and receiving data from the system host CPU over an RS232 line, and a video control section interface. The I/O control section includes a plurality of different I/O interface and control units for connecting the section to a number of different I/O devices and a system I/O bus interface and control unit for interfacing the section to the system I/O bus. The processor section manages the operations of the terminal control section as well as the I/O control section.

5 Claims, 167 Drawing Figures

FIG. 6(j)
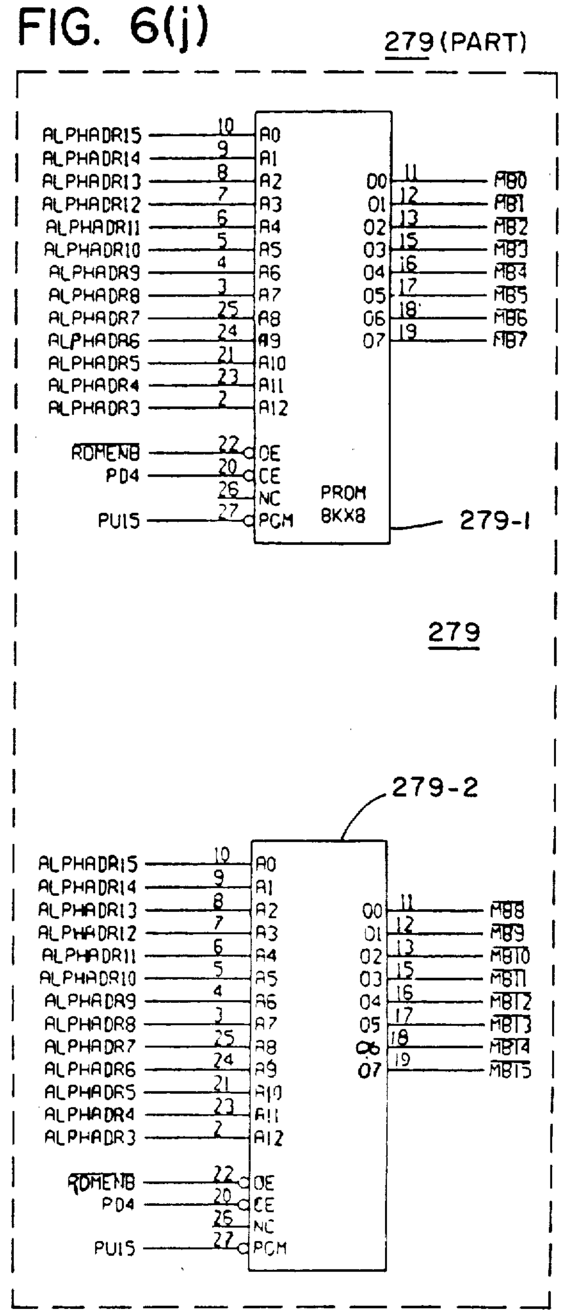
FIG. 6(i) 279(PART)
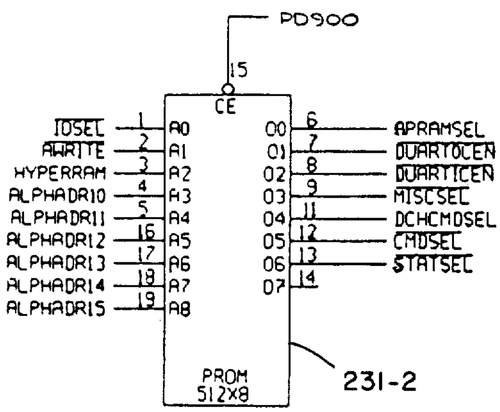
I/O PAGE DECODE
FIG. 6(g)

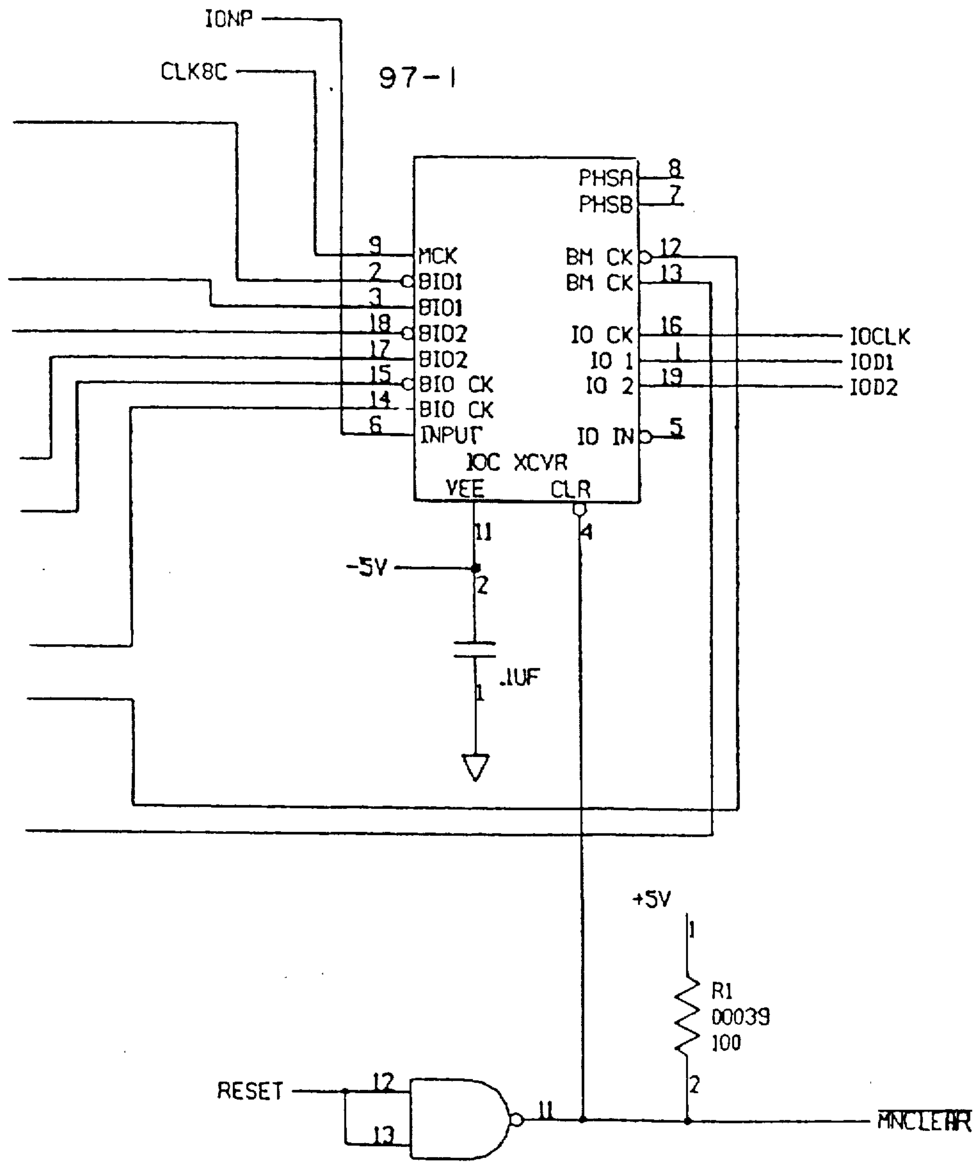
FIG. 7(a) 97 (PART)
SHEET 2 OF 2

RANDOM SYSTEM STATUS

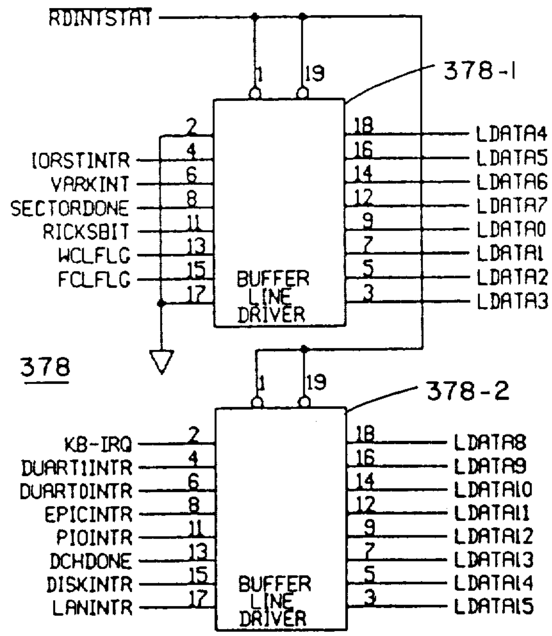
INTERRUPT STATUS
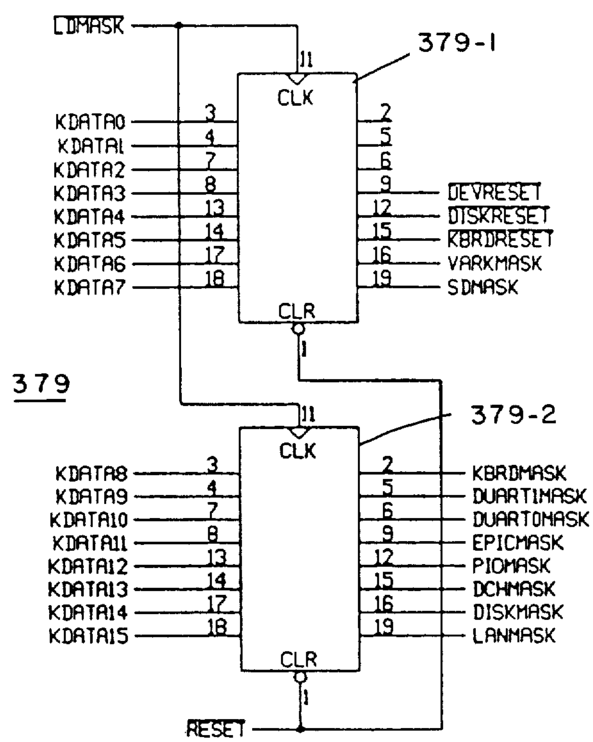
MASK REGISTER
FIG. 8(d)

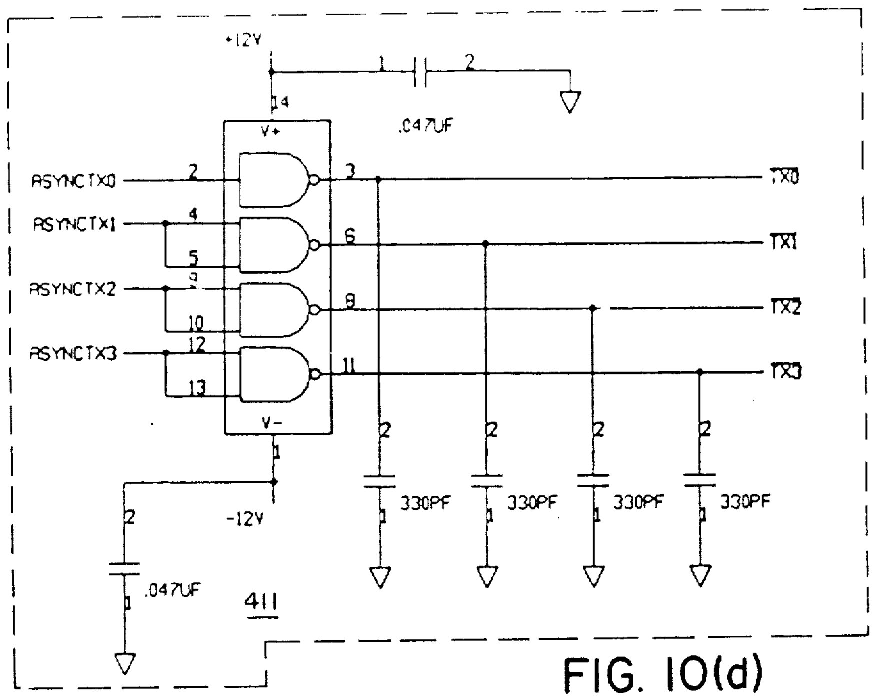
FIG. 10(d)
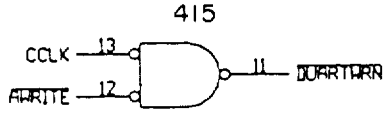
FIG. 10(e)
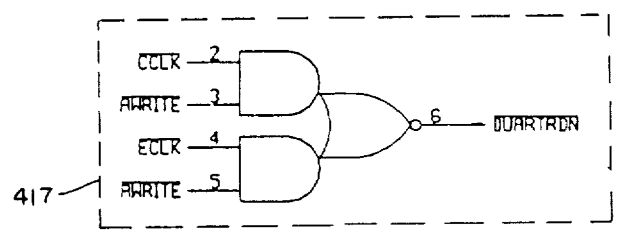
FIG. 10(f)
FIG. 10(g)
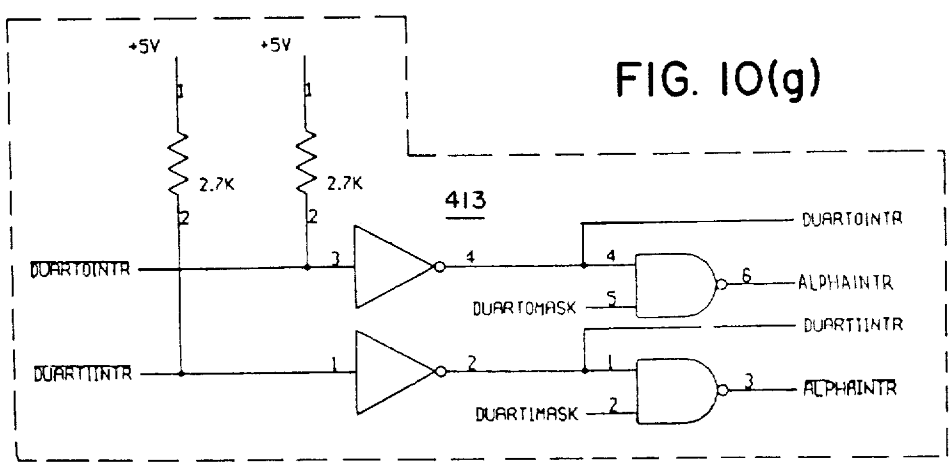

ADDRESS HOLD TIME ENFORCER

INTA

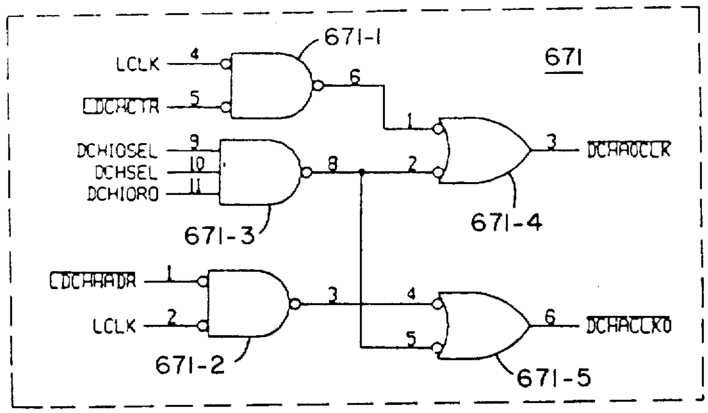
FIG. 16(a)
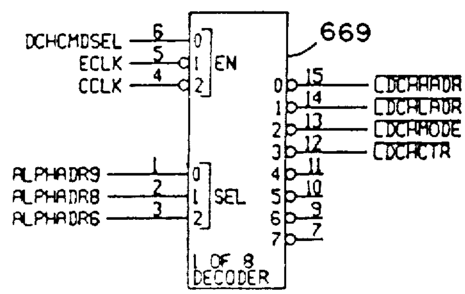
FIG. 16(b)
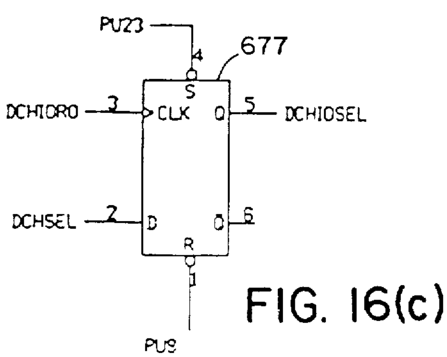
FIG. 16(c)
FIG. 16(d)
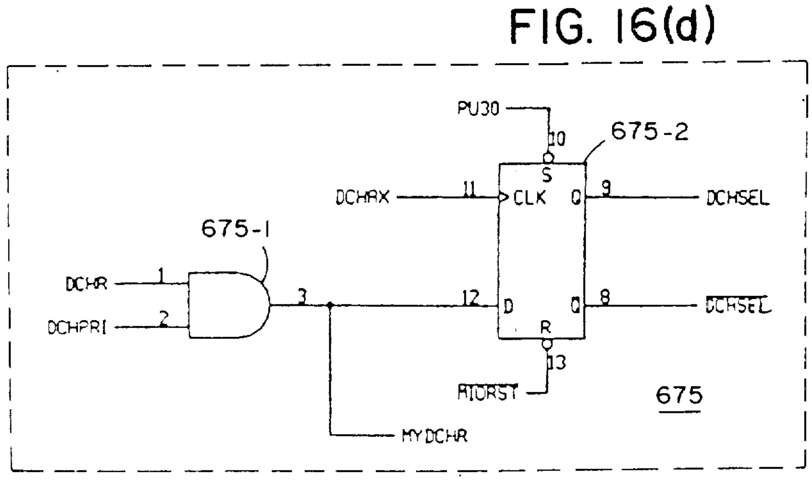

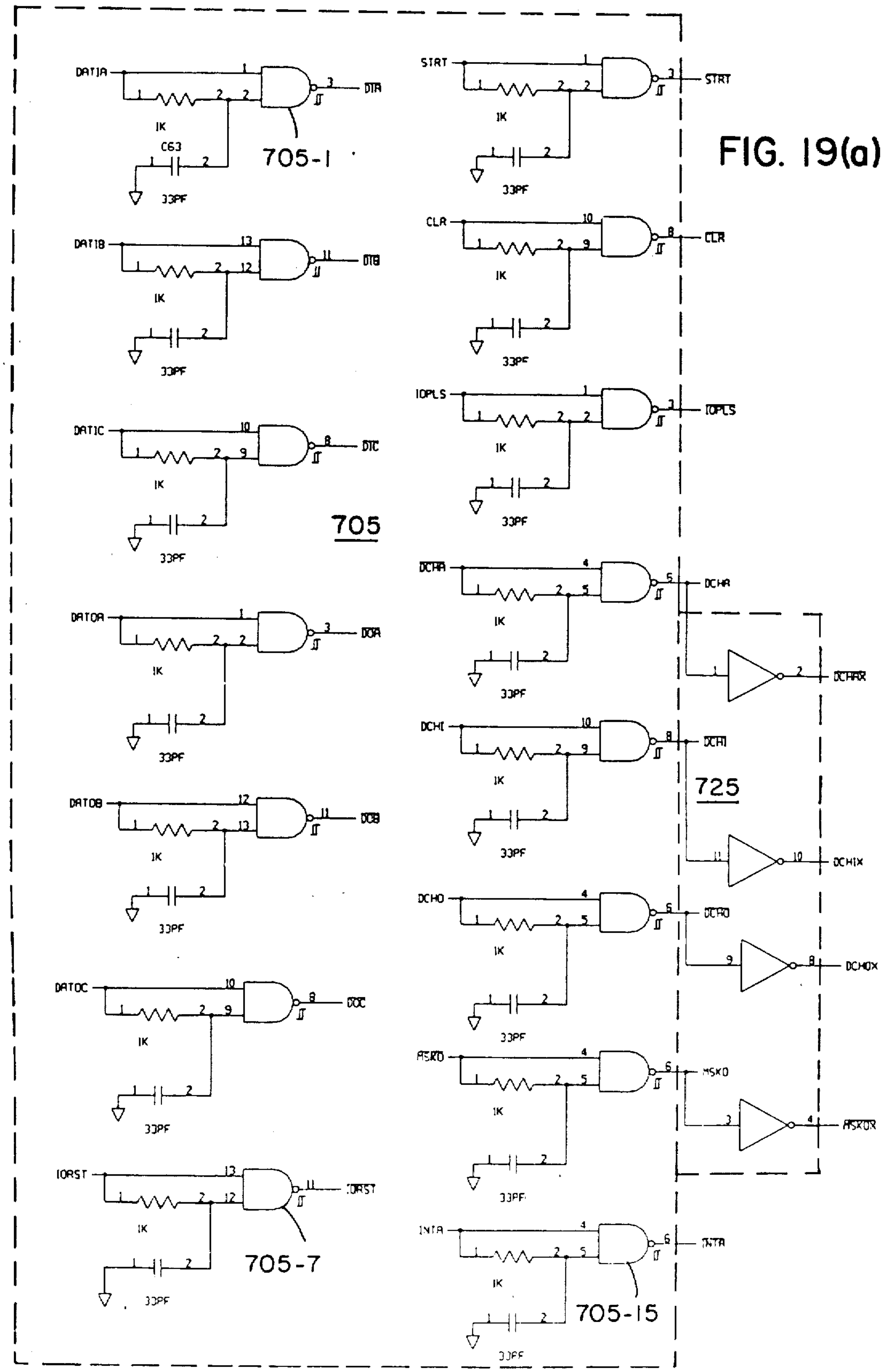
FIG. 19(a) 1 OF 2

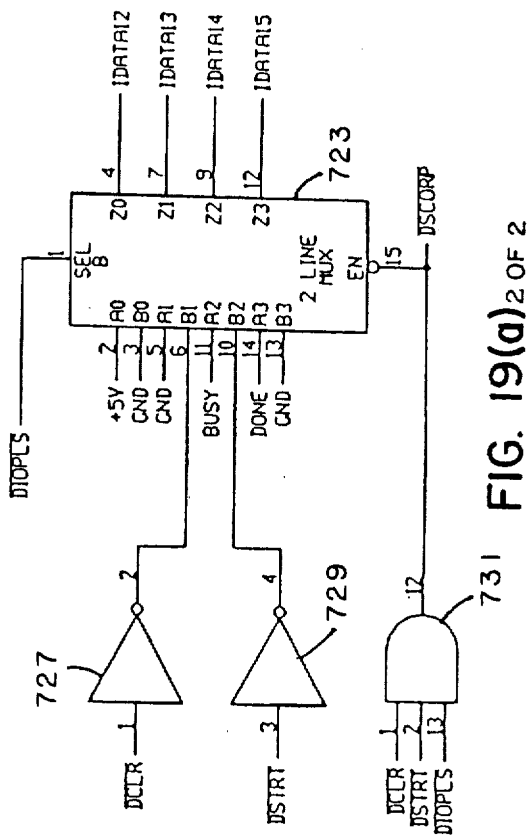
FIG. 19(a) 2 OF 2
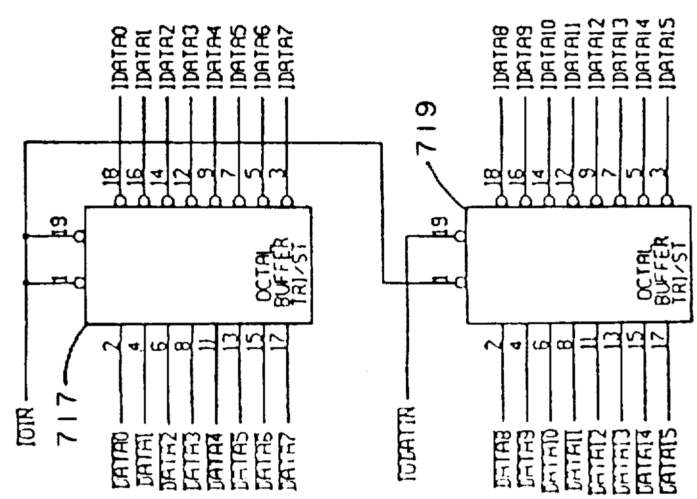
FIG. 19(b)

VIDEO MEMORY INTERFACE
129 (PART)

FIG. 27(e)
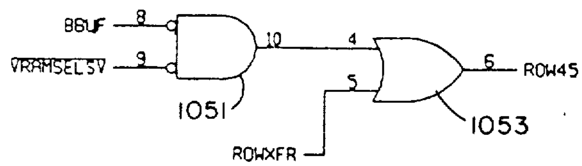
FIG. 27(d)
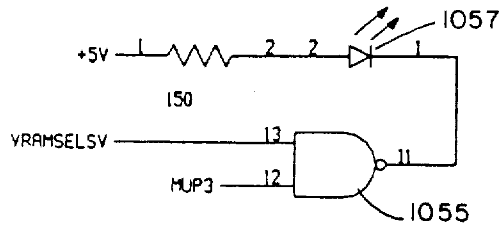
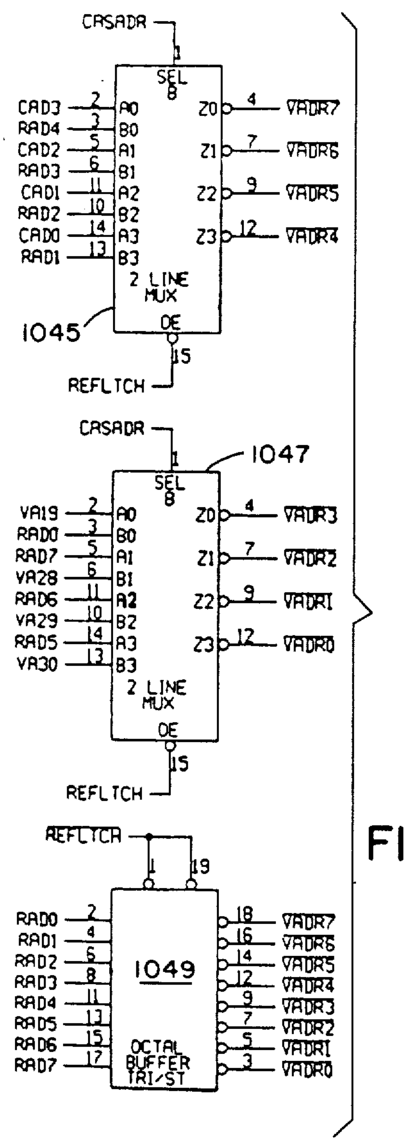
FIG. 27(b)
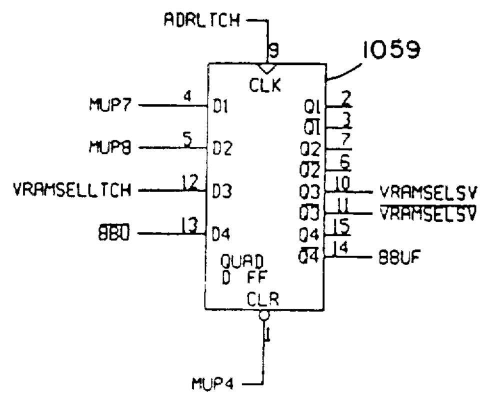
FIG. 27(c)
VIDEO MEMORY INTERFACE
129 (PART)

125 (PART)

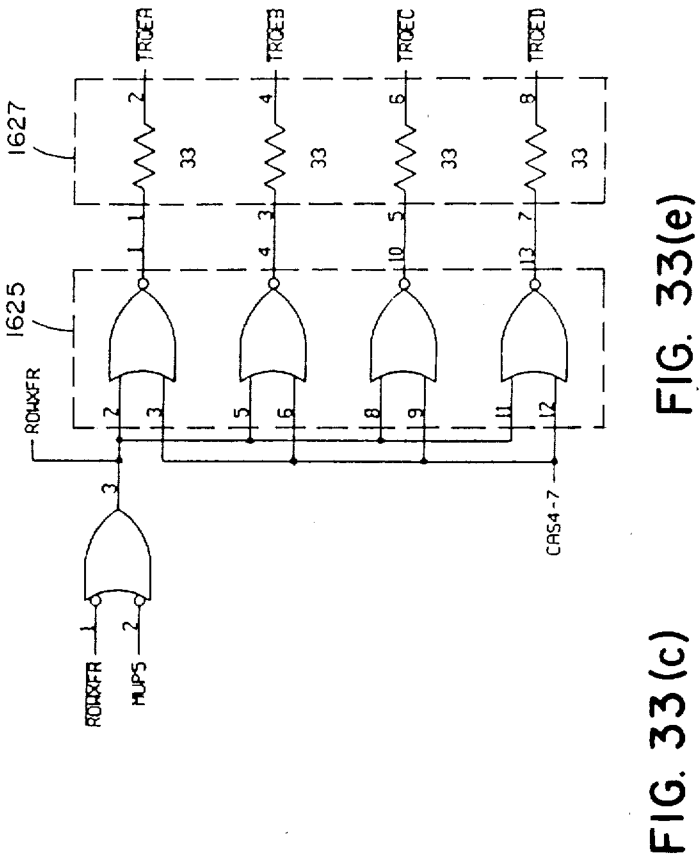
FIG. 33(e)
FIG. 33(c)
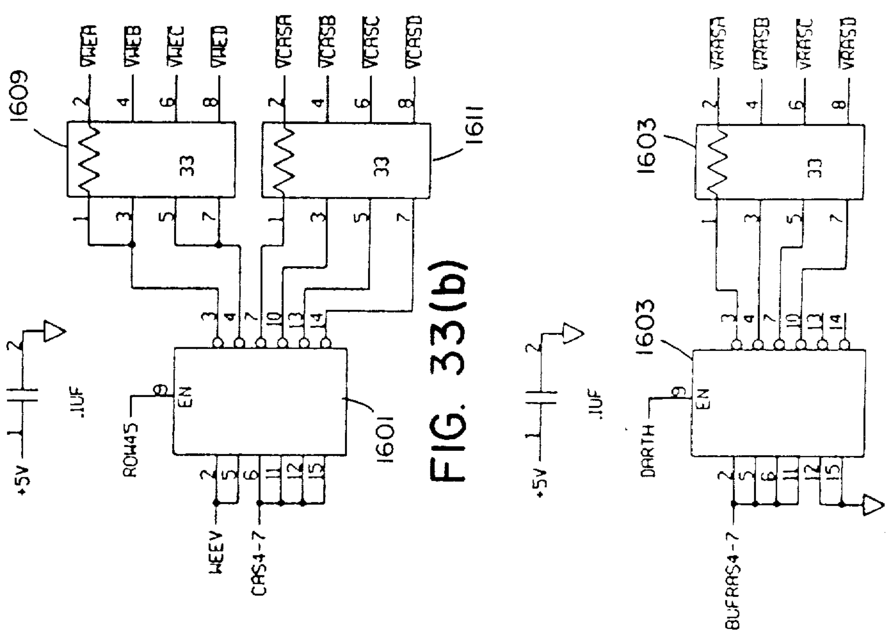
FIG. 33(b)

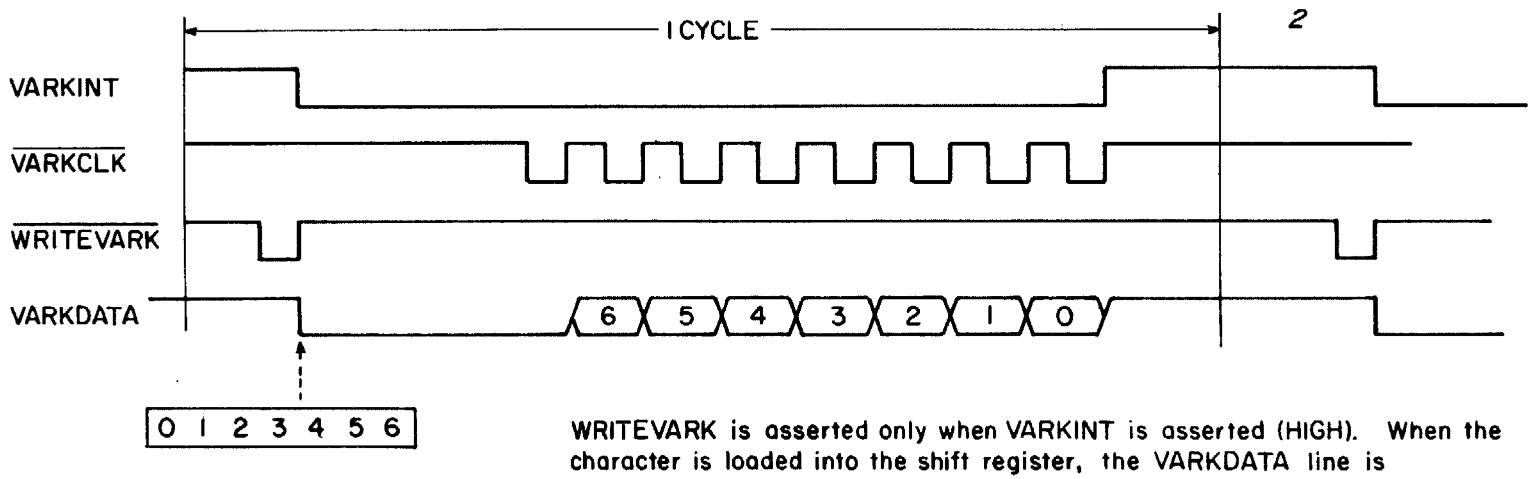

7-bit character code is loaded into shift register from KDATA 9-KDATAIS on rising edge of WRITEVARK WRITEVARK is asserted only when VARKINT is asserted (HIGH). When the character is loaded into the shift register, the VARKDATA line is driven low, signalling VARK to clock the data with a series of eight VARKCLK pulses. After the eighth VARKCLK, VARKINT becomes asserted and VARKDATA becomes HIGH, and the cycle begins again

FIG. 35

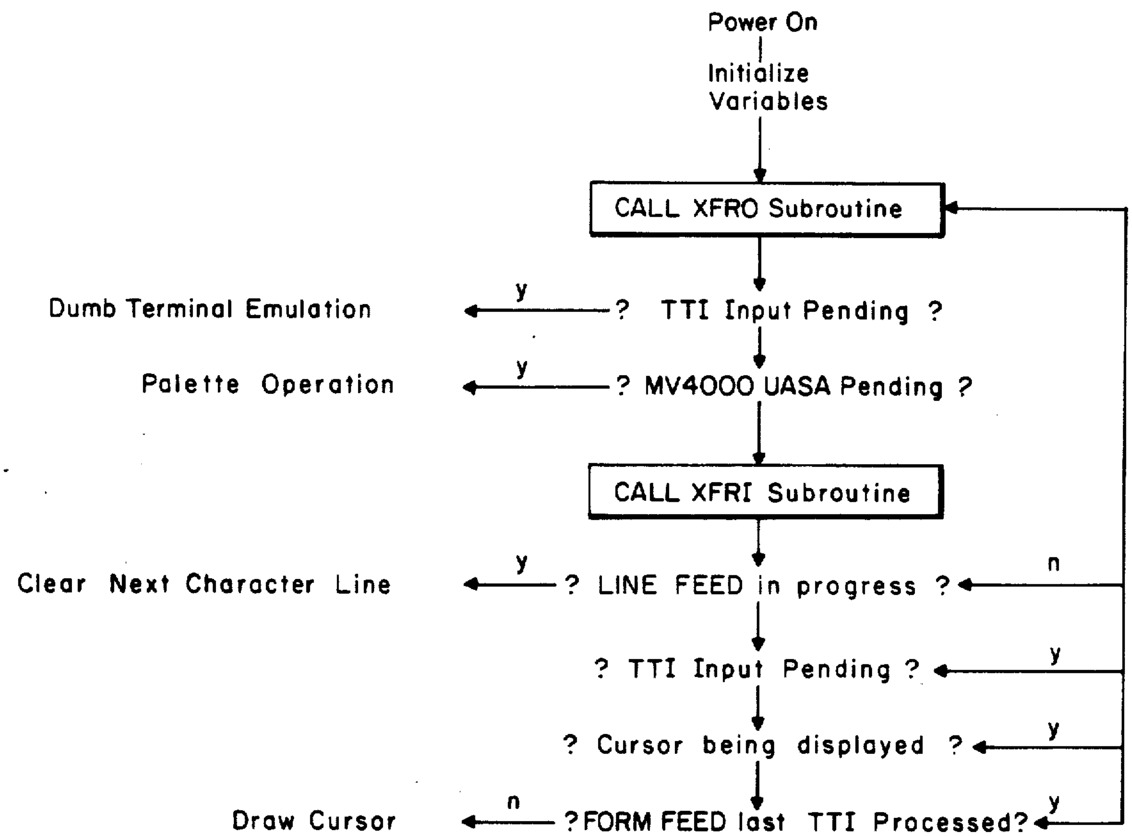
NOTE: The XFRO and XFRI subroutines are called alternately at exact intervals of 11 machine cycles in order to maintain video timing. Subordinate routines will "pick-up" phasing with respect to the foreground, maintain the calling sequence, and return to the foreground via synchronizing entry points.
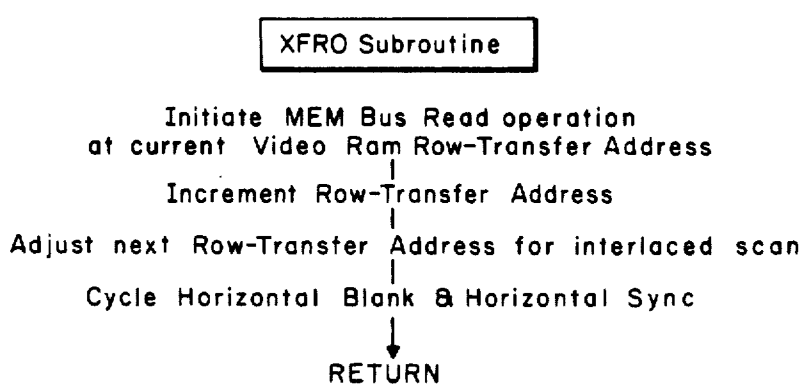
FIG. 36

VERTICAL BLANKING INTERVAL
ODD FIELD

VERTICAL BLANKING INTERVAL
EVEN FIELD

VERTICAL SYNC TIMING
ODD FIELD

VERTICAL SYNC TIMING
EVEN FIELD

HORIZONTAL BLANKING INTERVAL
VERTICAL RETRACE ENTRY

HORIZONTAL BLANKING INTERVAL
VERTICAL RETRACE EXIT

INPUT/OUTPUT DEVICE CONTROLLER FOR A DATA PROCESSING SYSTEM

BACKGROUND OF THE INVENTION

The present invention relates generally to data processing systems and more particularly to the terminal and input/output control sections of a data processing system.

In data processing systems the terminal is normally connected to the system (host) central processing unit (CPU) through an RS232 cable. A CRT display, a keyboard and sometimes a mouse are connected to the terminal. Control of these devices is achieved through a controller device in the terminal. The controller device usually includes some logic and/or hardware for generating the video timing and control signals for the CRT display. The video memory for use with the CRT is generally a part of the controller devices. Input/output devices, such as a disk drive and/or a tape drive are connected to the system input/output bus, each through a separate controller device having a separate processor.

One of the shortcomings of this arrangement is that it uses a number of different processors, one for the terminal controller and a separate one for each one of the input/output controllers. Another shortcoming of this arrangement is that although the memory in the terminal controller is generally adequate for use with the CRT display for displaying text it is not adequate when graphics are to be displayed.

It is an object of this invention to provide a new and improved data processing system.

It is another object of this invention to provide a new and improved I/O controller for a data processing system.

It is still another object of this invention to provide a new and improved video control section for a data processing system.

It is yet still another object of this invention to provide a data processing system in which the video memory is connected directly to the system memory bus.

It is another object of this invention to provide a data processing system in which all of the input/output control devices are managed by a single processor.

SUMMARY OF THE INVENTION

An input/output device controller for a data processing system having a central processing unit and a input-/output bus constructed according to the teachings of the present invention includes a terminal control section, an input/output control section, and a processor section, said processor section managing the operations of the terminal control section and said input/output control section, said terminal control section including interface means for interfacng to said central processing means, and said input/output control section including at least one peripheral device interface and control means, and a single input/output bus/input/output control and interface means for interfacing said input/output control section to said input/output bus.

Various features and advantages of the invention will appear from the description to follow. In the description, reference is made to the accompanying drawing which forms a part thereof, and in which is shown by way of illustration, a specific embodiment for practicing the invention. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In the drawings wherein like reference numerals represent like parts:

FIG. 35 is a set of waveforms useful in understanding the invention;

FIGS. 36 and 37 is a simplified flow chart illustrating the routine carried out in processor 121 in the video control section in FIG. 2A.

DETAILED DESCRIPTION OF PREFERRED EMBODIMENTS

Figure 1:
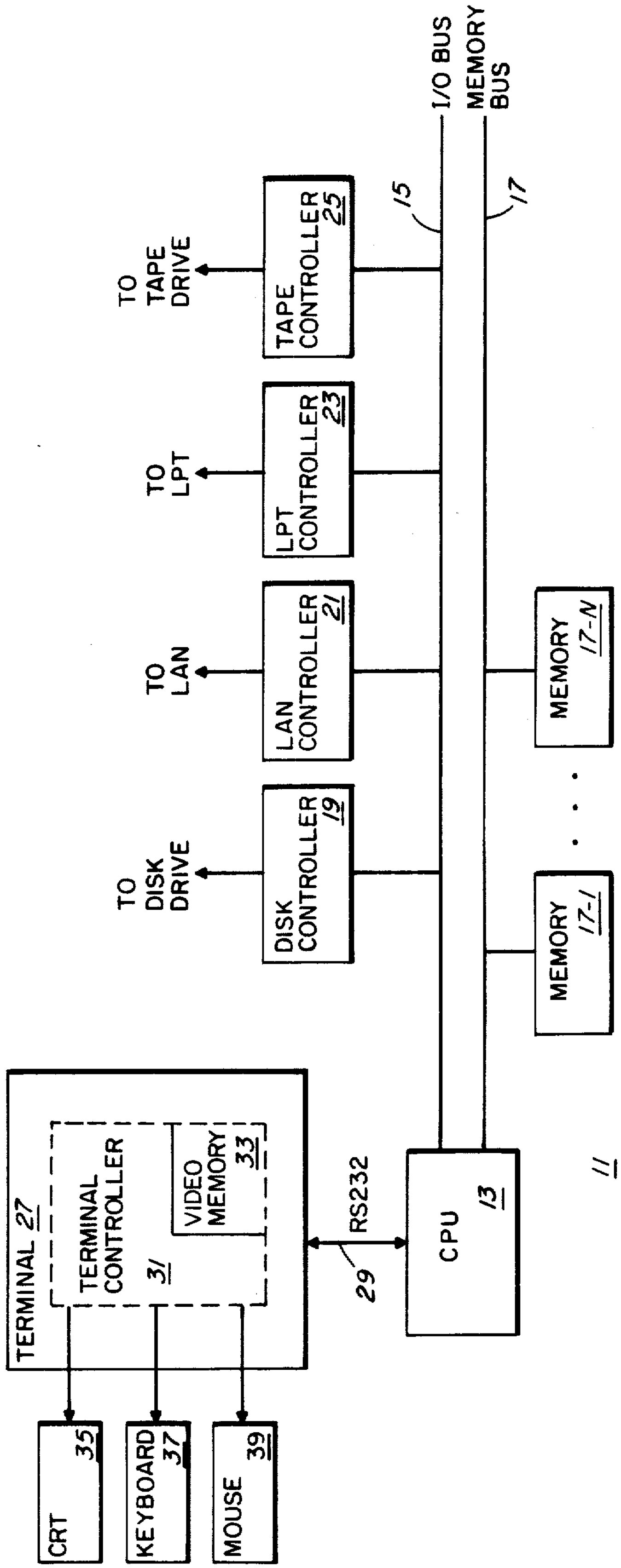
FIG. 1 is a block diagram of a conventional (prior art) data processing system.

Referring to FIG. 1 there is illustrated a block diagram of a conventional (prior art) data processing system 11.

Data processing system 11 includes a main or host CPU 13 which is connected to an I/O bus 15 and a memory bus 17. A plurality of memory devices labelled 17-1 and 17-N are connected to memory bus 17 and a plurality of controllers are coupled to I/O bus 15, each controller being used in connection with a different peripheral device. In the system shown there is a disk controller 19 for use with a disk drive, a LAN controller 21 for connecting the system to a local area network, a LPT controller 23 for use with a line printer and a tape controller 25 for use with a tape drive. Each controller includes its own processor.

A terminal 27 is connected to CPU13 over an RS232 cable 29. Terminal 27 includes a controller 31 which includes its own video memory 33. A CRT display 35, a keyboard 37 and a mouse 39 are each connected to controller 31.

Figure 2:
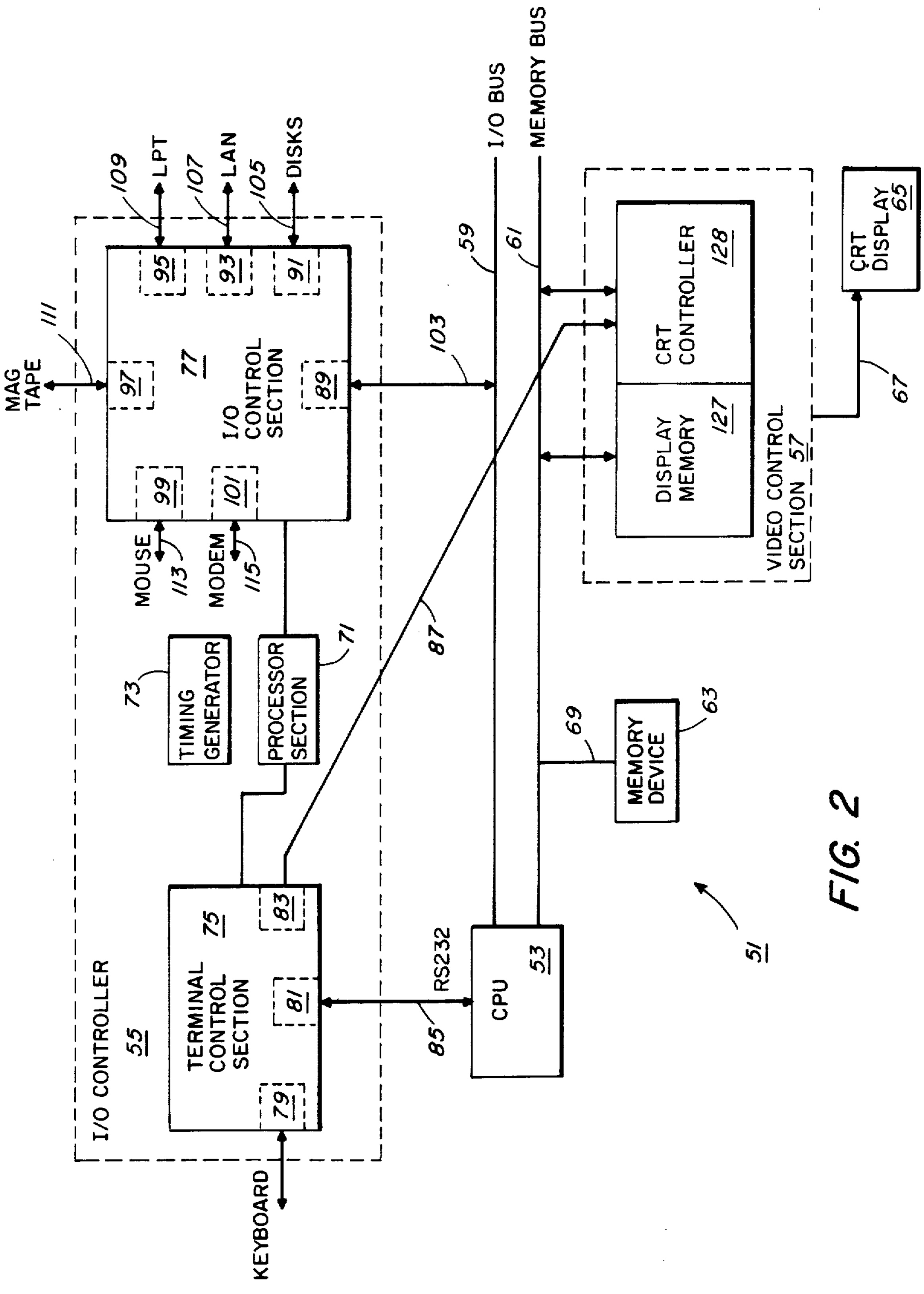
FIG. 2 is a block diagram of a data processing system constructed according to the teachings of this invention.

Referring now to FIG. 2, there is illustrated a block diagram of a data processing system constructed according to the teachings of the present invention and identified generally by reference numeral 51.

Data processing system 51 includes a central processing unit (CPU) 53, an input/output (I/O) controller 55, a video control section 57, an I/O bus 59, a memory bus 61 and a memory device 63.

CPU 53 is the host CPU for data processing system 51 and controls and manages the overall operations for the system. I/O controller 55 is implemented as a single printed circuit board and controls the various input/output devices which are connected to it. Video control section 57 is implemented as a single printed circuit board and controls the operations of a CRT device 65 which is coupled to it over a line 67. I/O bus 59 and memory bus 61 are each connected to CPU 53. Memory device 63, which is coupled to memory bus 61 over a line 69, holds the operating program for data processing system 51 as well as data received from I/O control section 77.

I/O controller 55 includes a processor section 71, a timing clock generating section 73, a terminal control section 75 and an I/O control section 77.

Processor section 71 manages the operations of terminal control section 75 and I/O control section 77. Timing clock generating section 73 generates the necessary clock signals for the operation of I/O control subsystem 55.

Terminal control section 75 includes a keyboard interface 79 for interfacing the section to a keyboard, a CPU interface 81 for interfacing the section to CPU 53 and a video control section interface 83 for interfacing the section to video memory subsystem 57. CPU interface 81 is coupled to CPU 53 through a cable 85 which may be an RS 232 cable. Video memory subsystem interface 83 is coupled to video control section 57 over a line 87 made up of two wires. One of the wires constitutes the data path from terminal control section 73 to video control section 57 and the other line provides a path for sending clock signals from video memory subsystem 57 to terminal control section 75.

I/O control section 77 includes a data channel controller 89, a disk drive interface and controller section 91, a local area network interface and controller section 93, a line printer interface and controller section 95, a tape drive controller section 97, a mouse controller and interface section 99 and a modem controller and interface section 101. Data channel controller 89 controls the flow of data between I/O control section 77 and I/O bus 59 over a line 103. Disk drive controller section 91 controls the operations of disk drive systems which are coupled thereto over a line 105. Local area network controller section 93 controls the operation of a device connected thereto over a line 107 which is coupled to a local area network. Line printer controller section 95 controls the operation of a line printer which may be connected thereto over a line 109. Tape drive controller section 97 controls the operation of a tape drive system which may be connected thereto over a line 111. Mouse controller section 99 controls the operations of a mouse which may be connected thereto over a line 113. Modem interface section 101 allows a modem to be coupled thereto over a line 115.

As can be seen, the only connection between terminal control section 75 and CPU 53 is through cable 85 and the only connection between I/O control section 77 and I/O bus 59 is through line 103. Also, line 87 serves as the data path from terminal control section 75 to video memory subsystem 57 for transferring data.

Figure 2A:
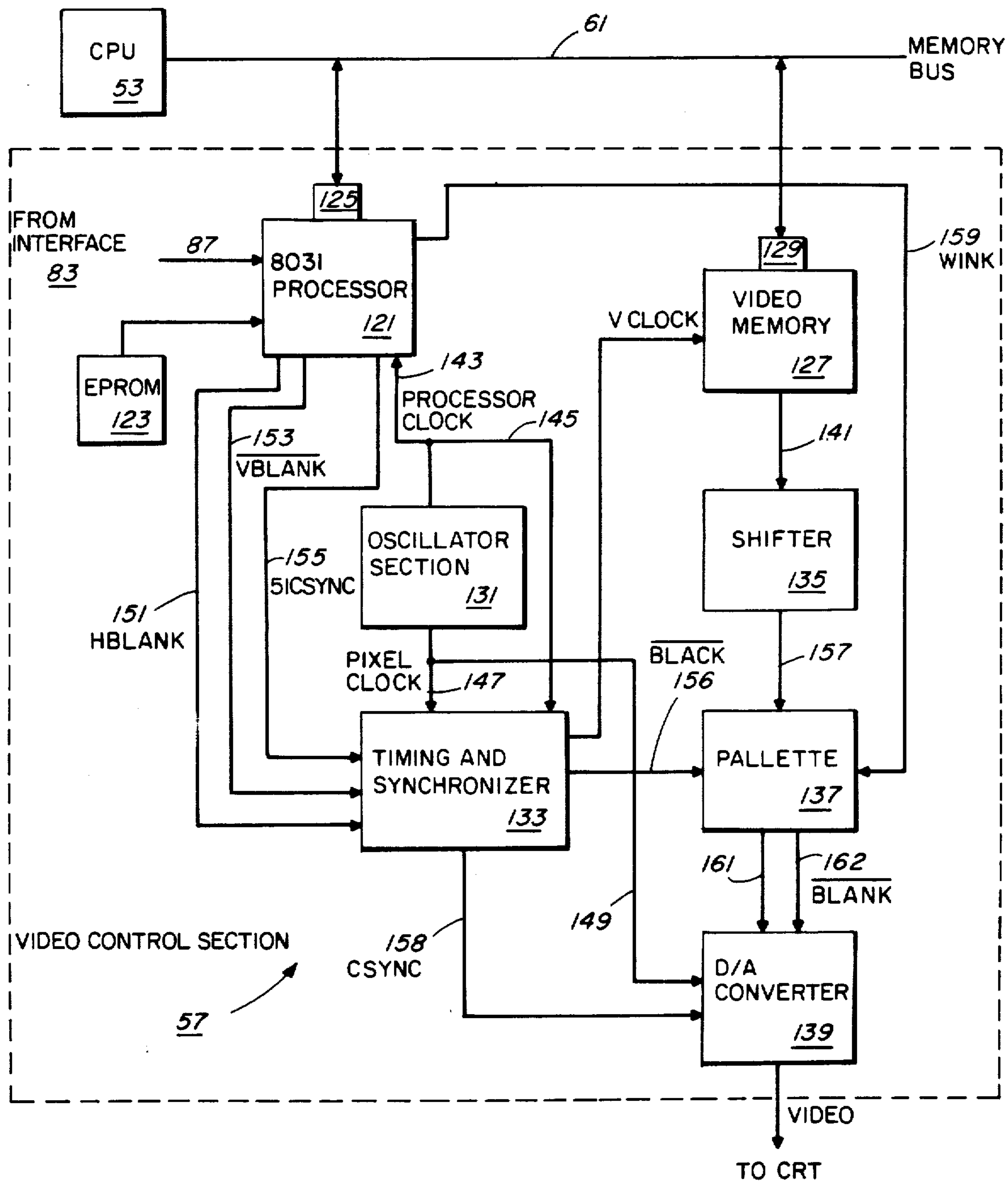
FIG. 2A is a block diagram of the video control section 57 shown in FIG. 2.

Referring now to FIG. 2A there is shown a block diagram of the video control section 57. Video control section 57 includes a microprocessor 121, an EPROM 123, a microprocessor/memory bus interface section 125, a video memory 127, a memory bus/video memory interface 129, an oscillator section 131, a timing and synchronizer circuit 133, a shifter 135, a palette 137, and a D/A converter 139.

Microprocessor 121 manages the overall operations of video control section 57 and may be an 8031 chip. Microprocssor 121 receives coded data signals from I/O controller subsystem 55 over line 87. Eprom 123 holds the operating program for microprocessor 121. Interface section 125 interfaces microprocessor 121 to memory bus 61.

Video memory 127 is a dual port RAM which receives data signals from microprocessor 121 over memory bus 61, a timing signal called V clock from timing and synchronizer circuit 133 over a line 140 which shifts a row register in video memory 127 and outputs a serial stream of data and timing signals to shifter 141 over a line 141. Interface 129 interfaces video memory 129. Oscillator section 131 generates two clock signals, one called processor clock which is sent to microprocessor 121 over a line 143 and to timing and synchronizer circuit 133 over a line 145 and the other called pixel clock which is sent to timing and synchronizer circuit 133 over a line 147 and to palette 137 over line 149.

Timing and synchronizer circuit 133 receives in addition to the processor clock and pixel clock signals a video timing control signal called HBLANK from microprocessor 121 over a line 151, a video timing control signal called $\overline{\text{VBLANK}}$ from microprocessor 121 over a line 153 and video timing control signal called 51CSYNC from microprocessor 121 over a line 155. Timing and synchronizer 133 outputs V CLOCK to video memory 127, a blanking signal called $\overline{\text{BLACK}}$ which is sent to palette 137 over a line 156 and a signal called CSYNC which is sent to the D/A converter 139 over line 158. Shifter 135 receives the serial stream of data signals from video memory 127. Palette 137 receives data signals from shifter 135 over a line 157, a video timing control signal called WINK from microprocessor 121 over a line 159 and the $\overline{\text{BLACK}}$ signal. D/A converter 139 receives the digital output from palette 137 over a line 161, pixel clock from oscillator section 131 over line 149, a signal called $\overline{\text{BLANK}}$ from palette 137 over a line 162, and outputs an analog video signal.

Figure 3A:
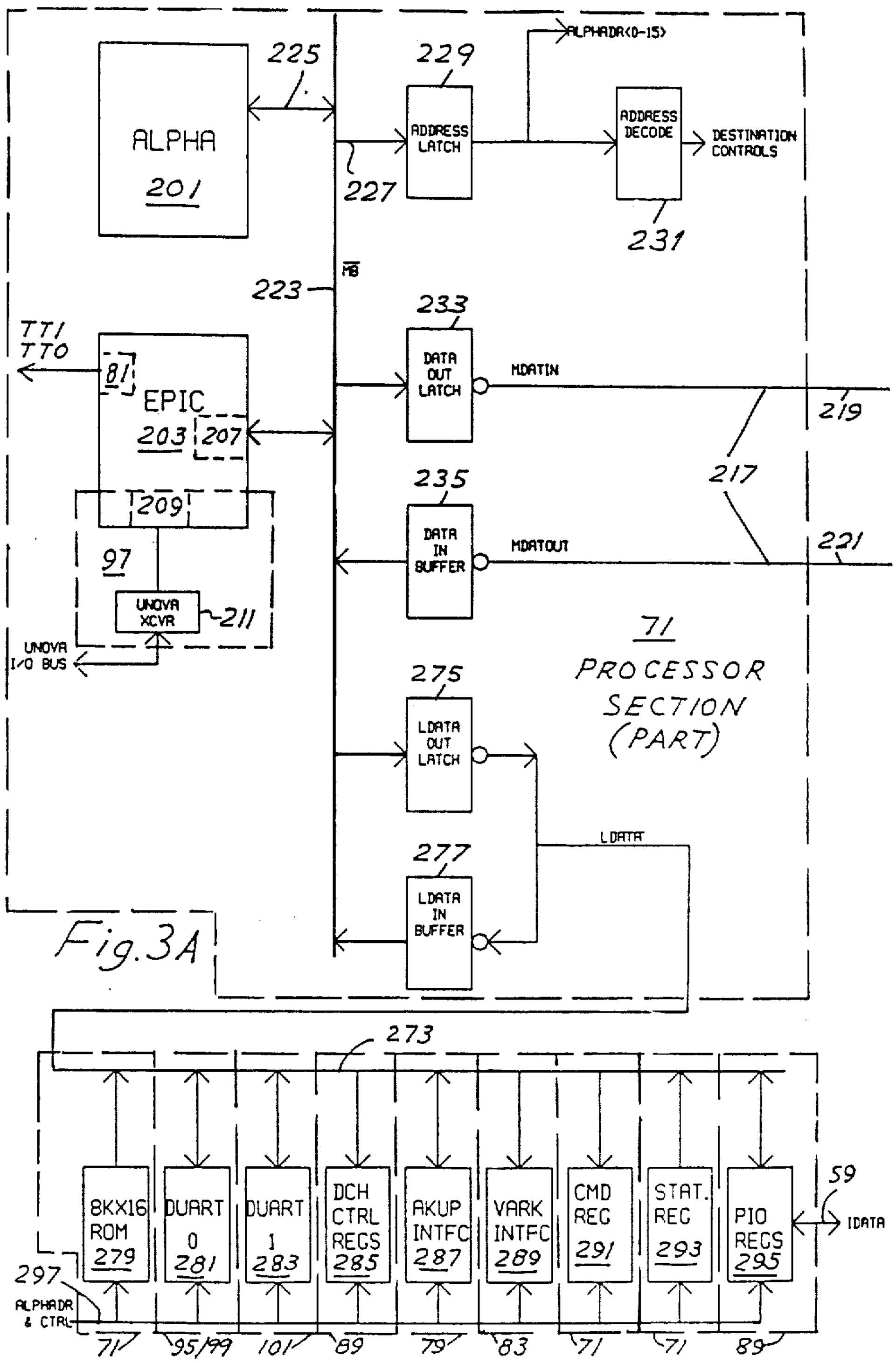
FIG. 3 is a block diagram of the I/O controller 55 shown in FIG. 2.
Figure 3B:
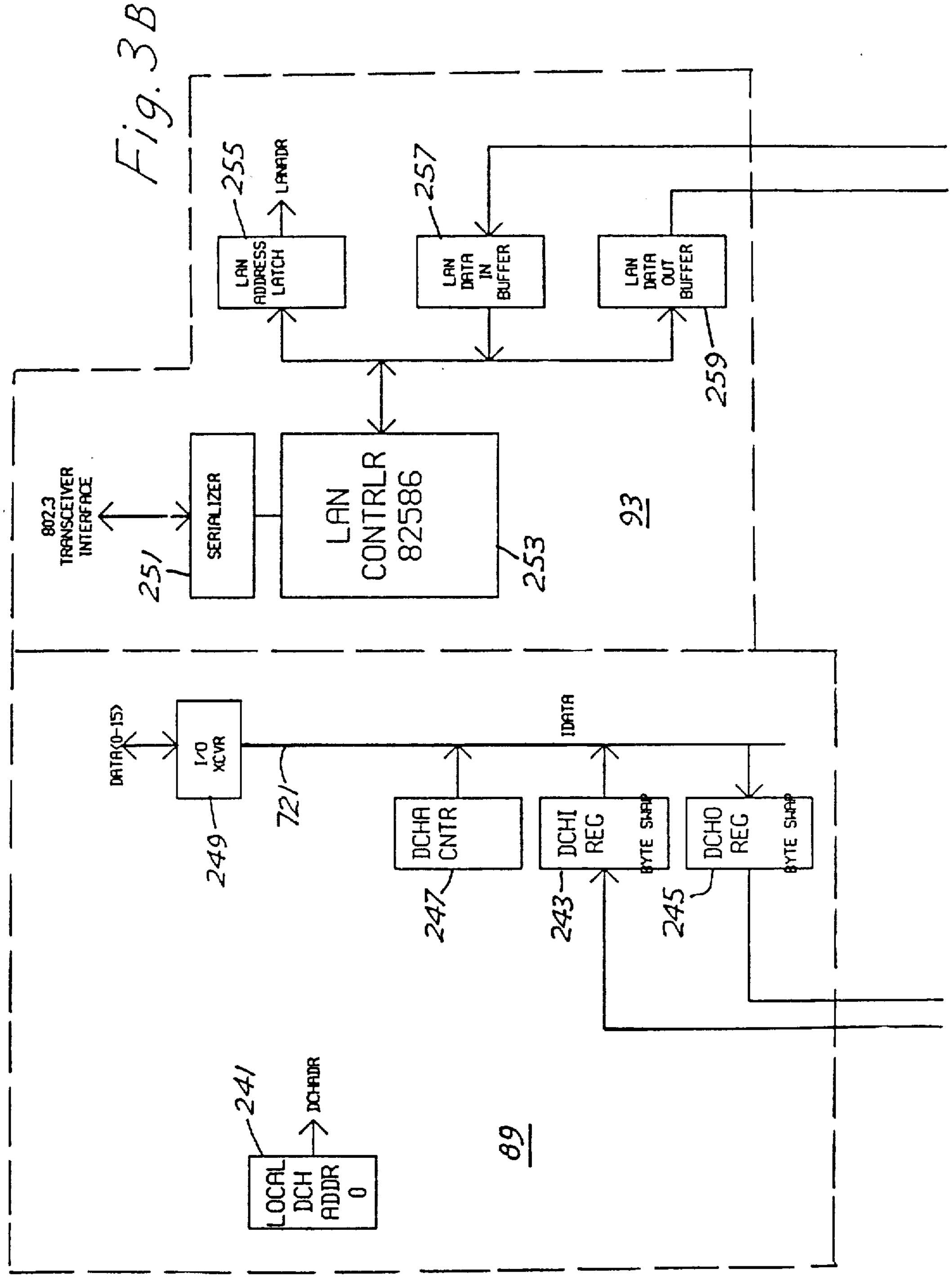
Figure 3C:
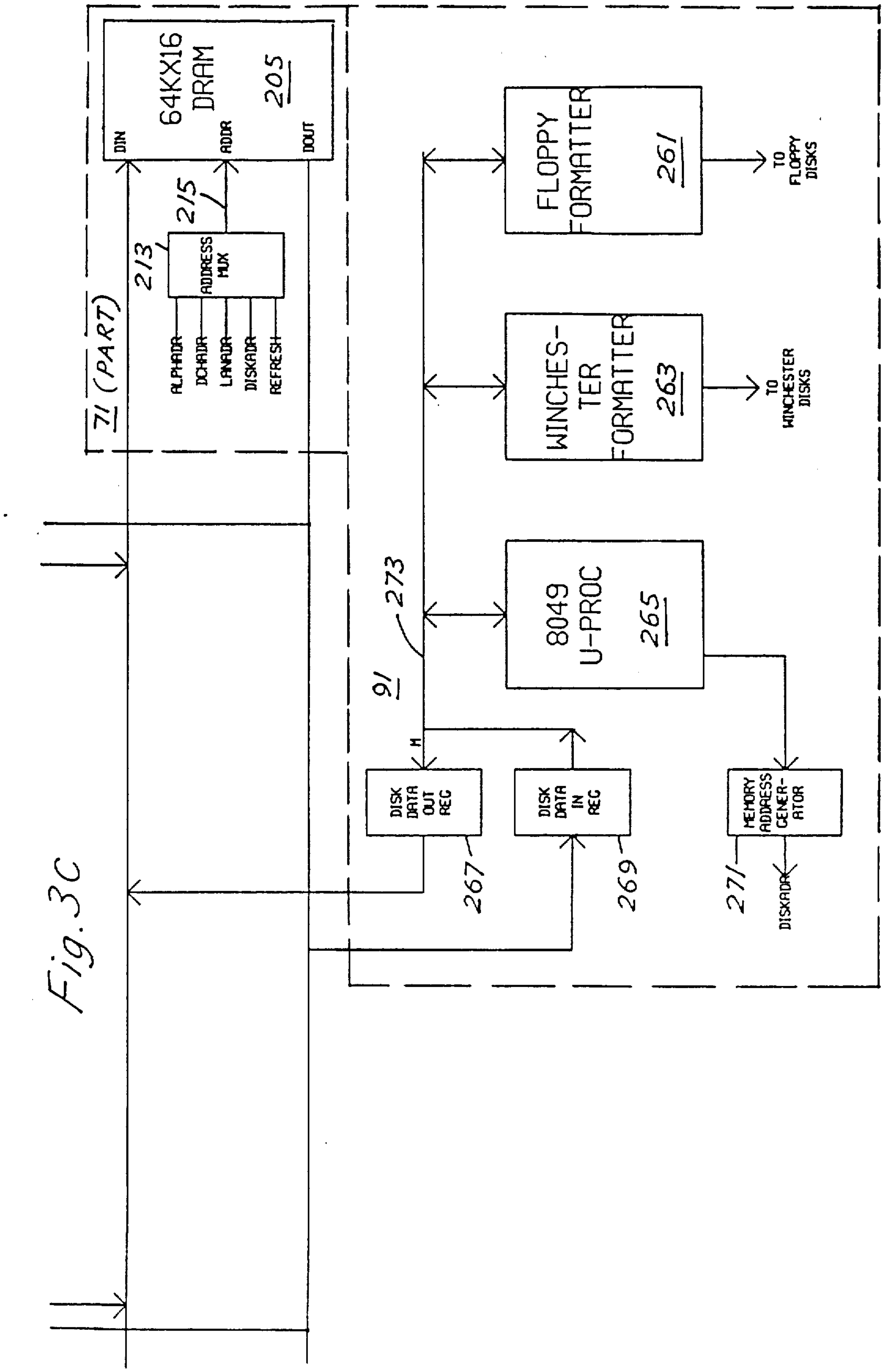
Figure 4A:
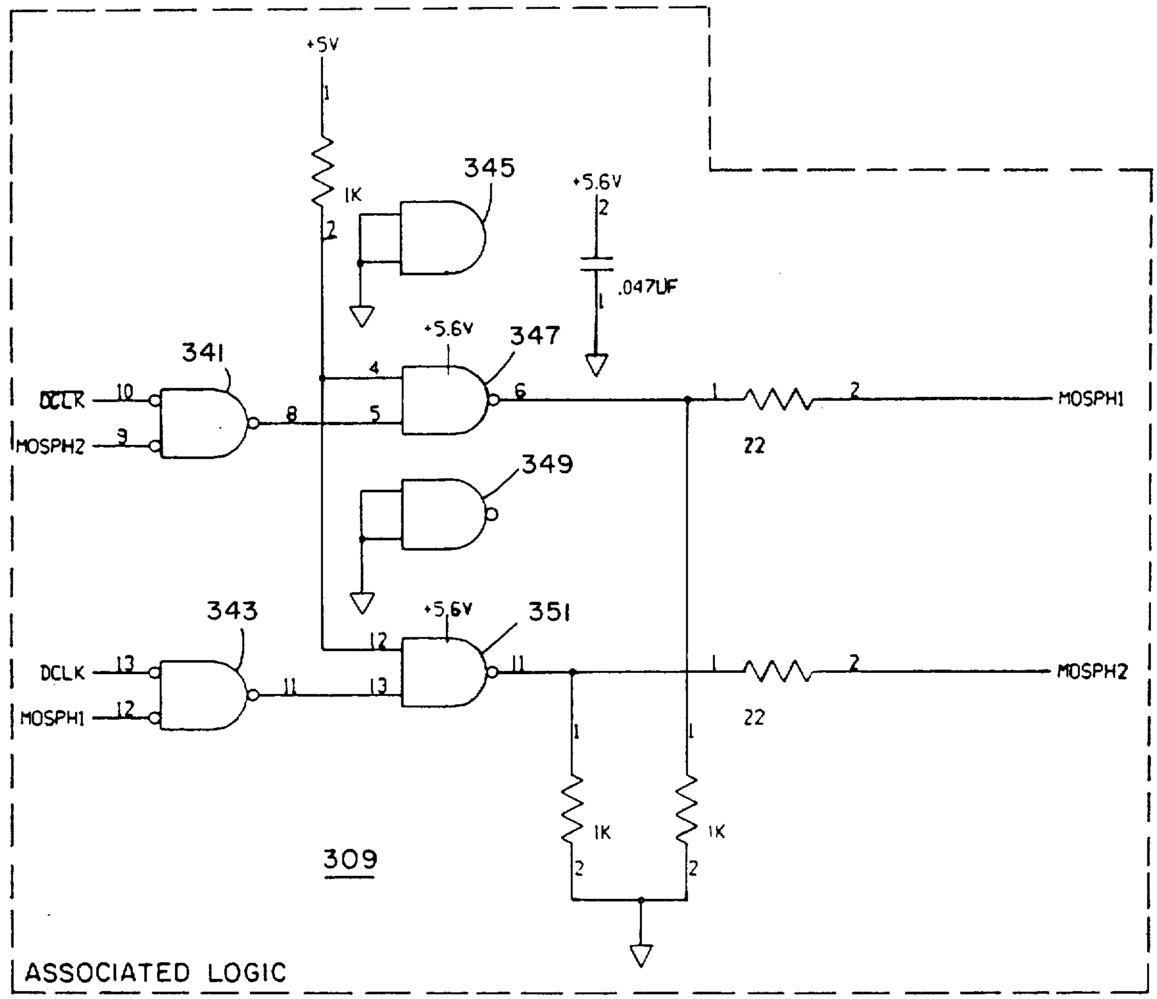
FIGS. 4(*a*) through 4(*g*) are schematic diagrams of parts of the timing generator section 73 shown in FIG. 2.
Figure 4B:
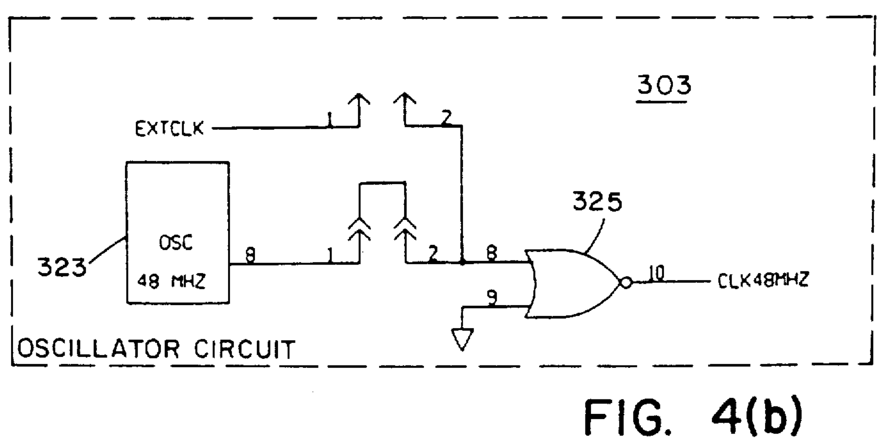
Figure 4C:
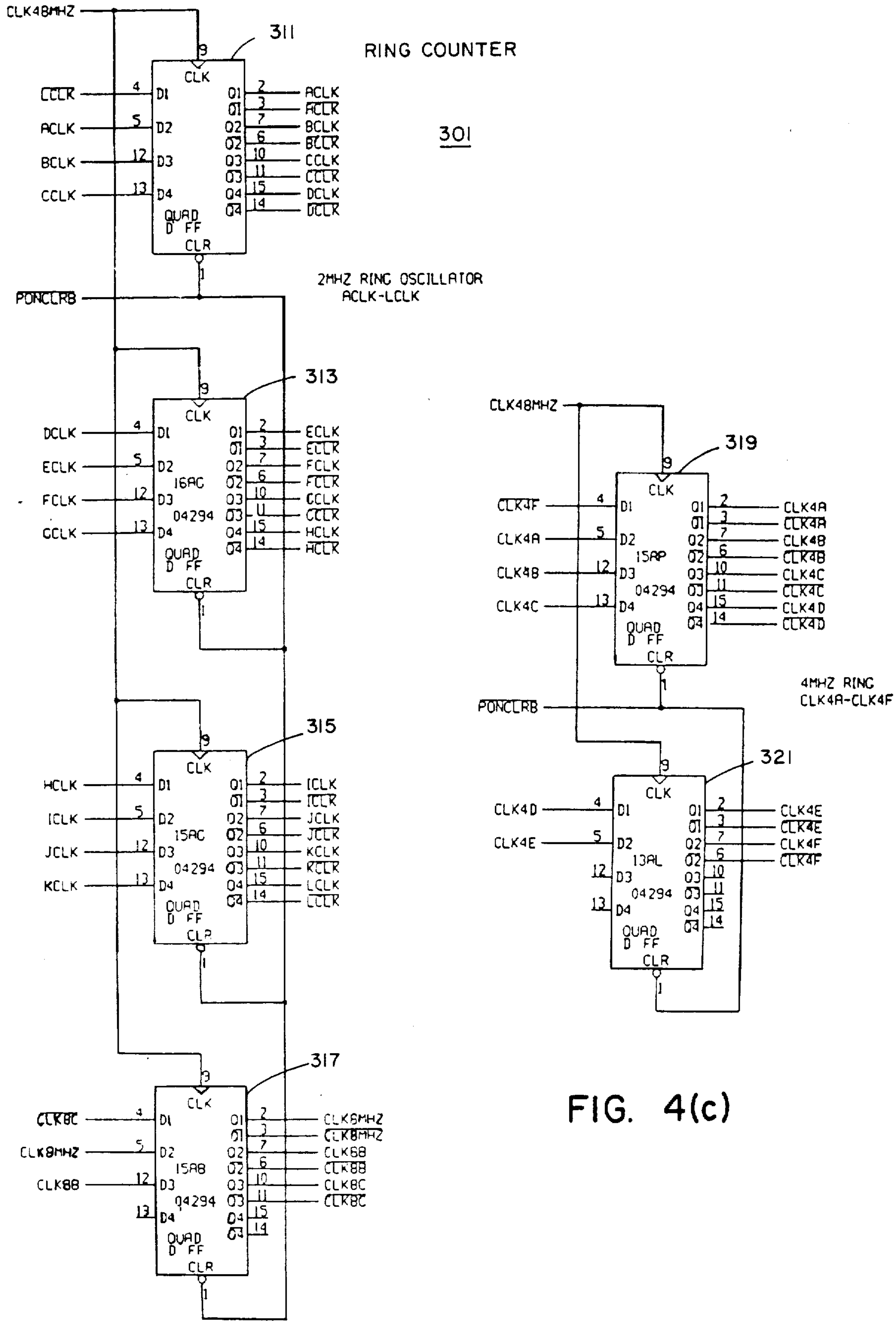
Figure 4D:
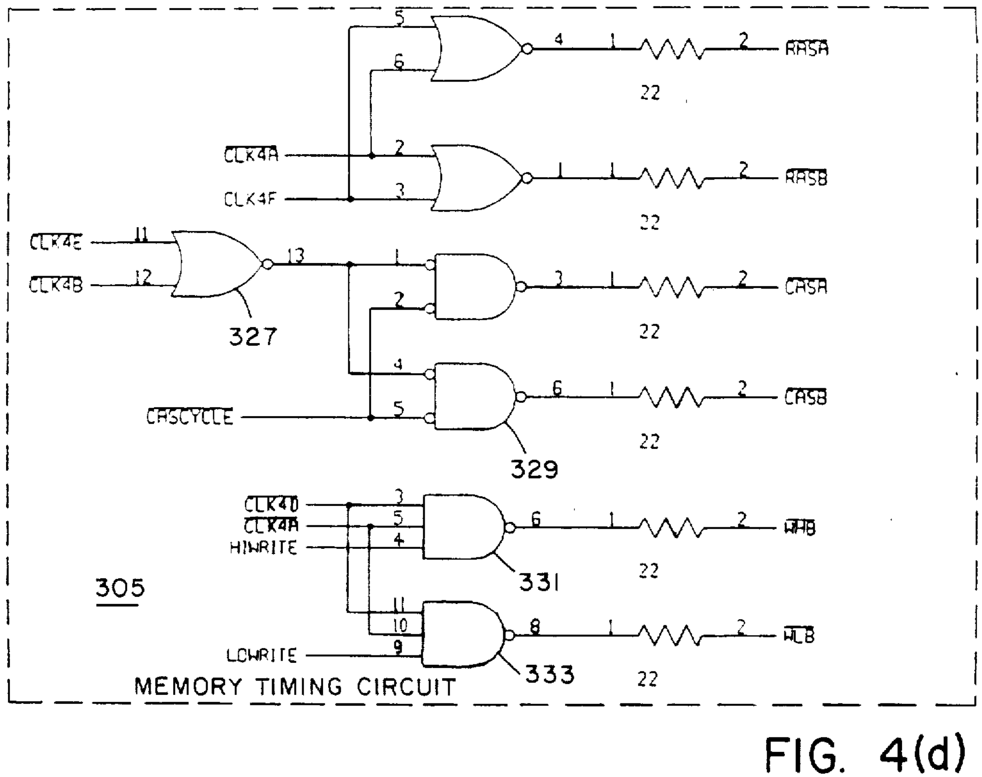
Figure 4E:
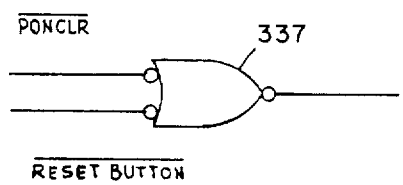
Figure 4F:
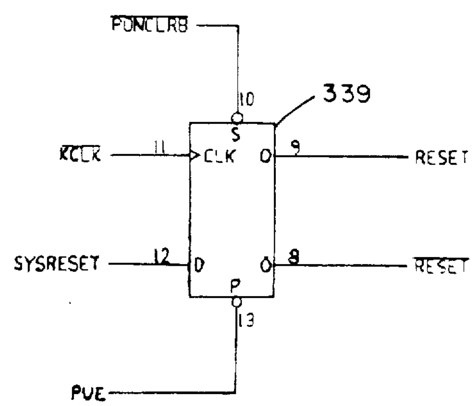
Figure 4G:
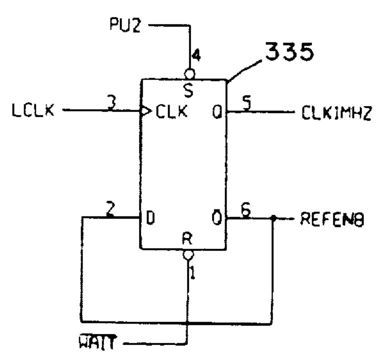
Figure 5A:
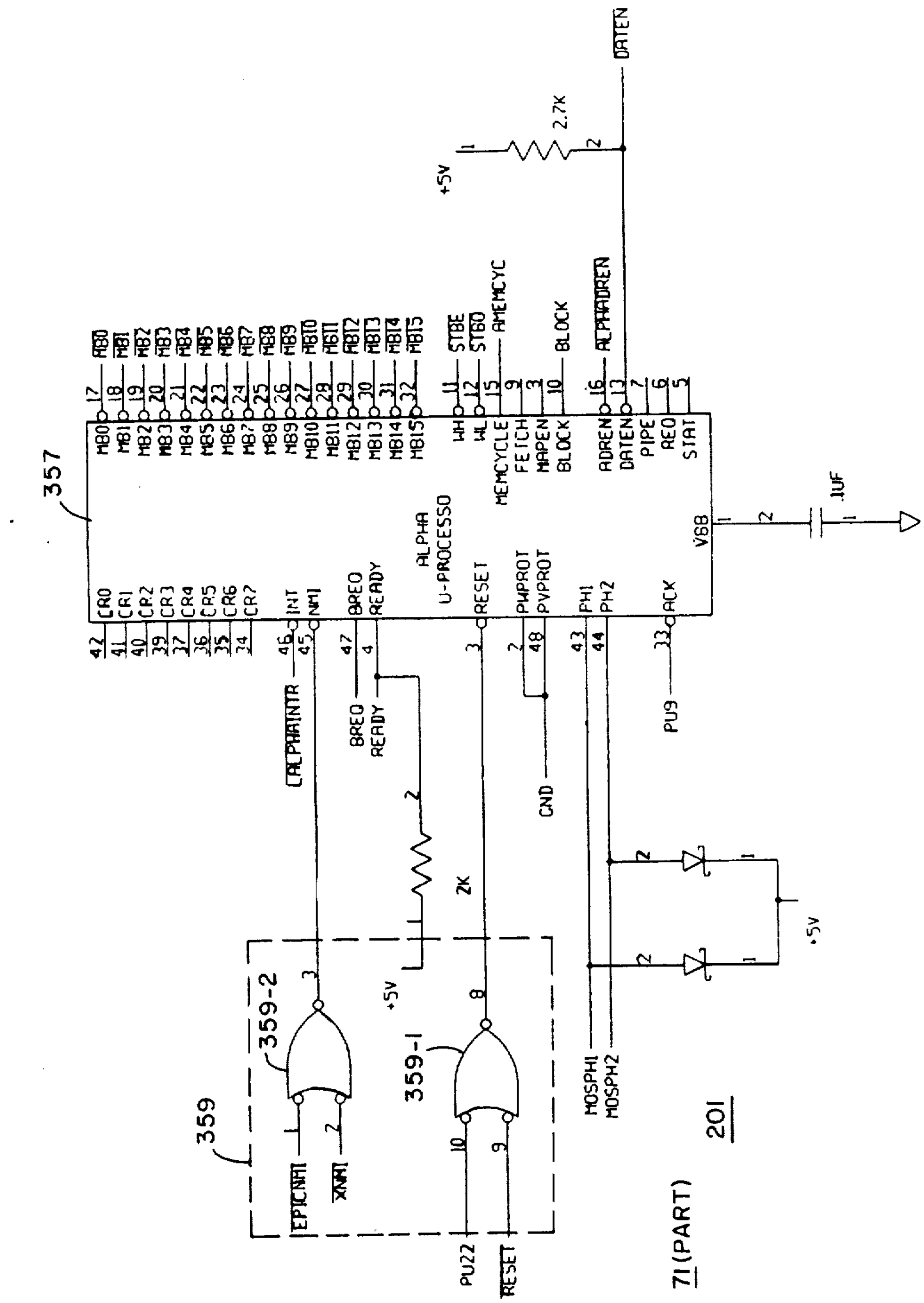
FIGS. 5(*a*) through 5(*i*) are schematic diagrams of the processor section 71 and the RS232/terminal control interface section 81 shown in FIG. 2.
Figure 5B:
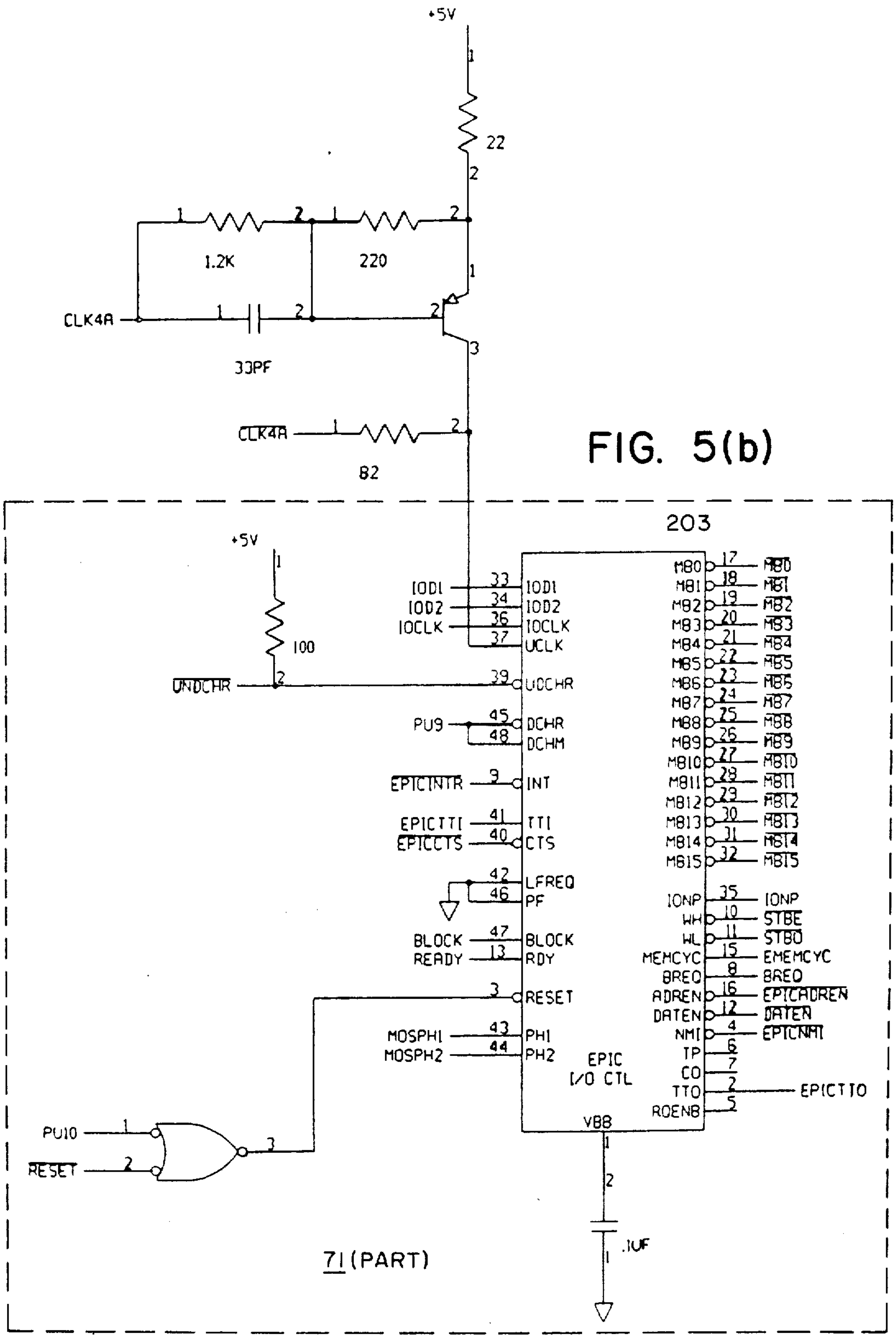
Figure 5C:
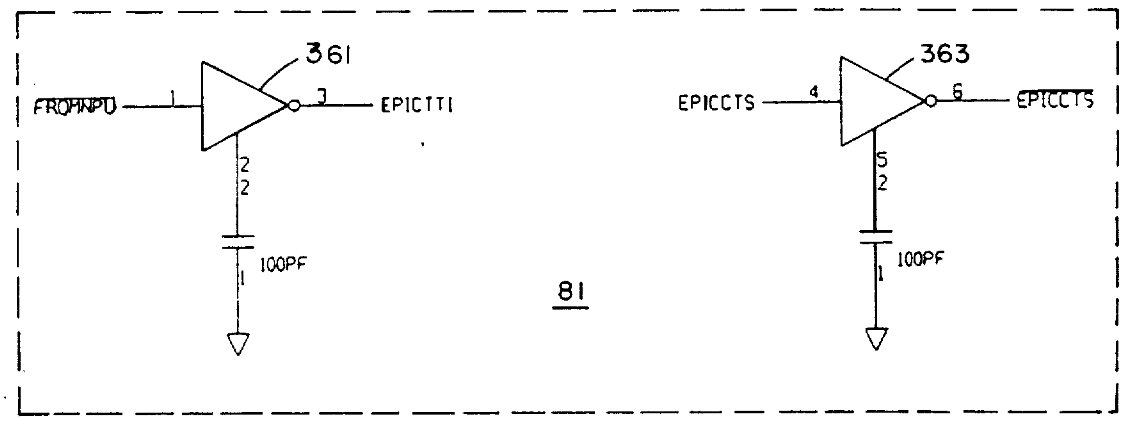
Figure 5D:
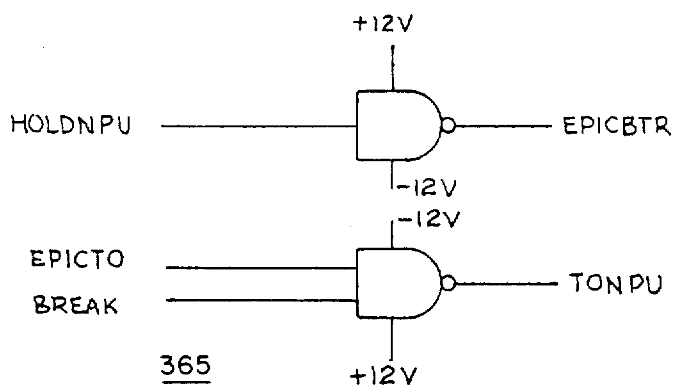
Figure 5E:
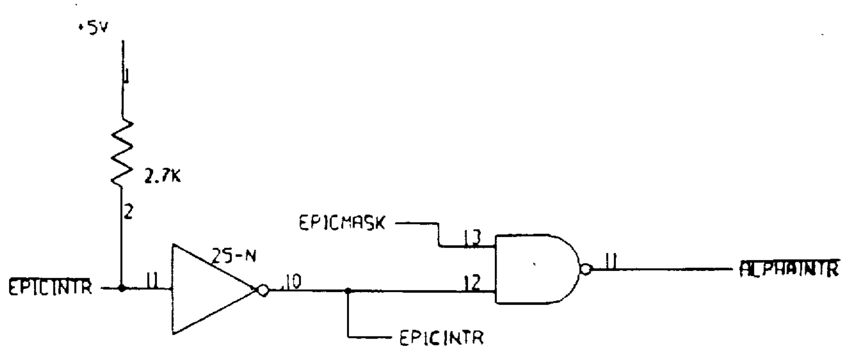
Figure 5G:
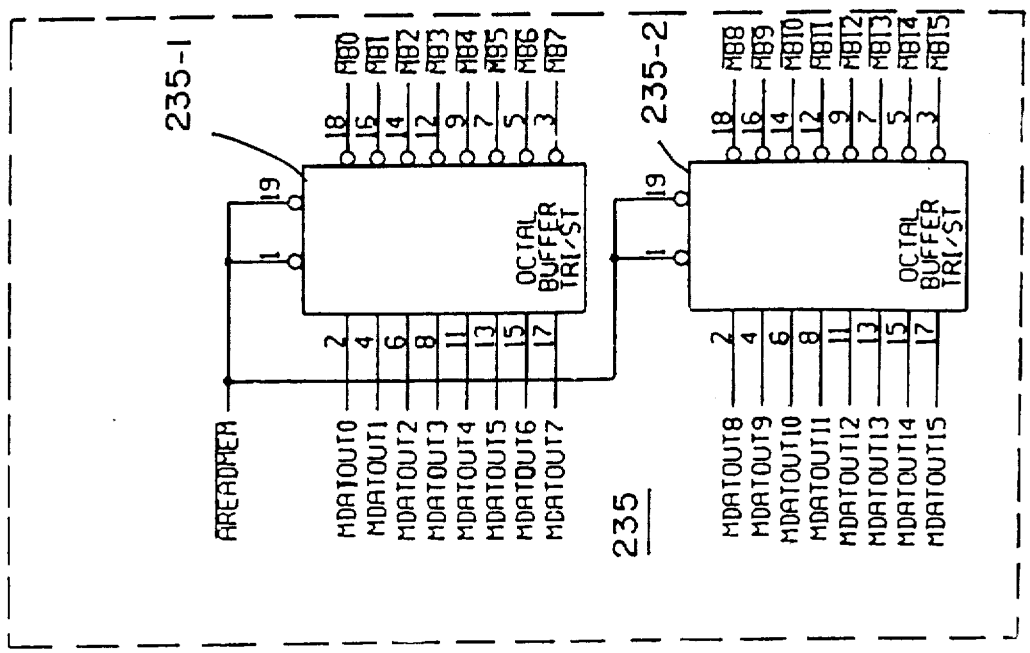
Figure 5F:
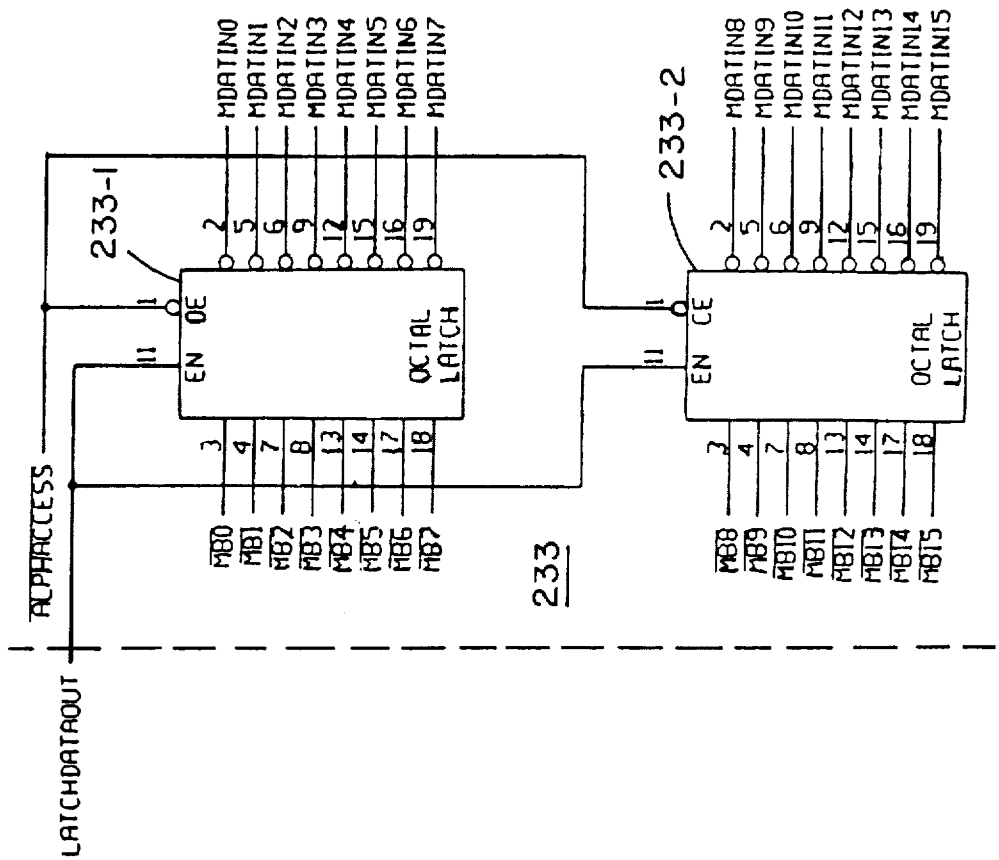
Figure 5H:
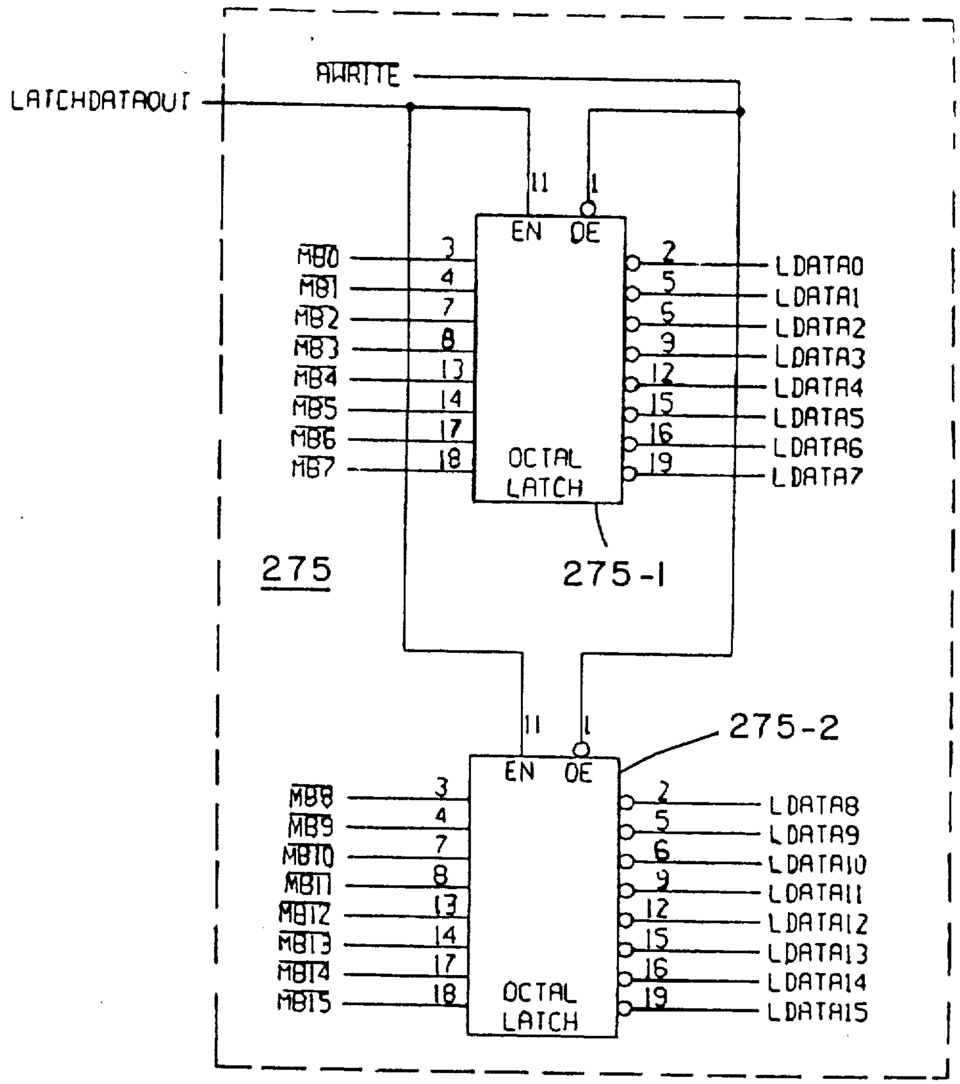
Figure 5I:
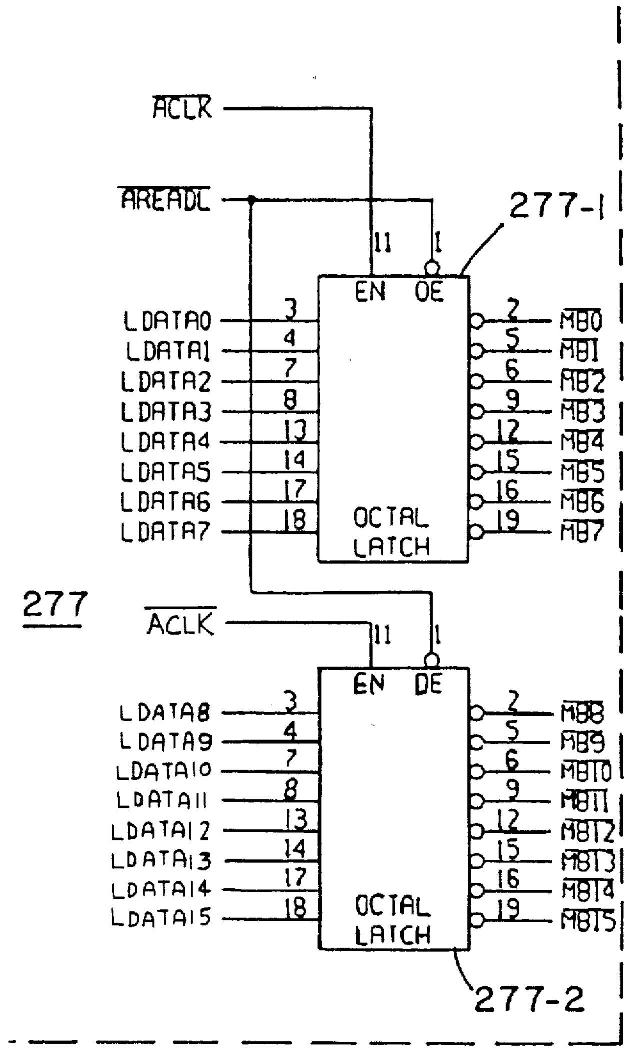
Figure 6A:
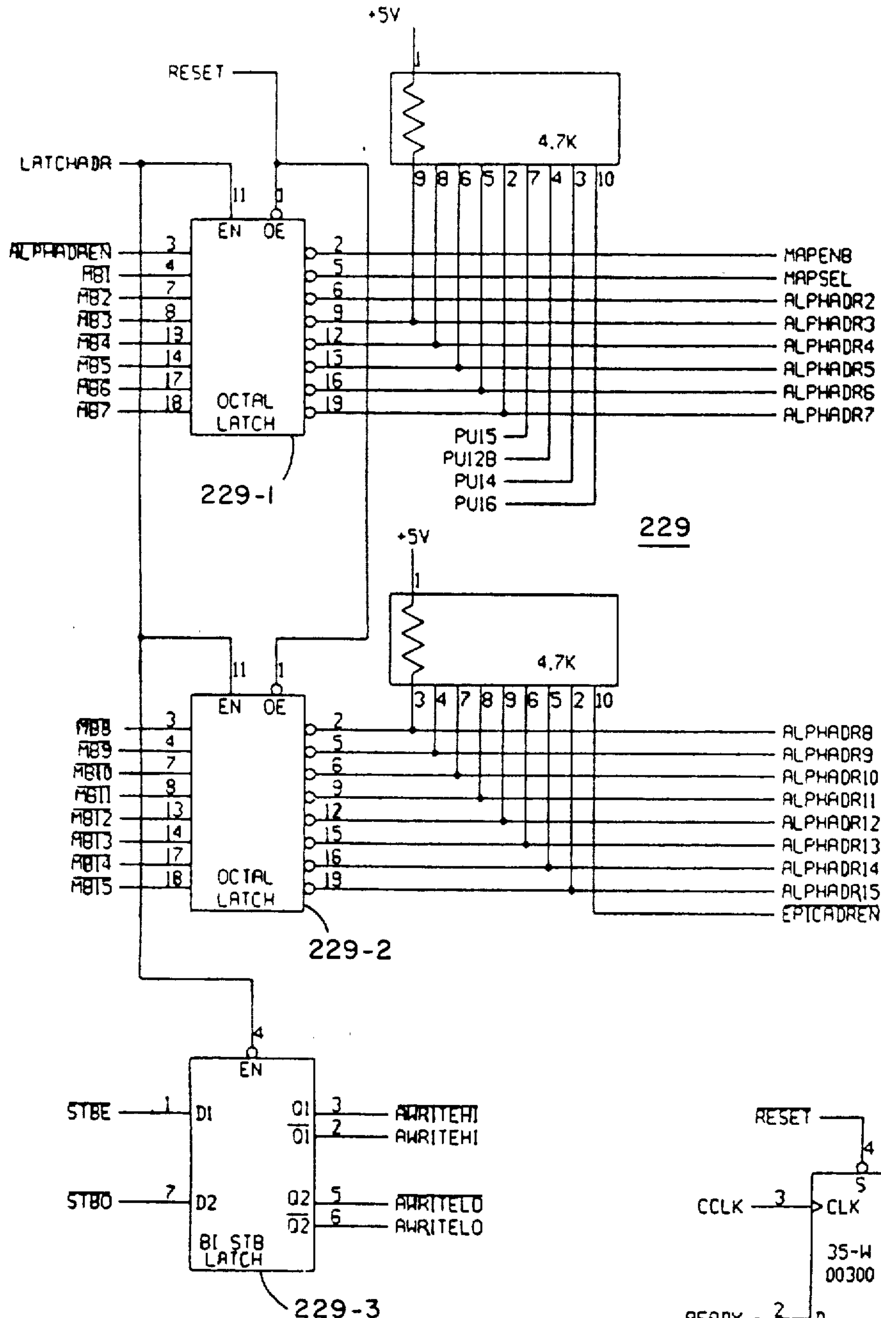
FIGS. 6(*a*) through 6(*j*) are schematic diagrams of circuitry associated with processor bus 223 in FIG. 3.
Figure 6B:
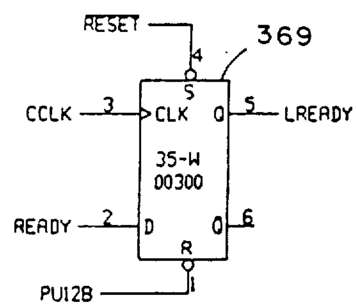
Figure 6C:
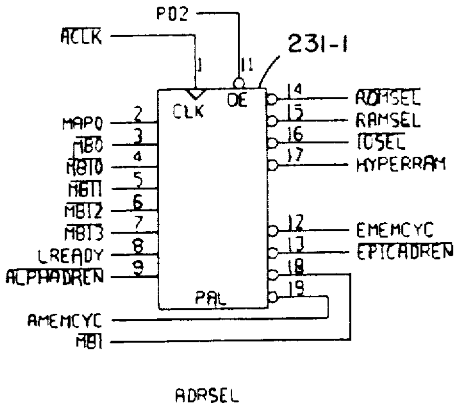
Figure 6D:
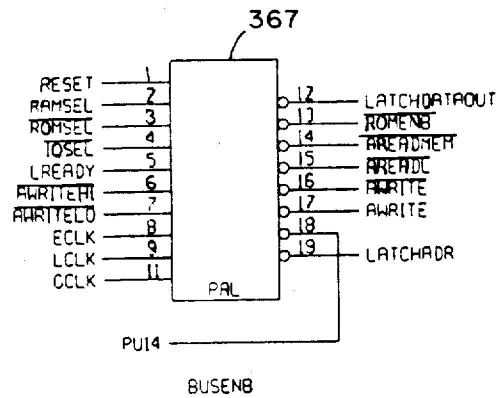
Figure 6E:
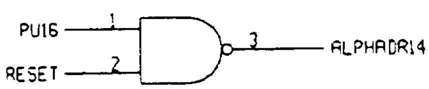
Figure 6F:
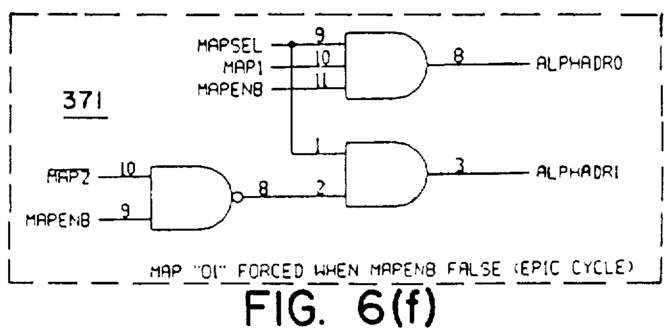
Figure 6H:
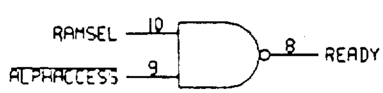

Referring now to FIG. 3, there is shown a more comprehensive block diagram of I/O control subsystem 55.

Subsystem 55 includes a microprocessor 201, identified as ALPHA, a peripheral interface controller 203 identified as EPIC which serves as a multi-function subsystem and a memory array 205. Microprocessor 201 manages all of the functions in I/O control subsystem 55. Peripheral interface controller 203 which is implemented as a single chip contains circuitry and/or logic 207 for providing a real time clock for supporting the timing of the program executed by microprocessor 201, circuitry 81 for interfacing to the RS242 cable 85 and interface circuitry 209 for interfacing to a magnetic tape drive. Interface circuitry 209 is connected to a transceiver 211 that converts the signals generated by multifunction subsystem chip 203 into appropriate signals for transmission to and from the magnetic tape drive over line 111. Memory array 205 is a 64K $\times$16 dynamic RAM (DRAM) which stores information received from microprocessor 201 or from disk controller 91 or from LAN controller 93 or from data channel controller 89 and thus serves as the memory for processor section 6.

An address multiplexor 213 is connected to DRAM 205 over a line 215. Address multiplexor 213 selects which particular source, i.e. microprocessor 201, data channel controller 89, LAN controller 93 or disk controller 91 is addressing DRAM 205. A 16 bit memory bus 217 having a data in channel 219 and a data out channel 221 is connected at one end to DRAM 205 and at the other end to DATA IN LATCH 233 and DATA OUT LATCH 235.

Microprocessor 201 is connected to a processor bus 223 over a bi-directional line 225. Sub-system chip 203 is connected to processor bus 223 over a bi-directional line 227. As can be seen, processor bus 223 provides the address and data path from microprocessor 201 and subsystem chip 203 to all other sections on I/O control subsystem 55.

Processor bus 223 is connected over a line 227 to an address latch 229 which latches the address generated by microprocessor 201 or sub-system chip 203. Address latch 229 is connected to an address decoder 231 which interprets the address in address latch 229 and determines which section on I/O control subsystem 55 is being addressed. Processor bus 223 is connected to the 16 bit memory bus 217 by a latch 233 and a buffer 235. Latch 233 is a data-out latch which is connected to the data-in channel 219 of memory bus 217. Data-out latch 233 takes data sourced from either microprocessor 201 or sub-system chip 203 which is being sent to memory 205 and holds the data until memory 205 is ready to receive it. Buffer 235 is a tri-state buffer that receives data coming from memory 205 over channel 221 of memory bus 217 and drives it into either microprocessor 201 or sub-system chip 203.

Data channel controller 89, local area network (LAN) controller 93 and disk controller 91 are also connected to memory bus 217.

Data channel controller 89 which manages the transfer of data between memory 205 of processor section 71 over system I/O bus 59 to system memory 63 through CPU 53 includes a local data channel address counter 241, a data channel input register 243, a data channel output register 245, a data channel address counter 247 and an input/output transceiver 249.

Local data channel address counter 241 is a counter that is loaded from either microprocesor 201 or sub-system chip 203 with the address in microprocessor memory 205 that is to be accessed. Data channel input register 243 is a 16 bit register that holds data which is read from processor memory 205 and sends it over I data line 103 to system I/O bus 59 to system CPU 53 when requested to do so by system CPU 53. Data channel output register 245 is a register that holds data received from main CPU 53 over I/O bus 59 and line 103 until such time as it can be written into processor memory 205. Data channel address counter 247 is an address counter that holds the main CPU 53 address which is to be accessed. I/O transceiver 249 is a driver/receiver combination that interfaces data channel controller 89 to the system I/O bus 59.

LAN controller 93 includes a serializer 251, a microprocessor 253, an address latch 255, a data-in buffer 257 and a data-out buffer 259.

Serializer 251 is a serial interface adapter which converts differential signals from microprocessor 253 to single ended (mos type) signals which are sent out and received from the local area network transceiver interface (not shown). Microprocessor 253 is a dedicated microprocessor that performs the functions of the local area network to which LAN controller may be attached. Address latch 255 is a latch that takes the address from microprocessor 253 and holds it to access (processor) local memory 205. Data-in buffer 257 serves as a driver for driving data from local memory 205 to microprocessor 253 during a "read" operation. Data-out buffer 259 serves as a driver for driving data from microprocesor 253 to local memory 205 during a "write" operation.

Disk controller 91 includes a floppy formatter 261, a Winchester formatter 263, a microprocessor 265, a disk data output register 267, a disk data input register 269 and a memory address generator 271.

Floppy formatter 261 interfaces I/O control section 77 to floppy disk drive which may be attached thereto. Winchester formatter 263 interfaces I/O control section 77 to a Winchester disk drive which may be attached thereto. Microprocessor 265 manages the operations of floppy formatter 261 and Winchester formatter 263. Disk data output register 267 provides a data path for data from floppy formatter 261 and Winchester formatter 263 to local memory 205 through data input channel 219. Disk data input register 269 provides a data path for data from local memory 205 through data output channel 221 to floppy formatter 261 and Winchester formatter 263. Disk data output register 267 and disk data input register 269 perform the necessary byte packing and unpacking between memory bus 217 which is 16 bits and the disk internal bus 273 which is 8 bits.

Processor bus 223 is also connected to a local bus L identified as bus 273 through an L data-out latch 275 and an L data-in buffer 277. L data bus 273 can be accessed only by microprocessor 201 and is the bus used by microprocessor 201 to manage the remainder of I/O control subsystem 55. L data-out latch 275 takes data from processor bus 223 that is sourced from microprocessor 201 which is being sent out over L data bus 273 to a particular device coupled to L data bus 273 and holds the data until that device is ready to receive it. Data in buffer 277 is a tri-state buffer that receives data from L data bus 273 that is coming from one of the devices connected to L data bus 273 and drives the data into microprocessor 201.

A number of devices are connected to L data bus 273. These devices are an 8K×16 ROM 279, a first DUART 281, a second DUART 283, a set of data channel control registers 285, a first interface 287, a second interface 289, a command register 291, a status register 293 and a set of PIO interface registers 295. In addition to receiving data and sending out data over L data bus 273, these devices also receive address and control signals from microprocessor 201 over line 297.

ROM 279 is the ROM that holds the program for microprocessor 201 that is executed by microprocessor 201 on power-up. After power-up, the operating program for operating I/O control sybsystem 55 is obtained from either the Winchester, the floppy or the tape drive. DUART 281 is a single chip containing two universal asynchronous receiver transmitter devices. One of the devices is used to communicate with a mouse over line 113 while the other device is used to communicate with the line printer over line 109. DUART 283 is also a single chip containing two UART devices. However, only one of the UART's is actually used, and that one is used for commmunicating with the modem over line 115. Data channel control registers 285 comprises a set of registers which are used to provide a data path from microprocessor 201 for loading up local data channel address register 241, data channel address control register 247, to store the particular operation being performed and to store the number of words to be transferred across the data channel. First interface 287 contains the circuitry for interfacing the terminal control section 75 to the keyboard and second interface section 289 contains the circuitry for interfacing terminal control section 75 to video memory subsystem 57. Command register 291 is a register that is written into by microprocessor 201 to control the various functions of I/O control subsystem 55. Status register 293 is the register that microprocessor 201 reads into to determine what is actually occurring in I/O control subsystem 55.

PIO registers 295 are registers used to provide a command and status interface to CPU 53.

Referring now to FIGS. 4(*a*) through 4(*g*), there are shown schematic diagrams of the major components of the timing generator section 73.

Timing generator section 73 includes a twelve cell twisted ring counter 301, an oscillator circuit 303, a memory timing circuit 305, associated logic 307 and associated logic 309.

Twelve cell twisted ring counter 301 is made up of six quad D type-flip-flops labelled 311 through 321. Flip-flops 311, 313 and 315 are used to convert the 48 MHZ clock signal from oscillator circuit 303 into a 2 MHZ clock signal. Flip-flop 317 converts the 48 MHZ clock signal into an 8 MHZ clock signal and flip-flops 319 and 321 convert the 48 MHZ clock signal into a 4 MHZ clock signal. Oscillator section 303 includes 48 MHZ crystal oscillator 323 and a buffer 325. Oscillator 323 and buffer 325 together generate the 48 MHZ clock. Memory timing circuit 305 includes an OR gate 327 which gates clock signals $\overline{\text{CLK4E}}$ and $\overline{\text{CLK4B}}$ and three NAND gates 329, 331 and 333. Associated logic 307 includes a D type flip-flop 335 that generates a 1 MHZ clock signal from a 2 MHZ clock signal, an AND gate 337 which resets I/O control subsystem 55 at power-up if a reset button is depressed and a D type flip-flop 339 that generates a system reset. Associated logic 309 is a circuit that generates the underlying phase 1 and phase 2 of microprocessor 201 and includes a pair of OR gates 341 and 343, a set of four NAND gates 345, 347, 349 and 351 that convert TTL levels to MOS levels and a pair of MOS drivers 353 and 355.

Referring now to FIGS. 5(*a*) through 5(*i*), there are shown schematic diagrams containing microprocessor 201, subsystem chip 203, latches 233, 275, buffers 235 and 277 and RS232 interface section 81. Microprocessor 201, (ALPHA in FIG. 3) includes a microprocessor chip 357 and associated logic 359, the associated logic including a pair of gates 359-1 and 359-2. Controller chip 203 includes a circuit 91 for interfacing processor section 71 to the magnetic tape, portions of the circuitry for interfacing terminal control section 75 to the RS232 cable and a real time clock. The interface circuitry 81 for interfacing terminal control section 75 to the RS232 cable also includes a pair of receivers 361 and 363 and a transmitter 365. Data output latch 233 includes a pair of octal latches 233-1 and 233-2. L Data output latch 275 includes a pair of octal latches 275-1 and 276-2. Data-in buffer 235 includes two octal tri-state buffers 235-1 and 235-2.

Referring now to FIGS. 6(*a*) through 6(*j*), there are illustrated logic circuitry associated with the processor bus 223. The circuitry includes three latches 229-1, 229-2 and 229-3 which together comprise address latch 229, a PAL 231-1 and a PROM 231-2 which together comprise address decoder 231, a PAL 367 which controls the flow of data on processor bus 223, a D type flip-flop 369 which latches the ready signal to PAL 231-1, a random logic 371 which permutes the high order microprocessor address and a pair of PROMS 279-1 and 279-2 which together comprise ROM 279.

Figure 7A:
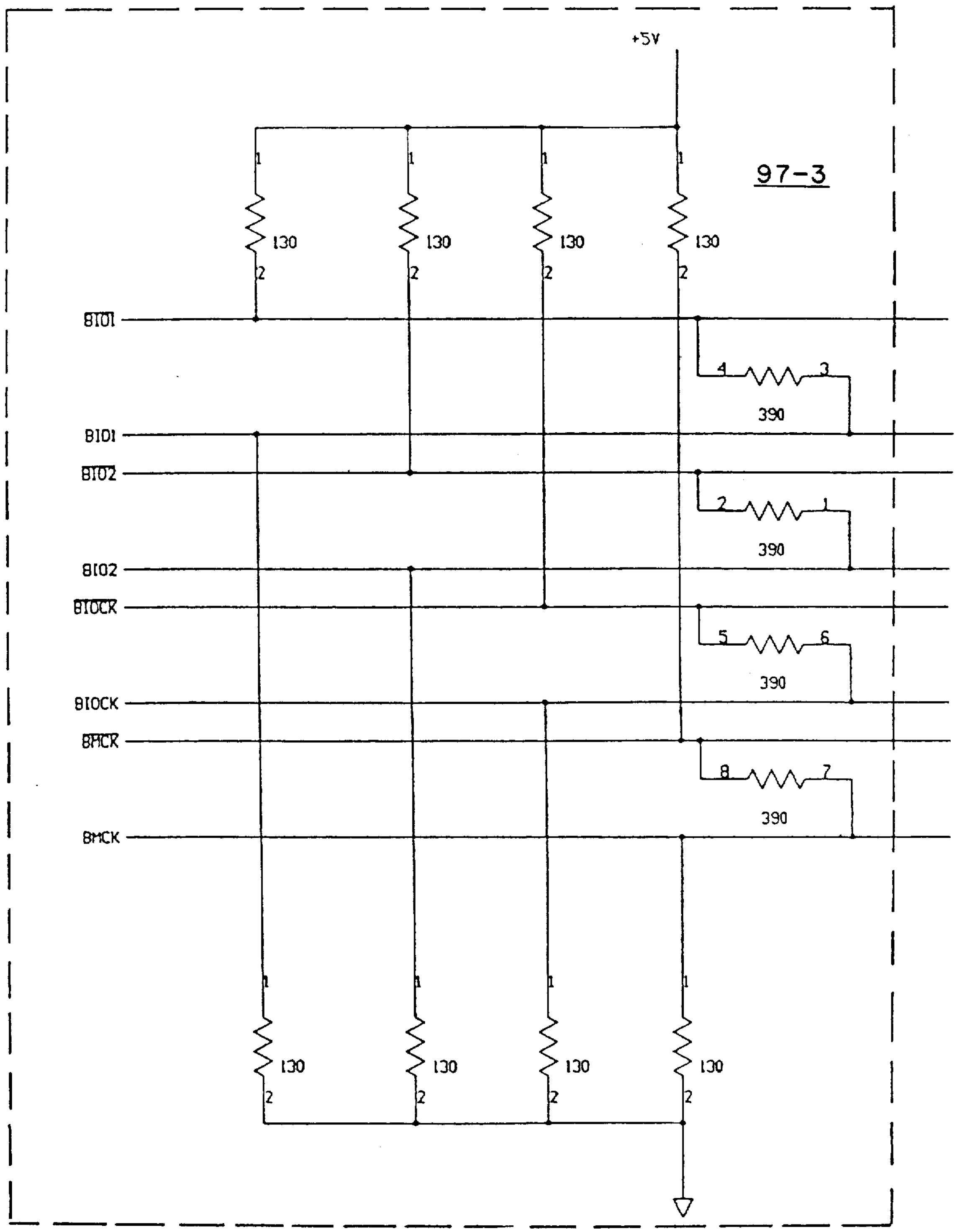
FIGS. 7(*a*) and 7(*b*) are schematic diagrams of parts of the magnetic tape interface/controller 97 in FIG. 2.
Figure 7B:
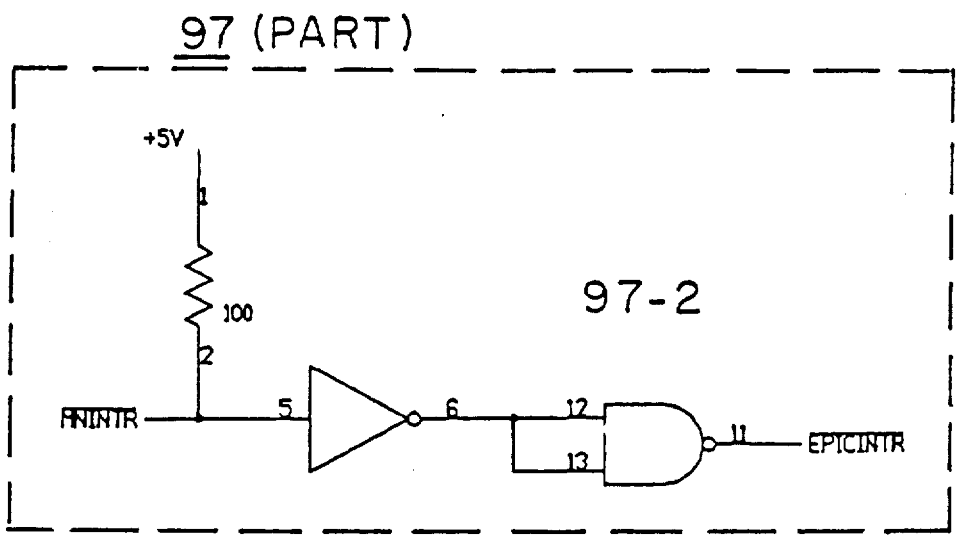
Figure 8A:
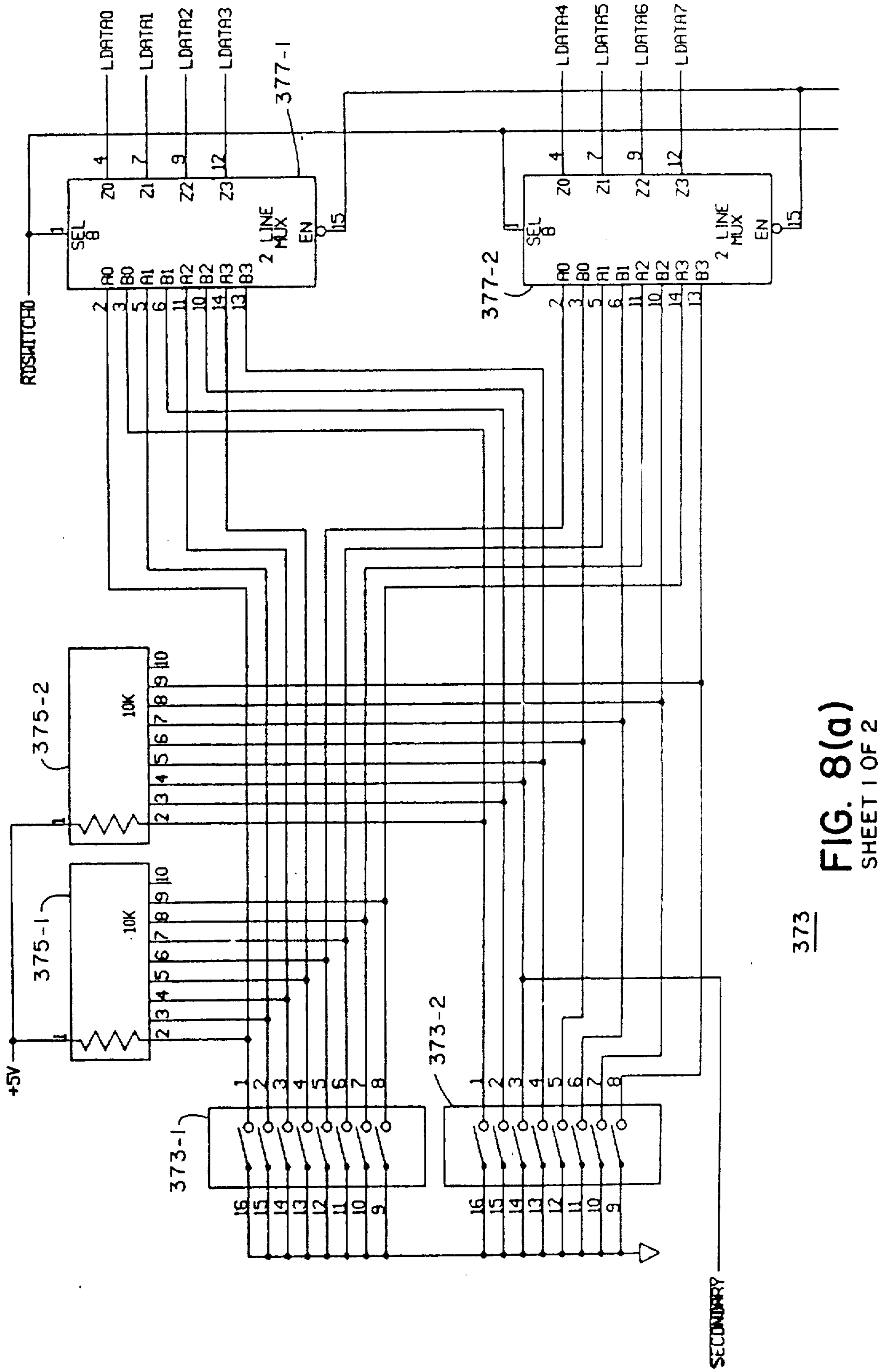
FIGS. 8(*a*) through 8(*h*) are schematic diagrams of the command and status portion of processor 71 in FIG. 2.
Figure 8A:
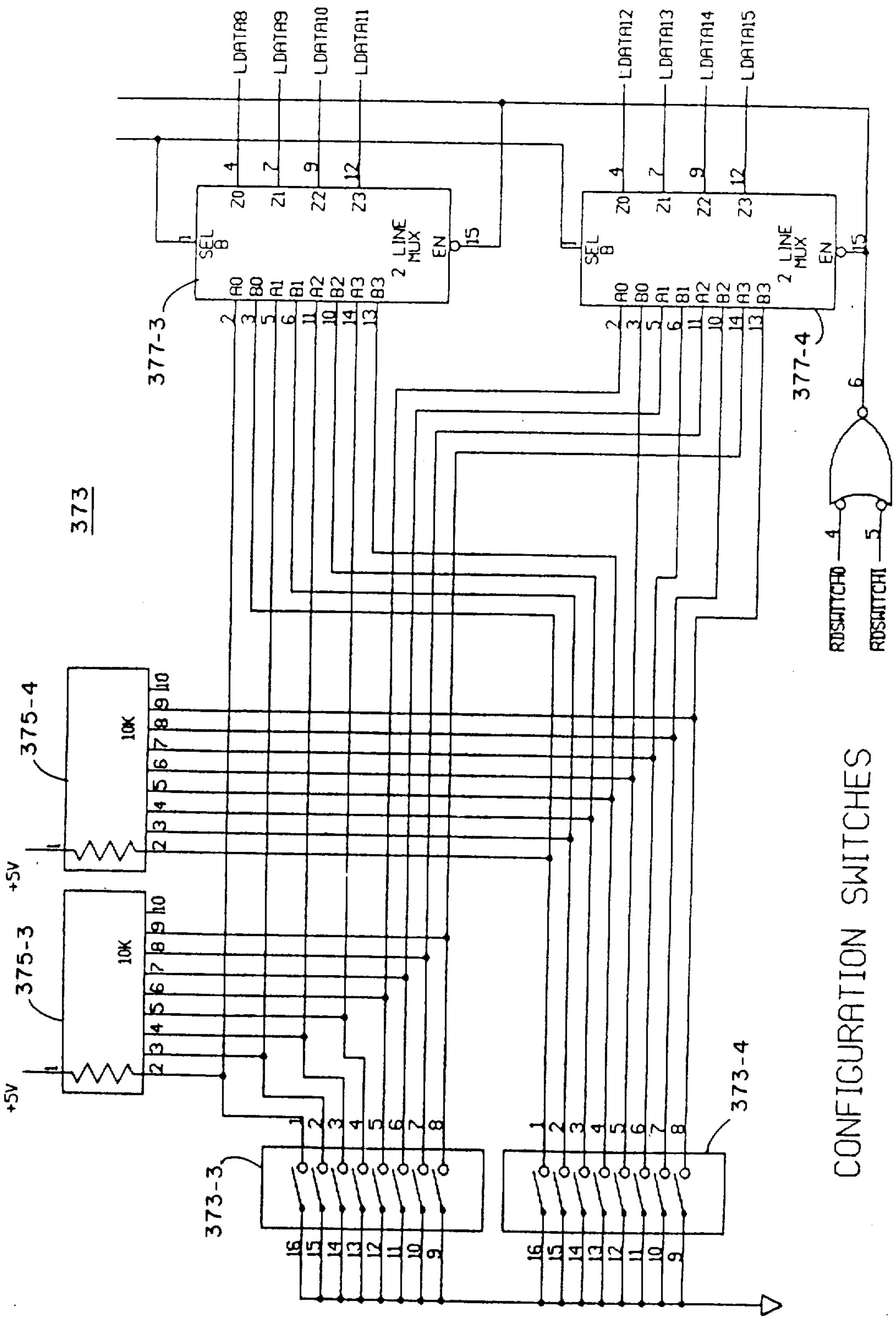
Figure 8B:
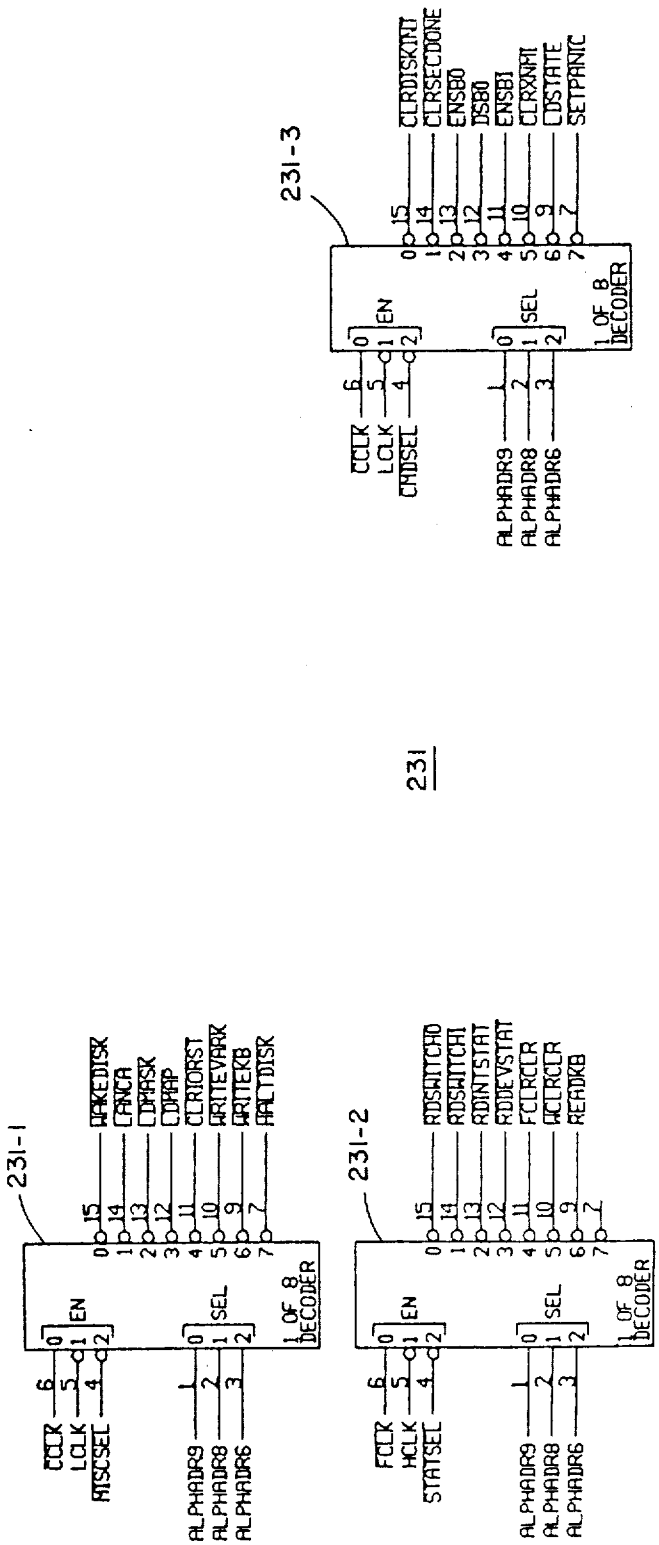
Figure 8E:
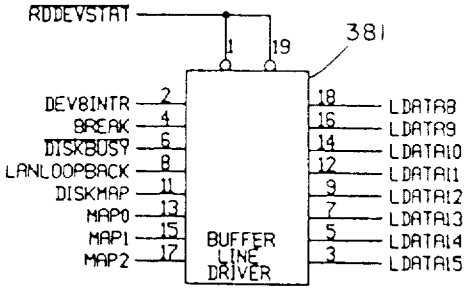
Figure 8F:
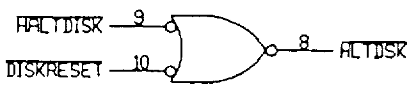
Figure 8G:
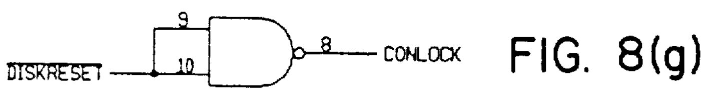
Figure 8H:
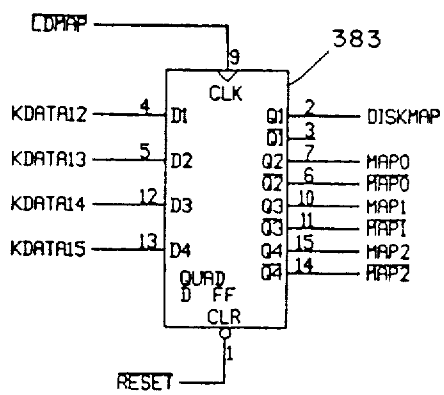
Figure 8C:
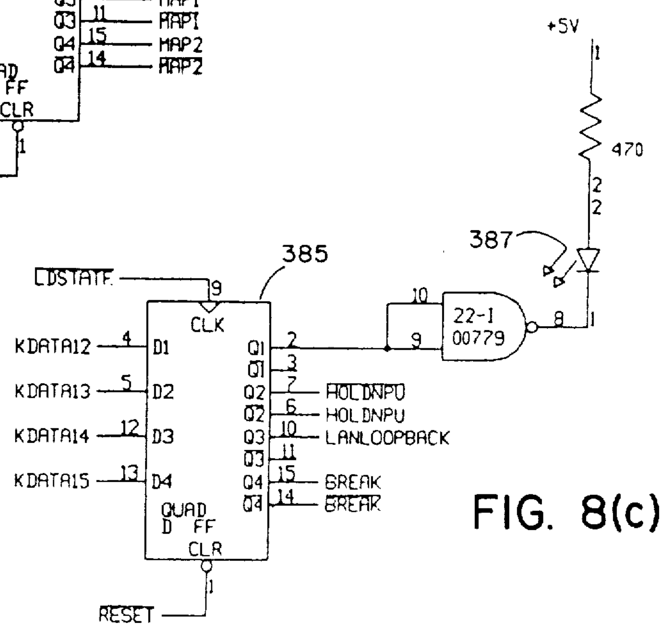

Referring now to FIGS. 7(*a*) and 7(*b*), there are illustrated schematic diagrams of the magnetic tape interface circuitry 97. Circuitry 97 includes a transceiver chip 97-1, an interrupt receiver circuit 97-2 for bus 111 and circuitry 97-3 which serves as a passive interface termination to bus 111.

Referring now to FIGS. 8(*a*) through 8(*h*), there are illustrated schematic diagrams of the command and status portion of processor section 71.

The portion includes a bank of four configuration switches 373-1 through 373-4, a set of four pull-up resistors 375-1 through 375-4 and a set of four 2 line multiplexors 377-1 through 377-4. The four configuration switches 373 together provide 32 switches whose values can be read from microprocessor 201 as two 16 bit words. The portion also includes the address decoder 231 which is made up of three decoders 231-1, 231-2 and 231-3. The portion further includes interrupt status registers 231. These registers comprise a pair of tri-state buffers 293-1 and 293-2 which act as buffer line drivers and allow microprocessor 201 to read the interrupt status of the various devices coupled to the I/O control unit 77. The portion further includes a mask register 379 which is made up of two quad D flip-flops 379-1 and 379-2. The mask register 379 allows microprocessor 201 to write into it with bits that enable each device that it interrupts. There is also a tri-state buffer 381 which allows microprocessor 201 to read a number of other status bits on I/O control subsystem 55, a quad D flip-flop 383 which serves as a MAP register and a quad D flip-flop 385 which has 4 bits of state that microprocessor can write into it. One of the states lights an LED 387 which indicates the status of the subsystem is OK after power up and self test.

Figure 9A:
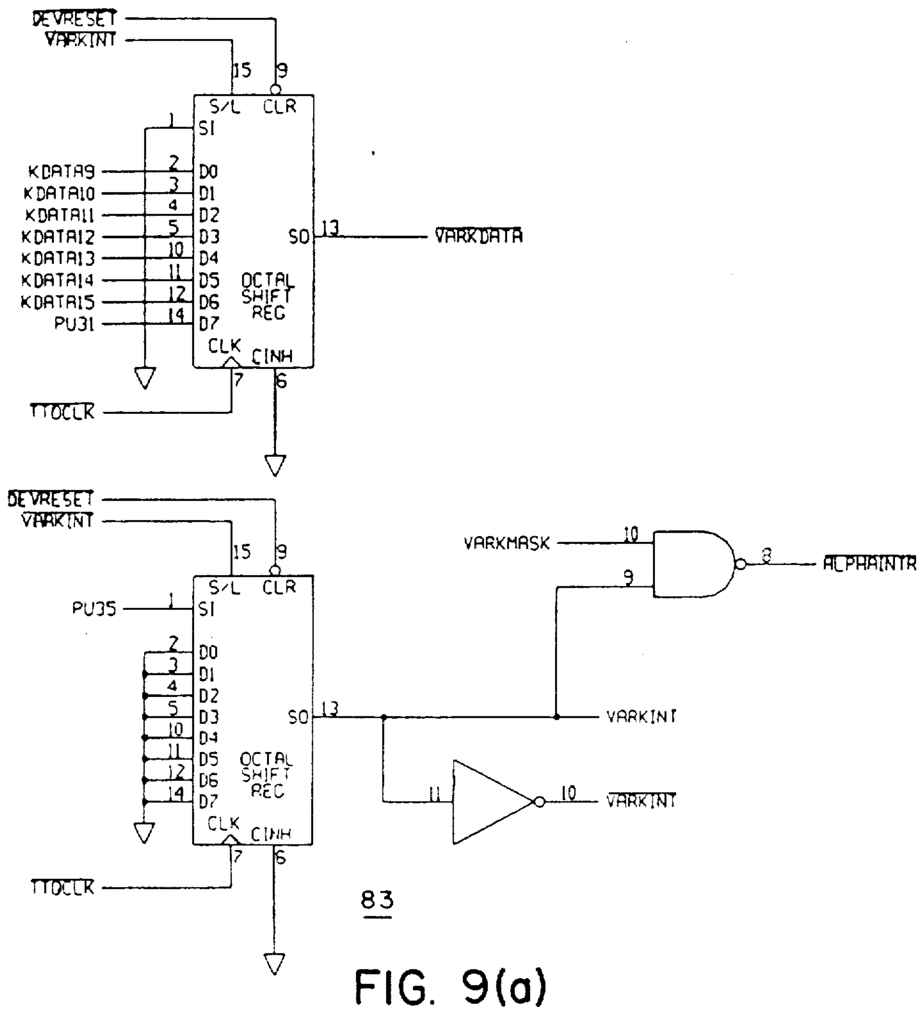
FIGS. 9(*a*) through 9(*c*) are schematic diagrams of portions of processor section 71, keyboard/terminal control interface 79 and terminal control/video control section interface and controller 83 in FIG. 2.
Figure 9B:
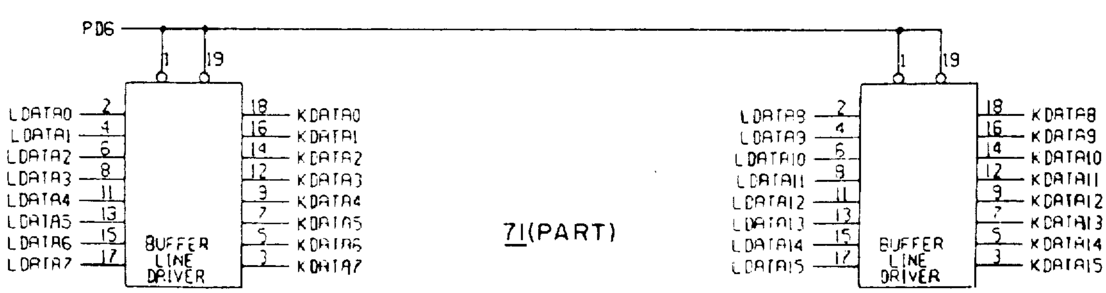
Figure 9C:
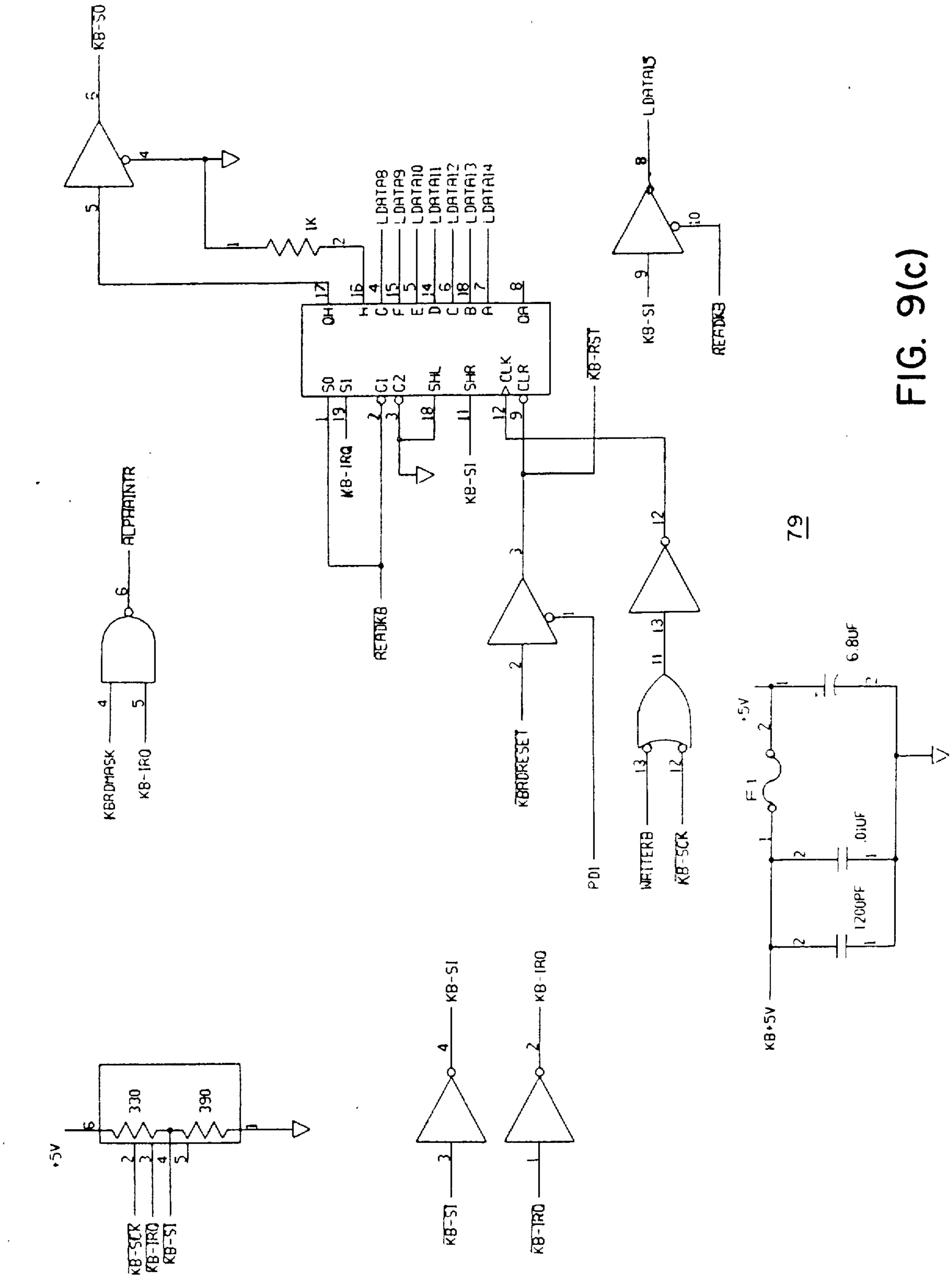

Referring now to FIGS. 9(*a*) and 9(*b*), there are illustrated schematic diagrams of another portion of processor section 27 along with the interface circuits connecting terminal control section 75 to the keyboard and connecting terminal control section 75 to vidio memory subsystem 57.

Figure 10A:
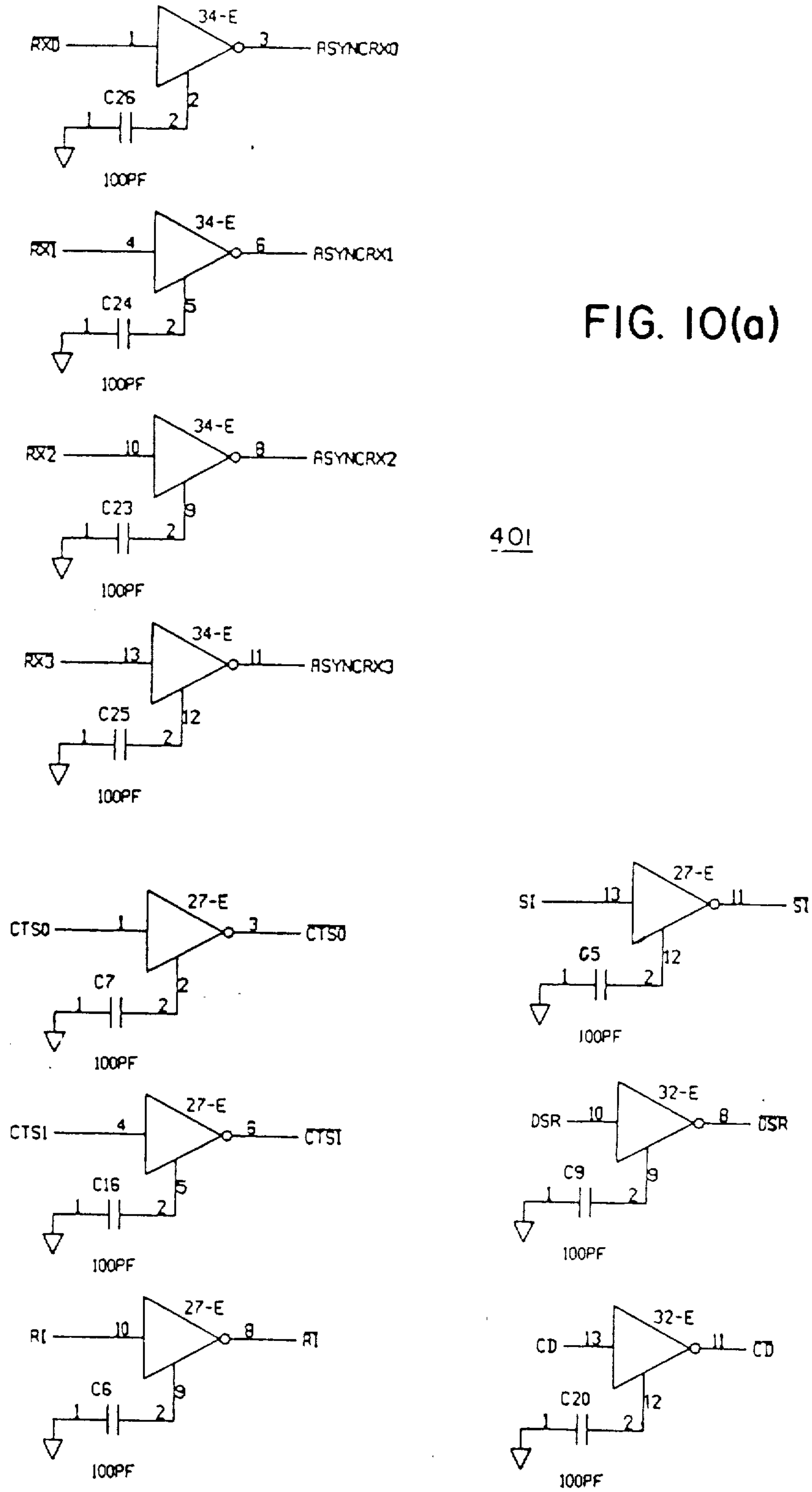
FIGS. 10(*a*) through 10(*g*) are schematic diagrams of LPT interface and control section 95, disk interface and control section 91 and mouse interface and control section 99 shown in FIG. 2.
Figure 10C:
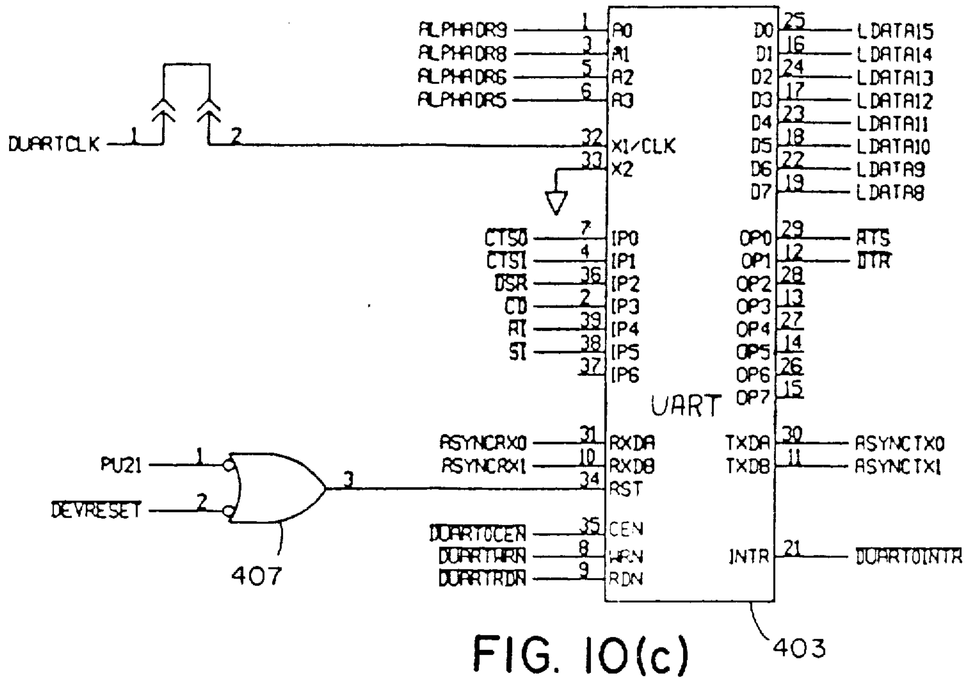
Figure 10B:
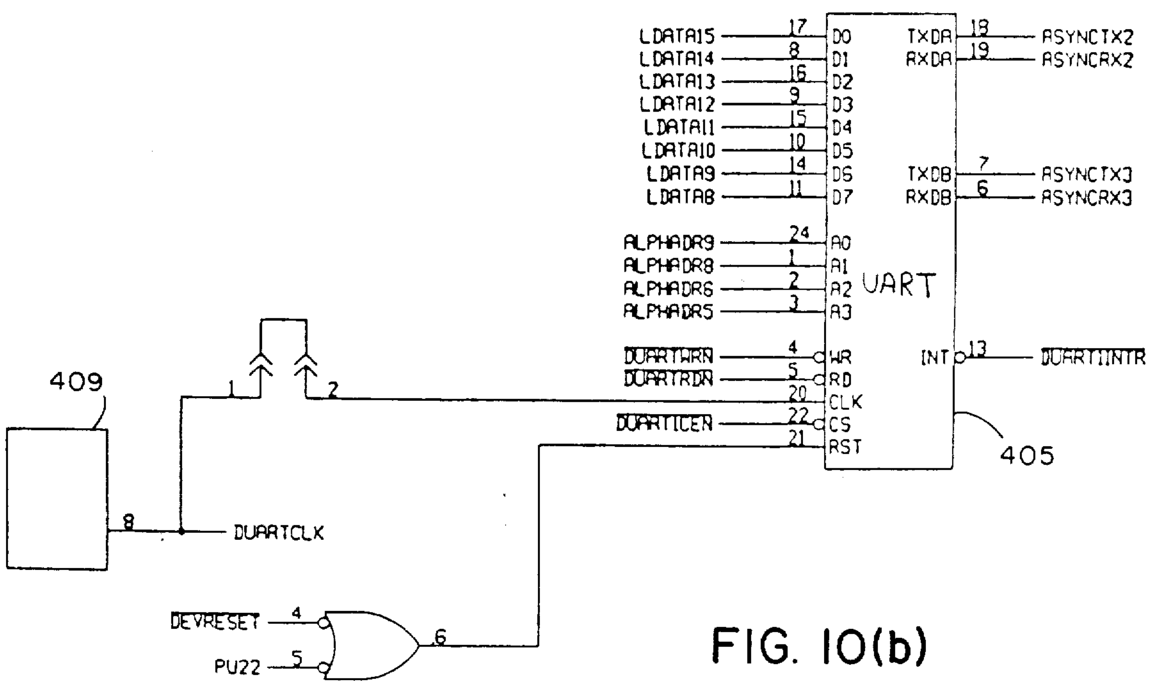
Figure 11A:
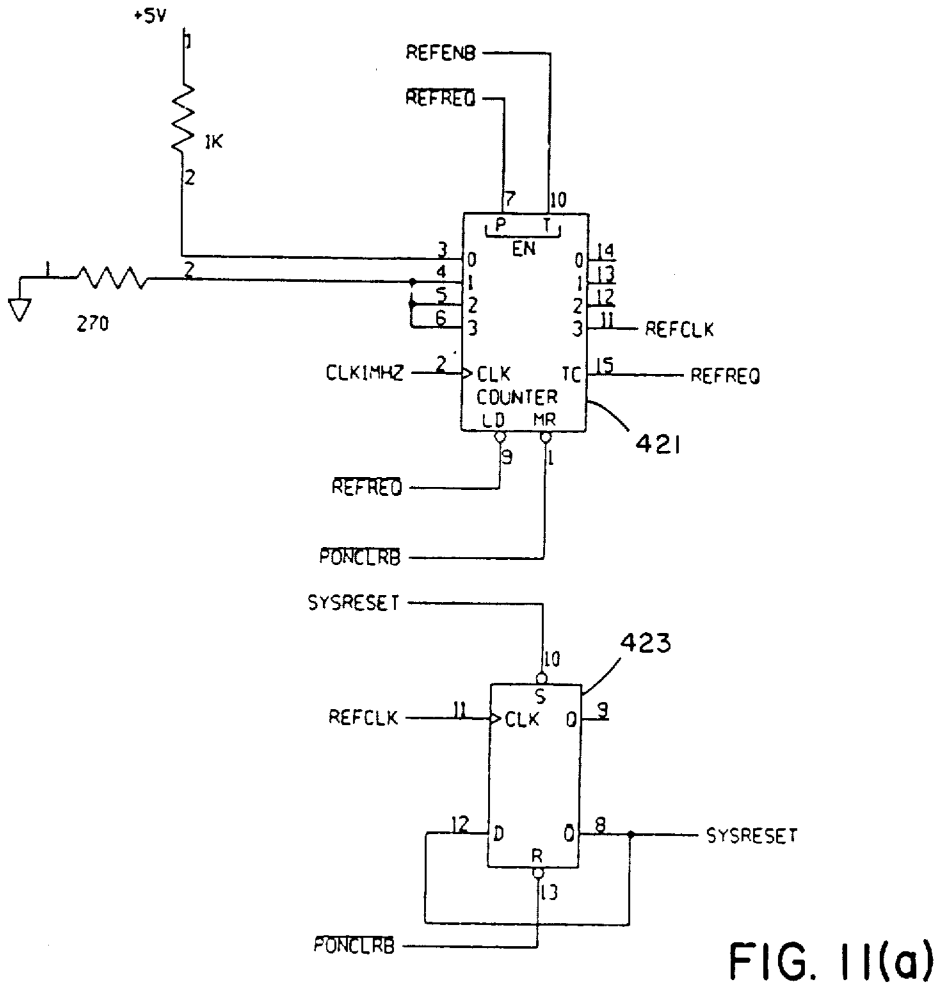
FIGS. 11(*a*) through 11(*d*) are schematic diagrams of the memory control portion of processor section 71 in FIG. 2.
Figure 11B:
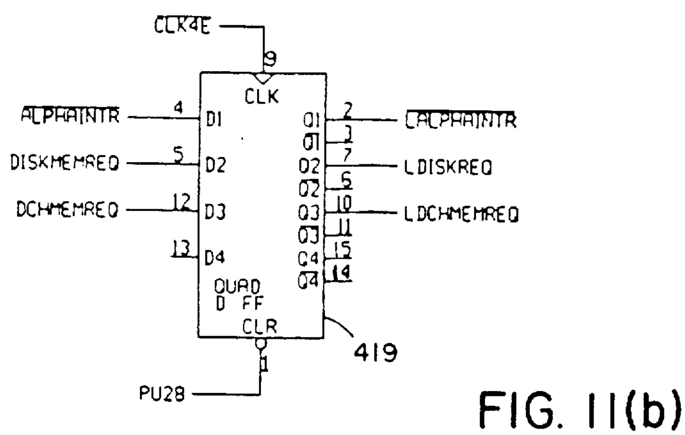
Figure 11C:
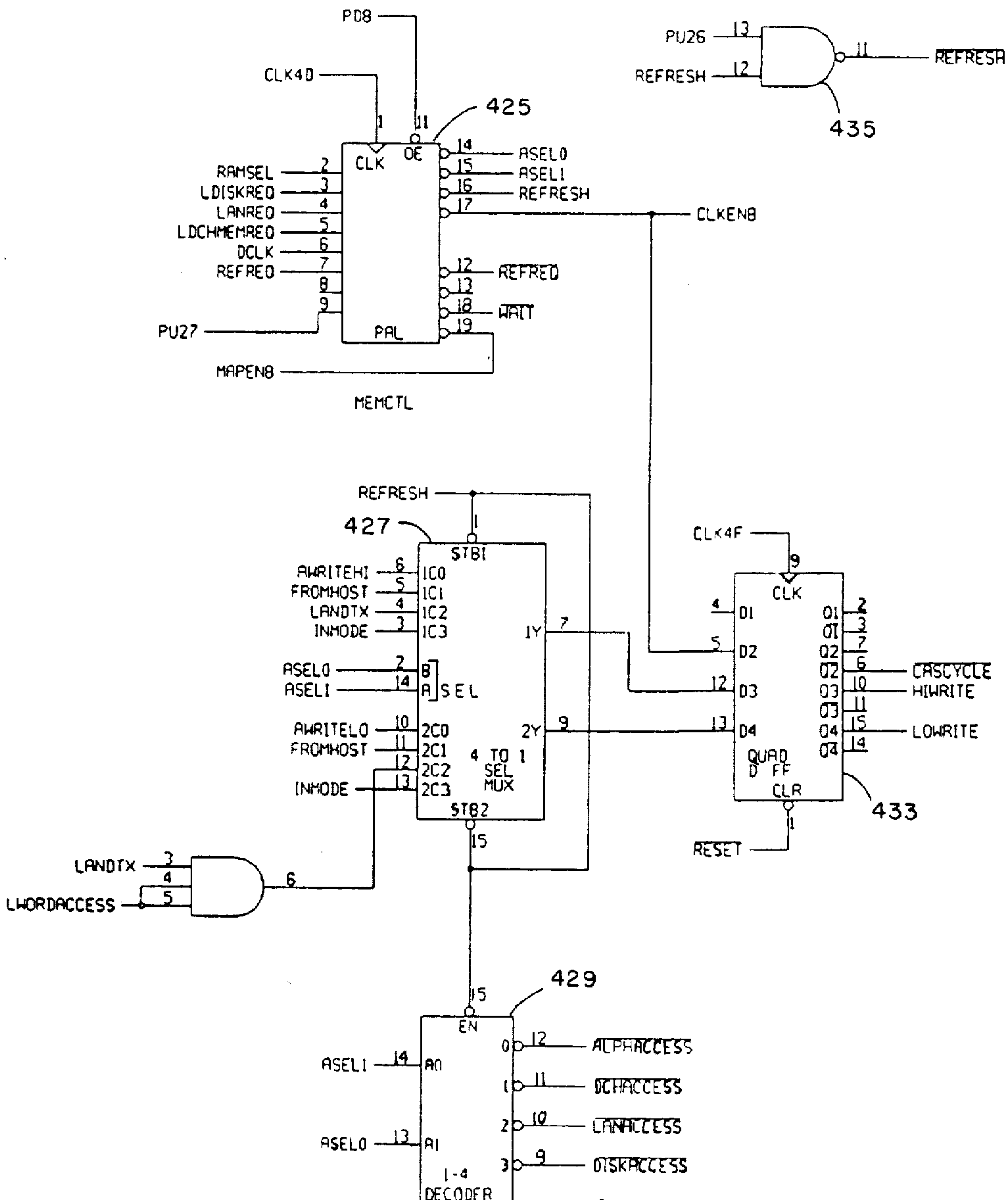
Figure 11D:
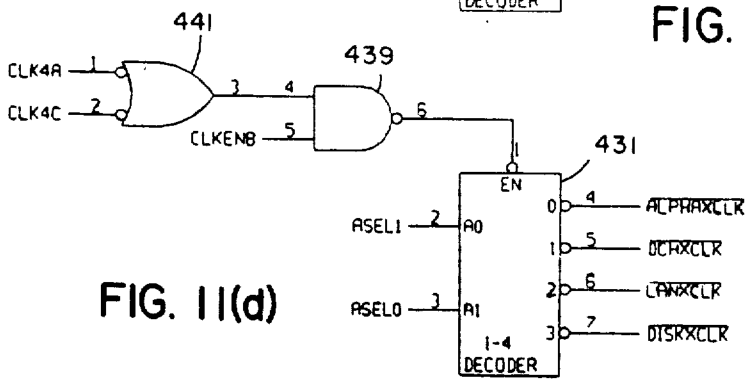
Figure 12A:
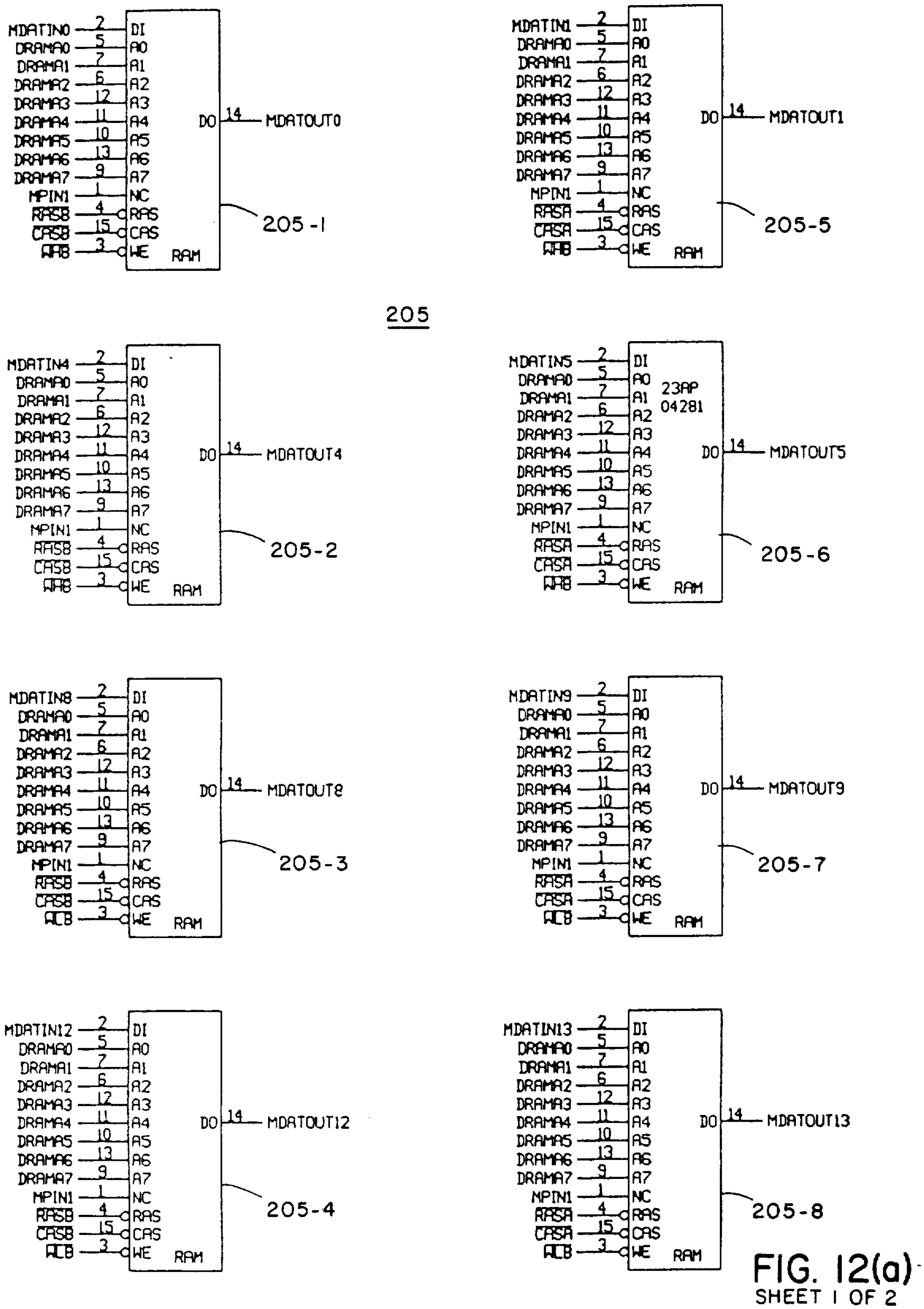
FIGS. 12(*a*) through 12(*c*) are schematic diagrams of the memory section of processor section 71 in FIG. 2.
Figure 12B:
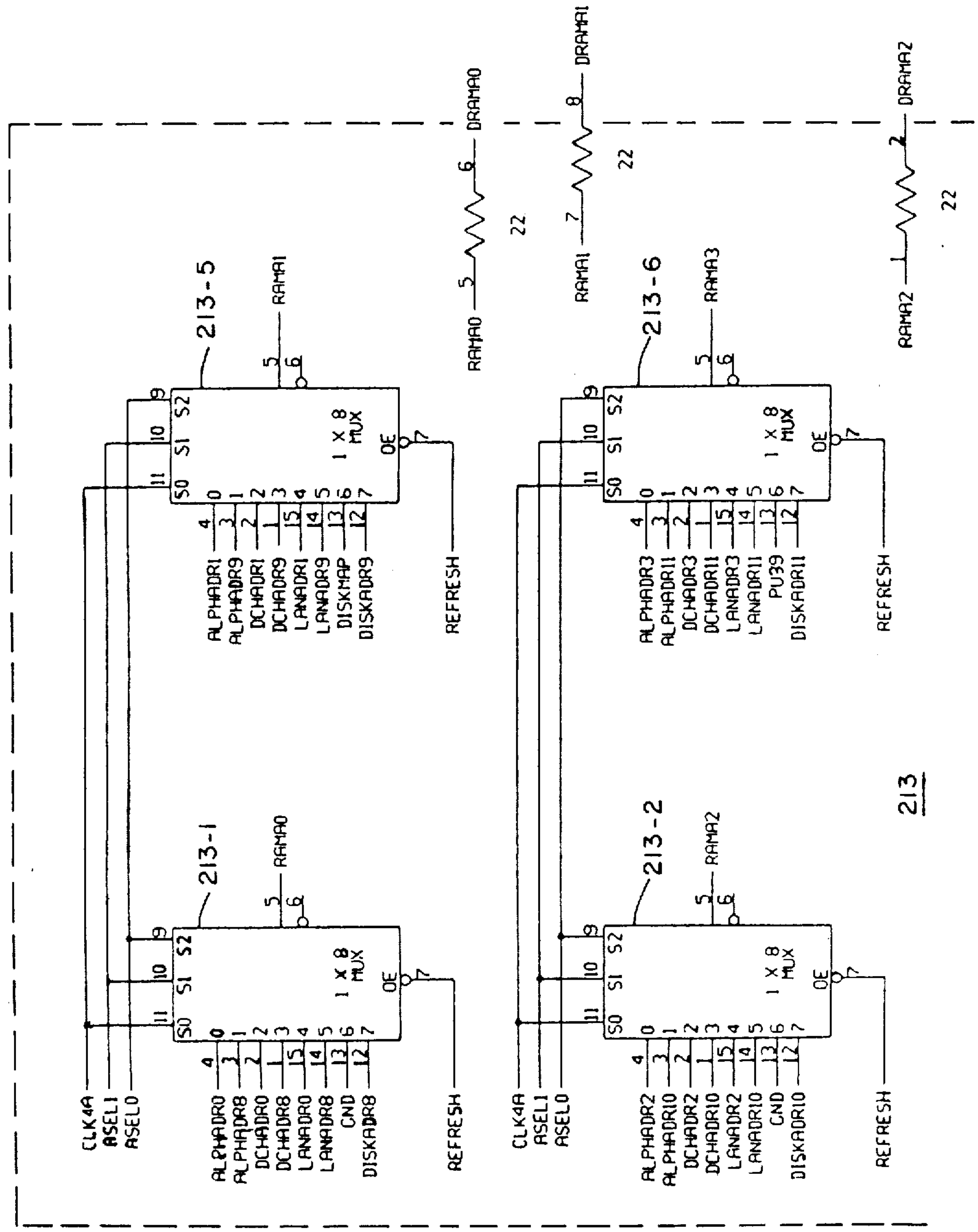
Figure 12B:
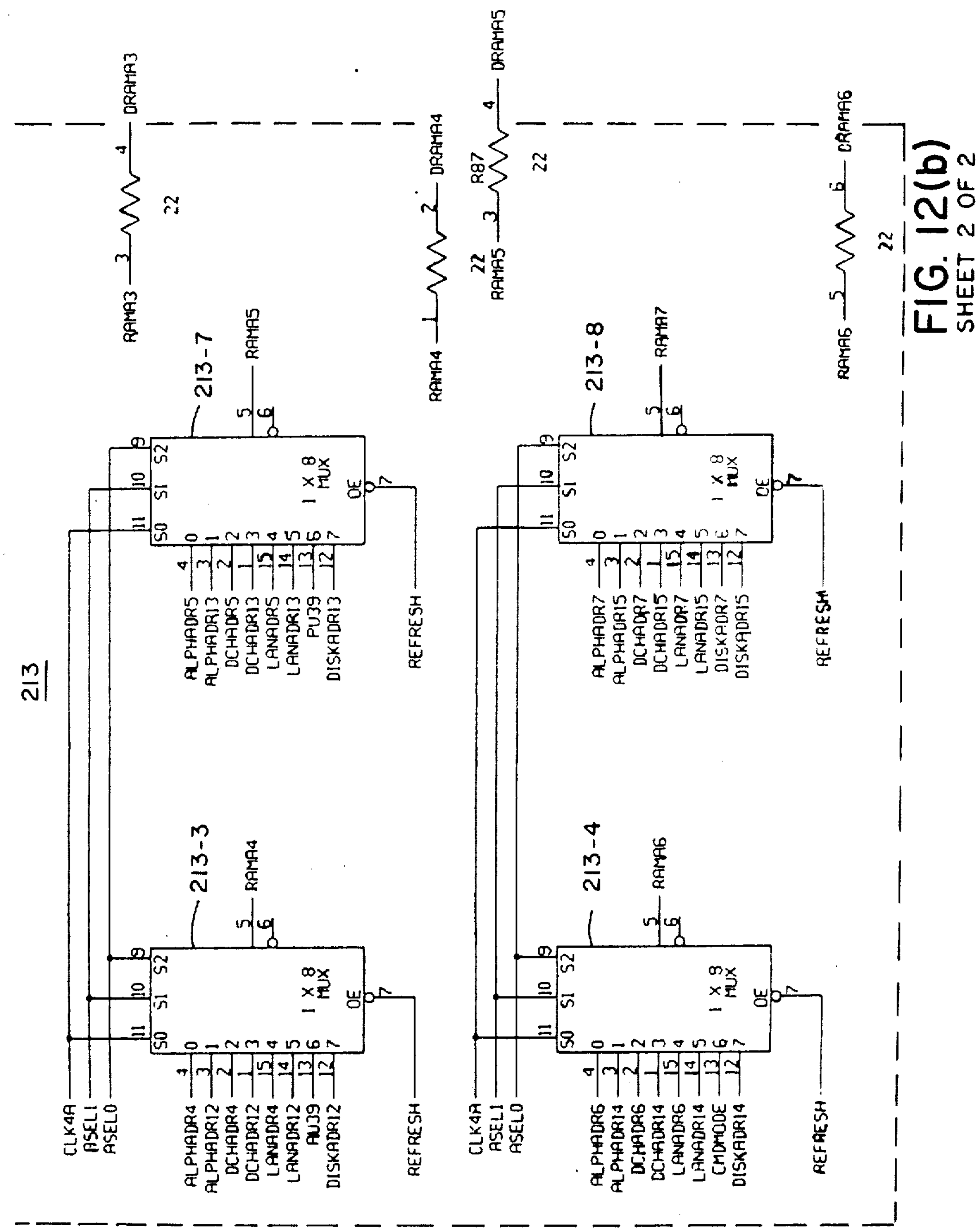
Figure 12C:
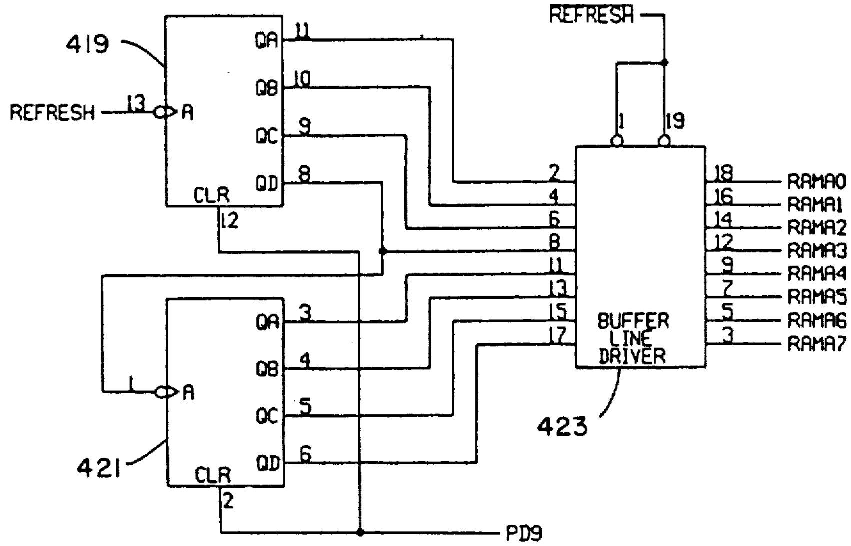
Figures 13A, 13B:
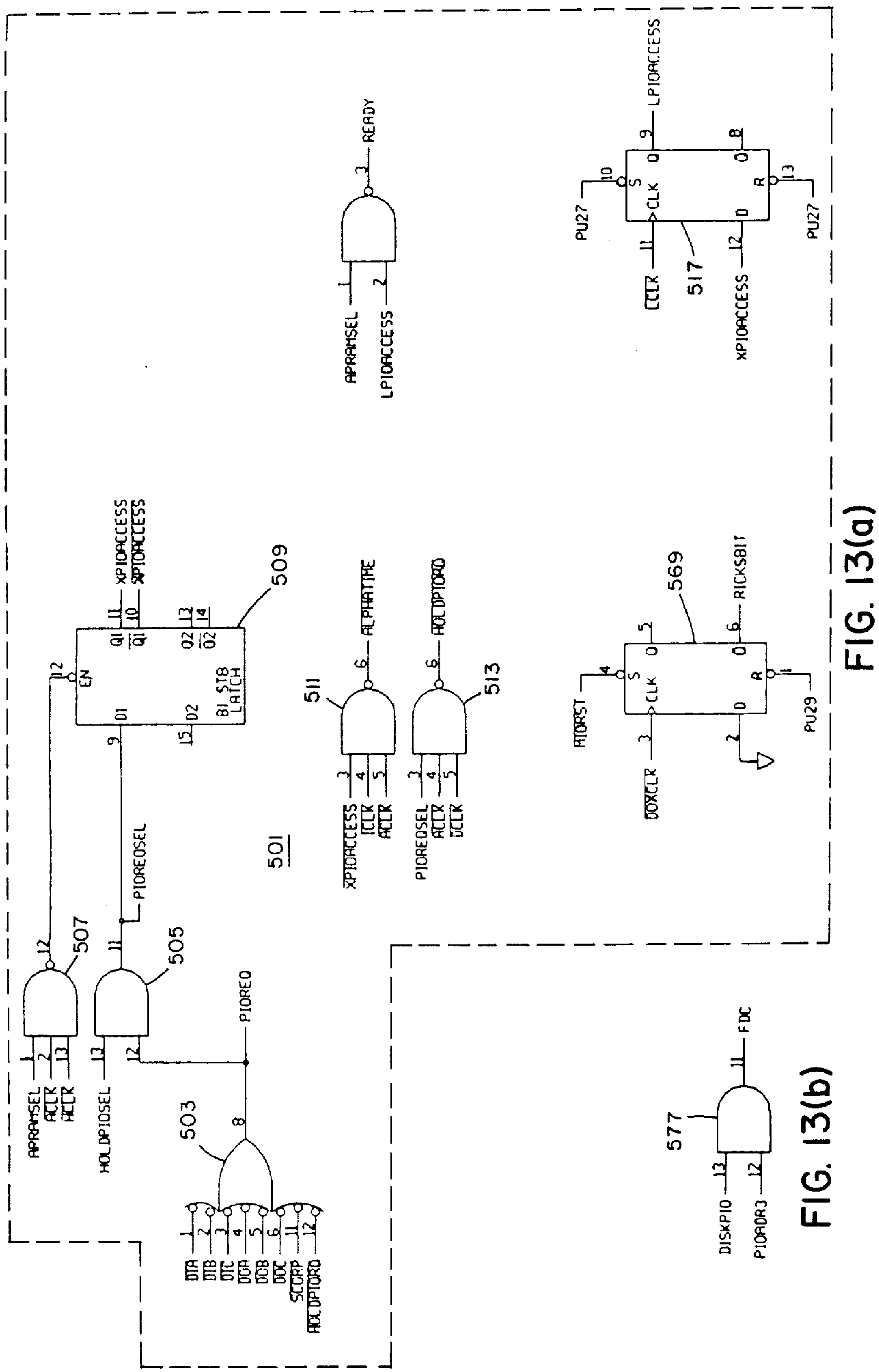
FIGS. 13(*a*) through 13(*h*) are schematic diagrams of a portion of the data channel interface and control section 88 in FIG. 2.
Figure 13C:
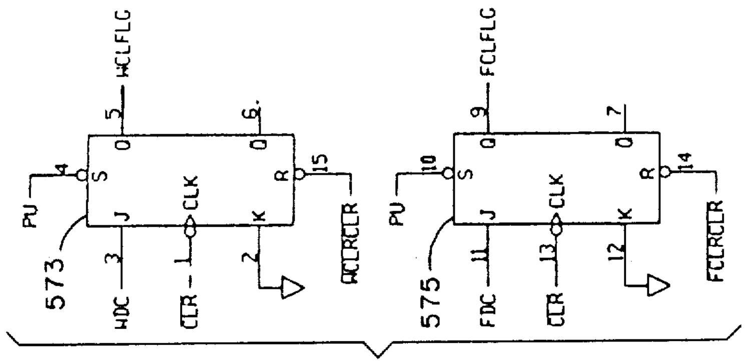
Figure 13D:
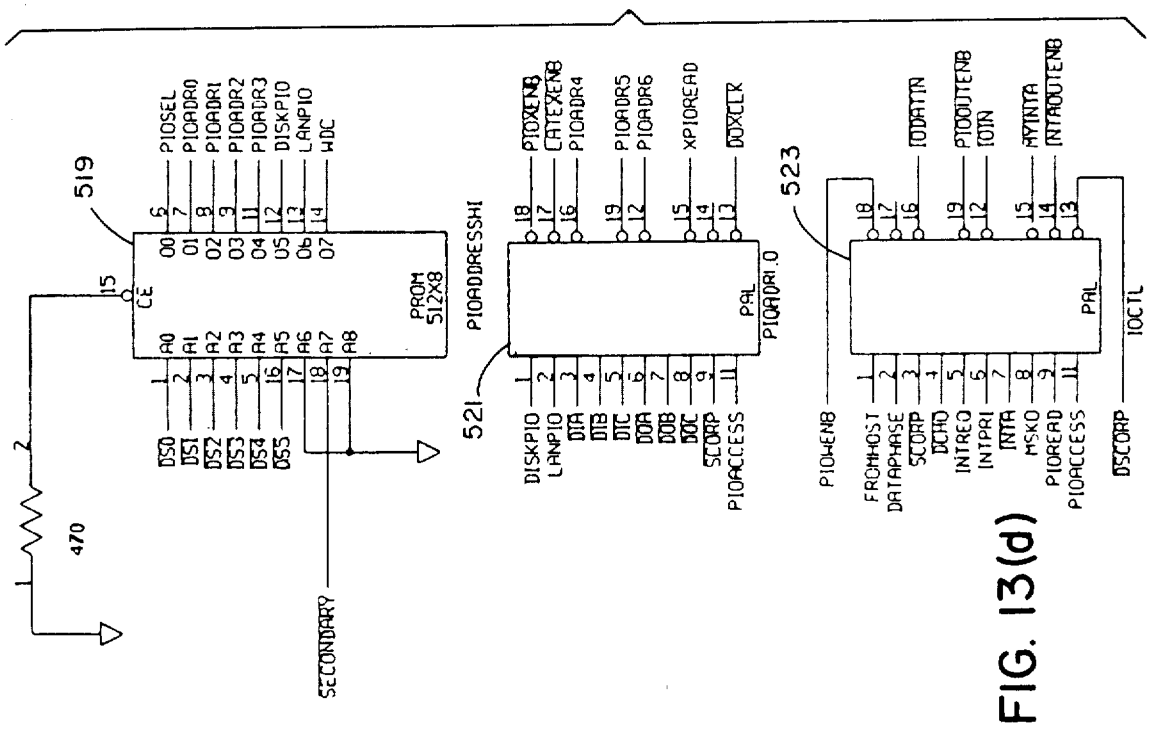
Figure 13E:
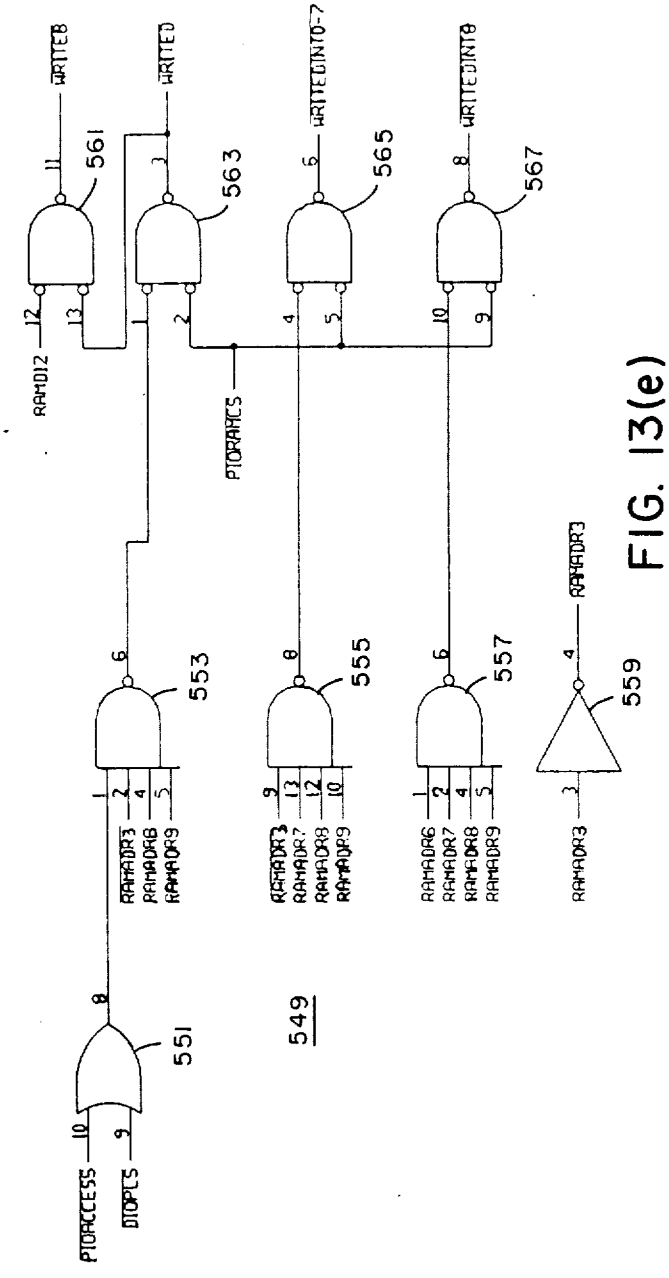
Figure 13F:
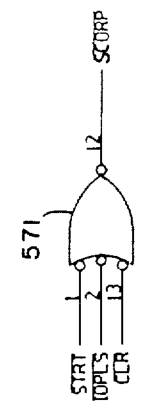
Figure 13G:
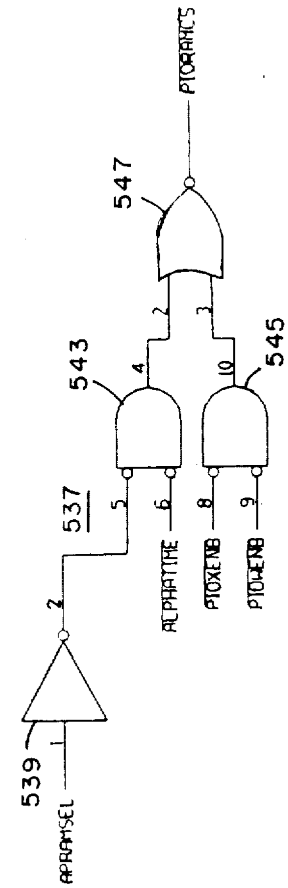
Figure 13H:
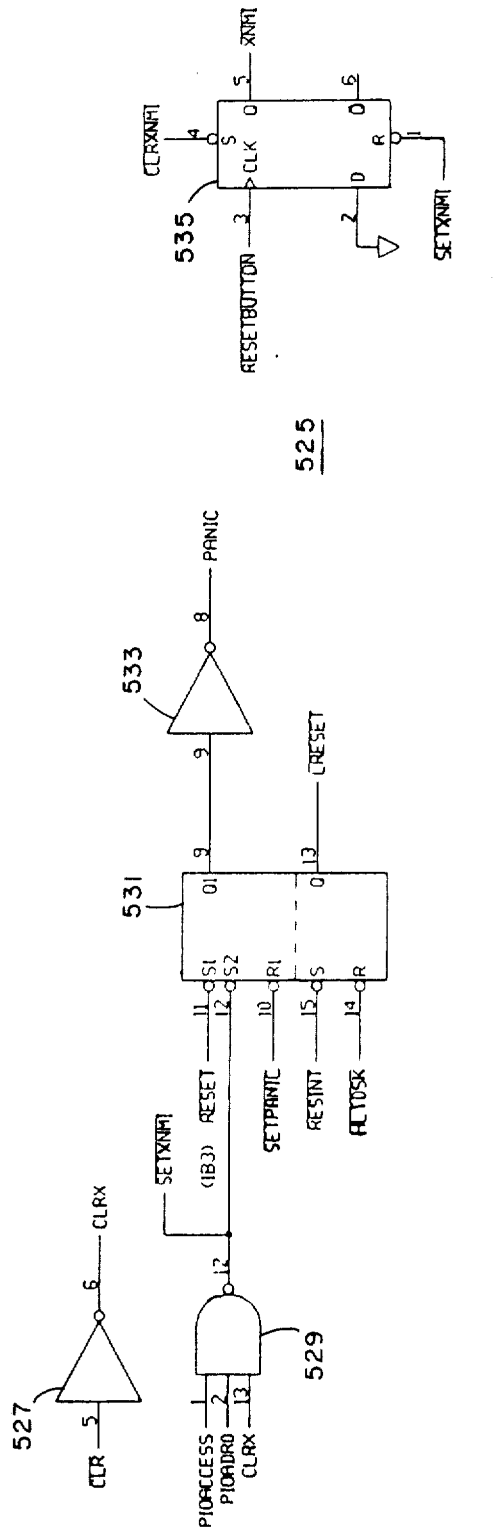
Figure 14A:
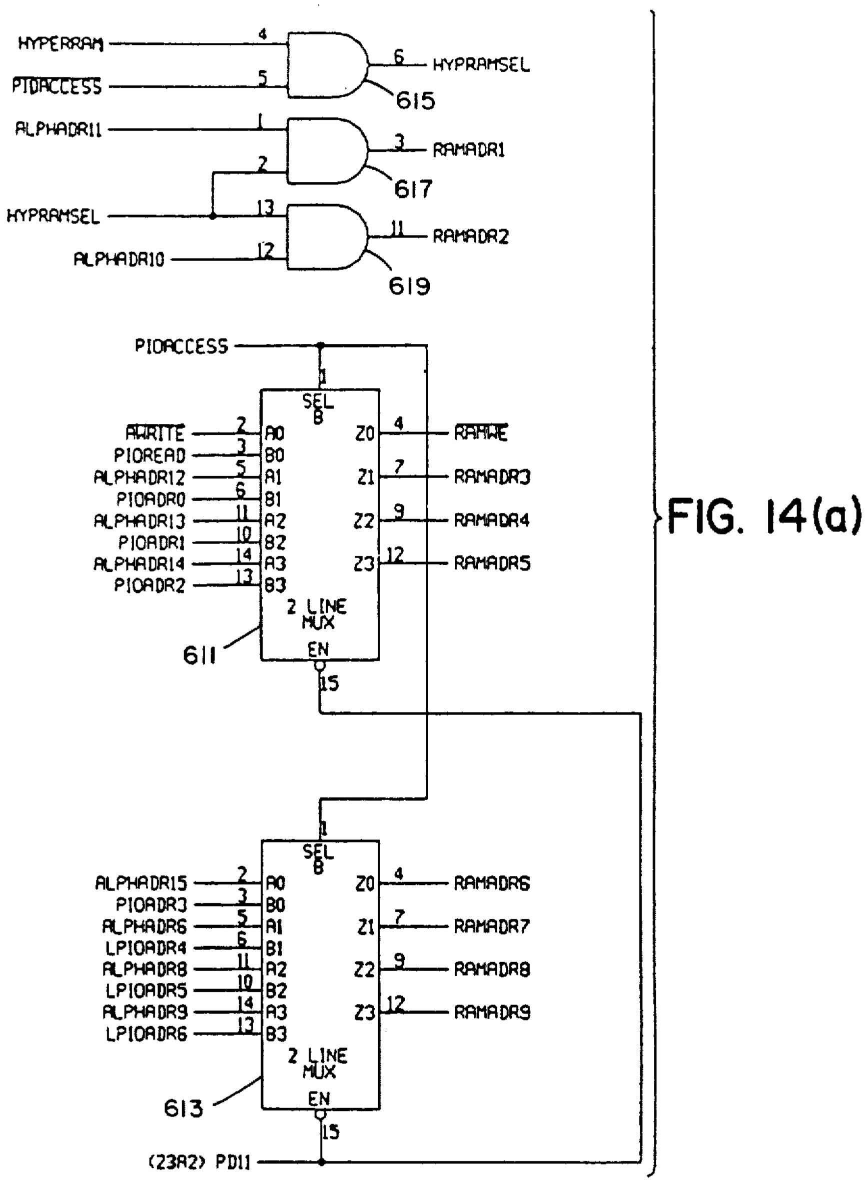
FIGS. 14(*a*) through 14(*f*) and FIGS. 15(*a*) and 15(*b*) are schematic diagrams of other portions of channel interface and control section 88.
Figure 14D:
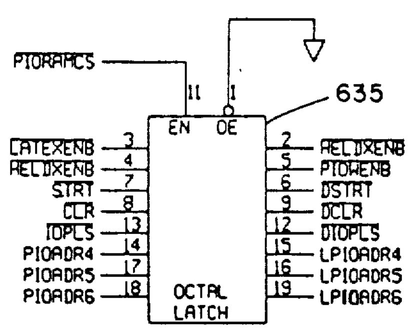
Figure 14B:
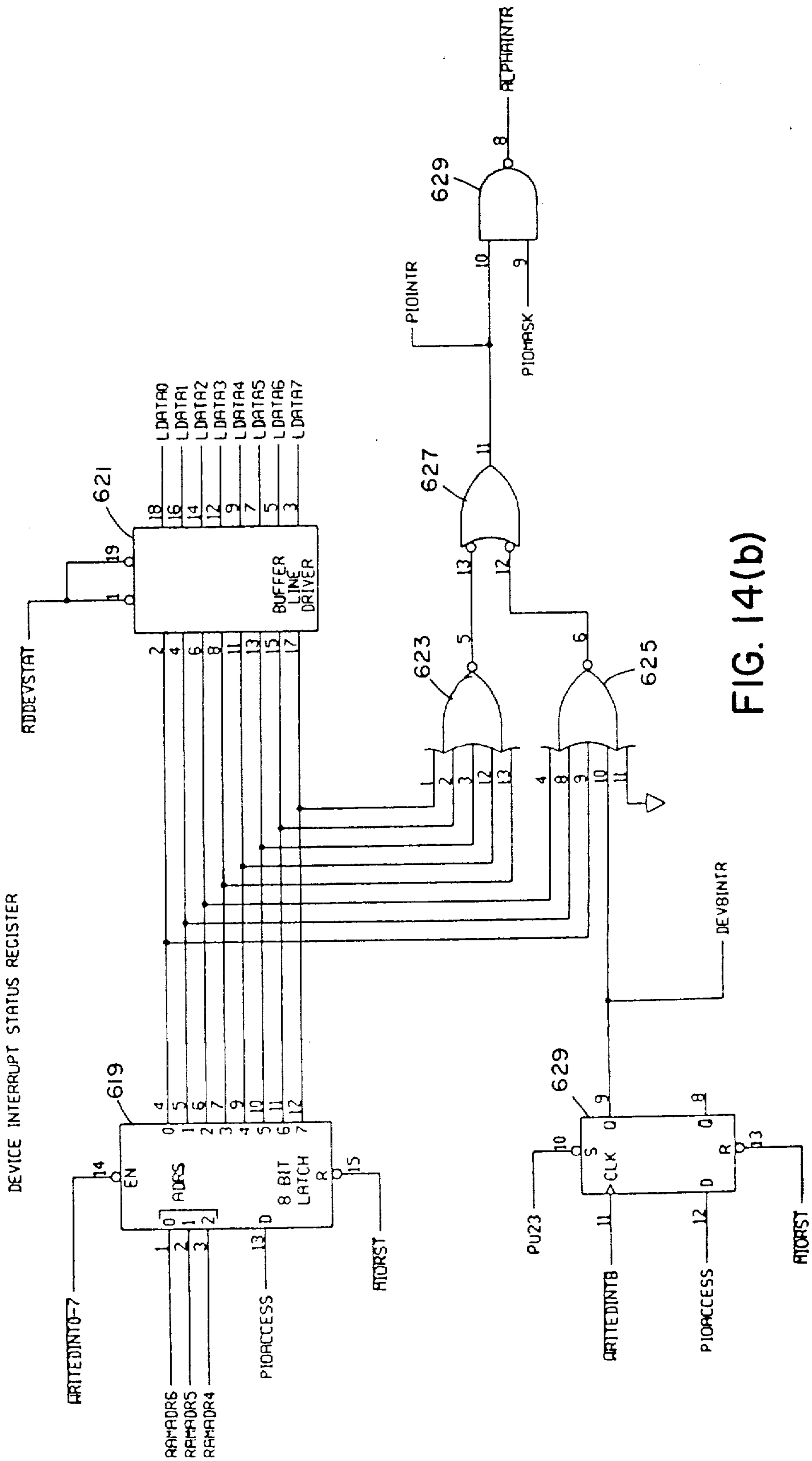
Figure 14C:
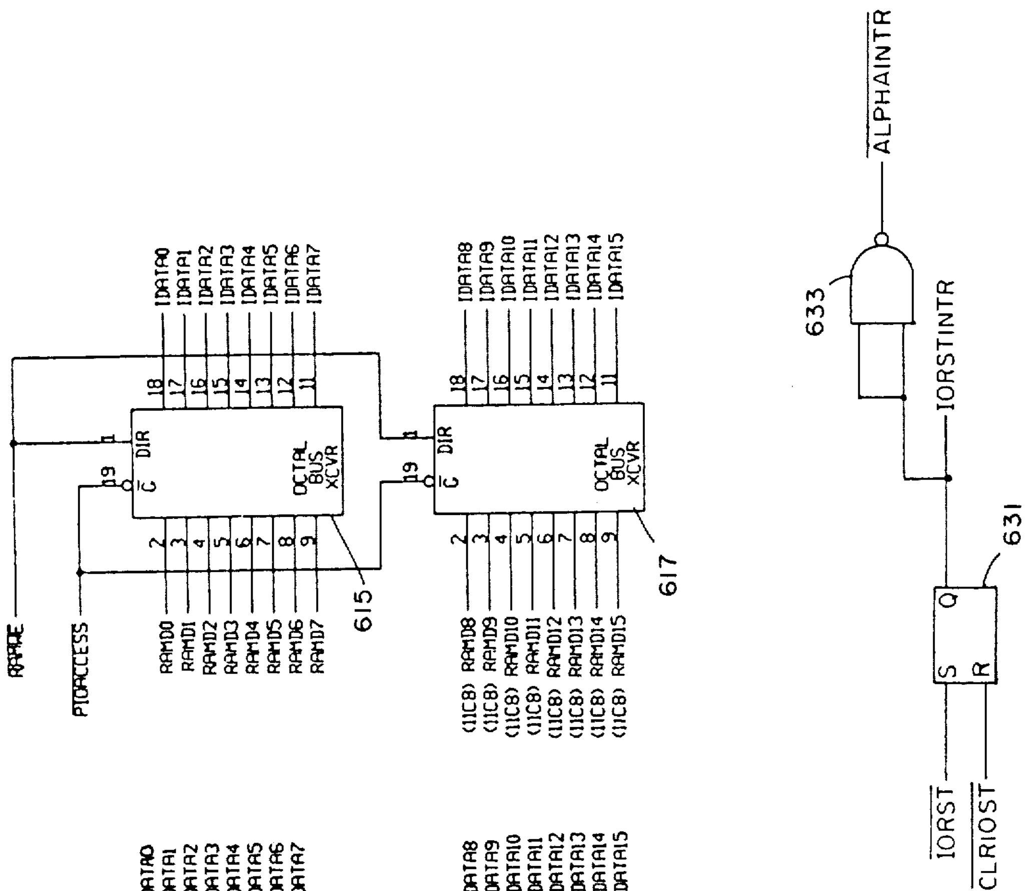
Figure 14E:
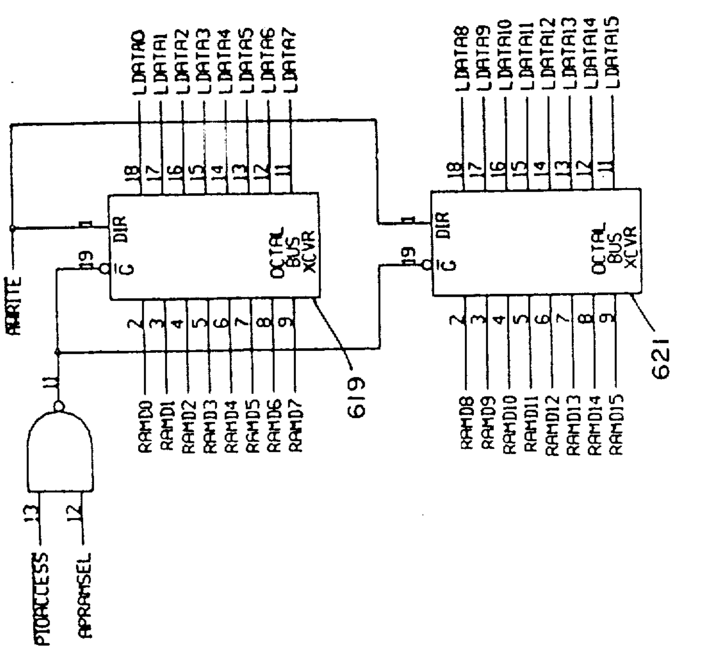
Figure 14F:
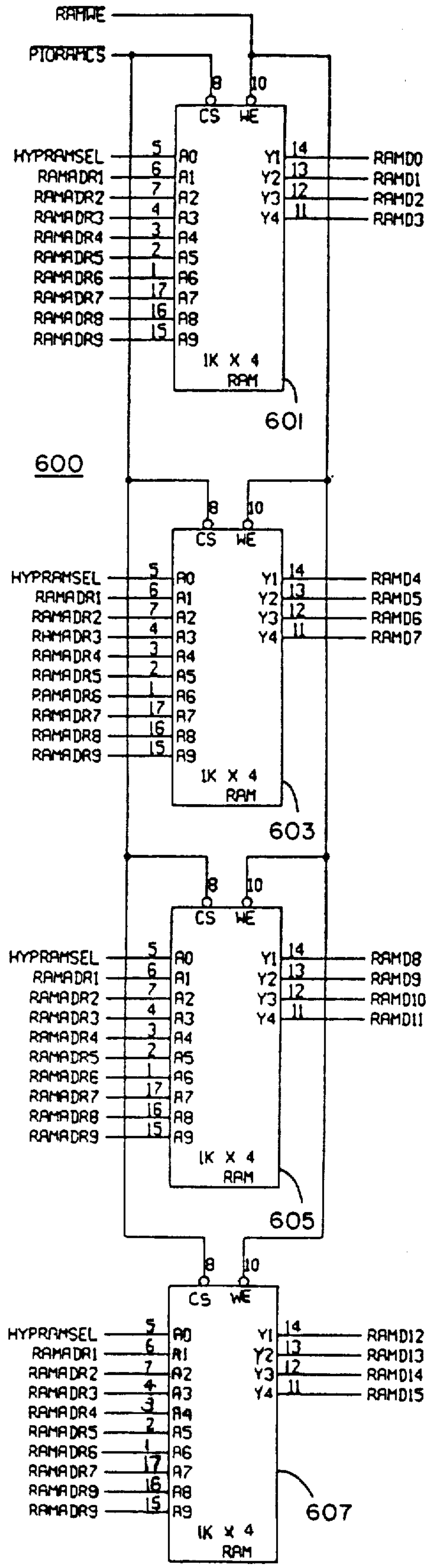
Figure 15A:
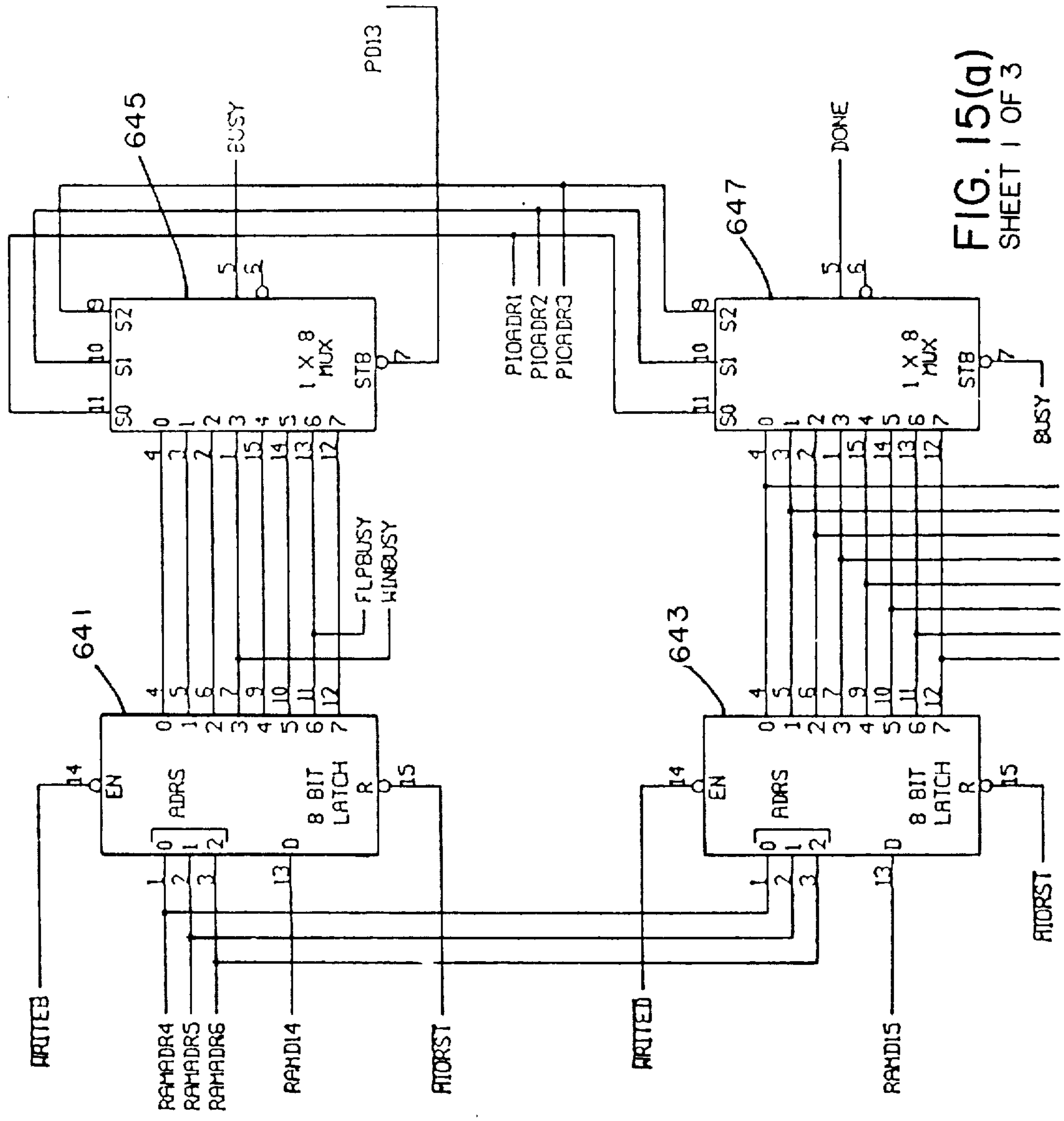
Figure 15A:
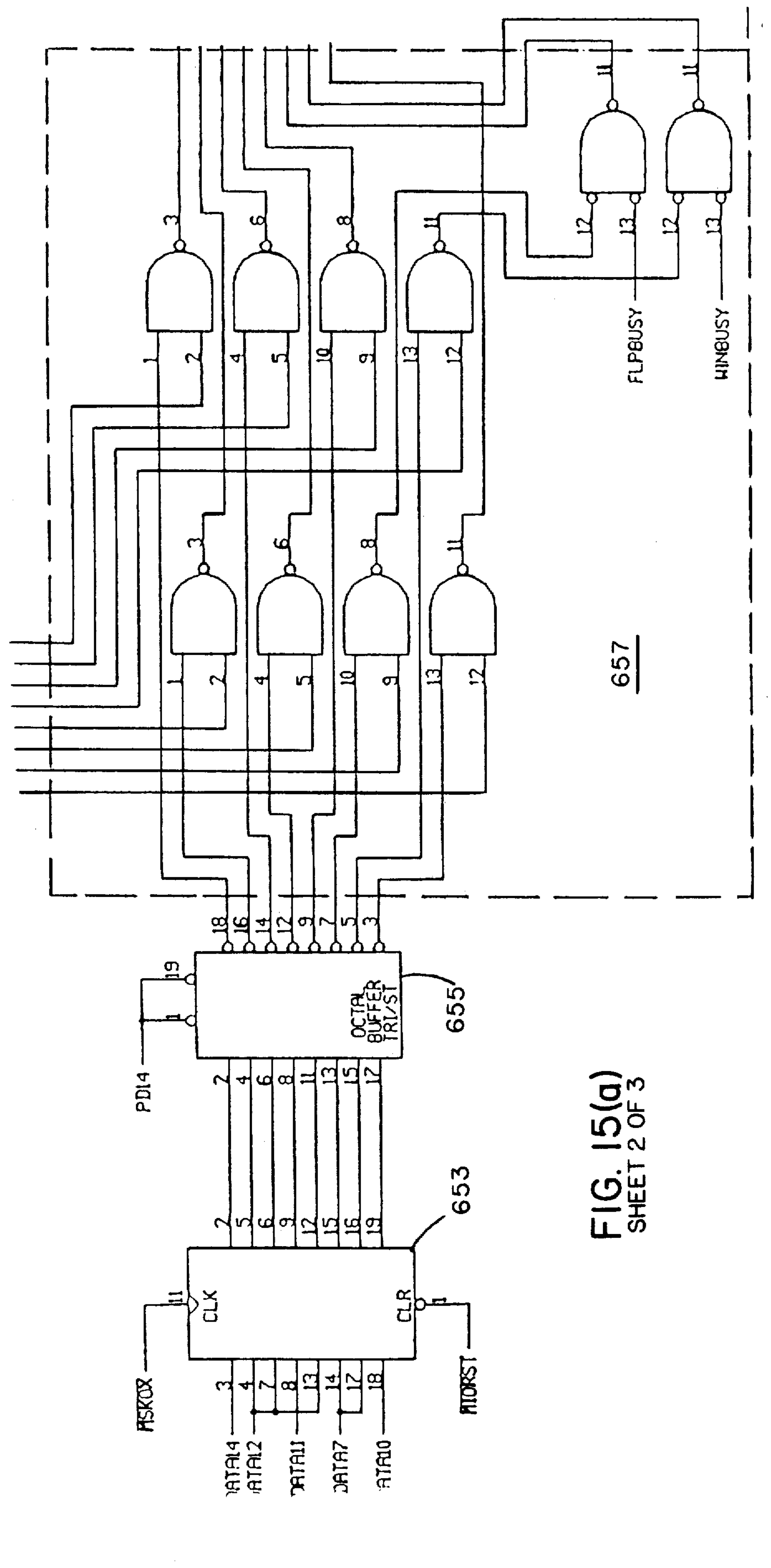
Figure 15B:
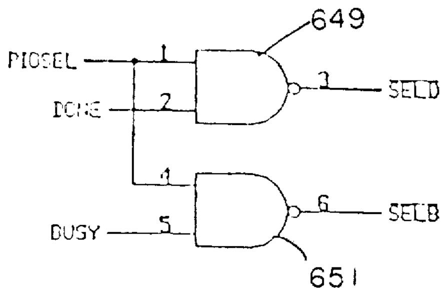
Figure 15A:
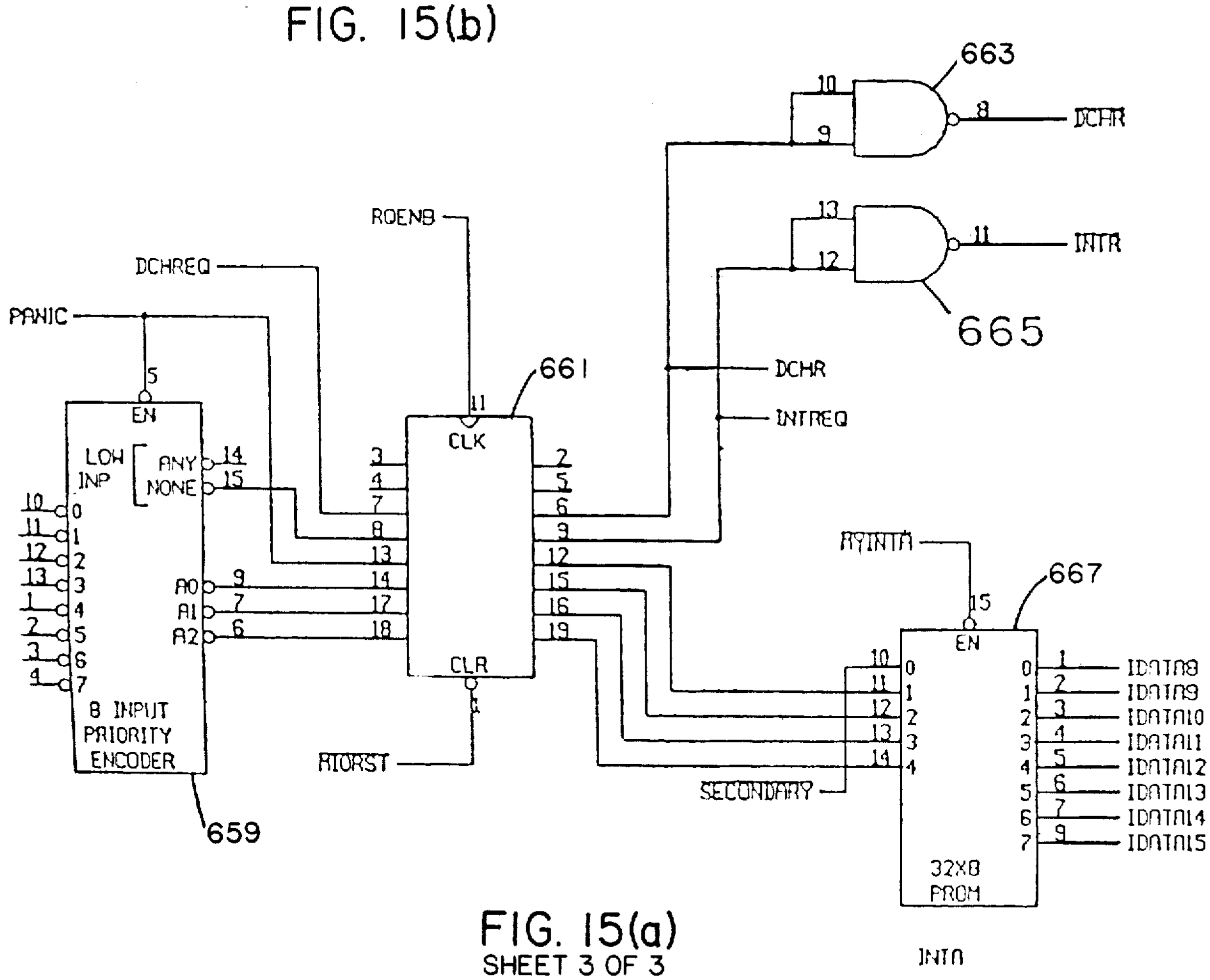

Referring now to FIGS. 10(*a*) through 10(*g*) there are illustrated circuit diagrams of the interface 95 to the line printer LPT, the interface 99 to the mouse and the interface 101 to the modem. The circuitry includes a set of ten RS232 receivers 501, a pair of UARTS 403 and 405, a NAND gate 407 which buffers the reset to UART 403, an oscillator 409 which generates a 10 MHZ clock signal for UART 405, a set of RS232 transmitters 411, a UART interrupt circuit 413, an OR gate 415 and an and/or gate 417.

Referring now to FIGS. 11(*a*) through 11(*d*), there are illustrated a schematic diagrams of the memory control portion of processor section 71. The portion includes a quad D flip-flop 419, a refresh counter 421, a D type flip-flop 423, a PAL 425, a 4 to 1 multiplexor 427, a pair of address decoders 429 and 431, a quad D flip-flop 433, a NAND gate 435 that is used as an inverter for the refresh signal and three other gates 437, 439 and 441.

Referring now to FIGS. 12(*a*) and 12(*b*), there are shown schematic diagrams of the memory section of processor section 71. The memory section includes a memory array 205, sixteen 64K DRAM's labelled 205-1 through 205-16 which collectively provide storage for 64K 16 bit words and a set of 8 address multiplexors labelled 213-1 through 213-8. The memory section also includes a pair of refresh address counters 419 and 421 and a refresh address driver 423. The refresh address driver is used to drive the memory address during the refresh cycle.

Referring now to FIGS. 13(*a*) through 13(*g*), there are illustrated schematic diagrams of a portion of the data channel control section 88 labelled PIO registers section 295.

There is logic 501 which performs arbitration between microprocessor 201 accessing the PIO registers and the host CPU 53 accessing the PIO registers. The logic includes an 8 input NAND gate 503, a 2 input AND gate 505, a 3 input NAND gate 507, a latch 509, a pair of 3 input NAND gates 511 and 513 and a 2 input NAND gate 515 and a D type flip-flop 517.

There is also a PROM 519 which serves as a reincoder device for reincoding the code from I/O bus 59 into the addresses in the RAMS that hold the PIO registers, a PAL 521 which converts commands from the CPU interface PIO into addresses and control signals to access the RAMS that hold the PIO registers and a PAL 523 which generates control signals for the data transfers in and out of I/O control subsystem 55. There is also a circuit 525 for interrupting the host CPU 53 if microprocessor 201 runs into any problems. Circuit 525 includes an inverter 527, a 3 input NAND gate 529 that decodes the signal from the host CPU 53, an RS type flip-flop 531, an inverter 533 and a D type flip-flop 535. There is also a circuit 537 that generates the chip select that enables the RAMS that contains information and based on that information accesses from either microprocessor 201 or the PIO registers. Circuit 537 includes an inverter 539 and four NOR gates 541, 543, 545 and 547. There is also a circuit 549 made up of an OR gate 552, three 4 input NAND gates 553, 555 and 557, an inverter 559 and four OR gates 561, 563, 565 and 567. There is also a D type flip-flop 569 that generates a bit indicating whether anything has been done after a reset, an AND gate 571, a pair of J-K flip-flops 573 and 575 and a gate 577.

Referring now to FIGS. 14(*a*) through 14(*f*) and FIGS. 15(*a*) and 15(*b*) there are illustrated schematic diagrams of other portions of PIO register sections 295.

Looking first at FIGS. 14(*a*) through 14(*f*), there is a RAM section 600 made up of four 1K×4 bit RAMS 601, 603, 605 and 607 which are used to store the PIO registers. There is a circuit 609 made up of two multiplexors 611 and 613 and 3 AND gates 615, 617 and 619. The multiplexors 611 and 613 selects between addresses to RAMS 600 from addresses microprocessor 201 and addresses from the PIO. There are a pair of octal transceivers 615 and 617 which provide a data path between RMAS 600 and the I/O interface. There are a pair of octal transceivers 619 and 621 that provide a data path between RAMS 600 and the processor bus 223 and the L data bus 273. There is a 8 bit latch 619 that contains bits which are set when a PIO command comes in for a particular device, a tri-state buffer 621 which is used to allow microprocessor 201 to determine who is doing the interrupting, a pair of five input NAND gates 623 and 625 and a two input NAND gate 627 which together form a bit that interrupts the microprocessor 201 and an open collector driver 629 which actually interrupts microprocessor 201. There is a D type flip-flop 629 which is used to provide a ninth interrupt bit, an RS type flip-flop 631 that gets set when host CPU 53 issues an I/O reset command that interrupts microprocessor 201 through a collector driver 633 and a latch 635 that latches on the PIO address system that connects to RAMS 600.

Turning now to FIGS. 15(*a*) and 15(*b*), there is circuitry for the "BUSY" and "DONE" latches for each one of the devices connected I/O control subsystem 55 and the interrupt generation logic. There is an 8 bit latch 641 that contains the "busy" bits for each device code, an 8 bit latch 643 that contains the "done" bits for each device and a pair of multiplexors 645 and 647 that allow host CPU 53 to interrogate the "busy" bits and the "done" bits. Drivers 649 and 651 are I/O bus drivers for the "busy" and "done" bits, respectively. Register 653 is a register that holds the masked bits. When a masked bit is set it disables that particular device from interrupting. Octal tri-state buffer 655 is used as an octal inverter for the masked bits. NAND gates 657 gate each device's "done" bit with each device's masked bit. Encoder 659 functions as a priority encoder for all of the interrupts. Register 661 is a register which synchronizes the interrupt to the signal from the host CPU and also synchronizes a data channel request to the host CPU. Drivers 663 and 665 are the drivers to the host CPU for data channel requests and interrupt requests. PROM 667 converts the interrupting device into its device code which can be interpreted by the host CPU 53.

Figures 16E, 16F, 16G:
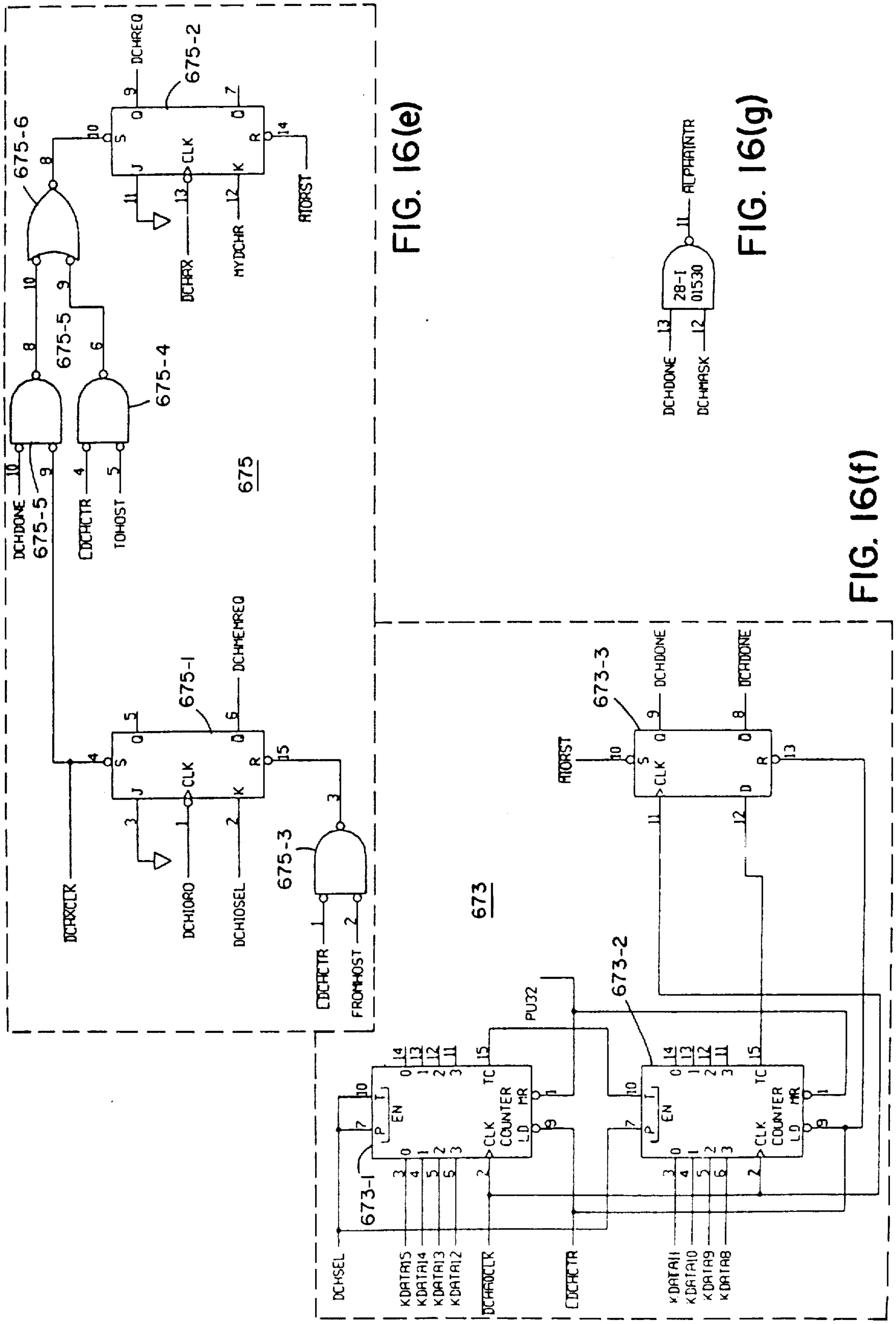
FIGS. 16(*a*) through 16(*g*), 17(*a*) through 17(*d*), 18(*a*) through 18(*d*), and 19(*a*) through 19(*g*) are schematic diagrams of controller 89 in FIG. 3.

Referring now to FIGS. 16(*a*) through 16(*f*), 17(*a*) through 17(*d*), 18(*a*) through 18(*d*) and 19(*a*) through 19(*g*), there are illustrated schematic diagrams of portions of data channel controller 89.

Looking first at FIGS. 16(*a*) and 16(*f*), decoder 669 is the decoder for the microprocessor addresses for loading the register that control the data channel. The decoder is a part of data channel control registers 285 in FIG. 3. Circuit 671 is a set of gates which are also used to control the loading of the registers 285. Gates 671-1 and 671-2 are OR gates while gates 671-3, 671-4 and 671-5 are NAND gates. Circuit 673 is a counter that determines how many words can be transferred from local memory to 205 to host memory 63 or the reverse across I/O bus 61. The circuit is made up of two counters 673-1 and 673-2 and a D-type flip-flop 673-3.

There is also a circuit 675 which is made up of an AND gate 675-1 and a D type flip-flop 675-2. Circuit 675 determines when a data channel transfer can be performed. Although only a single I/O control subsystem 55 is shown, data processing system 55 may include a plurality of I/O control subsystems, each coupled to data processing subsystem 53 in the same manner as I/O control subsystem 55 when a number of I/O control subsystems are employed, some form of technique such as a daisy chain priority scheme is used to enable one I/O control subsystem to access the main system.

There is a circuit 675 which functions as a "state machine". Circuit 675 is made up of two J-K flip-flops 671-1 and 675-2 and a plurality of gates 675-3 through 675-6. Circuit 675 is used to control data transfers between the host CPU and memory 205.

There is also a D type flip-flop 677 that is used to buffer a DCHSEL signal and an open collector driver 679 that is used to interrupt microprocessor 201 when a data channel transfer is completed.

Figure 17A:
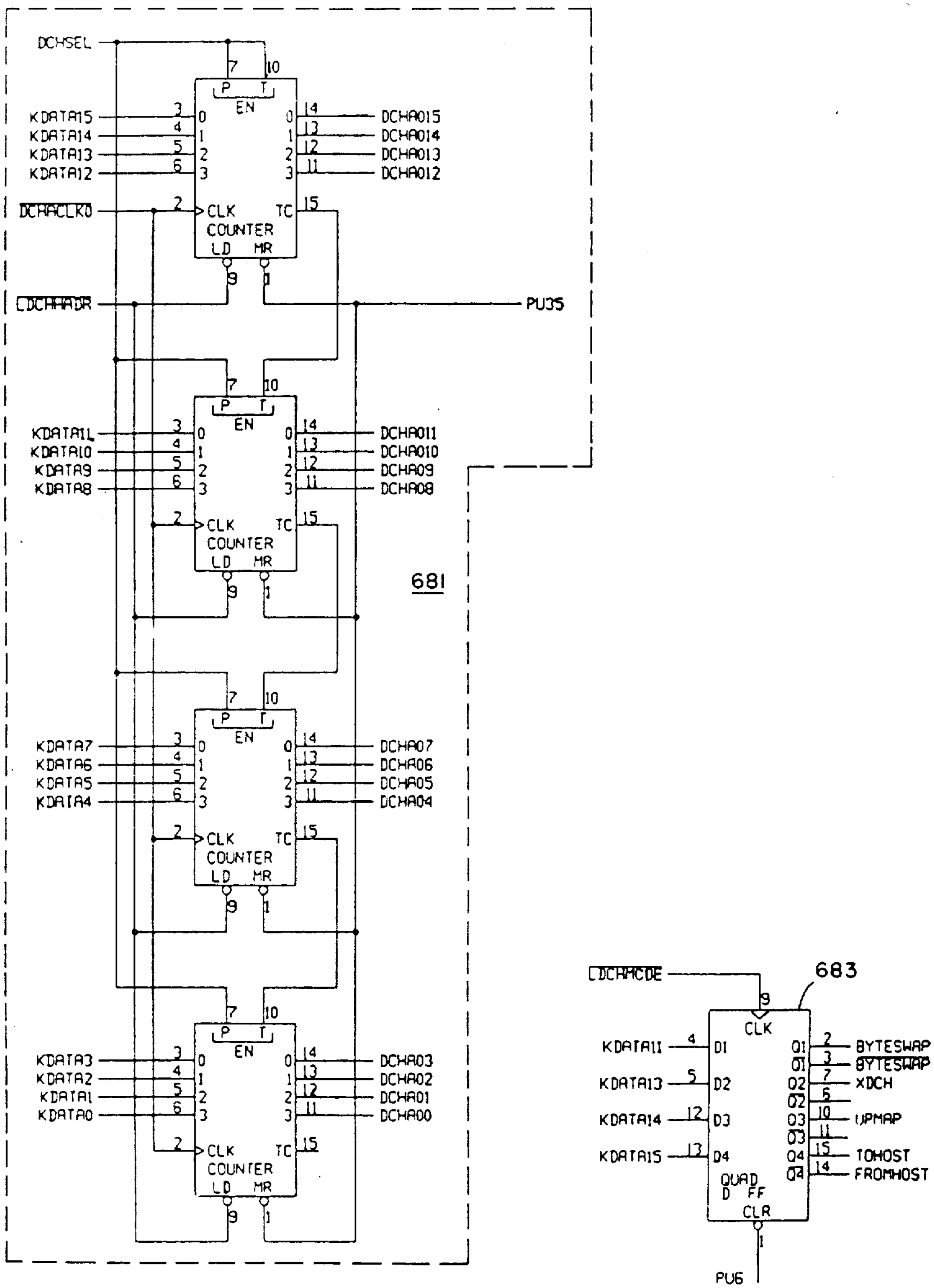
Figure 17B:
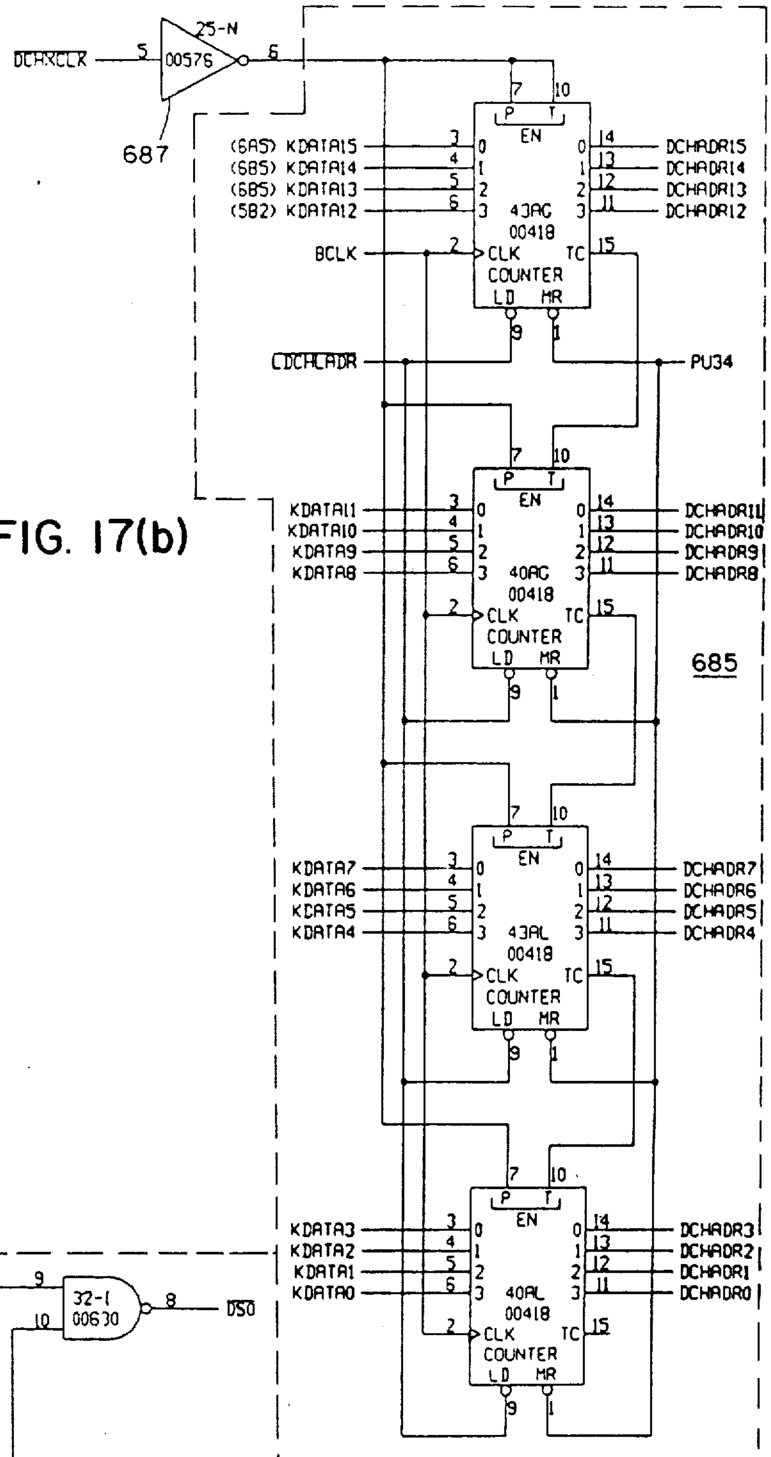
Figure 17C:
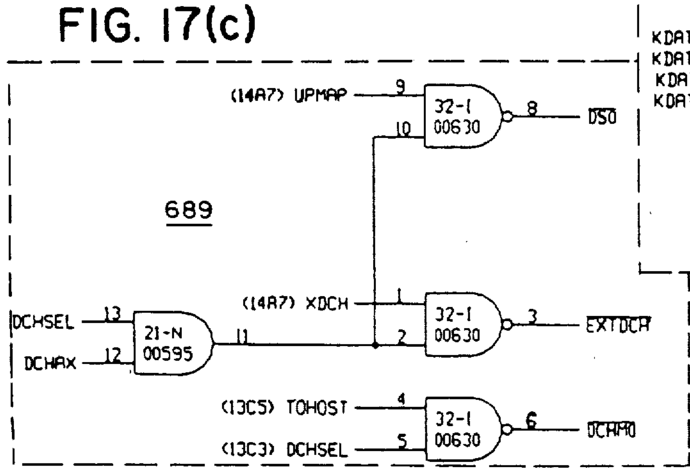
Figure 18A:
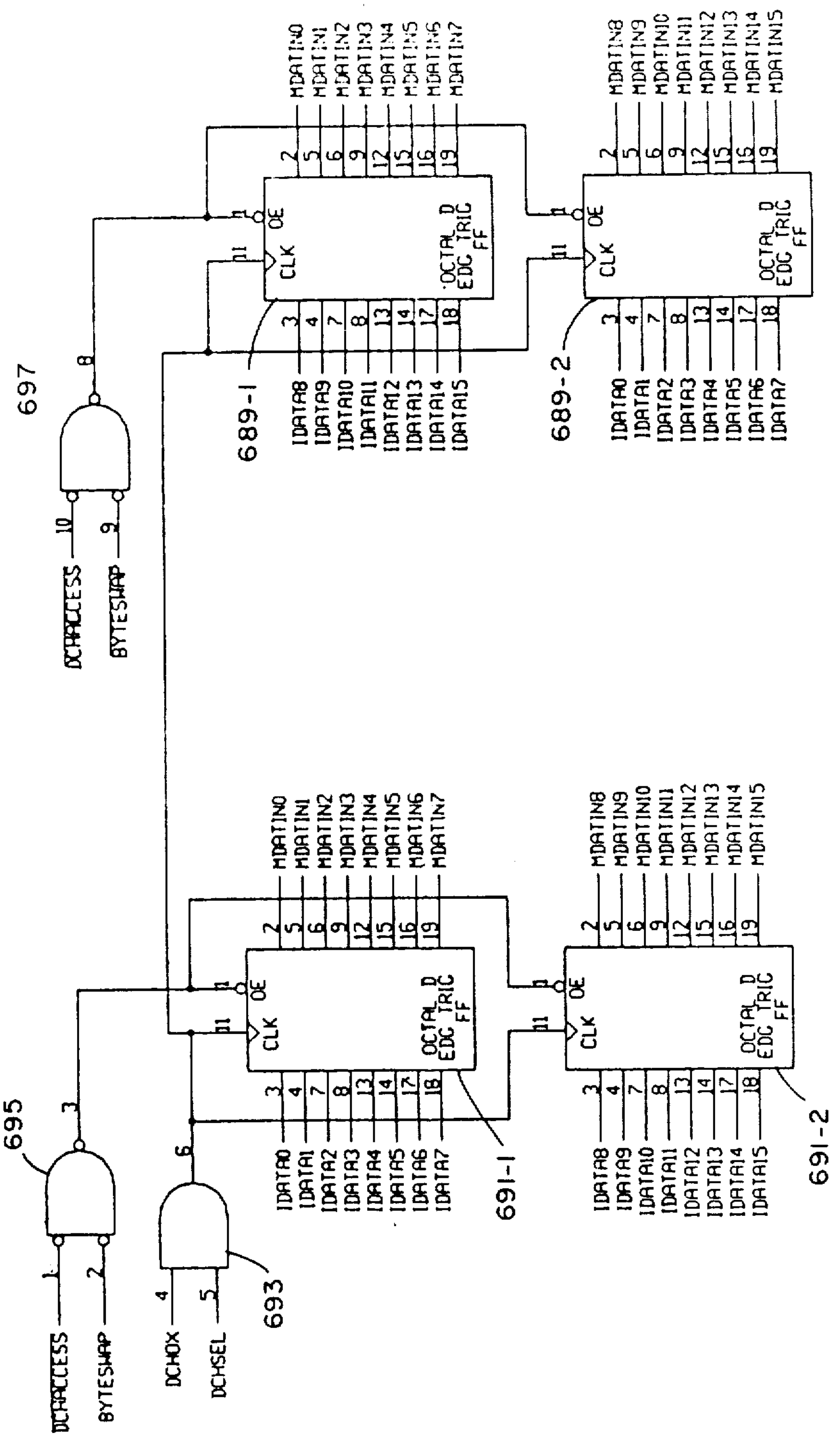
Figure 18B:
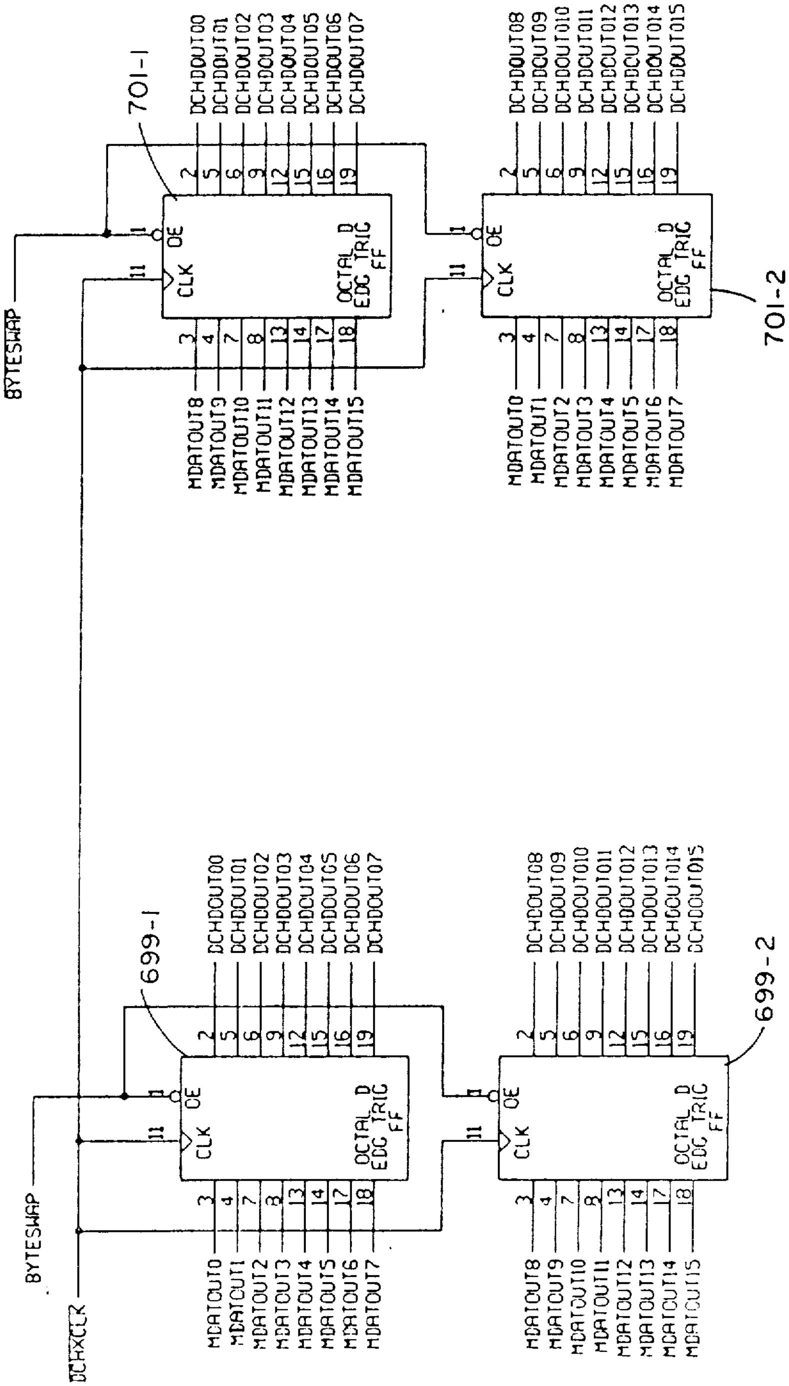
Figure 18C:
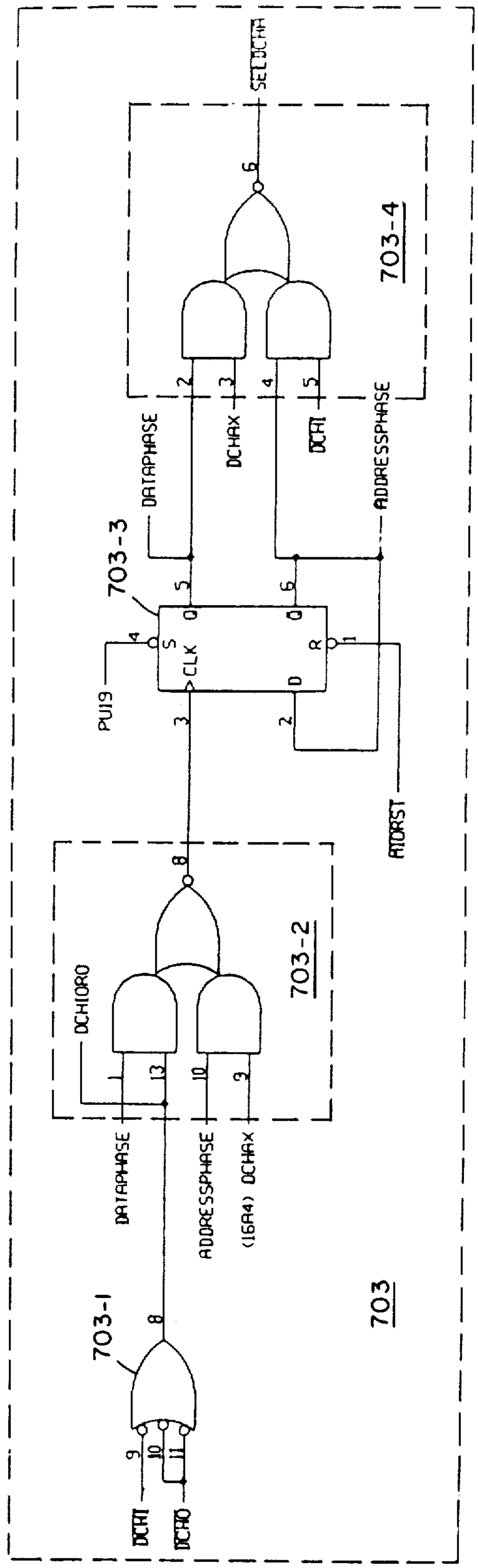
Figure 18D:
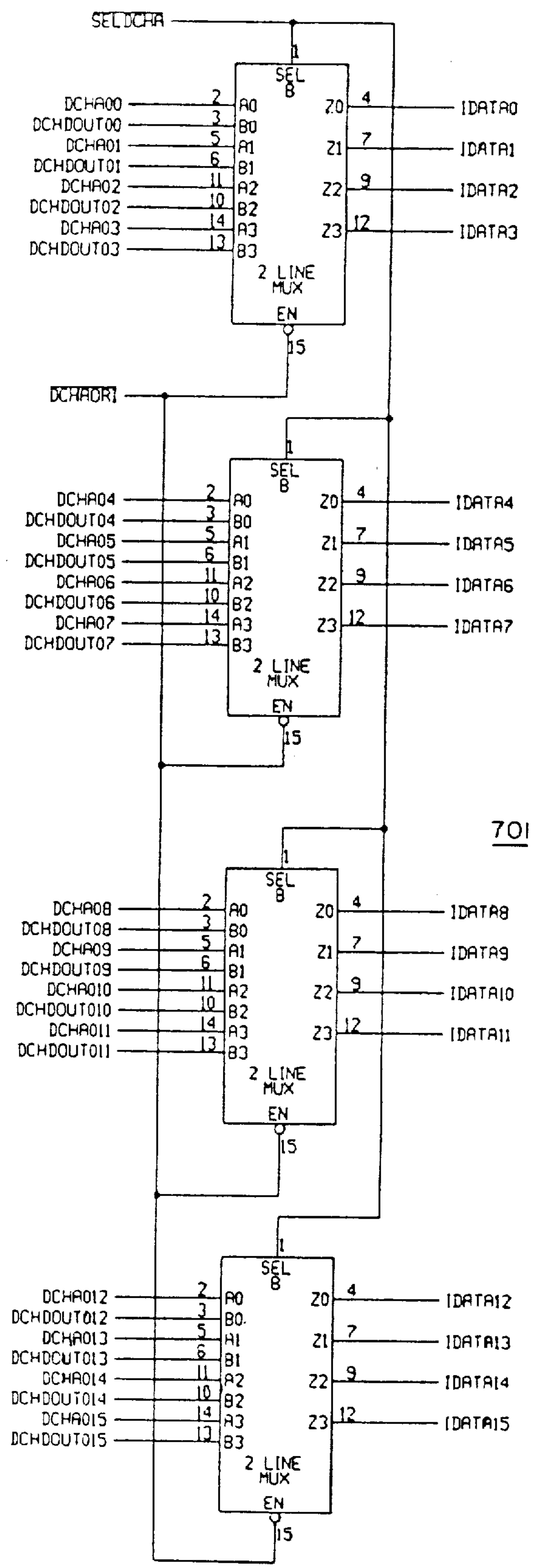
Figures 19C, 19D:
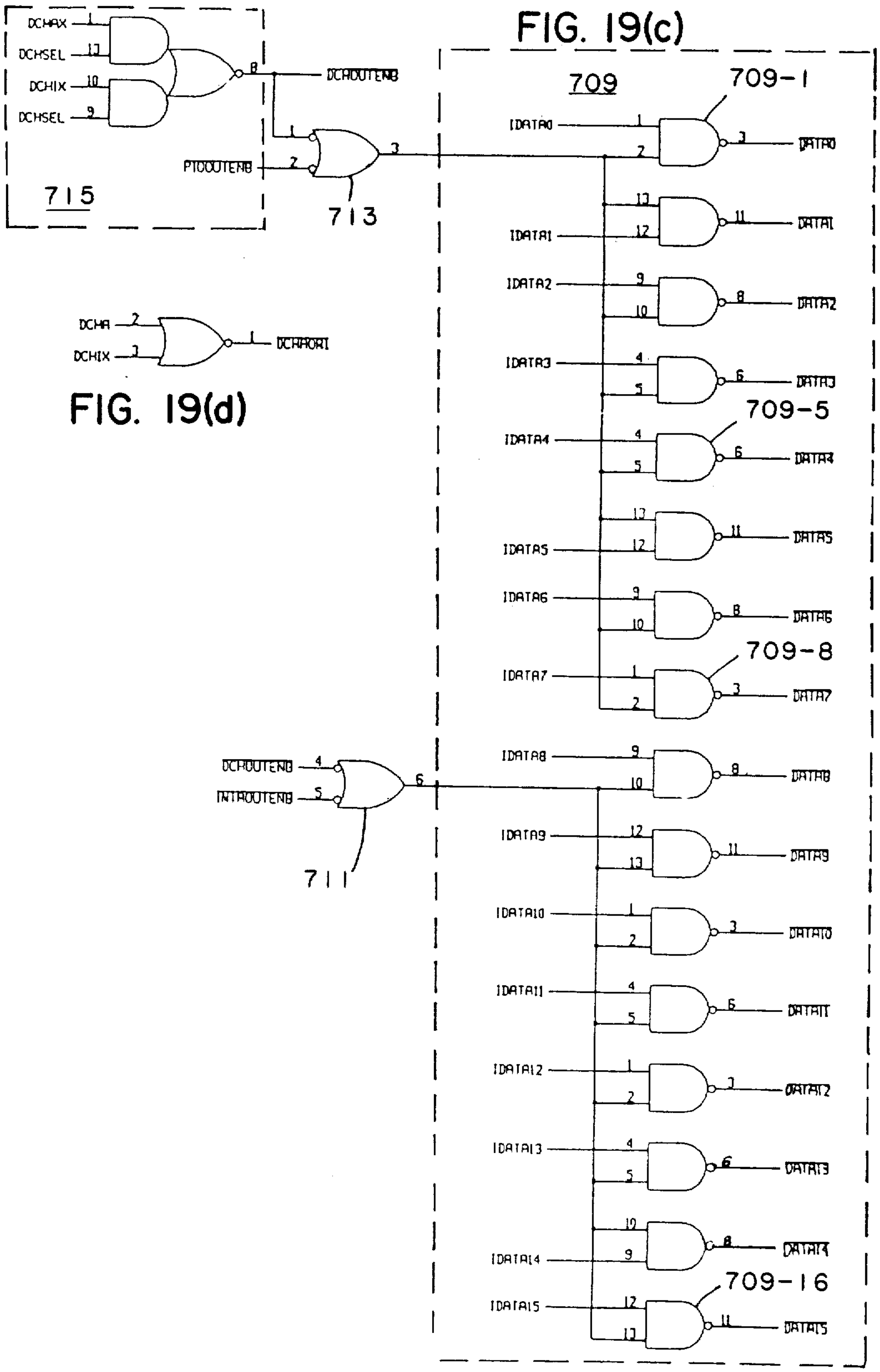
Figure 19E:
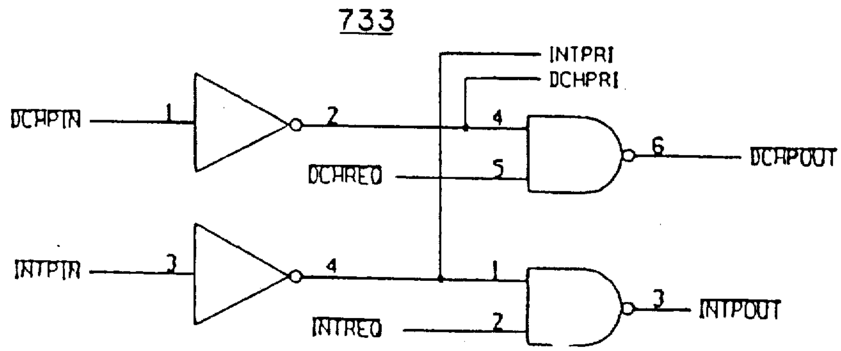
Figure 19F:
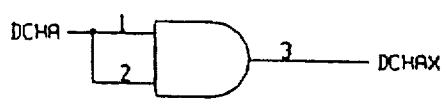
Figure 19G:
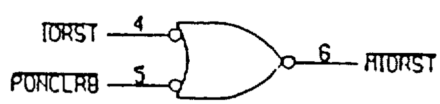
Figure 20A:
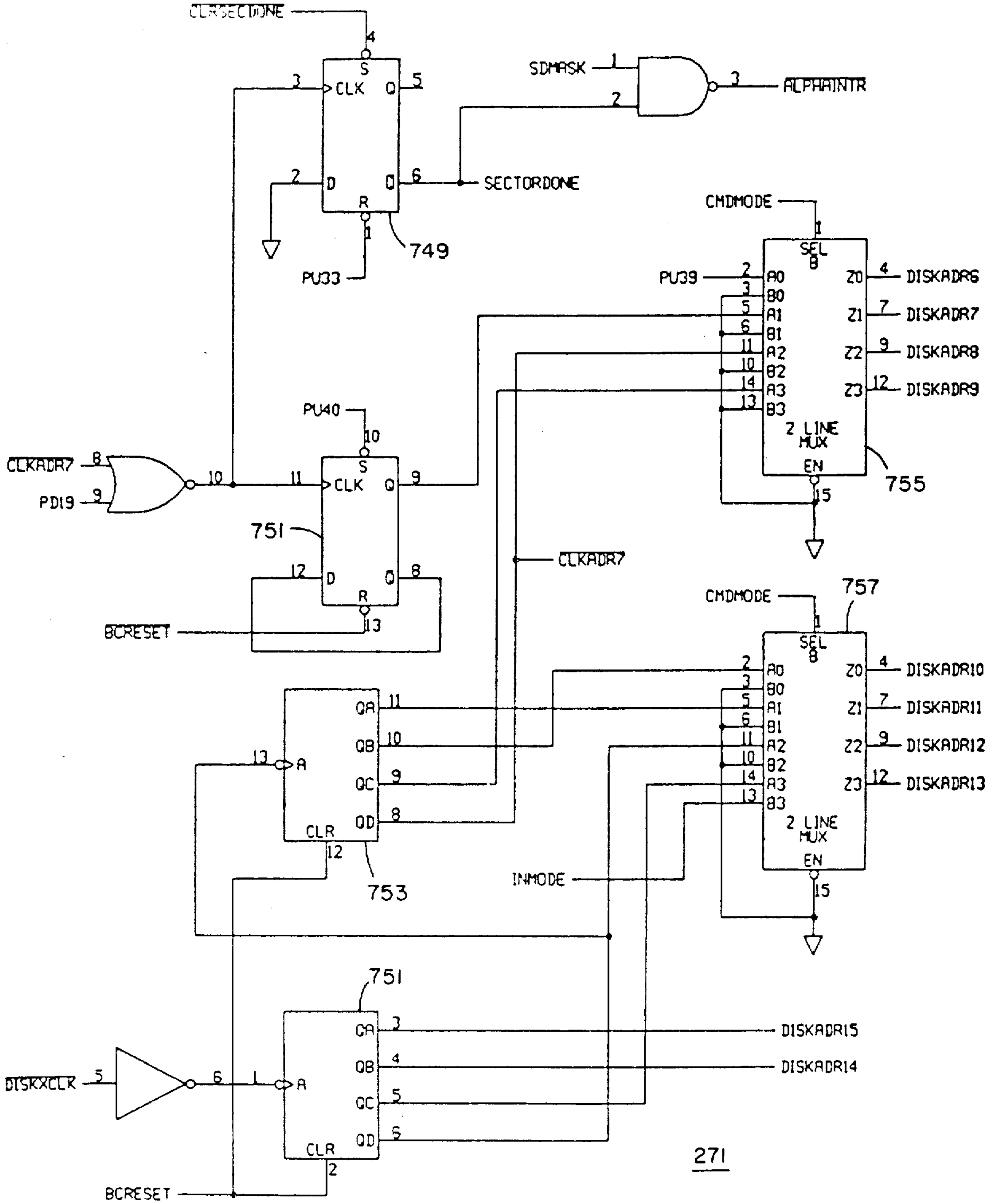
FIGS. 20(*a*) through 20(*g*), 21(*a*) through 21(*e*), 22(*a*) through 22(*f*) and 23(*a*) through 23(*d*) are schematic diagrams of disk controller/interface section 91 in FIG. 3.
Figure 20B:
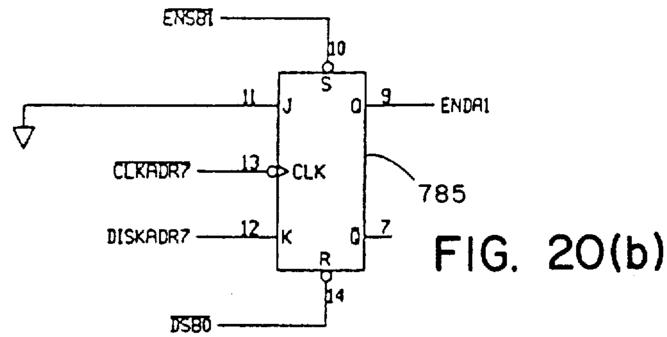
Figure 20C:
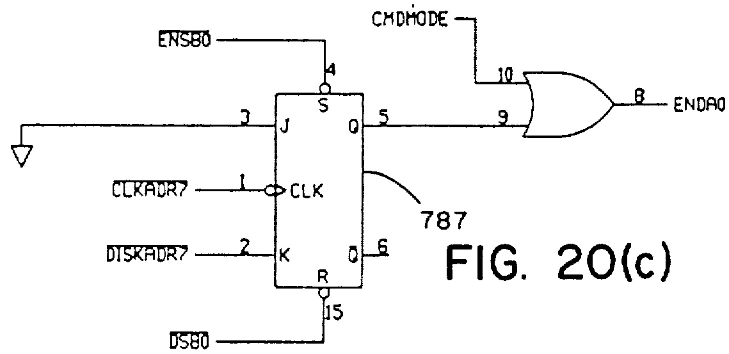
Figure 20D:
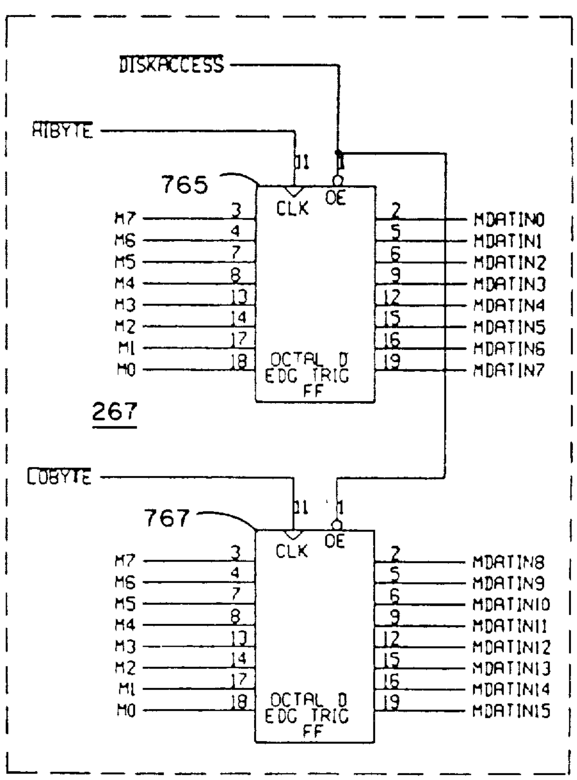
Figure 20E:
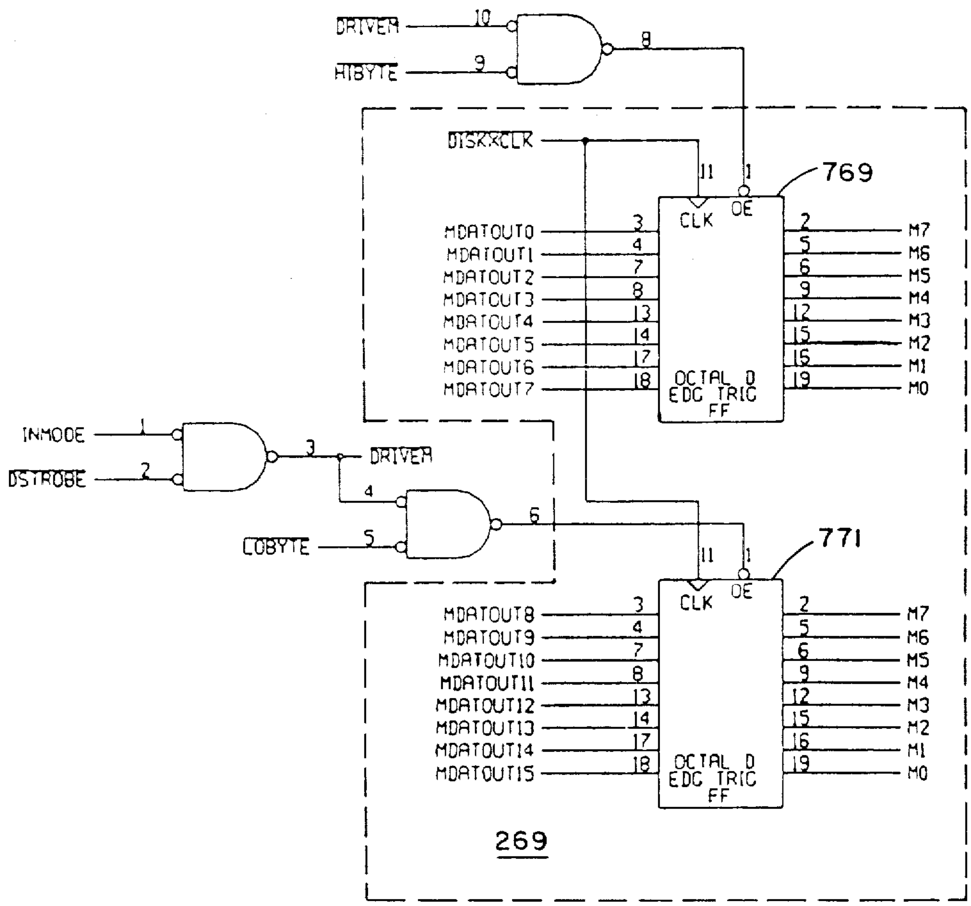
Figure 20G:
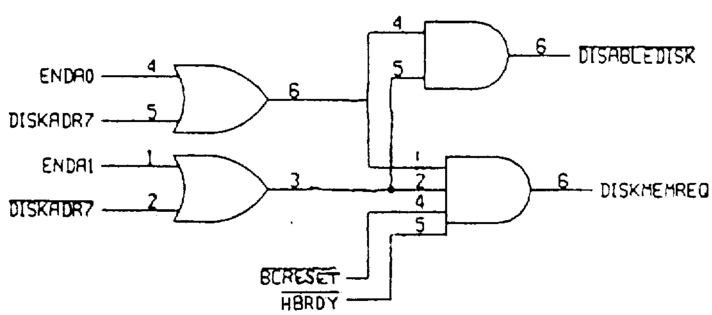
Figure 20F:
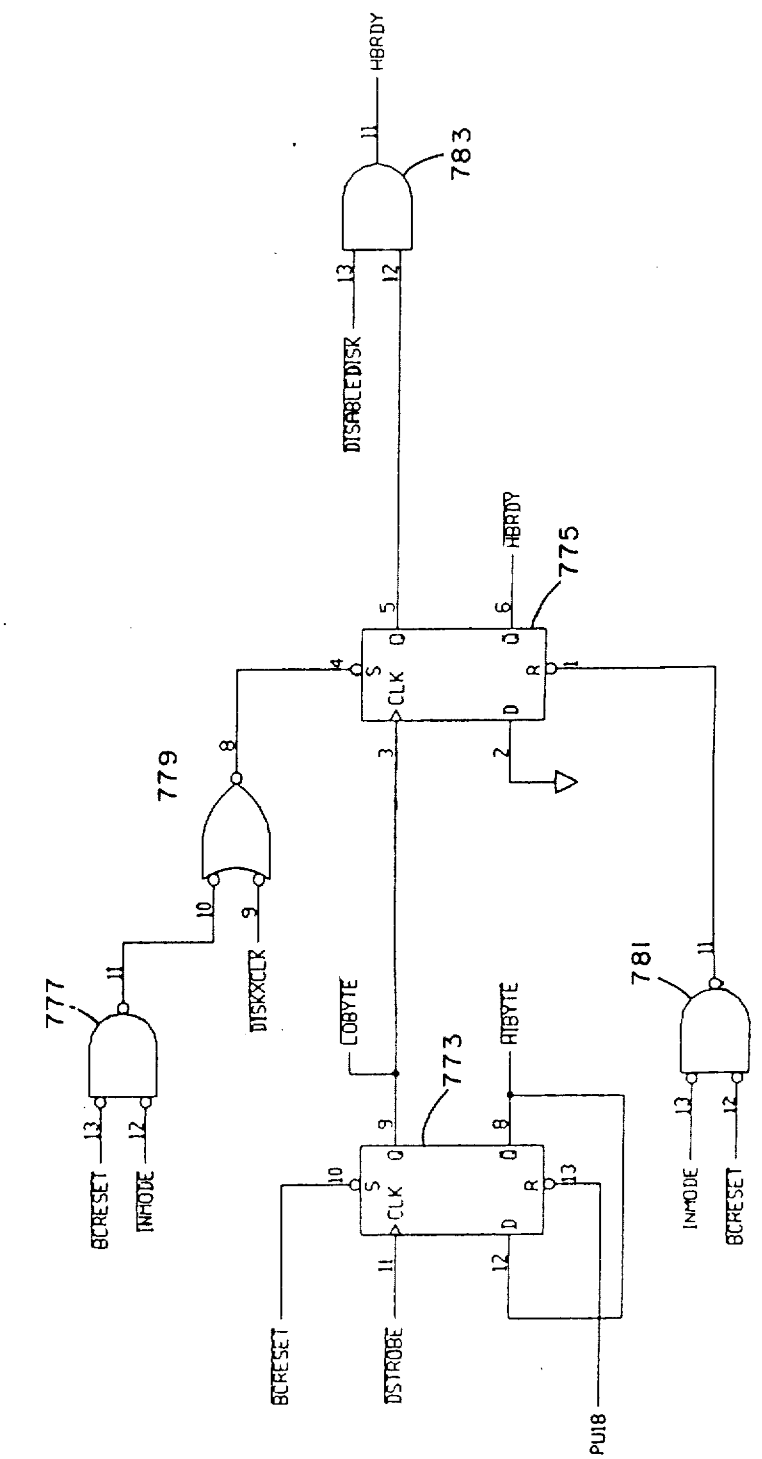
Figure 21A:
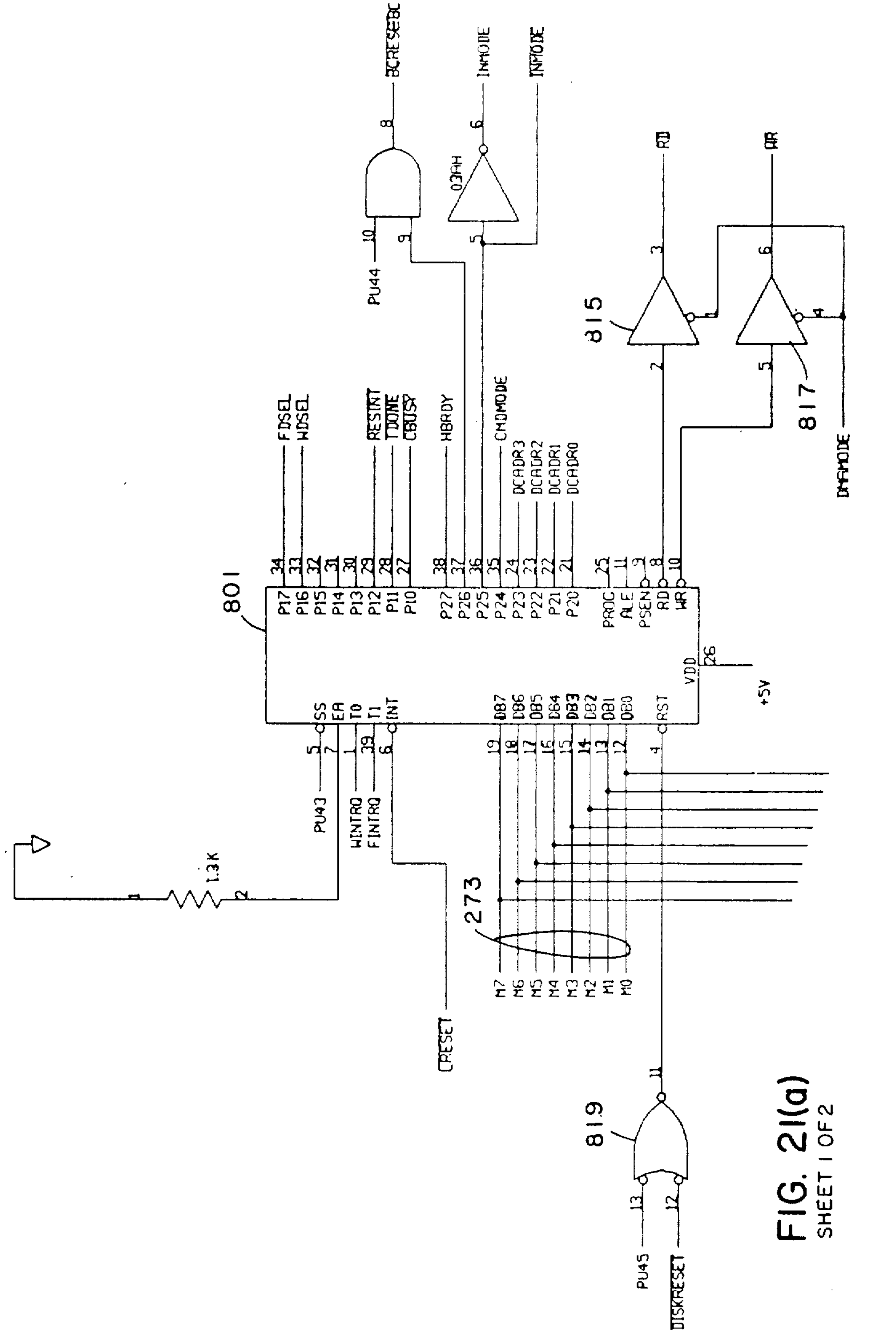
Figure 21A:
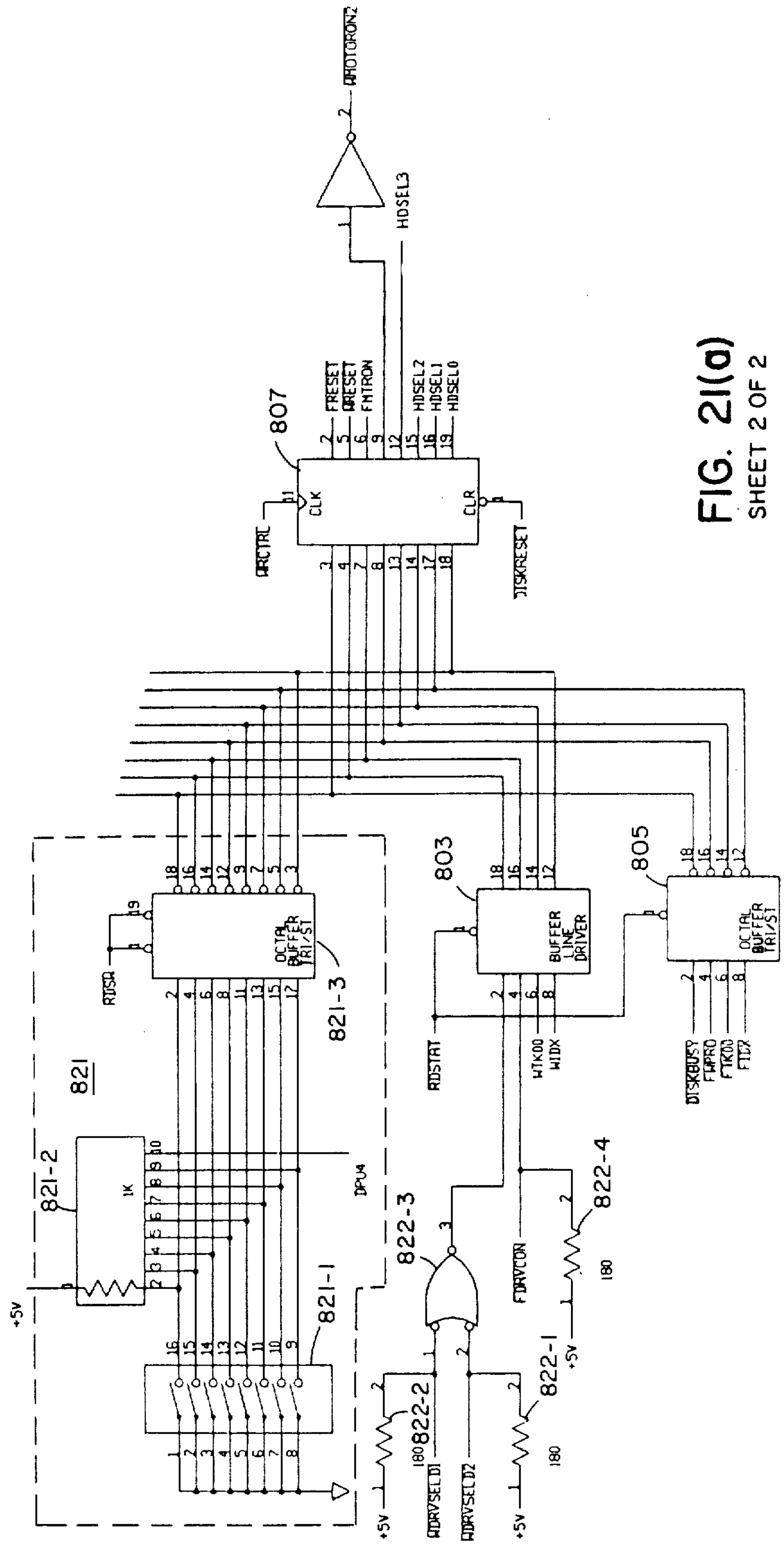
Figure 21B:
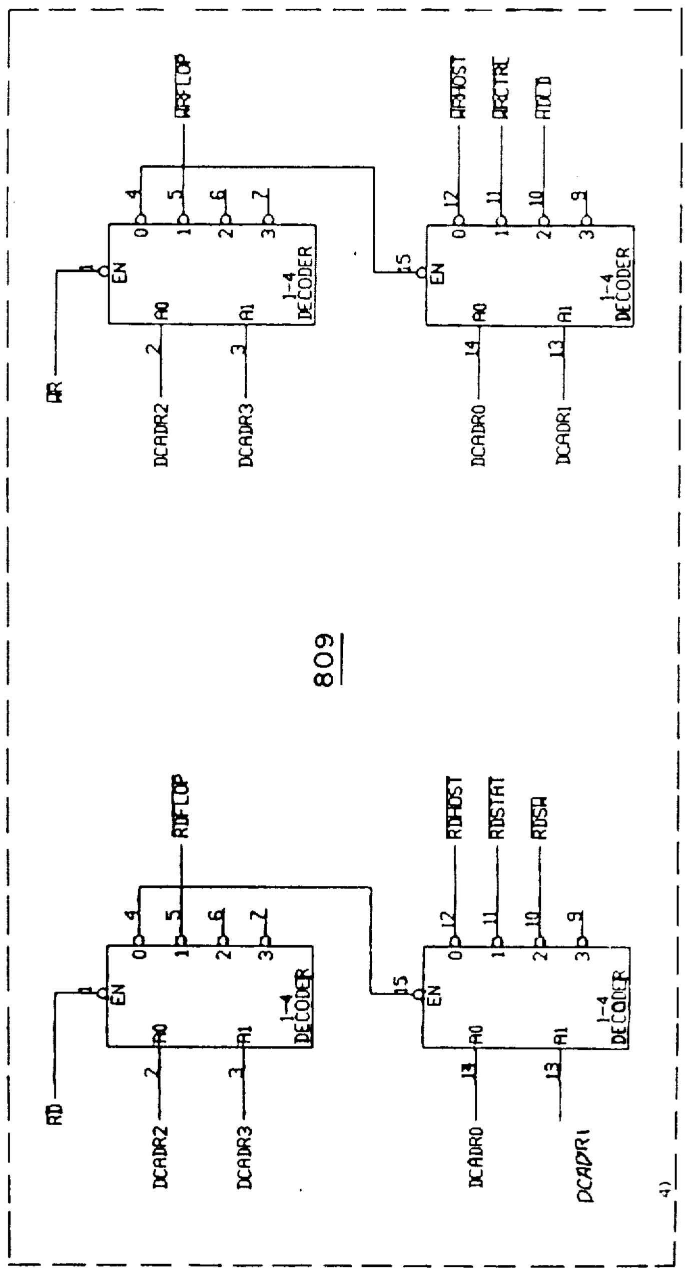
Figure 21C:
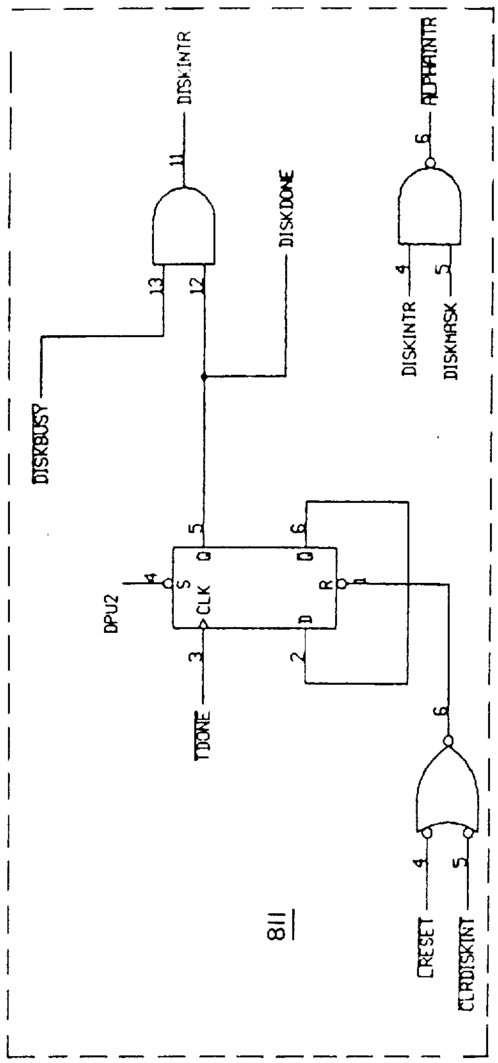
Figure 21E:
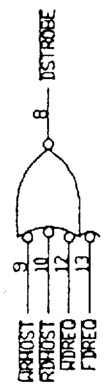
Figure 21D:
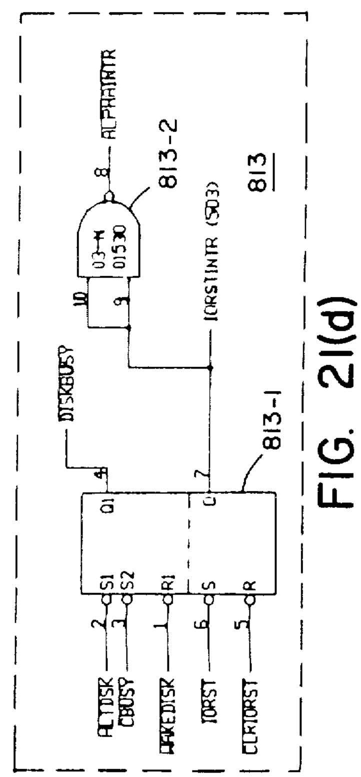
Figures 22A, 22B:
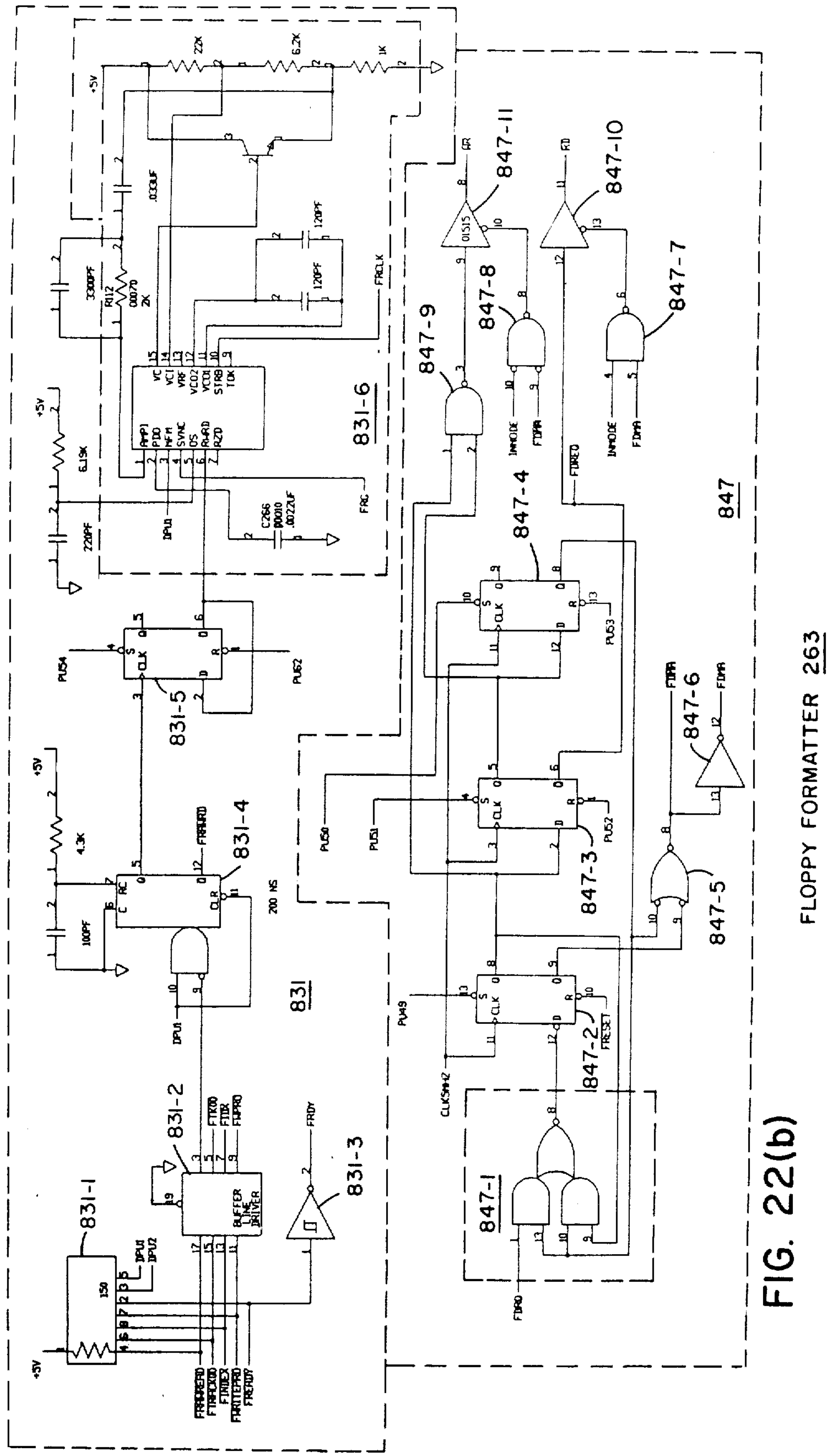
Figure 22C:
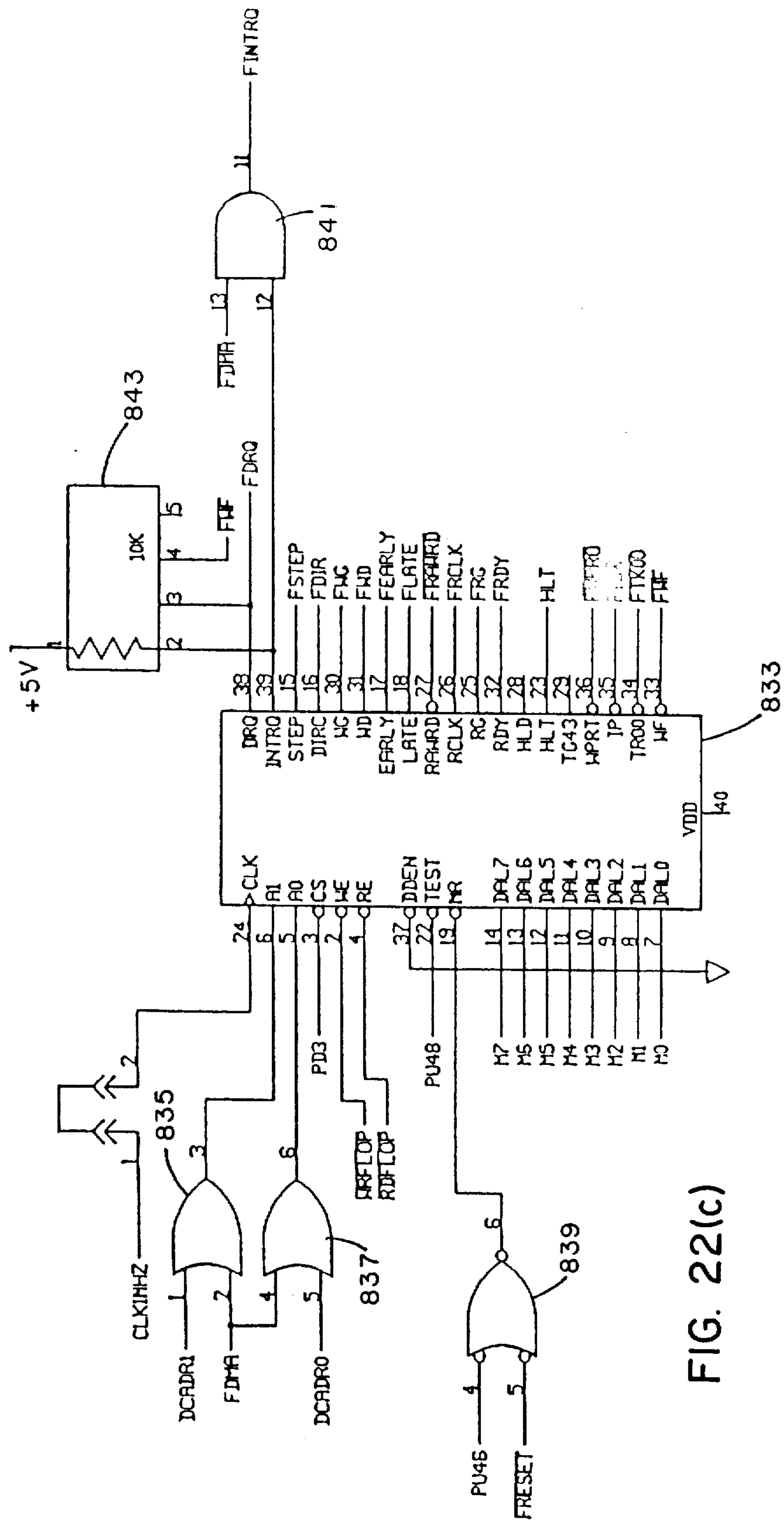
Figure 22F:
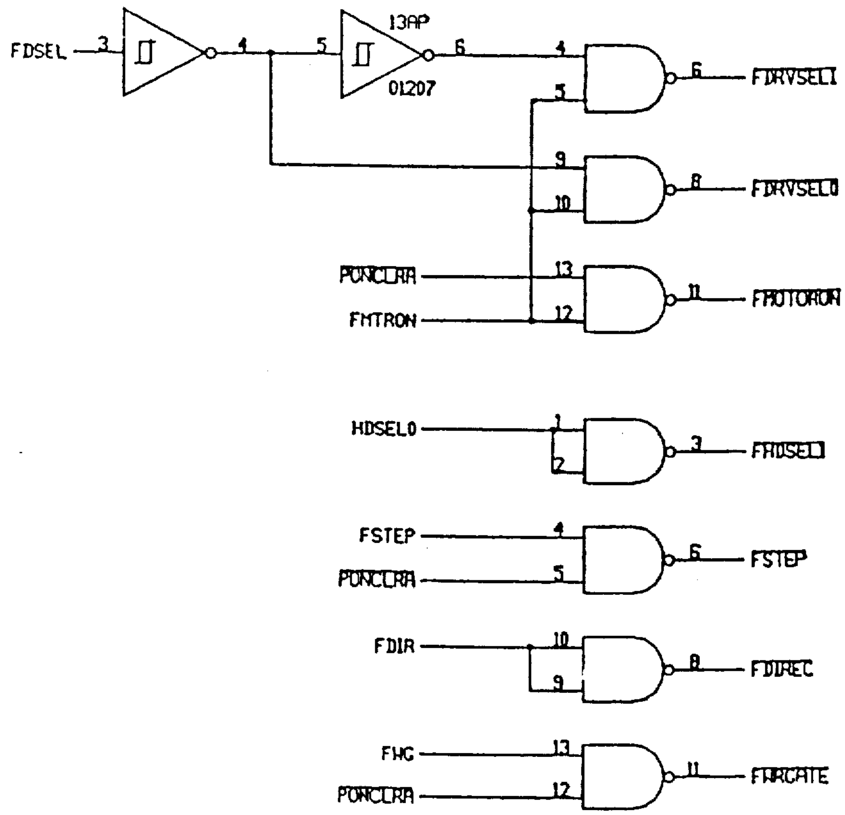
Figure 22D:
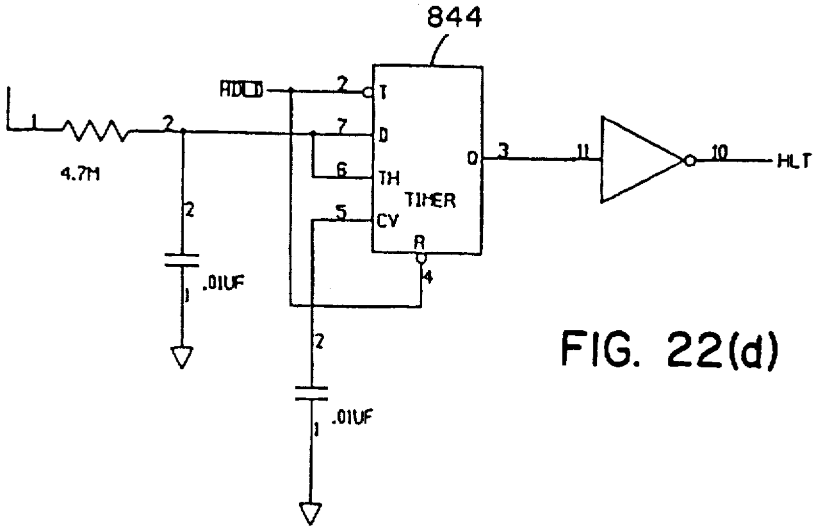
Figure 22E:
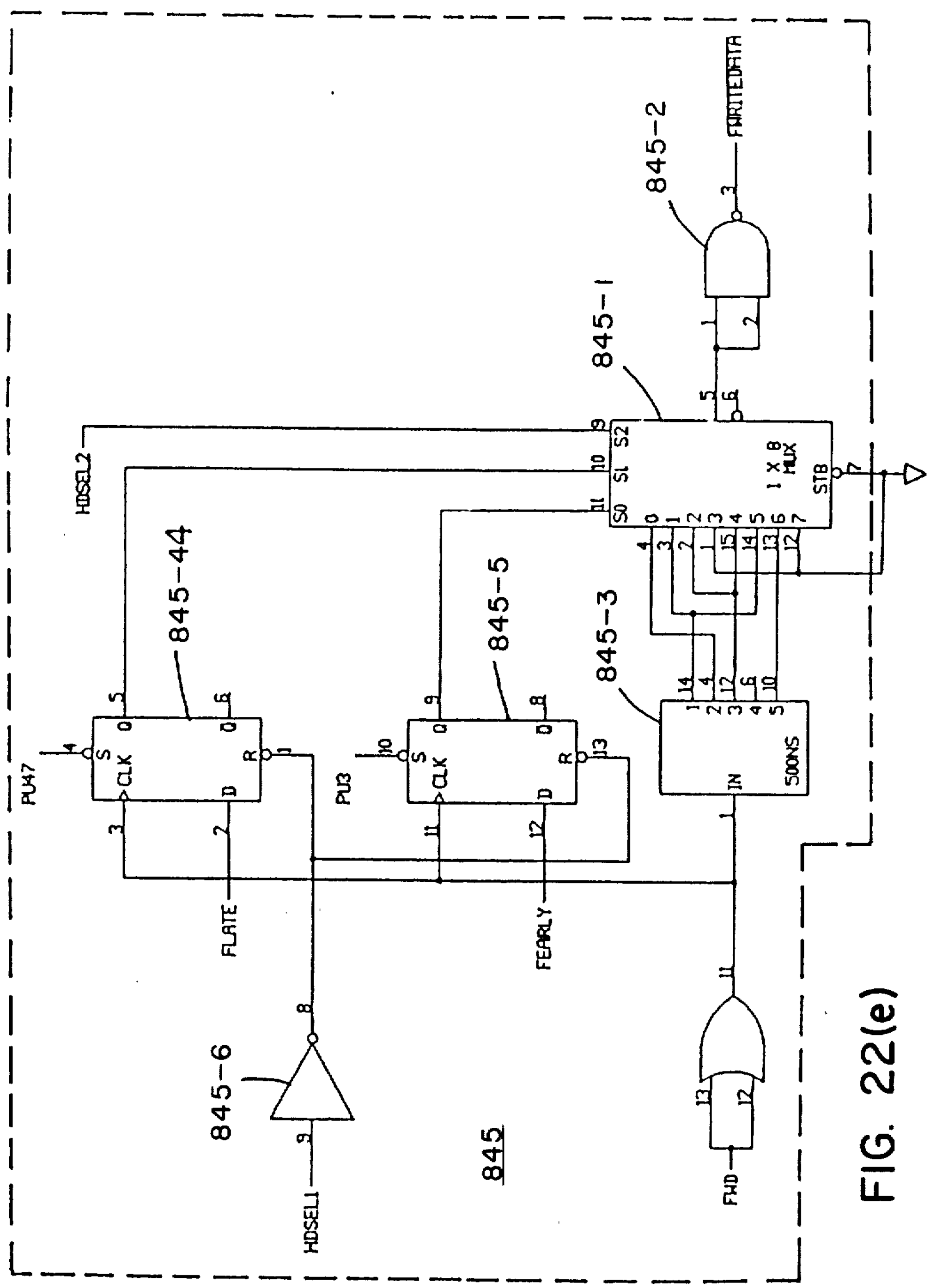
Figure 23A:
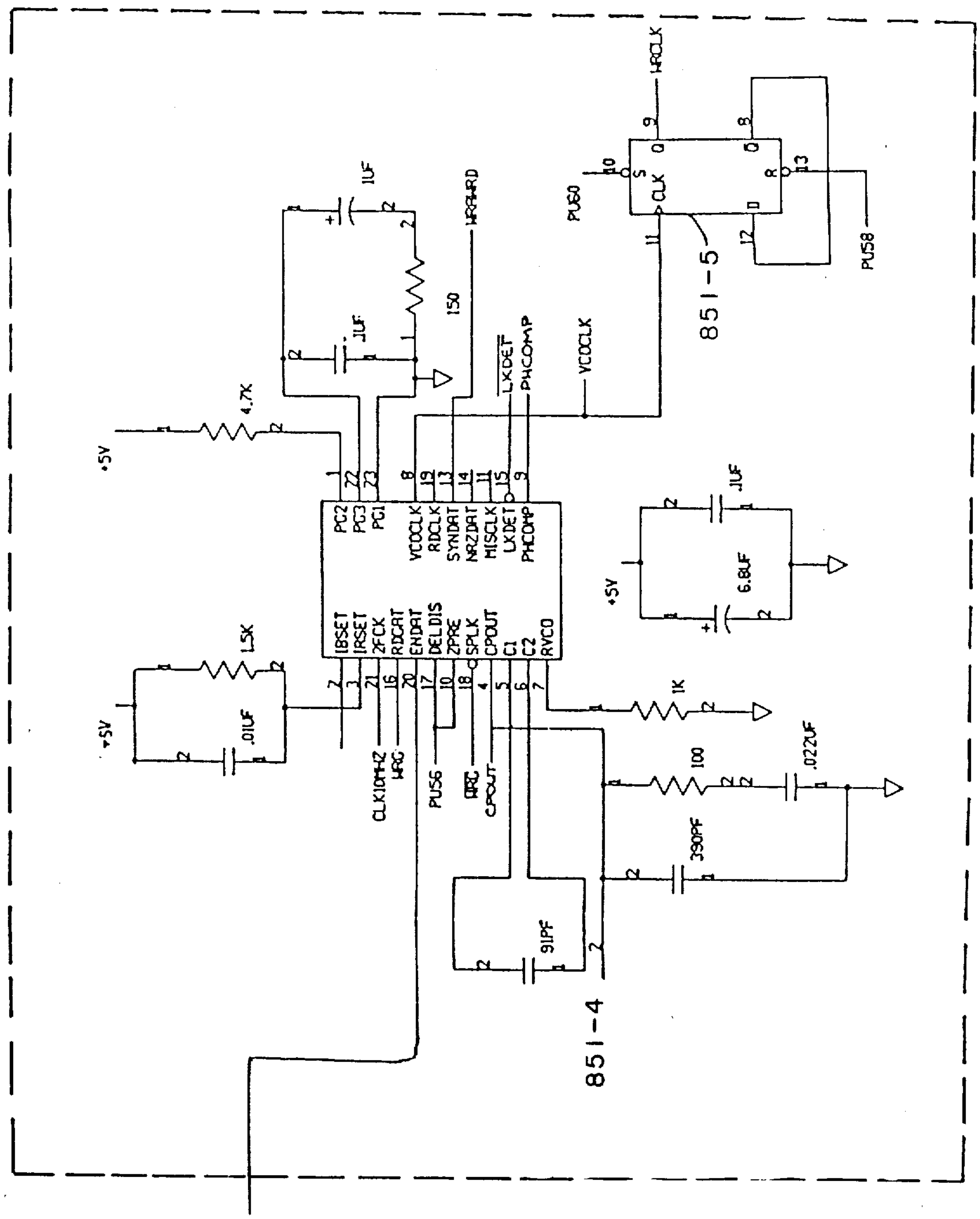
Figure 23A:
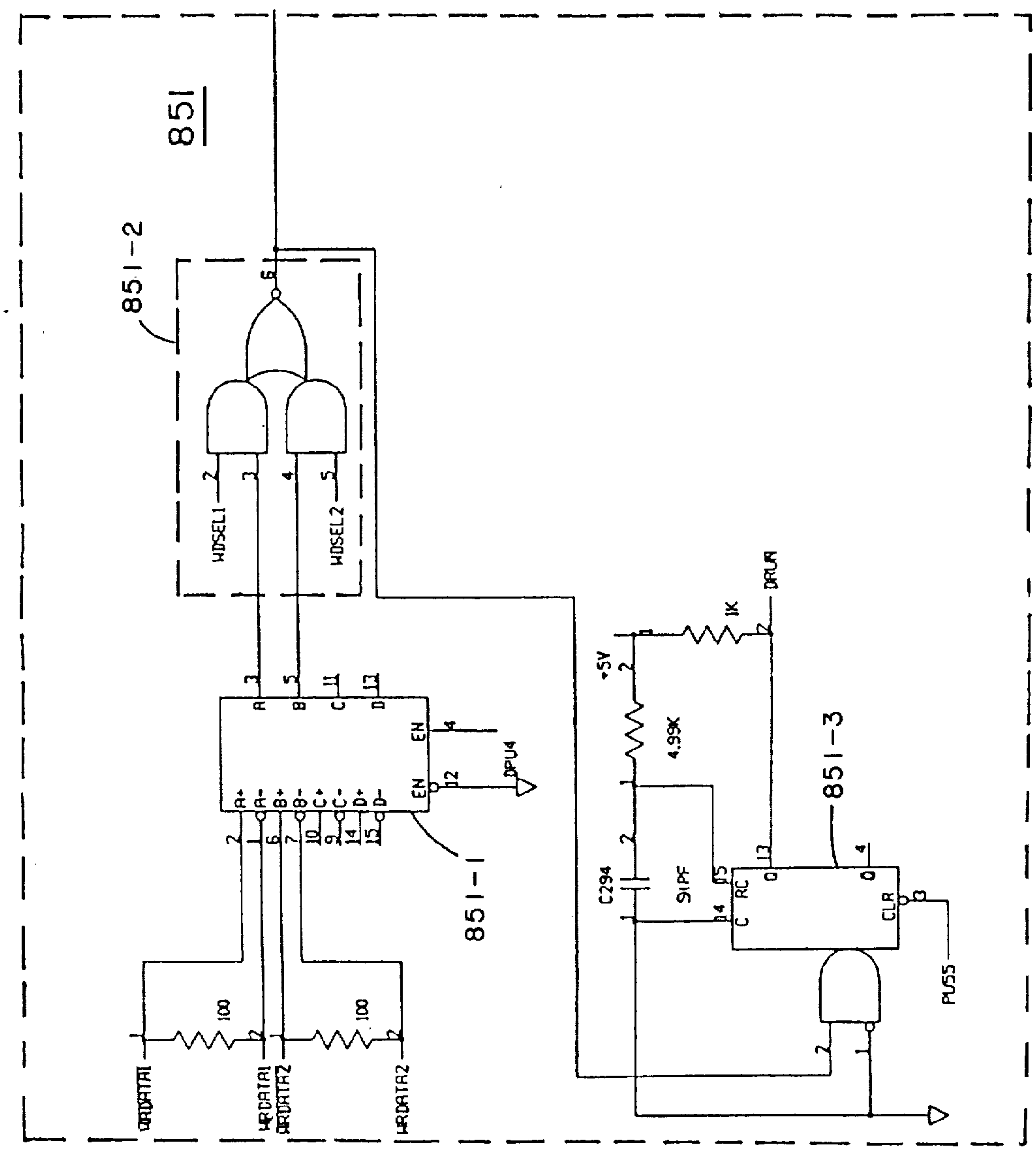
Figure 23B:
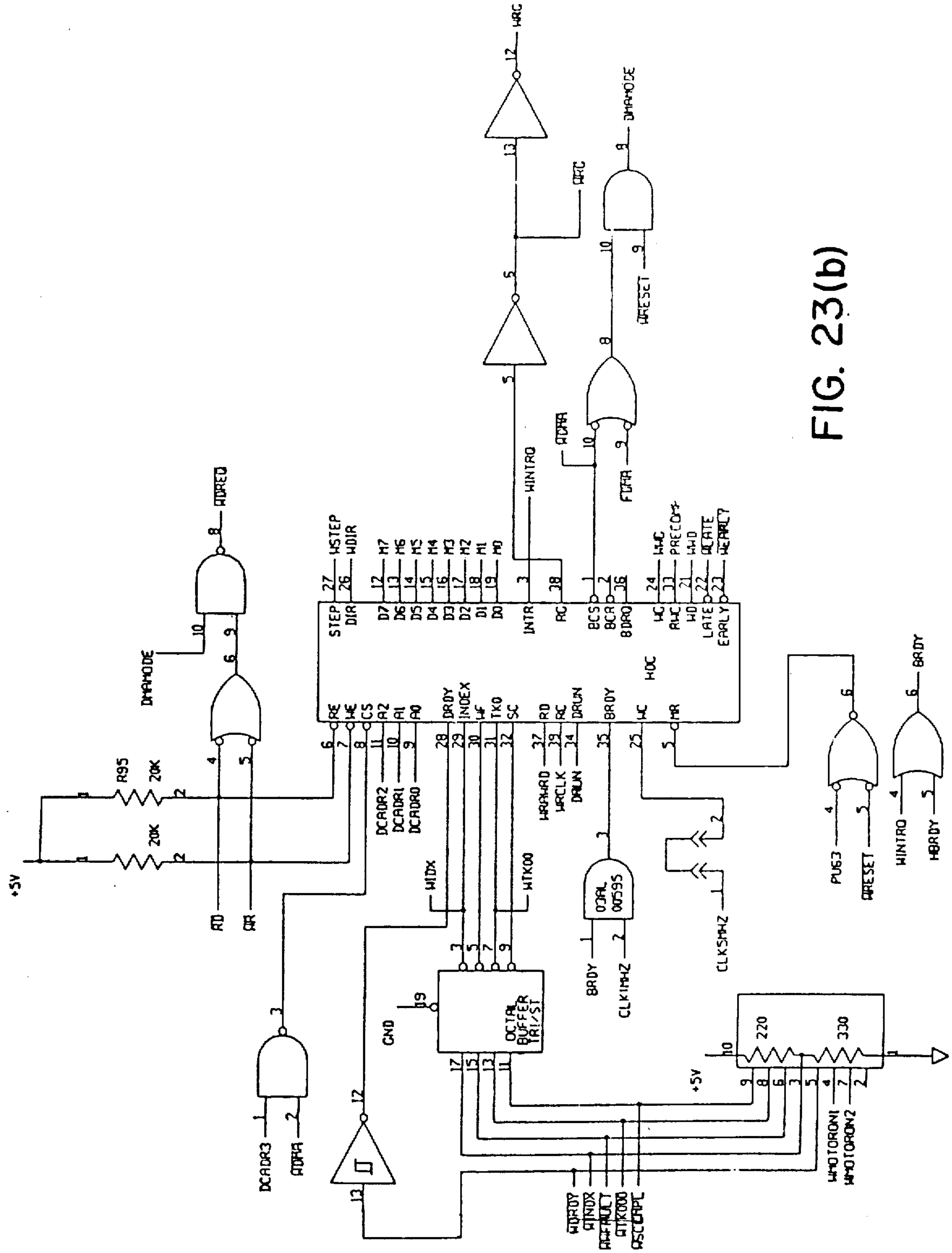
Figure 23C:
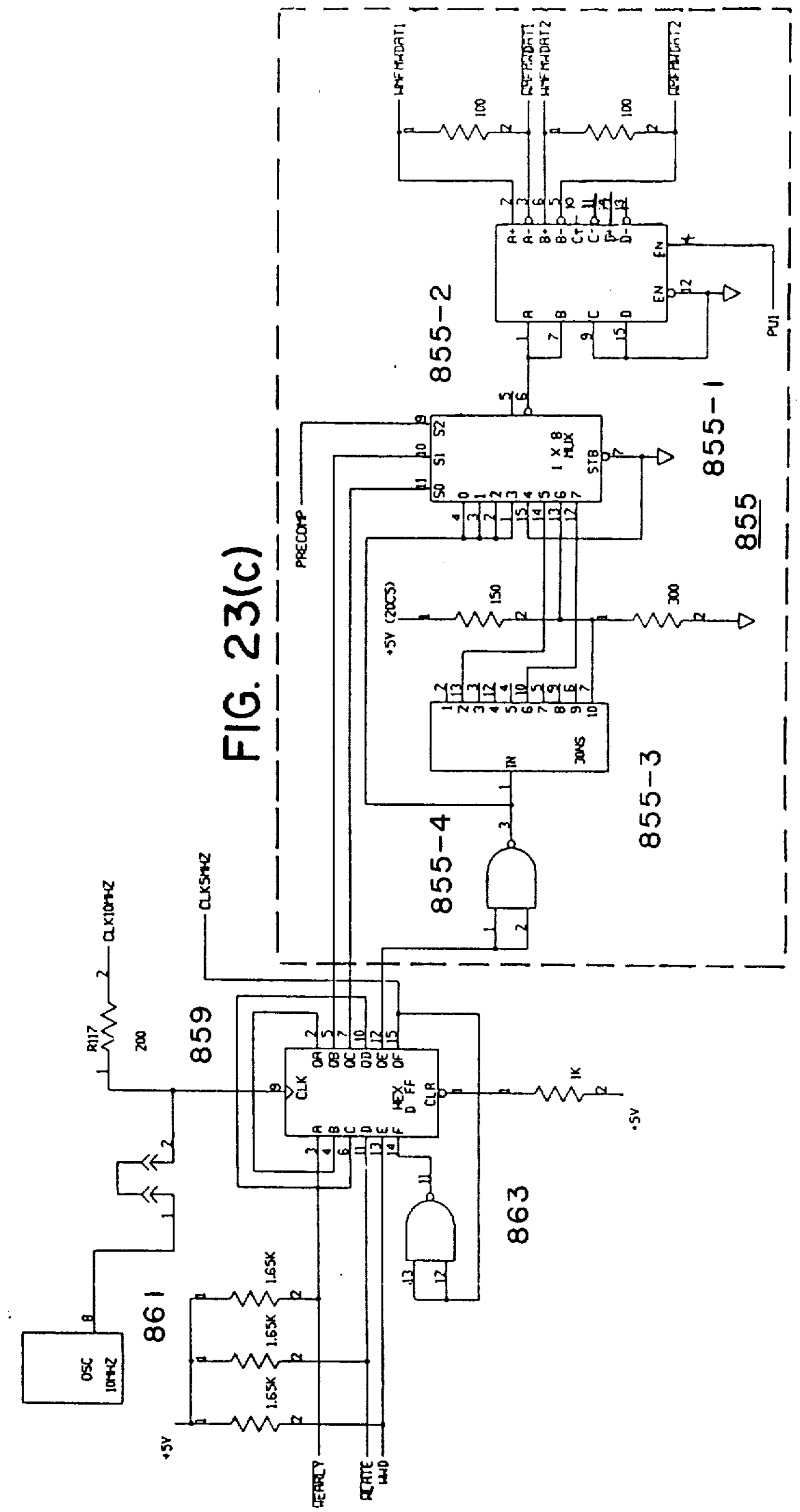
Figure 23D:
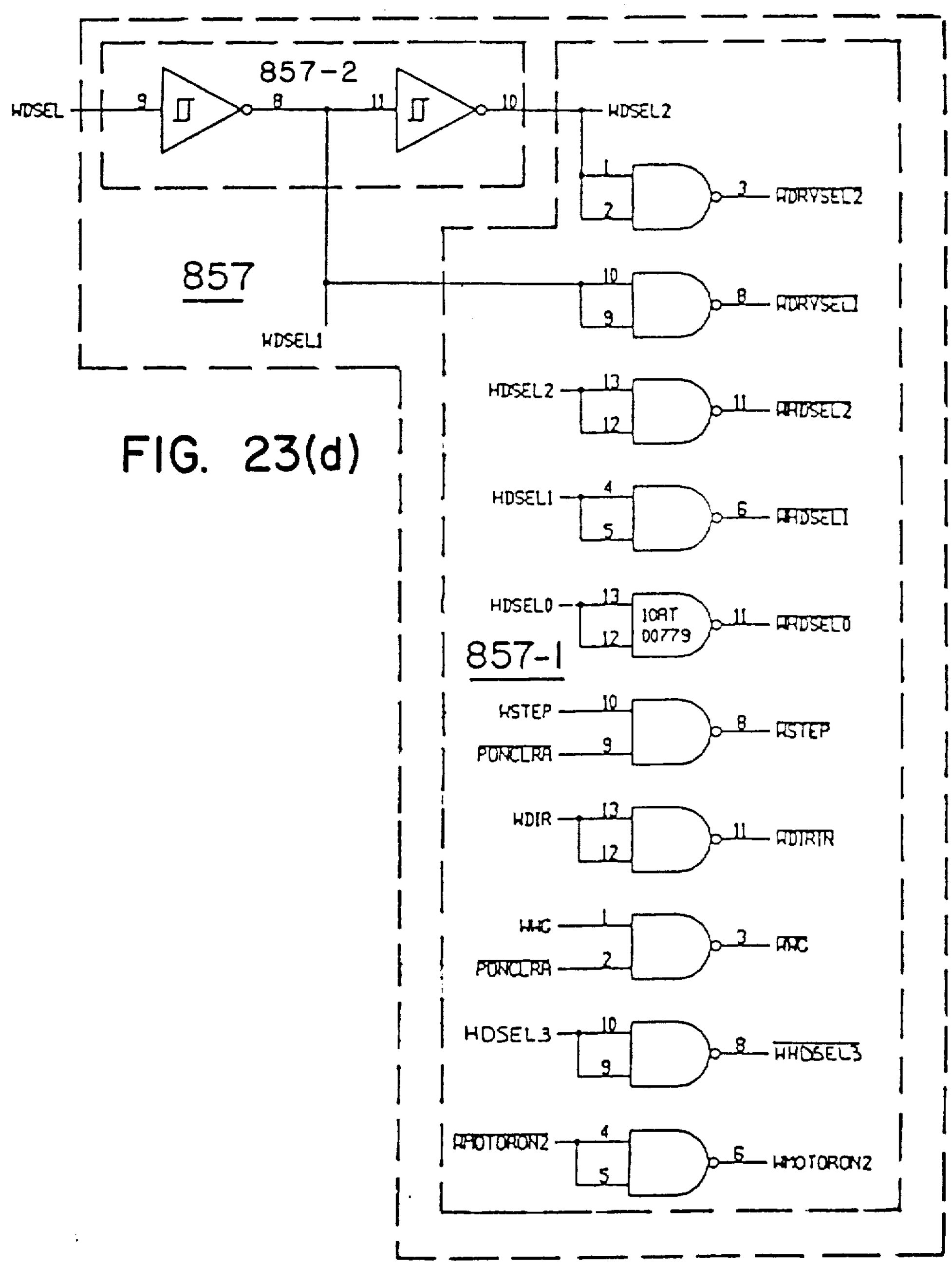
Figure 24A:
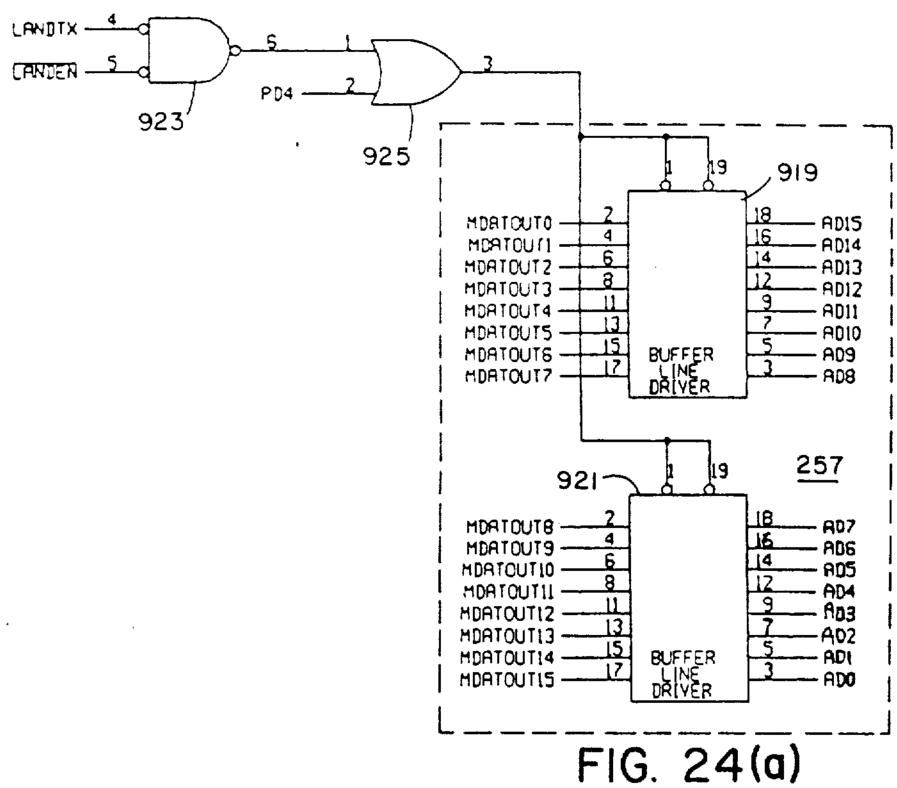
FIGS. 24(*a*) through 24(*g*) are schematic diagrams of the LAN controller 253 in FIG. 3.
Figure 24B:
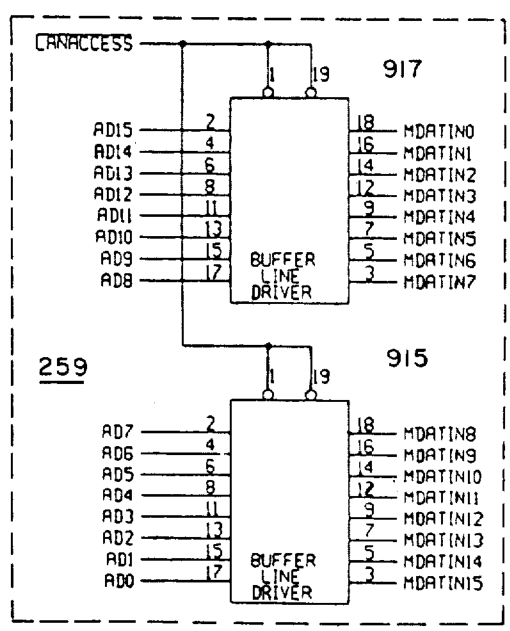
Figure 24C:
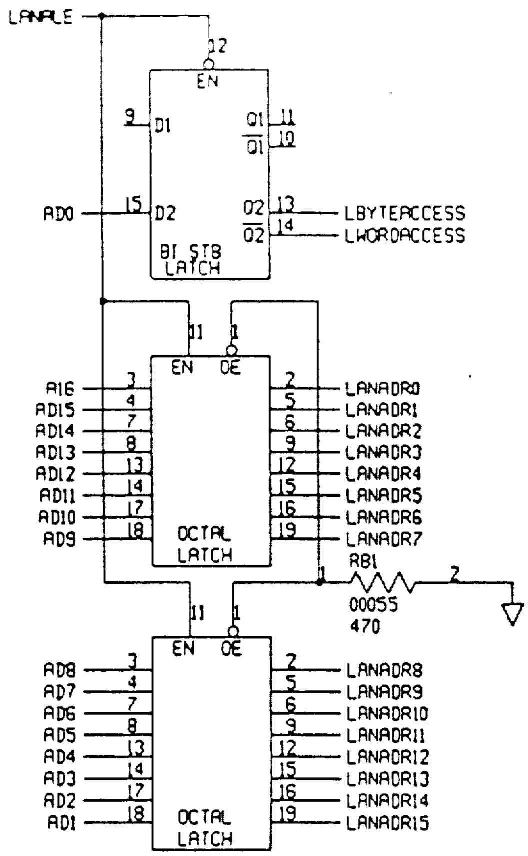
Figure 24F:
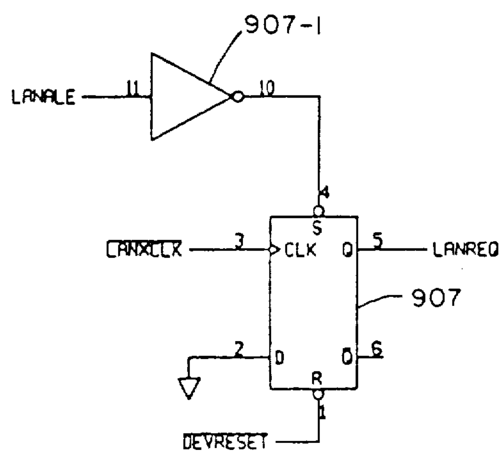
Figure 24G:
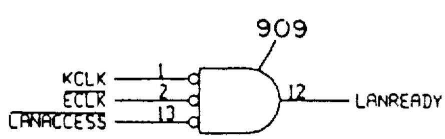
Figure 24D:
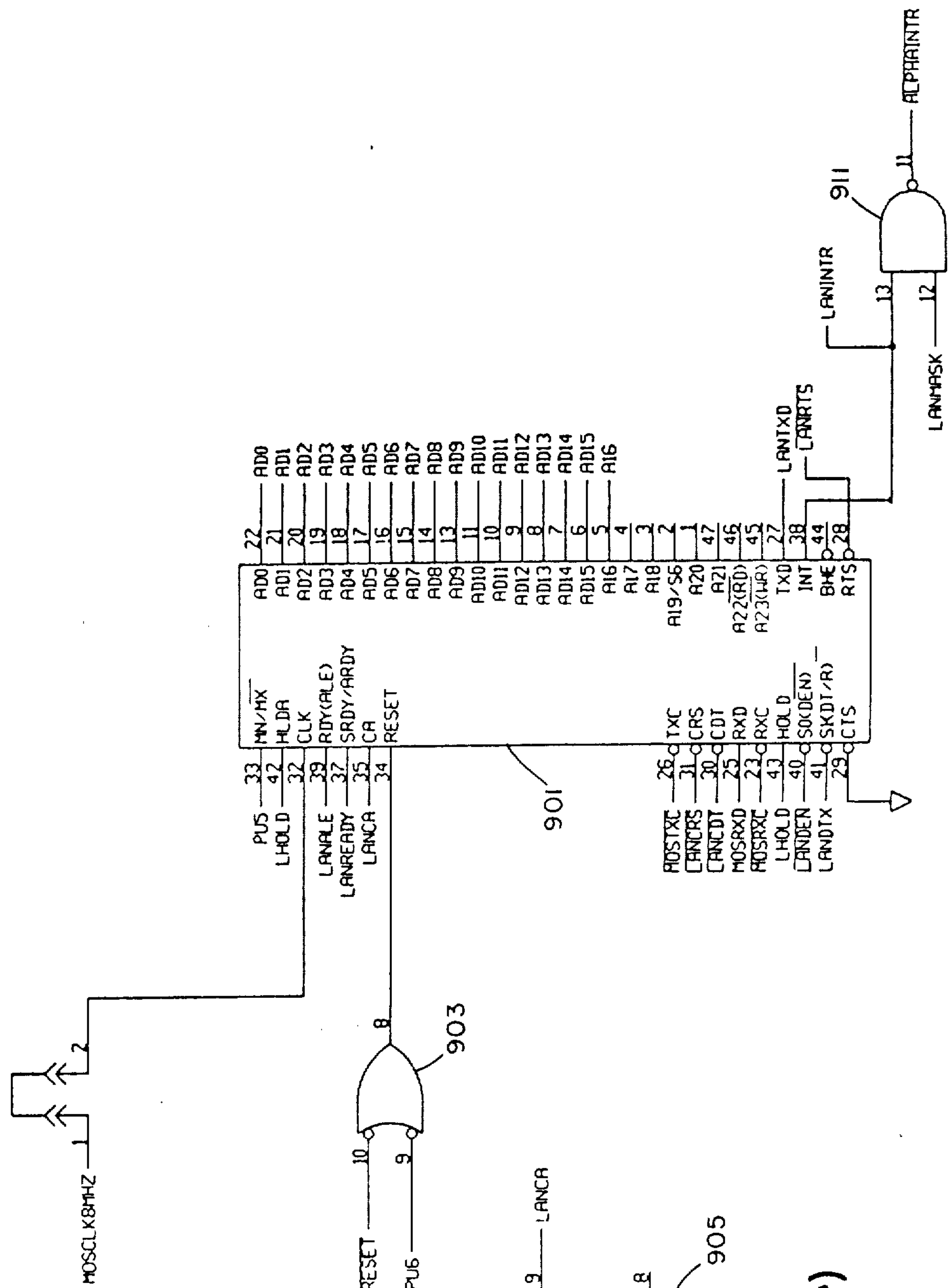
Figure 24E:
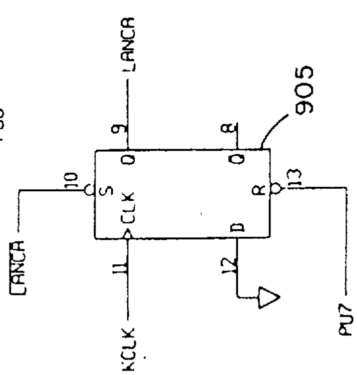

Turning now to FIGS. 17(*a*) through 17(*d*), there are set of four counters 681 which serve as the host CPU 53 data channel address counters, a quad D type flip-flop 683 which serves as a control register, has bits which specifies the direction of transfer and determines whether data should be byte-swapped. There is a group of four 4 bits counters 683 which together form a 16 bit counter that is the local address (i.e. the address of memory 205) to be transferred.

There is also an inverter 685 for counters 685 and a set of four gates 687.

Turning now to FIGS. 18(*a*) through 18(*d*), there is a pair of octal D registers 689-1 and 689-2 which provide the data path for the I/O data for use in writing to memory 205 and perform byte swapping and a pair of octal D registers 691-1 and 691-2 which also provide a data path for the I/O data. There is also an AND gate 693 and a pair of OR gates 695 and 697 which collectively control registers 689 and 691. There is a pair of octal D registers 699-1 and 699-2 which are used to provide a data path from local memory 205 to I/O bus 59. Registers 701-1 and 701-2 perform the same function as registers 699-1 and 699-2 and in addition perform the byte swapping function.

There is a set of four multiplexors 710 which are used to select between addresses and data that is being sent from local memory 205 to the host CPU 53. During one part of a data channel transfer host CPU 53 asks for the address and during the other part of a data channel transfer host CPU 53 asks for the data.

There is also a circuit 703 that keeps track of what part of a data channel transfer is being done and then switches between address times and data times. Circuit 703 includes a 3 input NAND gate 703-1, an AND/OR INVERT gage 703-2, a D type flip-flop 703-3 and another AND/OR INVERT gate 703-4.

Turning now to FIGS. 19(*a*) through 19(*g*), there is shown the interface circuitry 89 for interfacing data channel controller 88 to I/O bus 89.

The circuitry includes fifteen Schmidtt triggered NAND gates 705 labelled 705-1 through 705-15. Each one of the gates 705 is connected to a filter circuit 707 to increase noise immunity. Gates 705 and their associated filters 708 perform the input receiving function off of I/O bus 59.

There is a set of sixteen output drivers 709-1 through 709-16 that are used to drive the data from I/O control section 77 to the host CPU 53 over I/O bus 59. Each one of drivers 709 is an open collector NAND gate. Gates 711 and 713 are gates that are used to enable the data. Additional controls are provided through AND/OR INVERT gate 715. Receivers 717 and 719, which are octal tri-state buffers, take data from host I/O bus 59 and drive the data onto the internal data bus 721 (see FIG. 3). When the control logic determines that I/O control board 55 should be receiving data from host CPU 53, drivers 709 are enabled.

Multiplexor 723 is used to drive data onto the local data bus 273 when the data is not coming from I/O bus 59.

There is a set of inverters 725 which are used to invert the signals from drivers 705-11 through 705-15, two other inverters 727 and 729 and a 3 input NAND gate 731. There is also a set of logic 733 made up of two inverters and two input NAND gates which is used in the priority scheme for determining access to I/O bus 59.

Turning first to FIGS. 20(*a*) through 20(*g*), memory address generator 271 includes a pair of counters 751 and 753, a pair of 2 line multiplexors 755 and 757, a pair of D type flip-flops 759 and 761 and an open collector driver 763. There is also a pair of octal D registers 765 and 767 which are used to provide a data path from M bus 273 which is 9 bits wide to the M data bus 217 which is 16 bits wide so that disk processor 265 can write into memory 205. There is also a pair of octal D registers 769 and 771 which are used to read data from memory 205. There is a D type flip-flop 773 which is used to determine which byte is being accessed on M bus 273 and a D type flip-flop 775 which counts M bus 273 transfers and after each two transfers makes a memory request. OR gate 777, and AND gate 779 and OR gate 781 are used to initialize flip-flop 775. AND gate 783 is used to inhibit memory transfers when memory 205 is not ready to receive the data. Flip-flops 785 and 787 are J-K type flip-flops which are used to determine whether memory 205 is ready for a data transfer.

Circuit 789 contains logic which determines if memory 205 is ready for a data transfer. The logic comprises two OR gates 792 and 793 and two AND gates 795 and 797.

In FIGS. 21(*a*) through 21(*e*), there are illustrated the details of the 8049 microprocessor section 265.

The section includes a microprocessor 801 which contains a program that interprets commands written into memory 205 and transforms the commands into an appropriate sequence of commands to the Winchester formatter 263 and the Floppy formatter 261. There is a pair of tri-state buffers 803 and 805 which are used to drive random data onto M bus 273, a command register 807, a set of four decoders 809 for decoding addresses and a logic circuit 811 that allows microprocessor 801 to interrupt microprocessor 201 after it has finished a command and which is made up of an AND gate 811-1, a D type flip-flop 811-2, an AND gate 811-3 and an open collector AND gate 811-4. There is also a logic circuit 813 that allows microprocessor 201 to interrupt microprocessor 801 when it has a command to issue. Circuit 813 is made up of an RS type of flip-flop 813-1 and a collector driver 813-2. There is also a pair of tri-state drivers 815 and 817 which function as a multiplexor to drive the READ and WRITE signals. There is a buffer 819 which is used to drive the reset into microprocessor 801. There is a circuit 821 which allows microprocessor 801 to read the values of a group of eight switches of configuration information. The circuit includes a switch 821-1, a set of pull-up resistors 821-2 and a tri-state buffer 821-3. There is a circuit 823 for determining whether the Winchester or the Floppy are connected. The circuit includes an AND gate 823-1 and associated resistors 821-1, 821-2 and 821-3.

Turning now to FIGS. 22(*a*) through 22(*f*), there are shown schematic diagrams of floppy formatter 261.

There is a data separator circuit 831 which includes pull-up resistors 831-1, an input receiver 831-2, an inverter 831-3, a one shot monostable multivibrator 831-4, a D type flip-flop 831-5 and a phase-lock loop circuit 831-6. There is also a floppy disk controller chip 833 and associated components.

The associated components include a pair of OR gates which are part of the decoding circuitry when processor 265 chip 833 united commands to controller 833, a reset buffer 839, a gate 841, and a set of pull-up resistors 843.

There is also a timer 845 that instructs controller 833 to perform certain functions.

There is also a write-data generator 845 that includes head select logic and a precompensation network. Write-data generator includes a multiplexor 845-1, an open collector driver 845-2, a delay line 845-3, a pair of D-type flip-flops 845-4 and 845-5 and an inverter 845-6. There is also a "state machine" circuit 847 which controls the transfer of data from controller 833 to memory 205. Circuit 847 includes an AND/OR INVERT gate 847-1, three D-type flip-flops 847-2, 847-3 and 847-4, an AND gate 847-5 an inverter 847-6, a NAND gate 846-7 and OR gate 846-8, a NAND gate 846-9 and a pair of tri-state drivers 846-10 and 846-11.

Turning now to FIGS. 23(*a*) through 23(*d*), there are illustrated schematic diagrams of the logic for the Winchester formatter 263.

There is a data separator circuit 851 which includes a differential receiver 851-1, an AND/OR INVERT gate 851-2, a one shot 851-3, a phase lock loop circuit 851-4 and a flip-flop 851-5.

There is a controller chip 853 and associated components. The associated components include an AND gate 853-1 which gates the reset and AND gate 853-2 which tells controller chip 851-6 when it can access memory 205, a gate 853-4 that conditions the buffer ready signal by gating it with a 1 MHZ clock, a NAND gate 853-5 which serves as a control for the read and write signals, an AND gate 853-6 and a circuit 853-7 that controls access to memory 205 from controller chip 853 and comprises two AND gates 853-8 and 853-9.

There is a NAND gate 853-10 which selects controller chip 853 for access by processor 801. There is also a tri-state buffer 853-11 which is always enabled and an inverter 853-12 which together act as a receiver for status signals from the Winchester disk drive connected to the Winchester formatter 263. There is also a set of pull-up resistors 853-13.

There is also a "write-data" generator 855 for controller 853 which includes a differential driver 855-1, a multiplexor 855-2, a delay line 855-3 and an open collector drive 855-4.

There is also a circuit 857 that drives the control information to the Winchester disk drive and which includes ten open collector line drivers 857-1 and two inverters 857-2.

There is also a hex D type flip-flop 859 and a 10 MHZ crystal oscillator 86 and a NAND gate 863 which together produce a 5 MHZ clock.

Referring now to FIGS. 24(*a*) through 24(*g*), there are shown schematic diagrams of the LAN controller circuit 253.

Circuit 253 includes a controller chip 901 which has an AND gate 903 which acts as a buffer on the reset signal input of controller chip 901, a D-type flip-flop 905 for synchronizing the interrupts from processor 201 to LAN controller chip 901, a D type flip-flop 907 coupled to an inverter 907-1 which synchronized the request for memory from LAN controller chip 901 to memory 205, a 3 input NOR gate 909 which synchronizes memory 205 with LAN controller 253 and an open collector driver 911 which drives a microprocessor 201 interrupt when the LAN controller 253 is finished with a command.

There is also a latch section 913 (corresponding to block 255 in FIG. 4) made up of 3 latches 913-2, 913-2 and 913-3 which takes the memory address from controller 901 and holds the addresses until memory 205 is ready to handle them.

There is a pair of tri-state buffers 915 and 917 that are used to drive data from controller 901 to M data in channel 219 of memory bus 217, a pair of tri-state buffers 919 and 921 that are used to drive data from M data out channel 221 of memory bus 217 to controller 253 and a pair of gates 923 and 925 which control the transfer of data from memory 200.

Figure 25A:
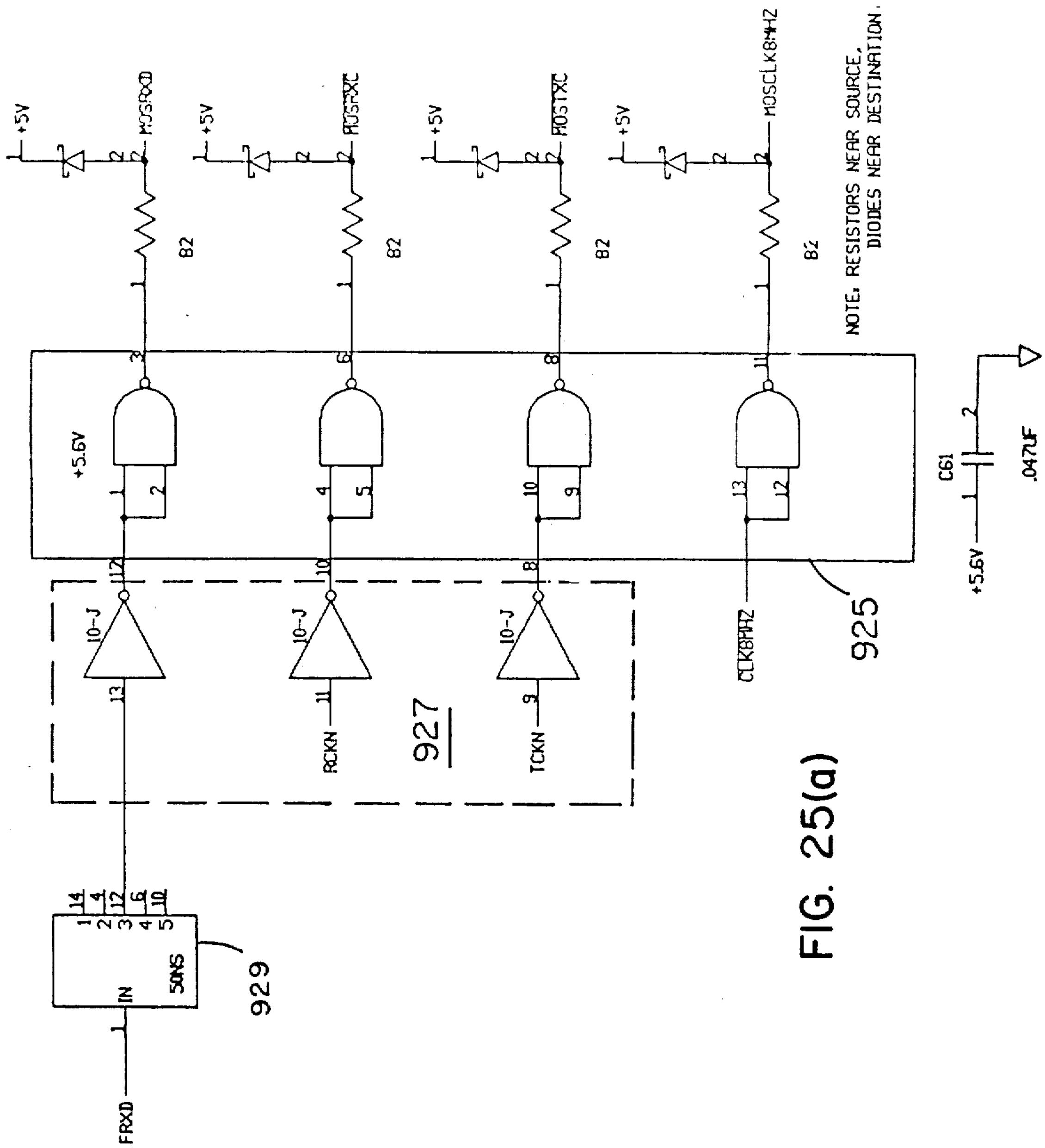
FIGS. 25(*a*) through 25(*c*) are schematic diagrams of the serializer 251 in FIG. 3.
Figure 25B:
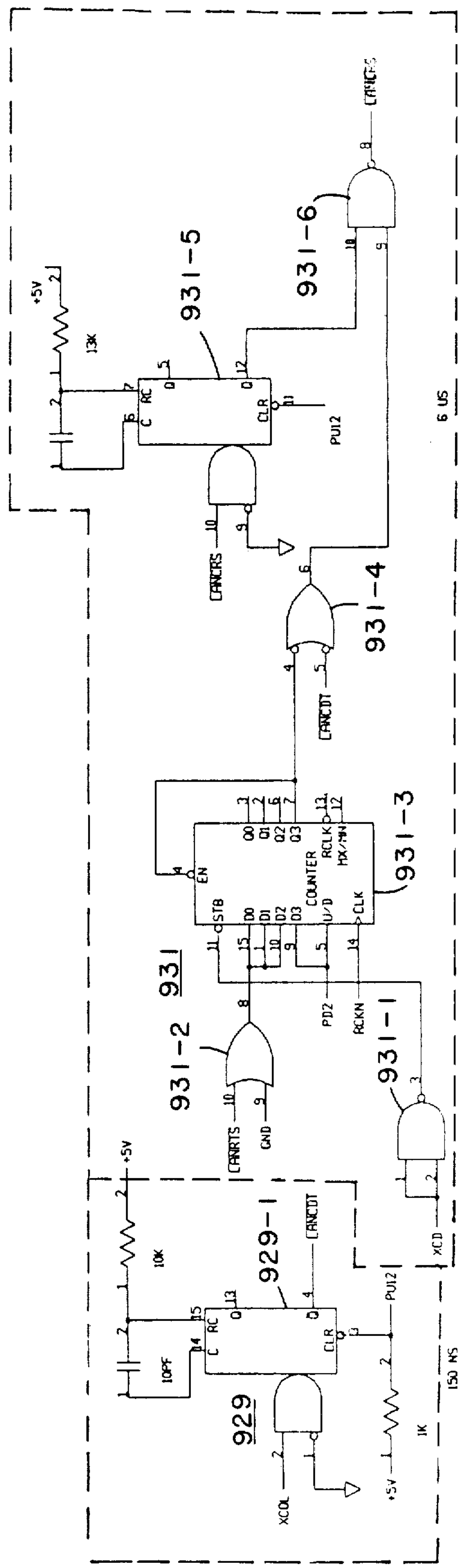
Figure 25C:
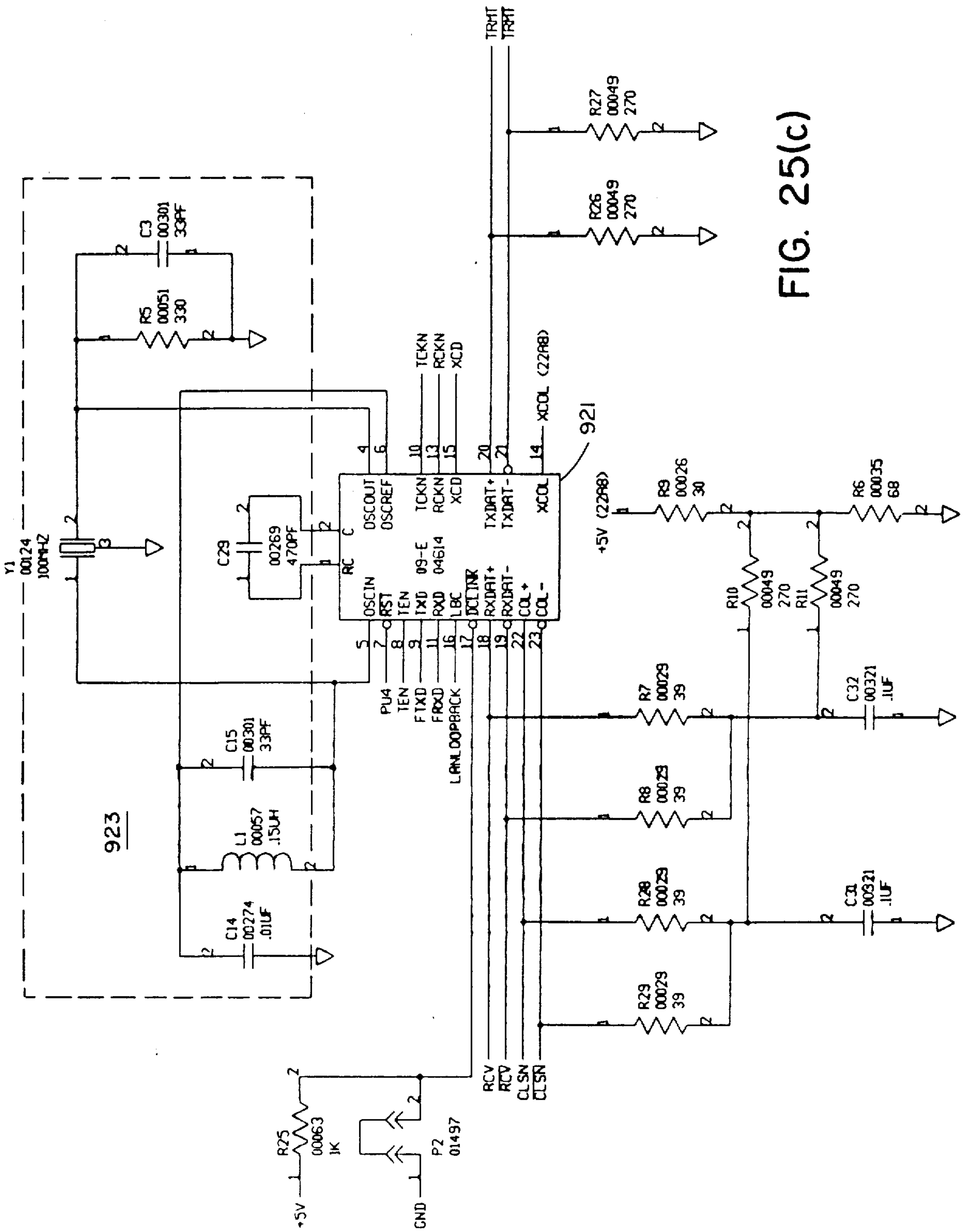
Figure 26A:
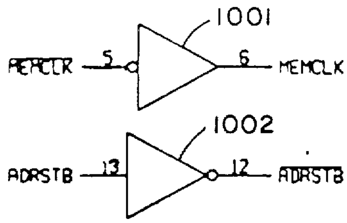
FIGS. 26(*a*) through 26(*h*), 27(*a*) through 27(*e*), 28(*a*) and 28(*b*) and 29(*a*) through 29(*c*) are schematic diagrams of the video memory/memory bus interface 129 in FIG. 2A.
Figure 26H:
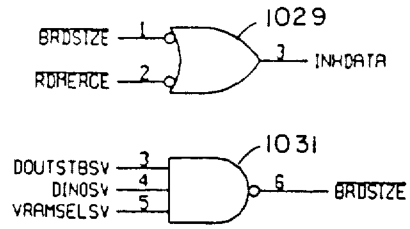
Figure 26B:
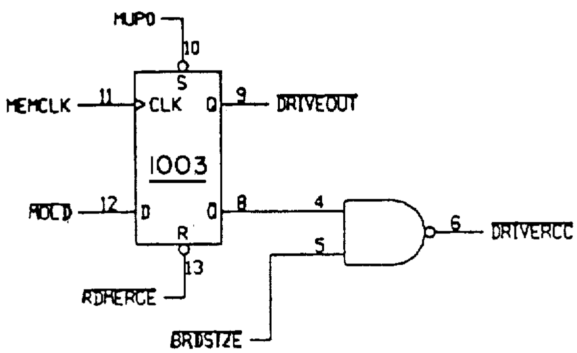
Figure 26C:
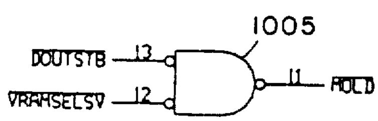
Figure 26D:
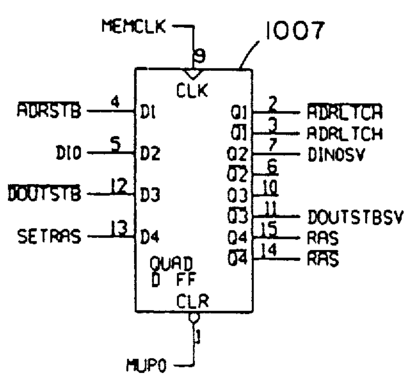
Figure 26G:
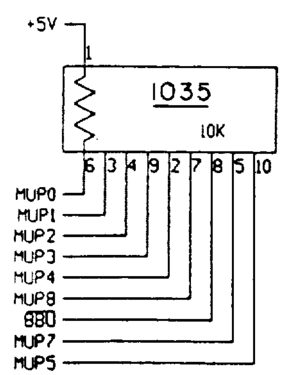
Figure 26E:
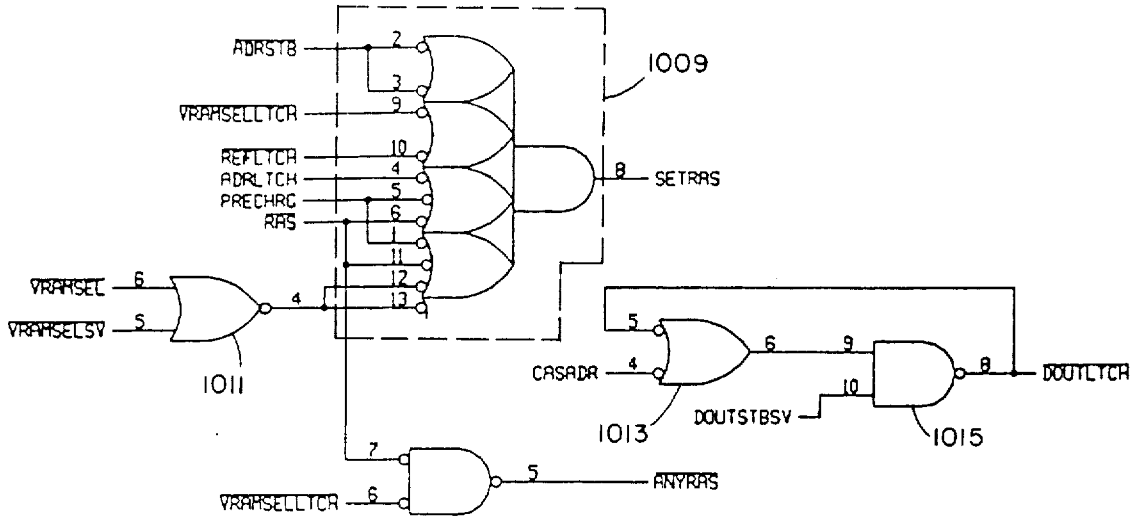
Figure 26F:
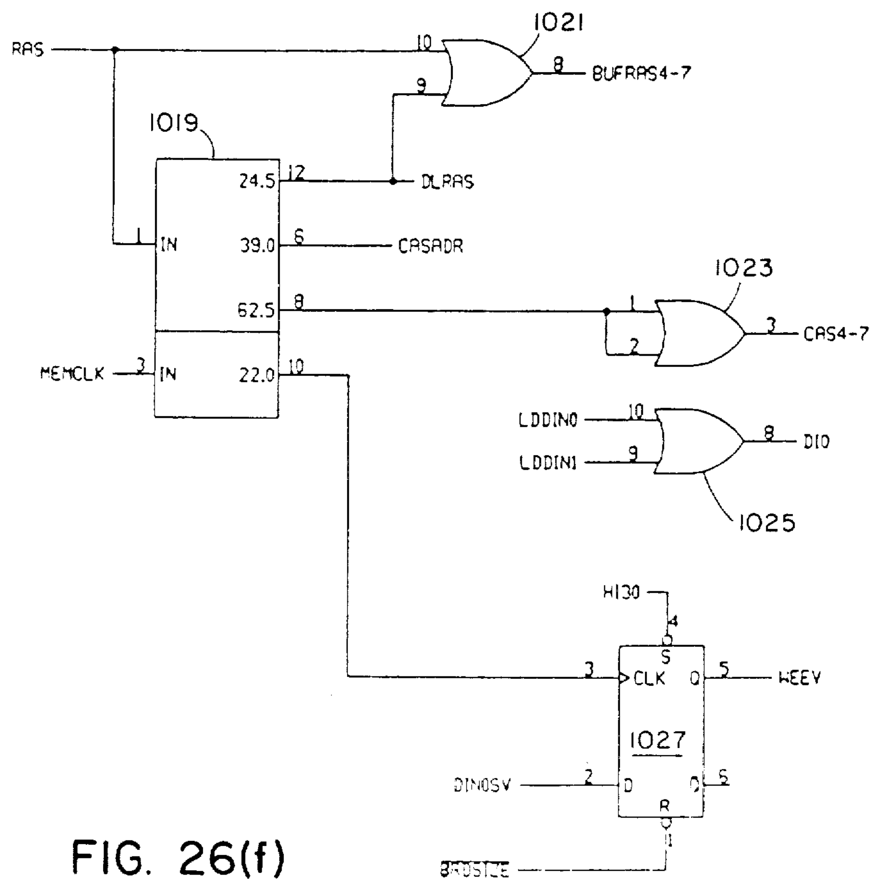

Referring now to FIGS. 25(*a*) through 25(*c*), there are shown circuit diagrams of serializer 251. There is a chip 921 which converts incoming differential signals into MOS signals which are sent to controller chip 901. Components connected to chip 921 include an oscillator circuit 923. There is a set of four MOS level driver 925, a set of three inverters 927 and a delay line 929. There is also a circuit 929 for conditioning the collission detect and a circuit 931 for conditioning the carrier delect.

Circuit 929 includes a one-shot 929-1 while circuit 931 includes an AND gate 931-1, and OR gate 931-2, a counter 931-3, an OR gate 931-4, a one shot 931-5 and an AND gate 931-6.

Referring now to FIGS. 26(*a*) through 26(*h*), 27(*a*) through 27(*e*), 28(*a*) and 28(*b*) and 29(*a*) through 29(*c*), there is illustrated schematic diagrams of the circuitry in video memory interface 129. As noted before, video memory interface 129 is used to interface video memory 127 to the system memory bus 61.

Looking first at FIGS. 26(*a*) through 26(*h*), there is a pair of inverters 1001 and 1003 which are used to buffer signals off of system memory bus 61. There is a D-type flip-flop 1003 which clocks out a drive signal which allows data, after a memory address has occurred to be driven out on bus 61. There is a two input gate 1005 which acts as an input to flip-flop 1003 to determine the state when data should be driven out on bus 61. Gate 1005 receives a control signal data output strobe DOUT STB and a control signal video RAM select VRAM SELSV. There is a quad-D type flip-flop 1007 which serves to sample the address strobe signal ADRSTB to determine when to close the address latches on the input side of bus 61, sample the data output strobe DOUTSTB to determine when data should be driven out and which receives a set RA signal SETRAS from decoding logic which is used to determine when the RAMS in video memory 127 whould be rassed i.e. given a read address strobe.

There is a 4Y AND/OR INVERT gate 1009 which collectively gate the control signals which determine when a RASS should occur. There is a NOR gate 1011 which gates between inputs VRAMSEL and VRAM SELV and applies to gated signal to inverter 1009. There is a pair of NAND gates 1013 and 1015 which allow data to be latched into output registers after a memory reading. There is an OR gate 1017 which OR's together a signal VRAM select latch VRAMSELTCH and a signal RAS and produces a signal ANYRAS which is sent to the memory controller in main CPU 53 to inform CPU 53 that a decode has been successful and that the video memory section 57 has been addressed. There is a delay line 1019 which is used as a timing delay device to allow appropriate skew between the RASS and CASS timing signals going to video memory 127.

There is a pair of OR gates 1021 and 1023 which serve as buffers which are used to drive the RASS and CASS signals to the appropriate memory driver device. OR gate 1025 OR's together two memory control signals allow the DRAMS in video memory 127 to be accessed as if they were in different planes of memory. D-type flip-flops 1027 samples the saved state of data and gates out a "write" signal to the RAM's in video memory 127 if it is a write cycle. There is a NAND gate 1029 which receives signals BRDSIZE and RDMERGE and outputs a signal inhibit data INHDATA. Gate 1031 is a 3 input NAND gate which functions as a decode to drive the signal BRDSIZE. Inverter 1033 is used to buffer and invert the precharge signal PRECHRG. Resister pack 1035 provides a number of resistive pull-ups for various unused signals in the board.

Figure 27A:
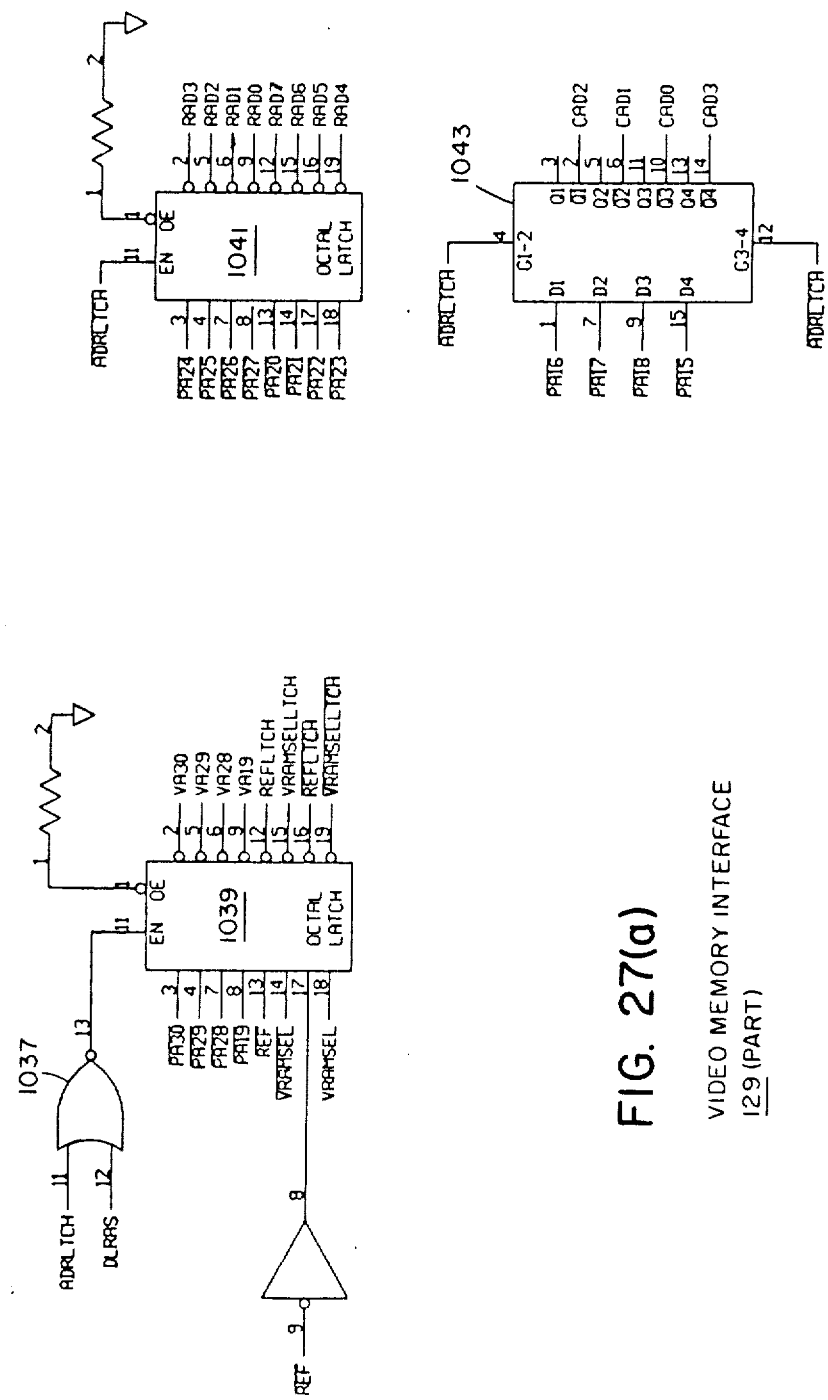

Turning now to FIGS. 27(*a*) through 27(*e*), there is a 2 input NOR gate 1037 which allows the closing of a portion of an octal latch 1039 which is used to sample physical address signals so that the desired address for a memory transaction can be retained. The remainder of this latching function is performed cumatively by octal latches 1041 and 1043. There are two 2 line multiplexors 1045 and 1047 which multiplex the addresses latches by latches 1039, 1041 and 1043. There is a tri-state octal buffer 1049 which is enabled by refresh latch REFLTCH and which during a refresh cycle supplies an alternate set of row addresses in order to guarantee the appropriate address sequence for a refresh function. NOR gate 1051 and OR gate 1053 are used to buffer the row enable drive signal. Buffer 1055 is used to turn on a diagnostic LED device 1057 indicating that the board has been selected.

Flip-flop 1057 is a quad D type flip-flop which is clocked by address latch ADRLTCH and which provides synchronized double rail (i.e. both polarities) of the VRAM SELECT signal to the remainder of interface logic 129.

Figure 28A:
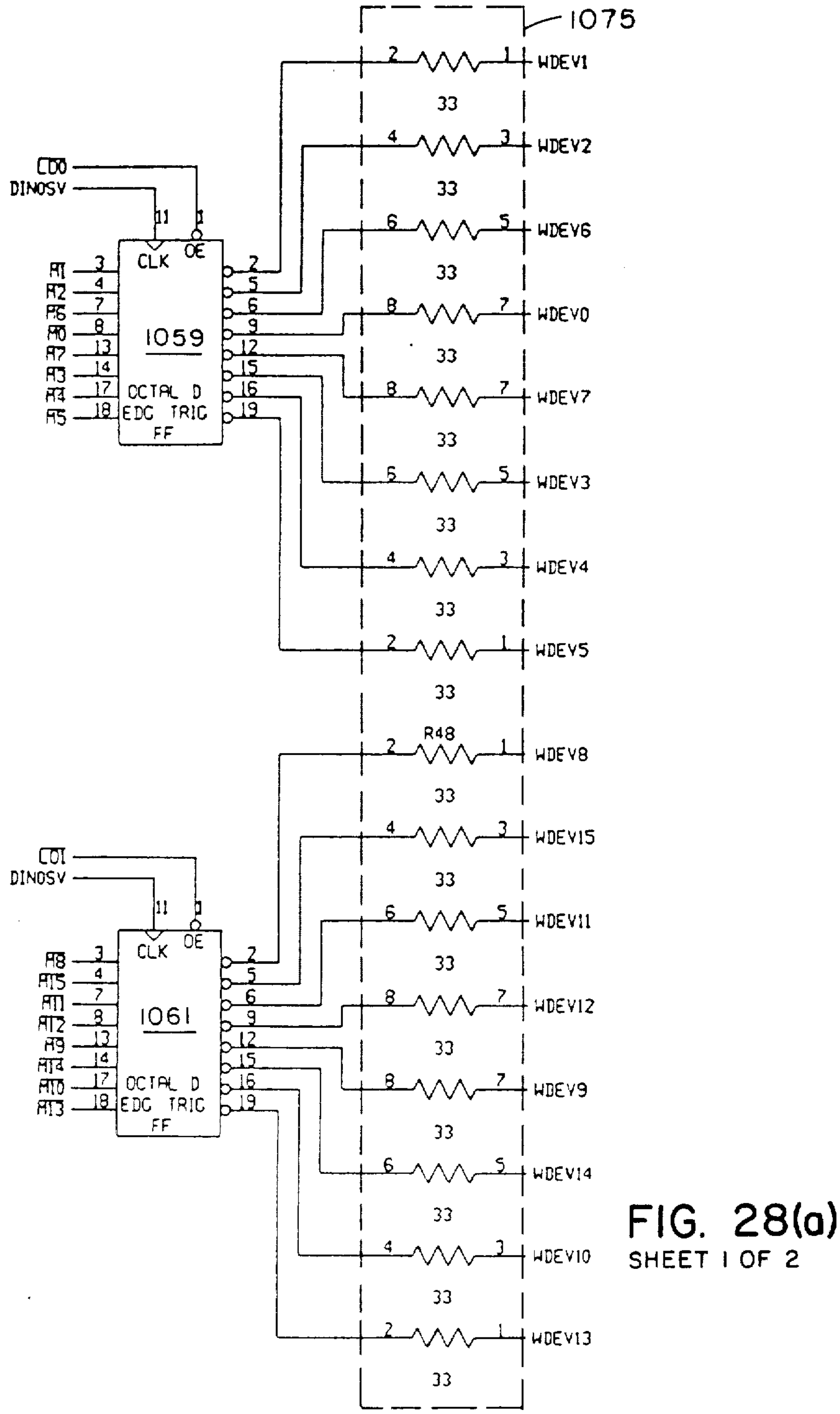
Figure 28A:
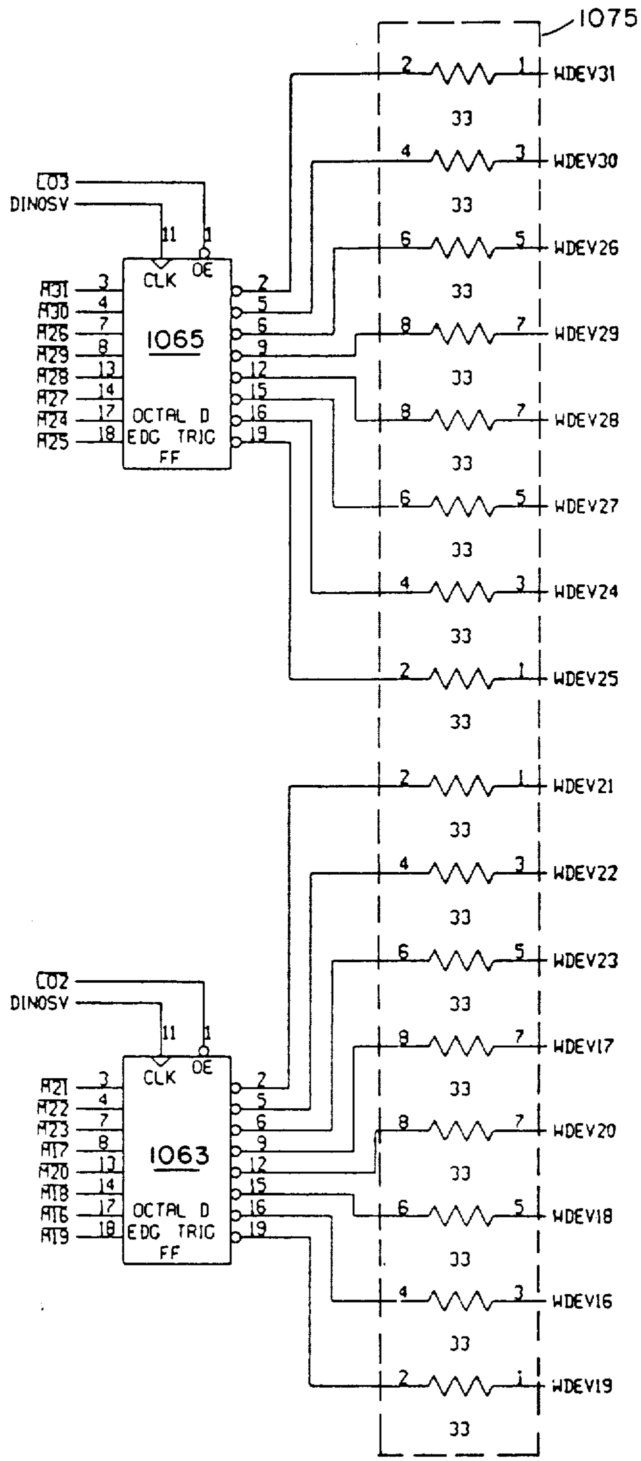
Figure 28B:
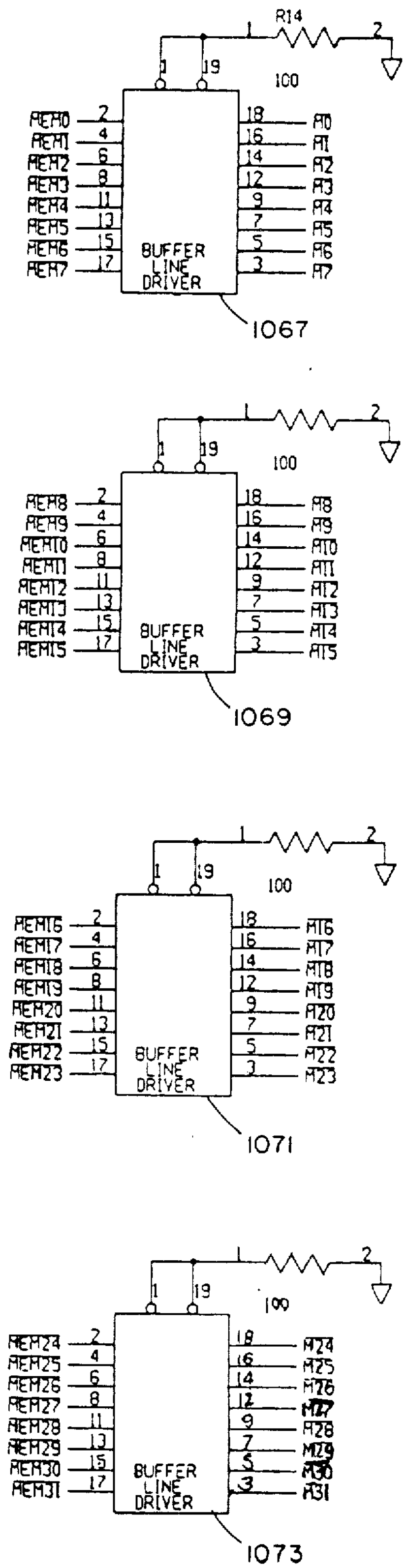

Turning now to FIGS. 28(*a*) and 28(*b*), there is a group of four octal D registers 1059 through 1065 which collectively comprise the write-data input register. These registers hold data to be written to the memory 127 so that when a write signal occurs the data will be written properly. Together they provide 32 bits of write data. The receive inputs from a buffered version of the memory data bus, the buffered signals being shown as M.

The M signals are produced by four buffer line drivers 1067, 1069, 1071 and 1073. These drivers receive memory data from CPU 53 off of memory bus 61 and provide the data to the local M bus for latching purposes, the signals outputted from the drivers being shown as M0 through M31.

The outputs from registers 1059 through 1065 are outputted through series terminating resistors 1075 as write data even signals WDEV1 through WDEV31.

Figure 29A:
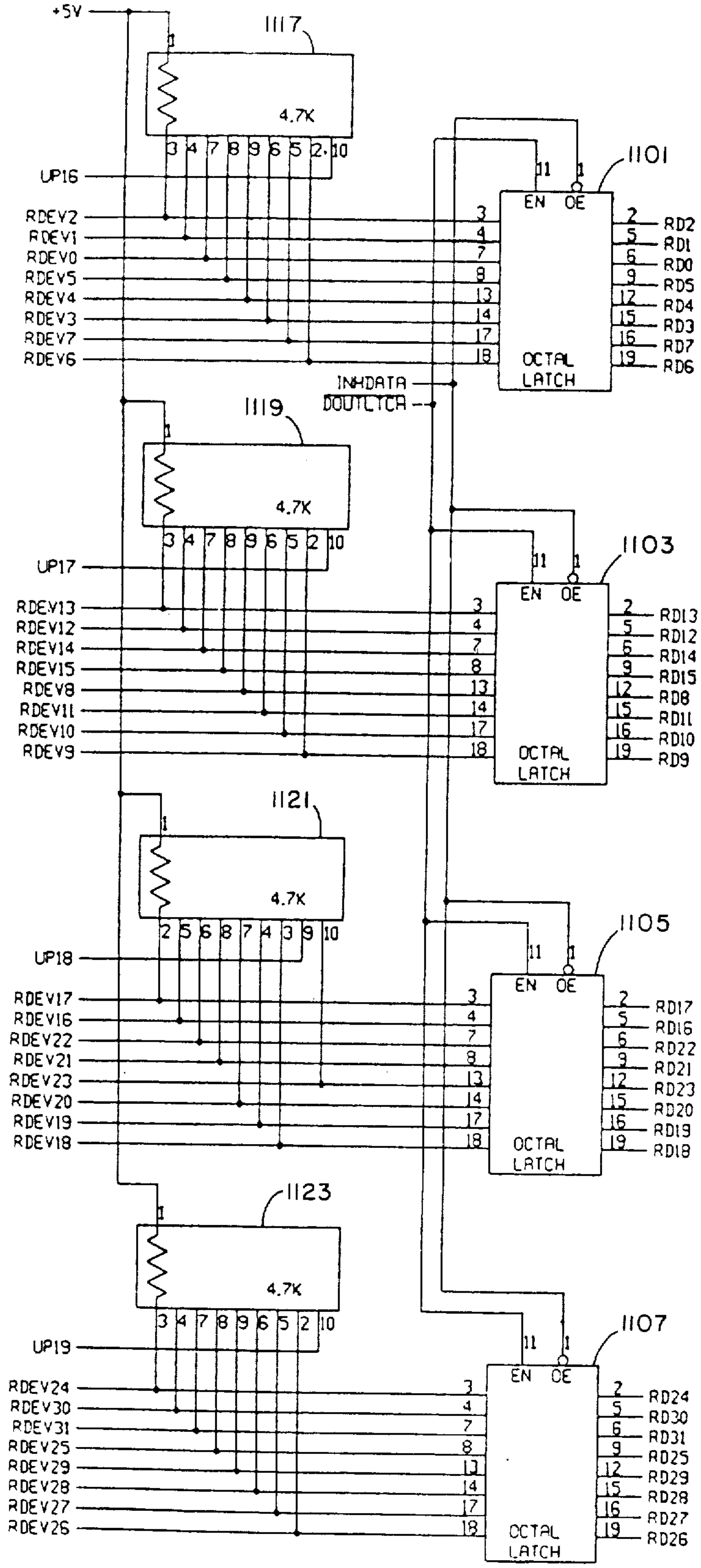
Figure 29B:
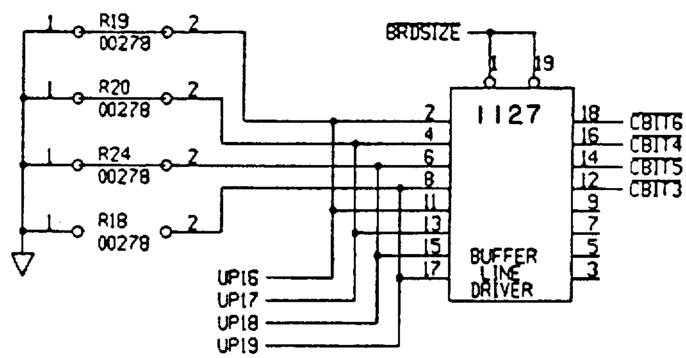
Figure 29C:
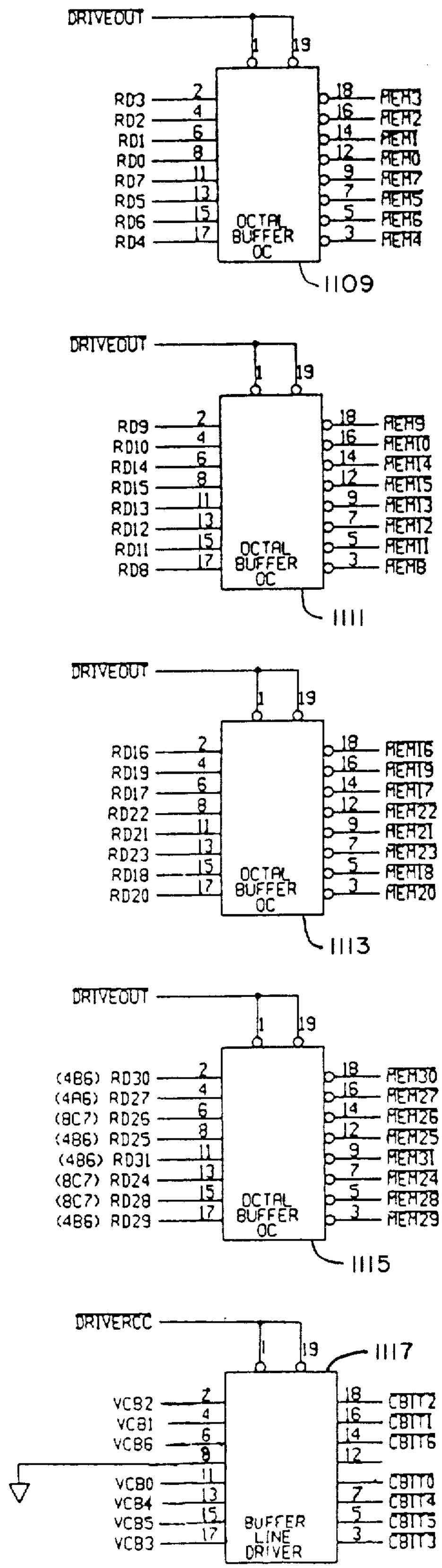
Figure 30A:
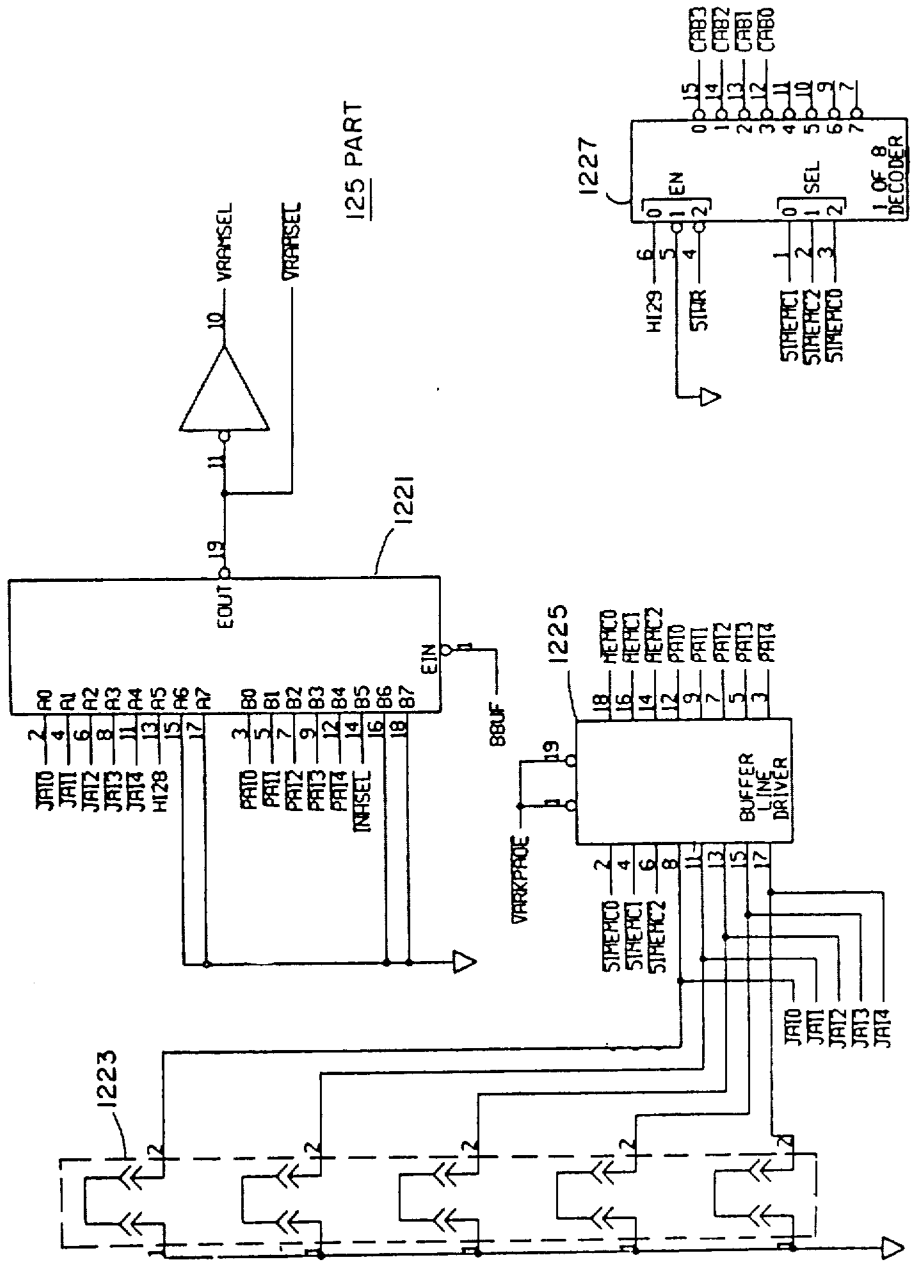
FIGS. 30(*a*) through 30(*h*) are schematic diagrams of processor/memory bus interface 125, processor 121 and miscellaneous logic in FIG. 2A.
Figure 30D:
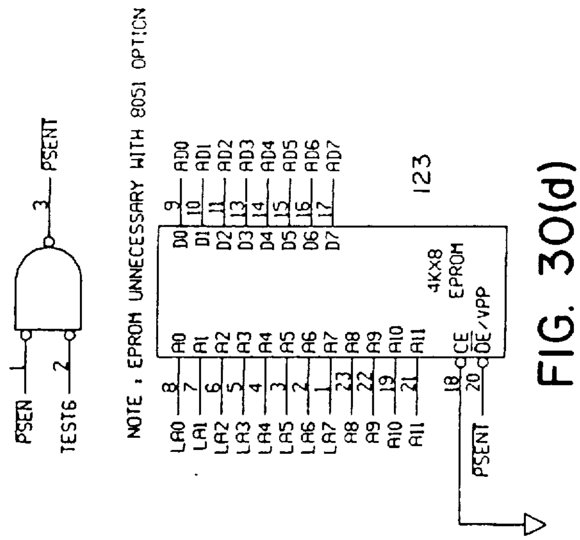
Figure 30E:
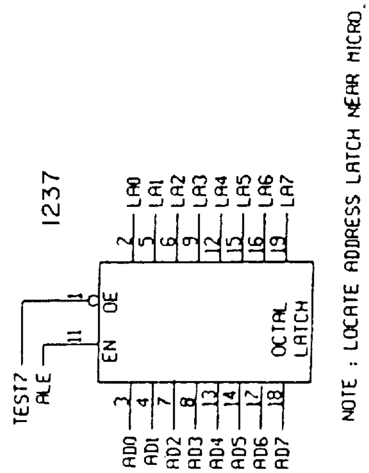
Figure 30B:
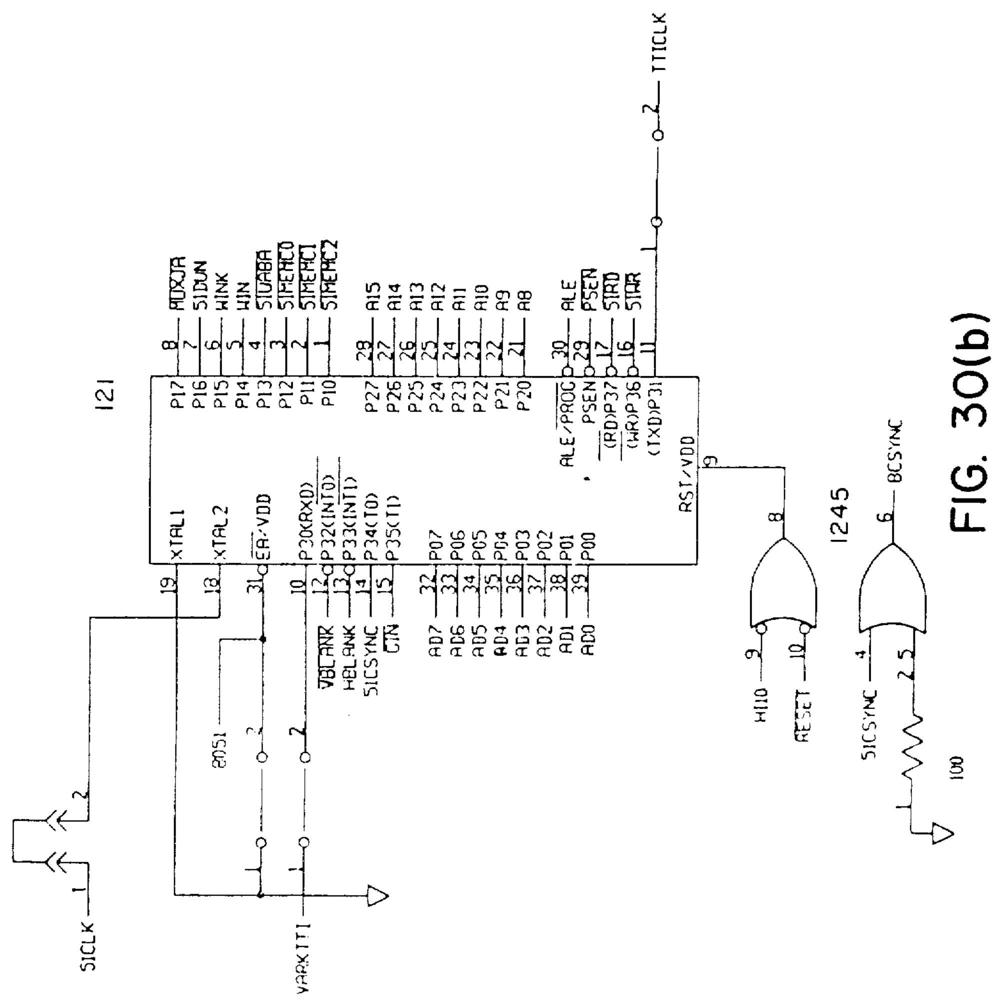
Figures 30C, 30F:
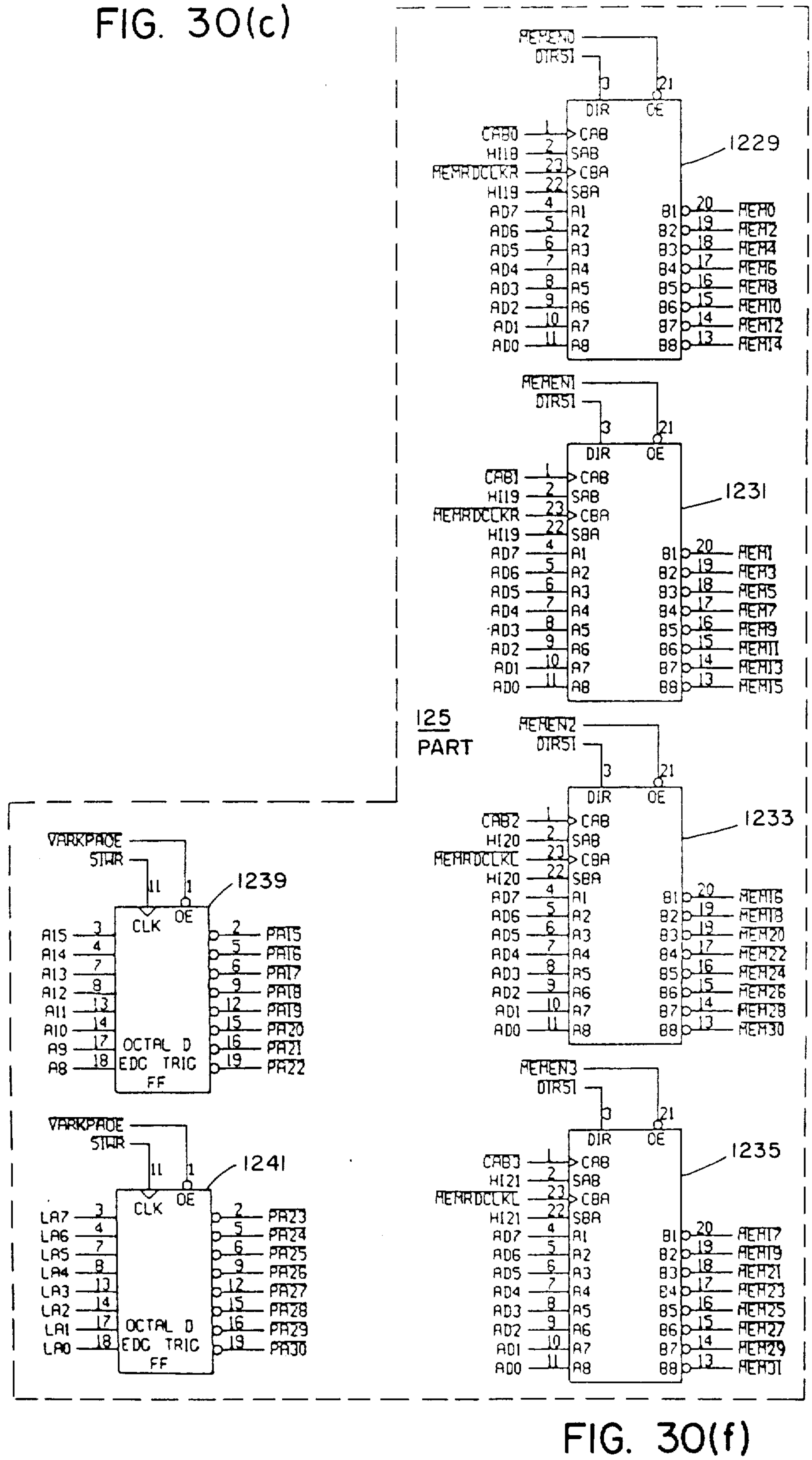
Figures 30G, 30H:
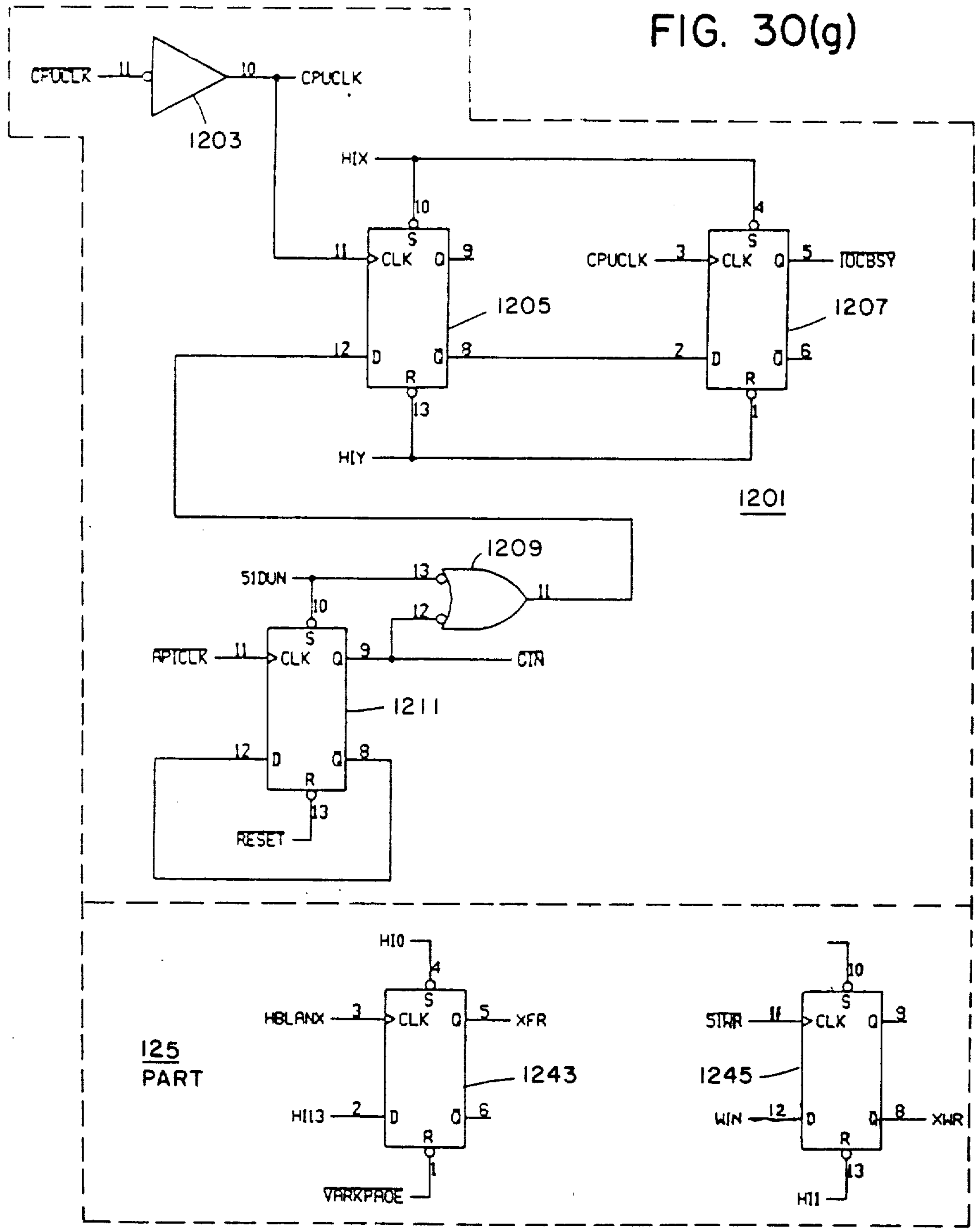
Figure 31A:
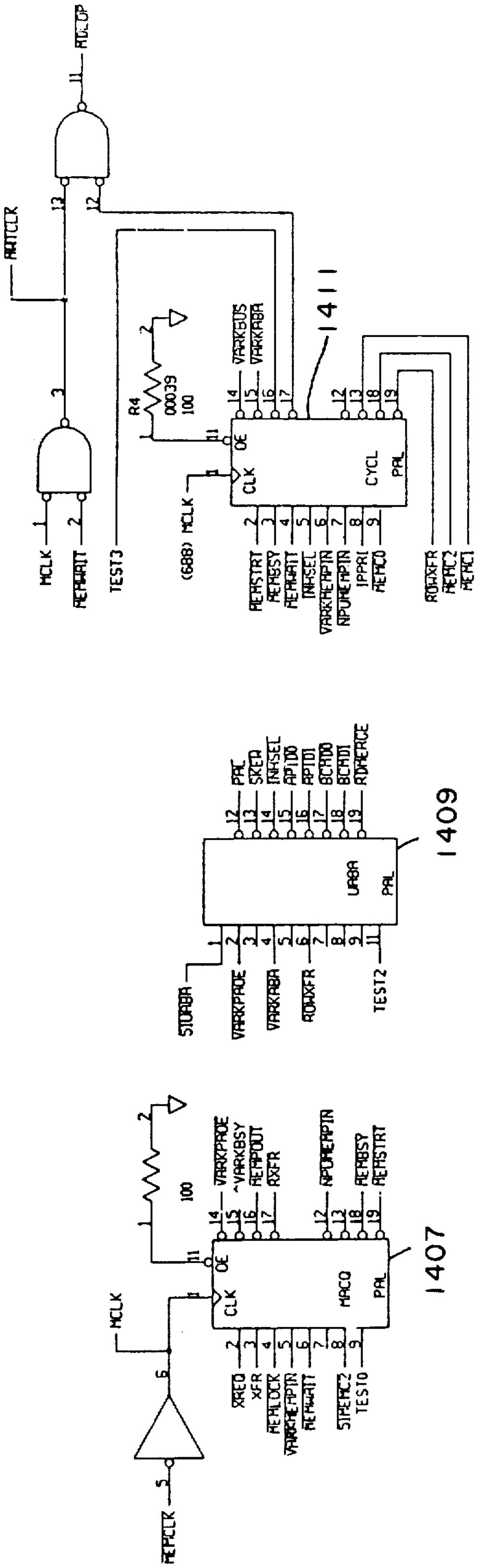
FIGS. 31(*a*) through 31(*d*) are schematic diagrams containing oscillator section 131, timing and synchronizer section 133 and portions of interface 125 in FIG. 2A.
Figure 31A:
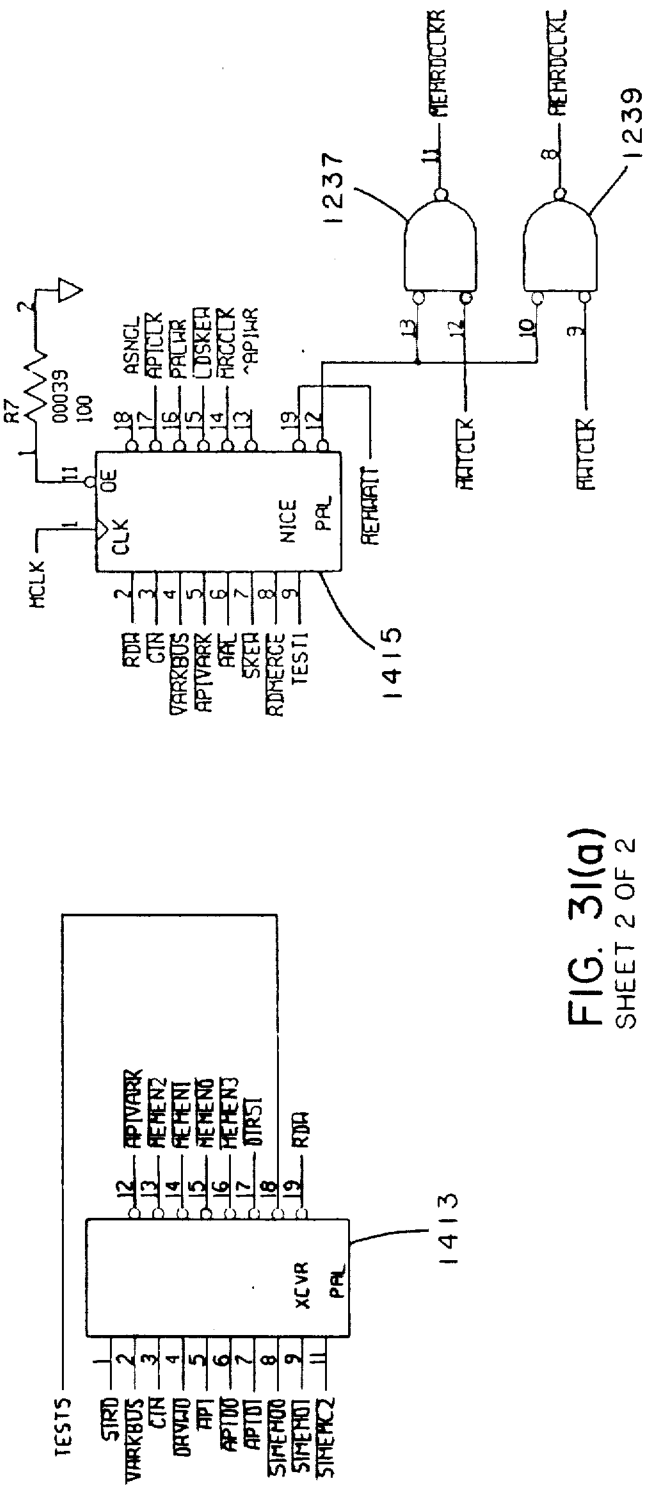
Figure 31B:
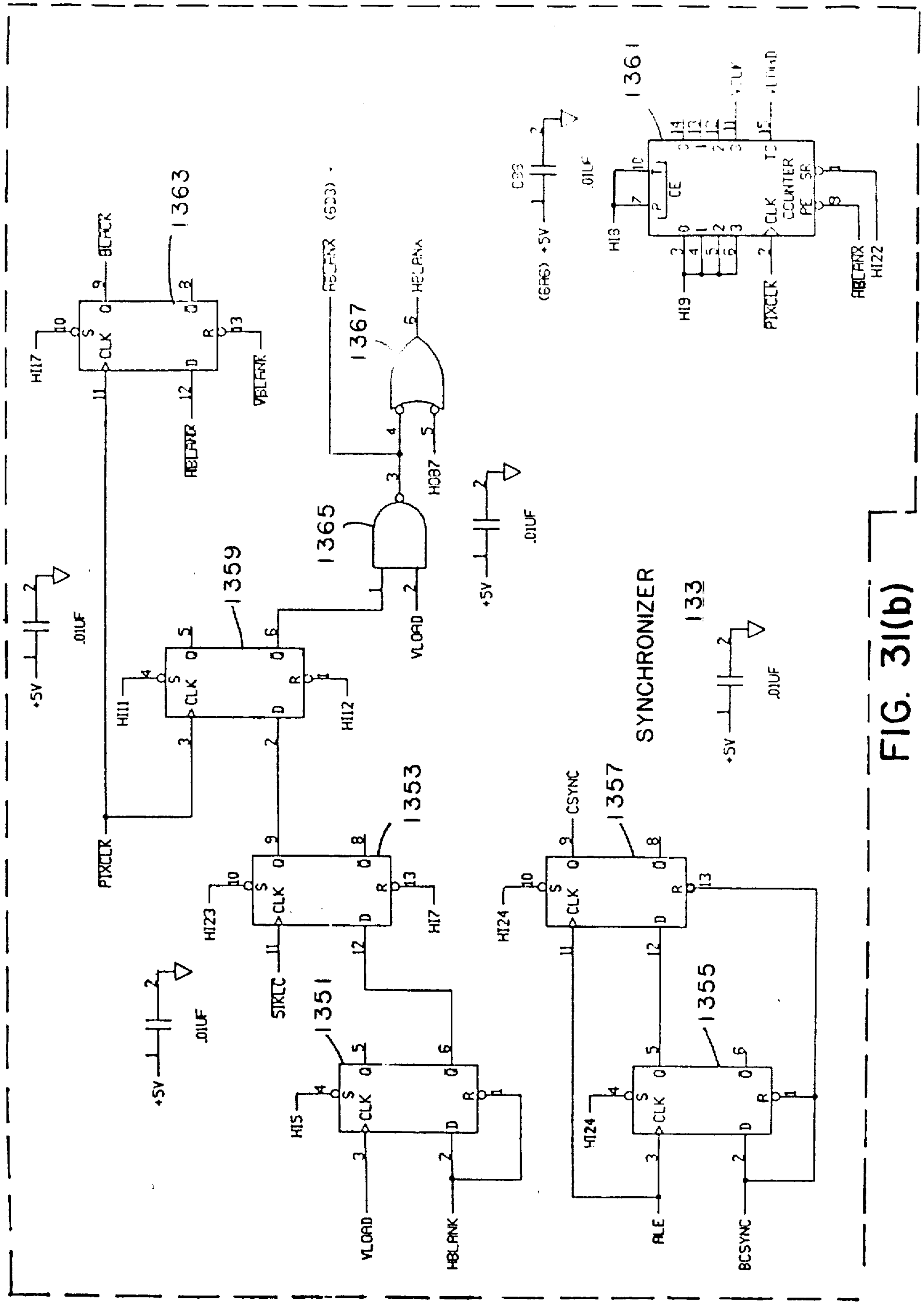
Figure 31C:
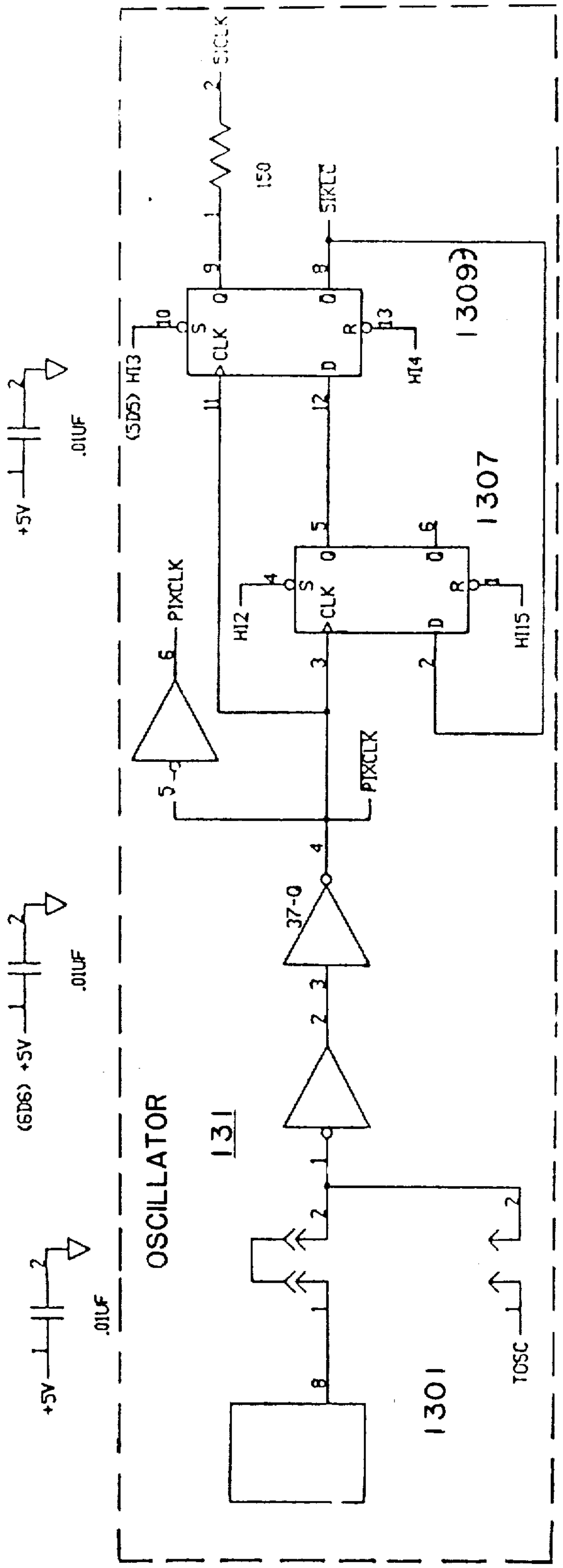
Figure 31D:
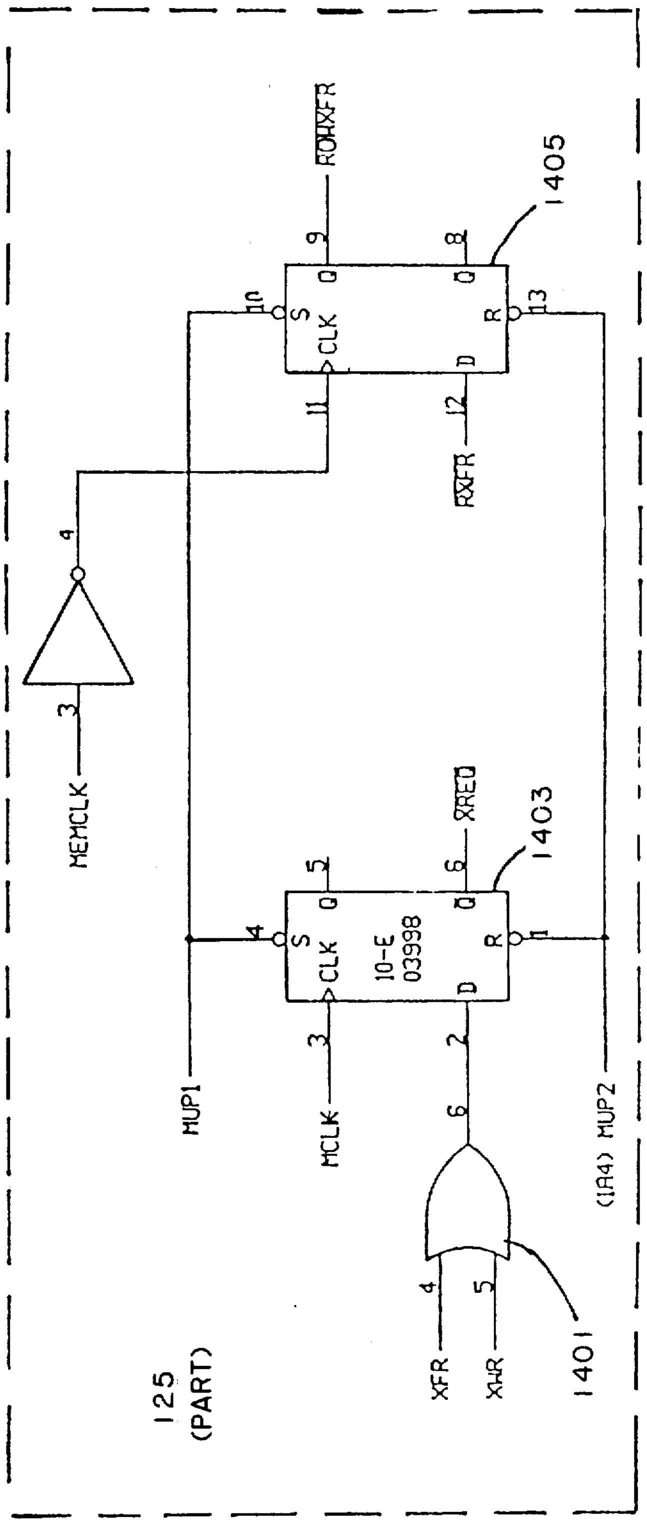

Turning now to FIGS. 29(*a*) through 29(*c*), there are illustrated the output portion of video memory interface and controller 129.

This portion includes four octal latches 1101 through 1107, four octal buffers 1109 through 1115, four resistor packs 1117, 1119, 1121 and 1123 and two buffer line drivers 1125 and 1127. Signals REDV0 through RDEV31 are the random access outputs of video memory 127. Latches 1101 through 1107, which are controlled by the data output latch control signal DOVTLCH latch the output data RDEV0 through RDEV31 for enabling onto a "read" bus RD0 through RD31 so that the data can be buffered back onto memory bus 17 when CPU 53 is performing a "read" function. The buffering is accomplished through buffers 1109 through 1115 which receive inputs RD0 through RD30 and output MEM0 through MEM31. Resistor packs 1117 through 1123 are used to terminate video RAM data outputs. Buffer line driver 1125 is used to place "correction-bit" data signals CBIT0 through CTIT6 onto memory bus 17. These bits are produced from VCB0 through VCb6 signals which are generated by parity generators to produce an error correction code such that if an error is seen on bus 17, CPU 13 can flag it as an error. Buffer 1127 is used to also drive the C bit lines CBIT3 through CBIT6.

Referring now to FIG. 30 there is shown miscellaneous logic associated with video control section 57, microprocessor 121 and interface 125.

There is a section of logic 1201 which is the control portion of palette 137 and which allows the synchronization for receiving palette commands. The section includes an inverter 1203, a pair of D-type flip-flops 1205 and 1207, a NAND gate 1209 and a D-type flip-flop 1211. Inverter 1203 buffers the signal $\overline{CPUCLK}$. The output of inverter 1203 clocks flip-flops 1205 and 1207 to synchronize a signal called IOC busy which is sent back to CPU 13 to indicate that microprocessor 121 is processing a palate command. The two flip-flops are driven by NAND gate 1209 which produces a signal that microprocessor 121 is busy if it has received a graphics instruction by virtue of the signal $\overline{GIN}$ being asserted or the signal 51 DUN.

There is a section of logic which constitutes a portion of the interface 125 between microprocessor 121 and the memory bus 61. The section includes an 8 bit comparator 1221, a set of jumpers 1223, a microbuffer 1225, a decoder 1227, a set of four octal register transceivers 1229, 1231, 1233 and 1235, an octal latch 1237, a pair of octal D flip-flops 1239 and 1241 and a pair of D-type flip-flops 1243 and 1245.

In FIGS. 30(*b*) and 30(*d*) are shown the microprocessor 121 and its associated EPROM 123 respectively. Processor 121 manages control section 57 and produces four timing signals, namely H BLANK, V BLANK, 51CSYNC and WINK.

Comparator 1221 compares the physical address present on bus 61 to the address set by jumpers 1223. The comparison produces a signal $\overline{VRAMSEL}$ (or a signal VRAMSEL). If the physical address present on bus 61 equals that set by jumpers 160, then video controller 51 will be selected. Buffer 161 is controlled by a signal $\overline{VARKPAVE}$ and serves to allow microprocessor 121 to only write to its own memory 127. Decoder 1227 is used to clock the output register portion of interface 125 in order to load data to be written into memory 127 or palette 137. Transceivers 1229 through 1235 are used to process data into and out of processor 121. If processor 121 generates a "write" signal, data is clocked into the output register portion of these transceivers. If a "read" signal is produced by processor 121, the input register side of these registers is enabled. Latch 1237 is used to latch the low address signals (AD0 through AD8) from processor 121. Flip-flop 1239 receiver address signals AD8 through AD15 from processor 121 and outputs signals $\overline{PA15}$ through $\overline{PA22}$. Flip-flop 1241 receives signals LA0 through LA7 from latch 1237 and outputs signals $\overline{PA23}$ through $\overline{PA30}$. Eprom 123 is a 4K×8 eprom and contains the programming required by processor (or microcontroller 121) to perform its functions. Processor 121 may be an 8031 chip manufactured by INTEL. Flip-flop 1243 registers the occurrence of horizontal blank signal H BLANK and presents the signal XFR for transfer to the control logic so that the next bus transaction that will occur from processor 121 will be one that produces a particular row address for the video RAMS so that the video sequence which will be clocked out of the video RAMS will be the appropriate one for that particular scan live on the screen. Flip-flop 1245 registers the occurrence of the signal 51WR and clocks out a signal external write XWR when an input signal WIN which stands for write inhibit is not asserted. The signal XWR allows the interface logic to perform a read or a write memory transaction from processor 121.

As can be appreciated, flip-flops 1243 and 1245 represent the dual functionality of the architecture of processor 121, namely, performing memory reads and writes by virtue of flip-flop 1245 which are interspersed CRT timing signals. The CRT timing signals occur at precise intervals under the control of flip-flop 1243. OR gate 1245 is used to buffer a signal BSYNC.

Referring now to FIGS. 31(*a*) through 31(*d*), there are shown logic of the oscillator section 131, the timing and synchronizer section 133 and an additional portion of microprocessor/memory bus interface 125.

Oscillator section 131 includes a 44 MHZ crystal oscillator 1301 which is buffered by buffers 1303 and 1305 to a signal called pixel clock bar $\overline{PIXCLK}$ which is inverted by inverter 1306 and sent to synchronizer 133 and to the D/A converter 139. The signal $\overline{PIXCLK}$ is also divided by four flip-flops 1307 and 1309, which are D-type flip-flops, to produce the 11 MHZ signal 51CLK which drives processor 121.

Timing and synchronizer section 133 includes five D-type flip-flops 1351 through 1359. Flip-flops 1351 and 1353 take the signal H BLANK and synchronize it back to the pixel clock speed. Flip-flops 1355 and 1357 take the signal BCSYNC and output the signal CSYNC. Flip-flop 1351 is clocked by a signal VLOAD. There is a counter 1361 which functions as a divide-by-sixteen which during the visible portion of any scan line counts every sixteenth pixel. Flip-flop 1363 is a D type flip-flop and is used to determine when the video stream is blanked. It does this by either the $\overline{VBLANK}$ signal being preset at its reset or $\overline{HBLANK}$ signal being present at its data input. $\overline{HBLANK}$ is produced by NAND gate 1365 and is also present at the parallel enable of counter 1361. Gate 1365 serves to invert the $\overline{HBLANK}$ signal.

OR gate 1401 takes either the signal XFR or the signal XWR and transmits it to a D-type flip-flop 1403 which is clocked by MCLK for synchronization purposes and to a D-type flip-flop 1405. The output $\overline{XREQ}$ from flip-flop 1403 is applied to a PAL 1407 which functions as a memory acquisition PAL (i.e. controls the control signals necessary to access bus 61 and gate out the address and control signals back to the memory control. D-type flip-flop 1403 is used to synchronize the signal $\overline{RXFR}$ with the signal MEMCLK so that the row transfer function on the video RAMS can occur at the appropriate times relative to the memory cycles on the bus.

There is a PAL 1409 which is used in connection with unaddressed bus activity. PAL 1409 is capable of both driving and receiving the AP1 and PCMD signals which are present on bus 61 so that it can both initiate and decode unaddressed bus activity UABA. PAL 1411 is a cycle decoding PAL which looks at the control signals on bus 61 and produces two signals $\overline{VARKBUS}$ and $\overline{VARKABA}$. $\overline{VARKBUS}$ indicates that controller 121 has gained access to bus 161 and $\overline{VARKABA}$ indicates that controller 121 has gained access of the bus 61 to generate a UABA signal. PAL 1413 is a transceiver control PAL and is used to control the output enables on the interface transceivers 1229 through 1235. PAL 1415 is a UABA signal conditioning PAL which effectively debounces the code of the UABA's and gates out a synchronized clean clock signal. Gates 1237 and 1239 clock the input portion of the register transceivers 1229 through 1235 so that the data which is present on bus 61 can be registered there. This will occur whenever controller 121 is reading memory into the transceivers on the main CPU 53 is writing data into the transceivers.

Figure 32:
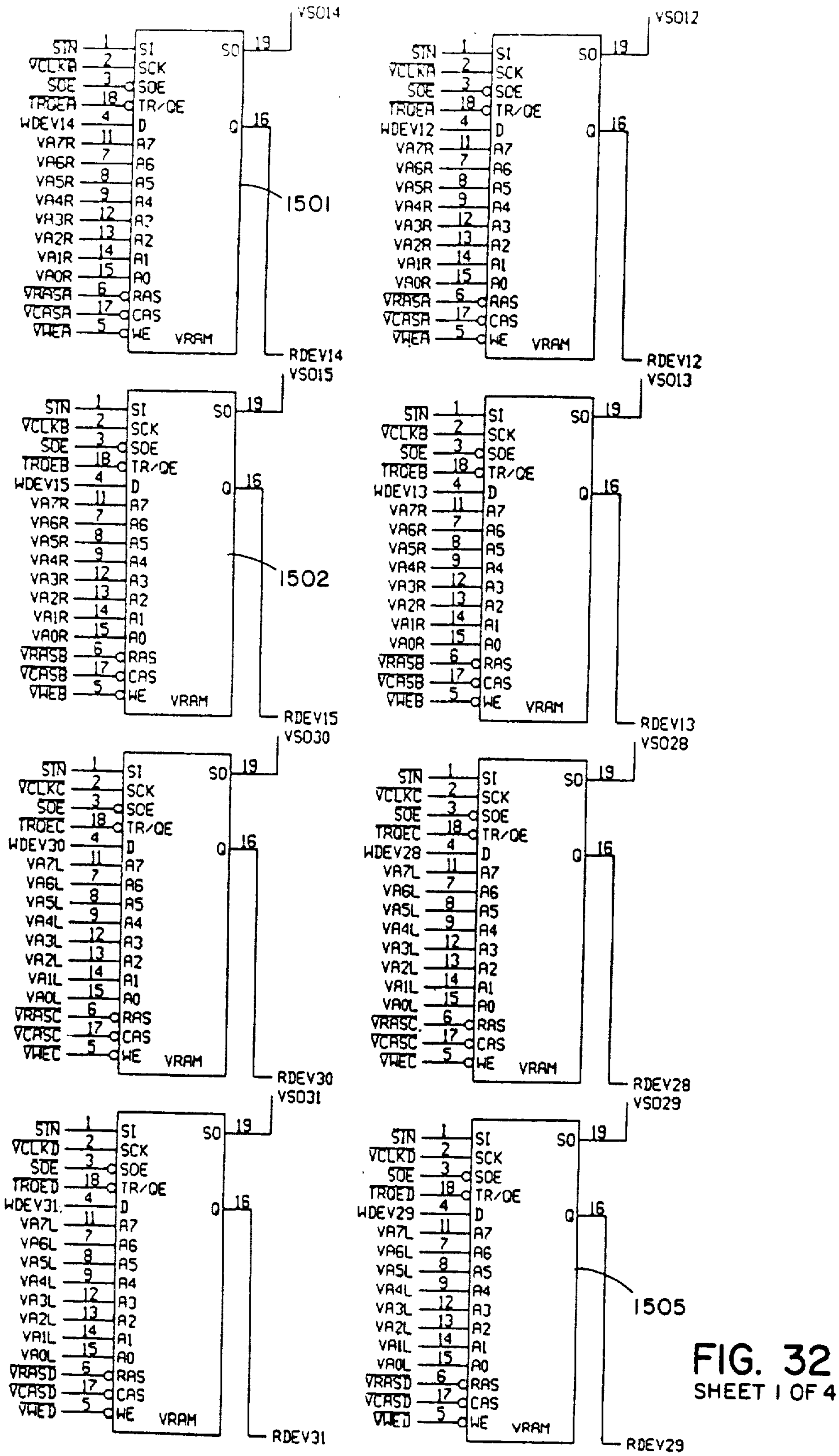
FIG. 32 is a schematic diagram of the video memory section 127 in FIG. 2A.
Figure 32:
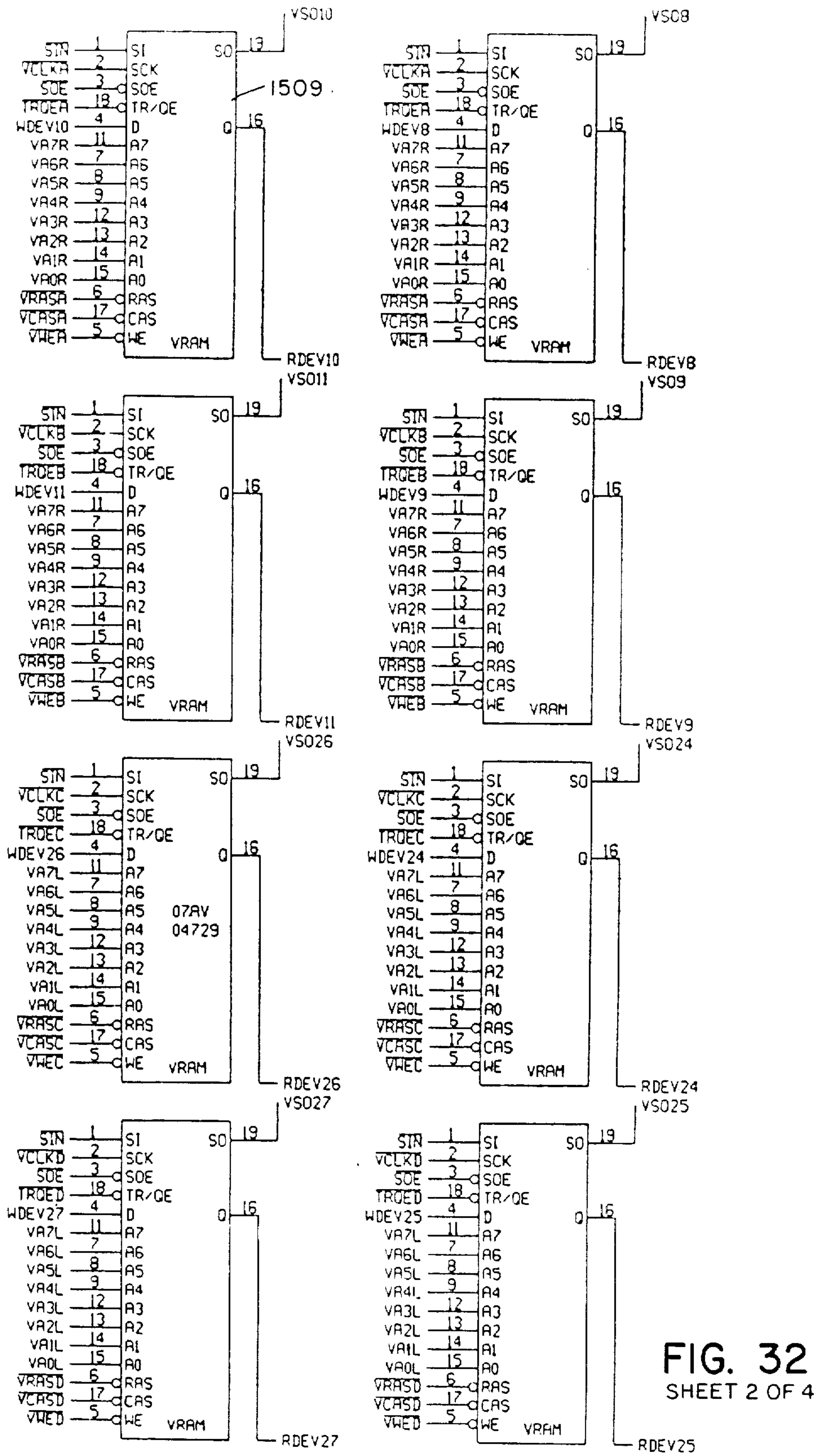
Figure 32:
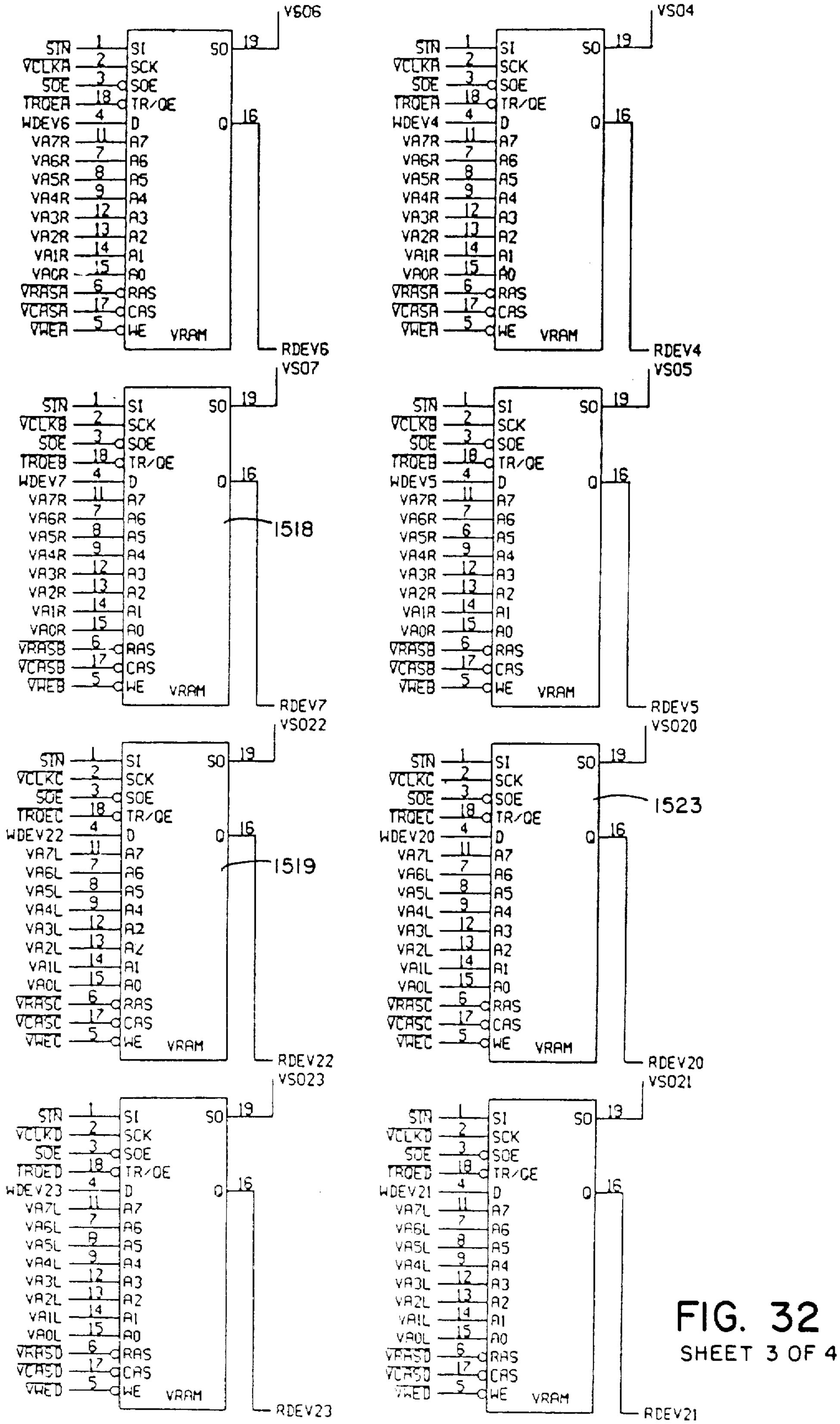
Figure 32:
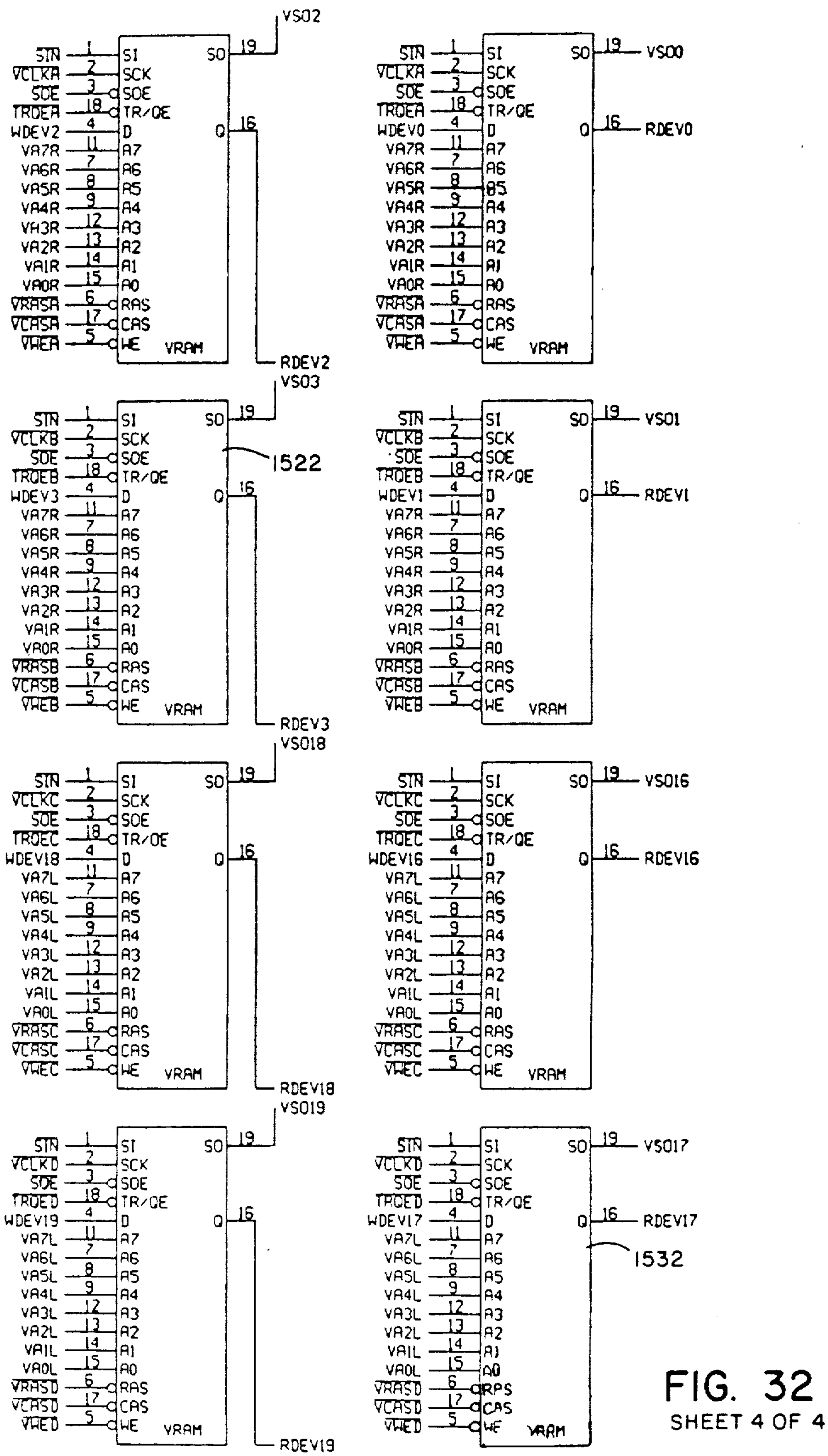

Referring now to FIG. 32 there is shown the details of video memory section 127. This section is made up of an array of thirty-two 64K dual port RAMS 1501 through 1532 RAMS. RAMS which together produce 256KB of memory. These RAMS are memory devices which function as normal dynamic RAMS with the additional function of having the serial port available for producing the video data stream.

Figure 33A:
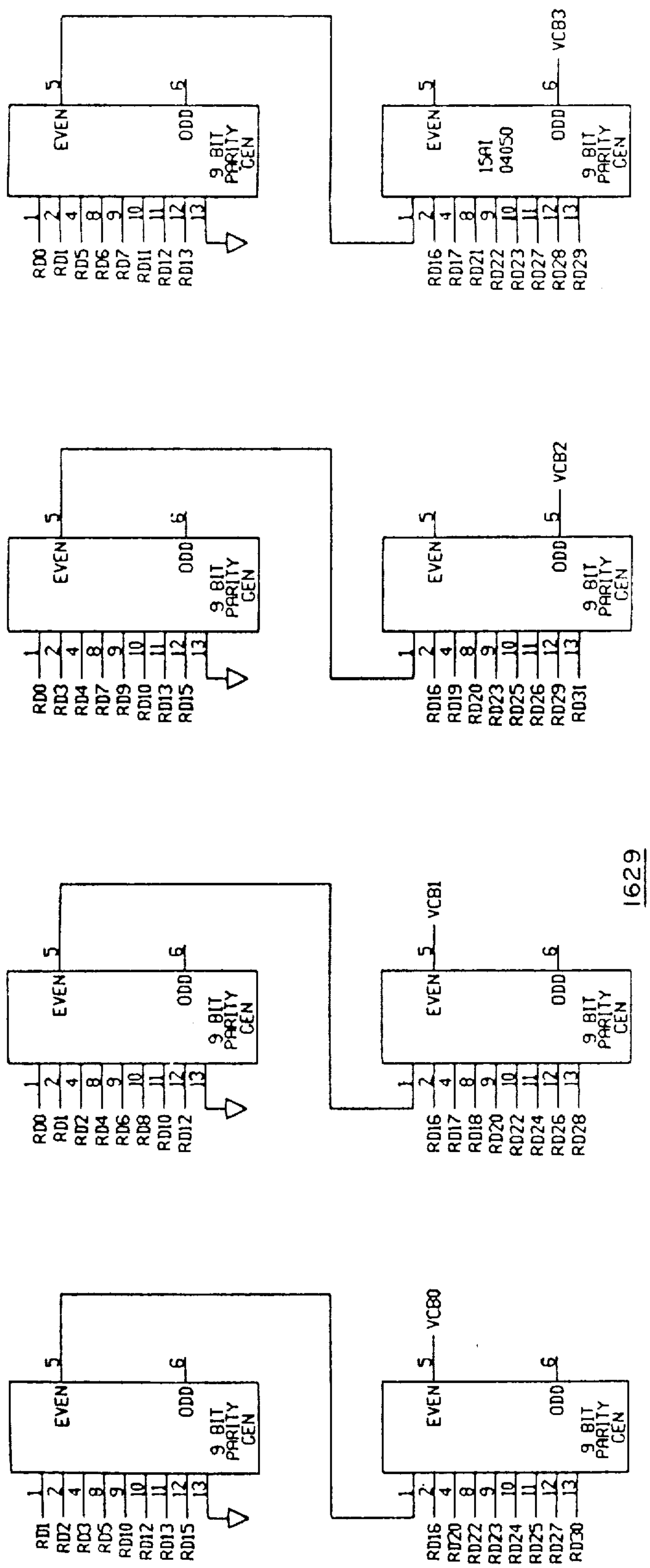
FIGS. 33(*a*) through 33(*e*) are schematic diagrams of portions of interface 129 in FIG. 2A.
Figure 33A:
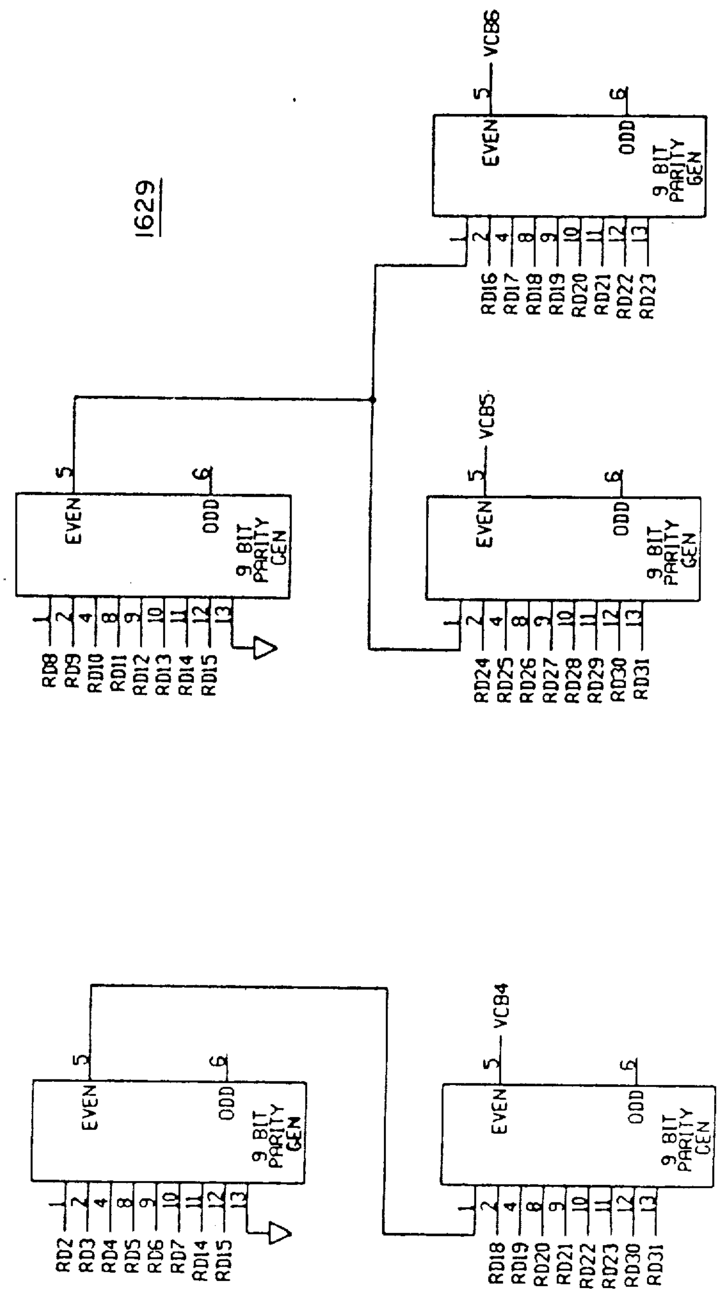
Figure 33D:
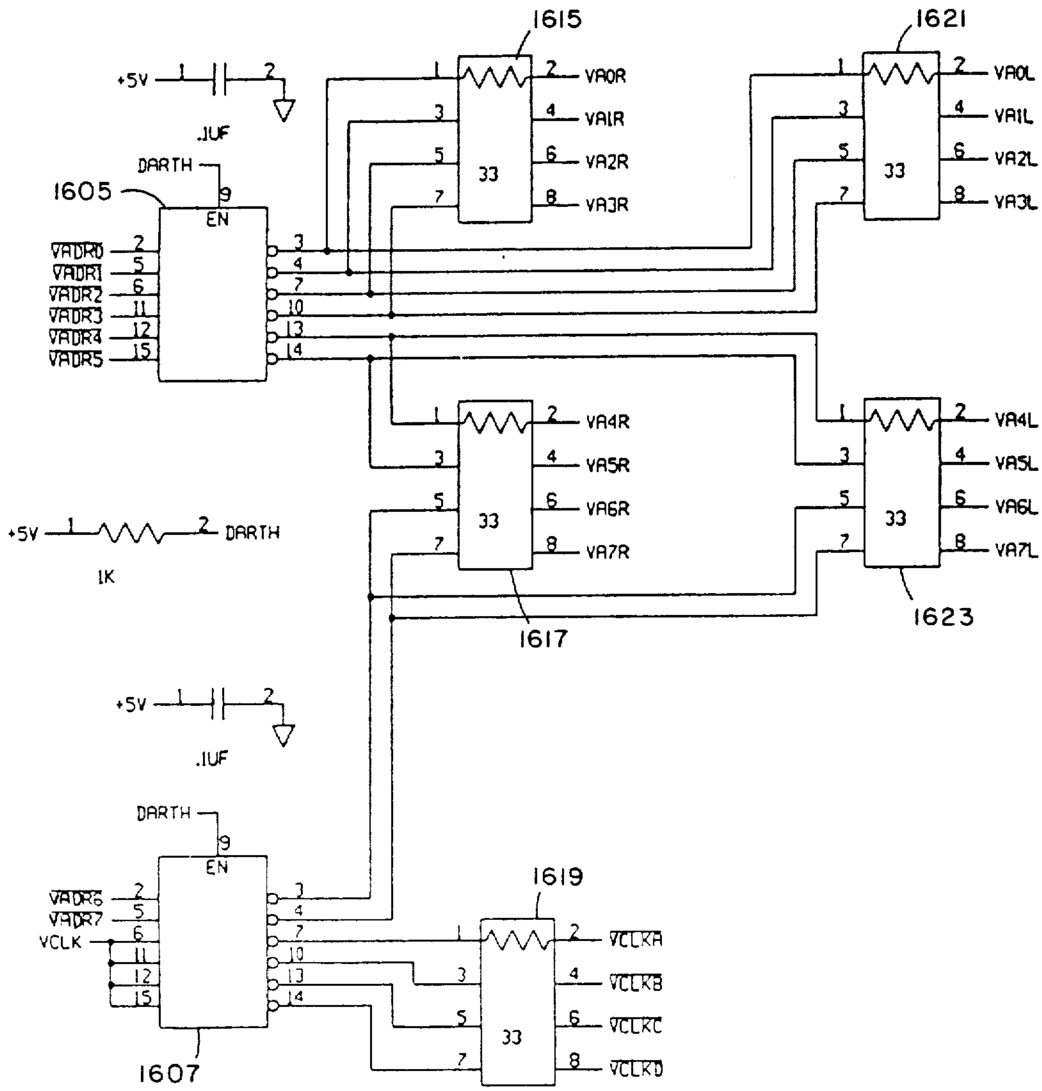

Referring now to FIGS. 33(*a*) through 33(*e*), there are shown schematic diagrams of another part of memory bus/video memory section interface section 129.

There are four drivers 1601, 1603, 1605 and 1607. Driver 1601 is used to drive the WRITE and CAS (column address strobe) signals. Driver 1603 is used to drive the RAS (row address strobe) signals. Driver 1605 is used to drive certain address lines and driver 1607 is used to drive other address lines and the clock signals. Associated with each driver 1601 through 1607 are resistor packages, the resistor packages being labelled 1609 through 1623. There is also a transfer Q enable driver 1625 which is made up of four gates, and an associated series (resistive) terminator pack 1627. There is a set of twelve parity generator checkers 1629 which are connected to the read bus RD (a local bus in the memory control section which is driven on to the memory bus 61 by buffers 1109 through 1115 see FIG. 29).

Figure 34A:
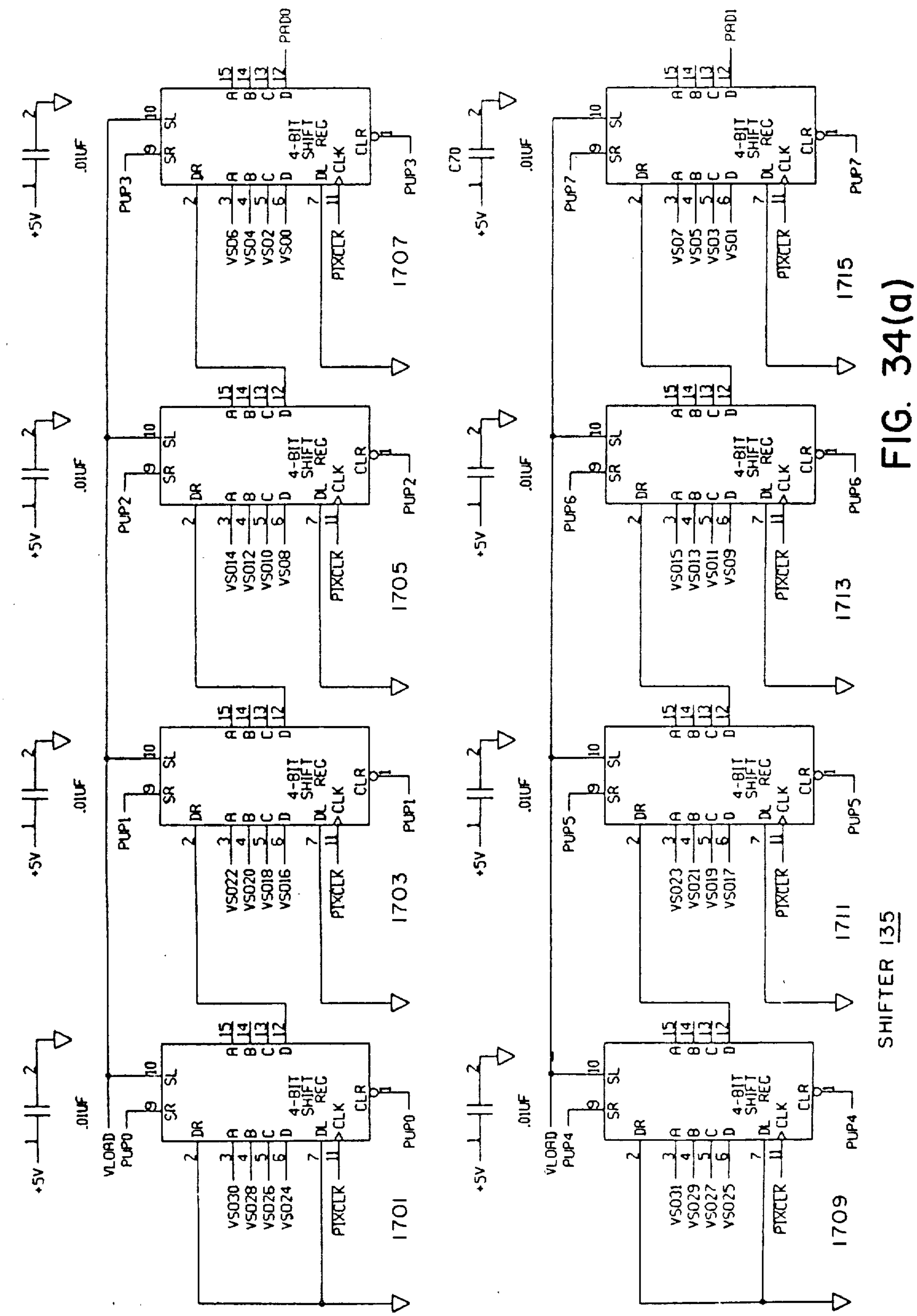
FIGS. 34(*a*) and 34(*b*) are schematic diagrams of shifter 135, palette 137 and D/A converter 139 in FIG. 2A.
Figure 34B:
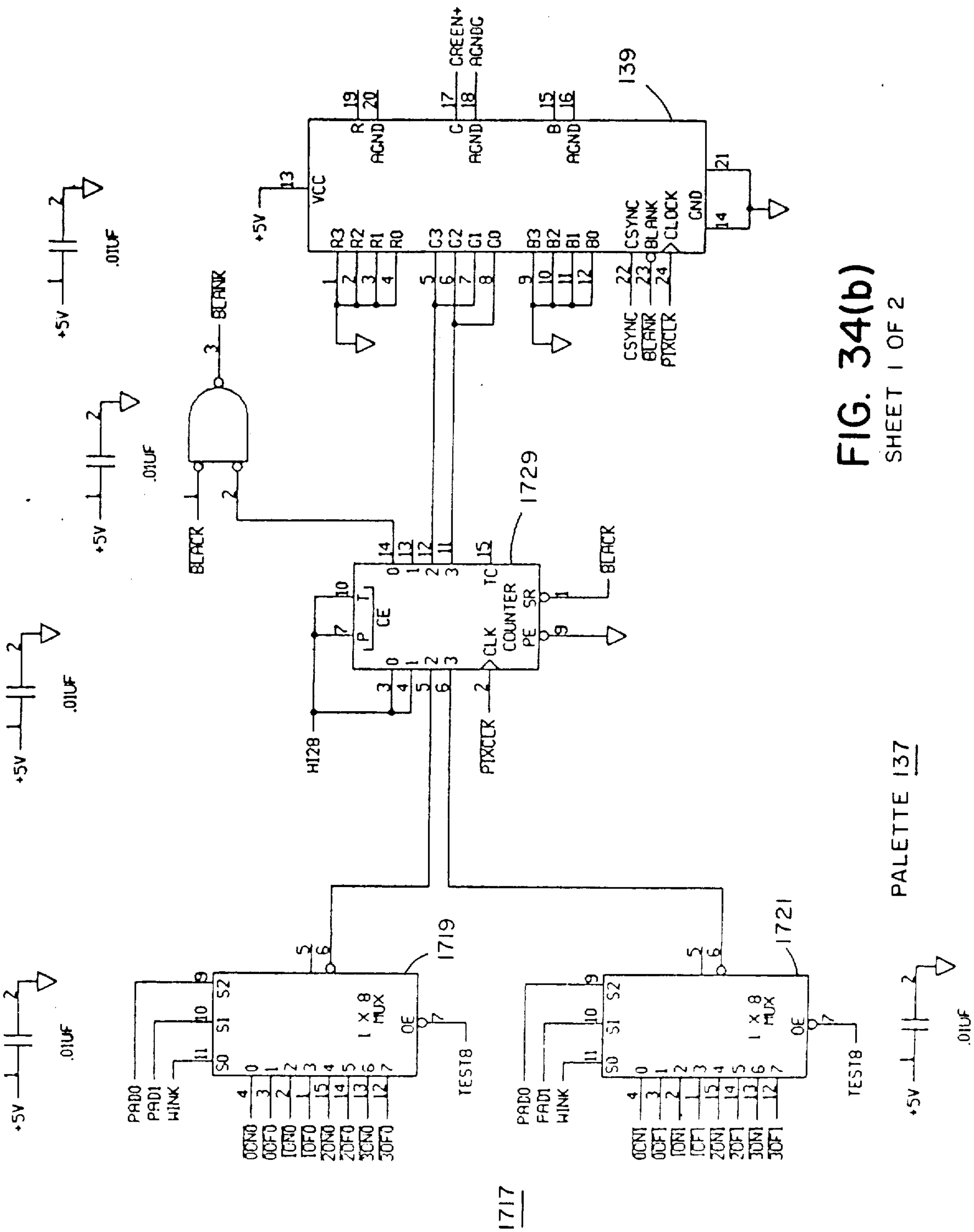
Figure 34B:
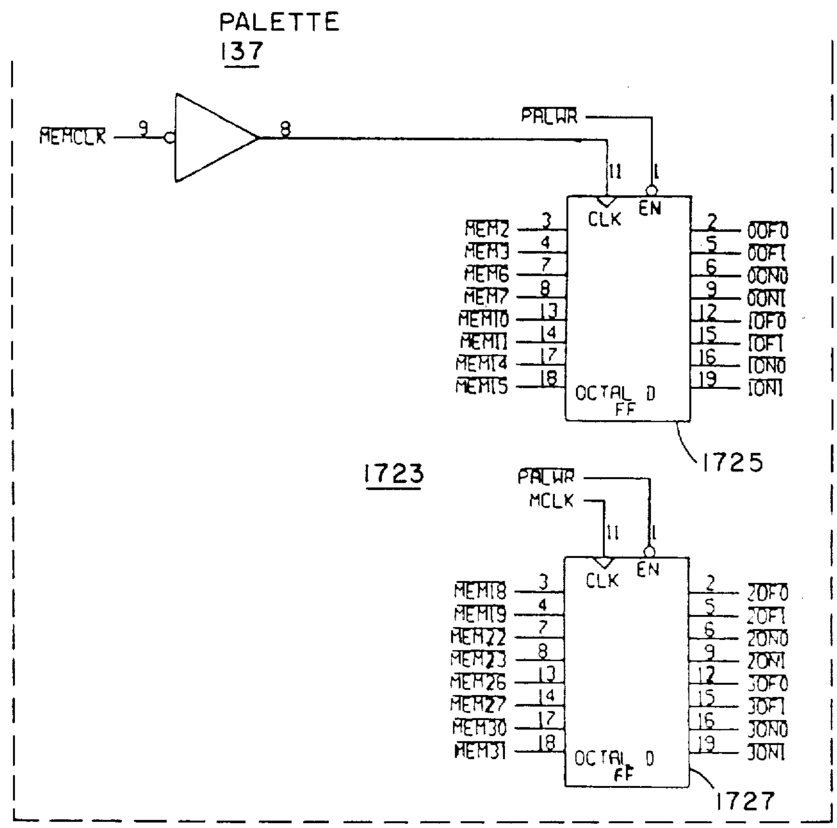

Referring now to FIGS. 34(*a*) and 34(*b*) there are shown circuitry of shifter 135, palette 137 and the D/A converter 139.

The VSO signals, which are the serial stream of data signals for each bit from video memory 127, are registered by a bank of eight 4 bit shifters 1701 through 1715. These shifters generate 2 bit pixels and are clocked at the 44 MHZ pixel clock rate to form the pixel stream. These pixels are mapped by palette 137.

Palette 137 includes a section 1717 made up of two $1\times8$ multiplexors 1719 and 1721 and a section 1723 made up of a pair of octal flip-flops 1725 and 1727. The actual palette entries are registered in section 1723. There is also a four bit counter 1729 which serves as a pipeline register to hold the pixel stream.

There is also a driver 1731 which drives a $\overline{\text{BLANK}}$* signal to a 4 bit triple D/A converter 139 which converts the digital signal output to (analog) video signals.

Referring now to FIG. 35, there is shown a set of waveforms of the signals VARKINT, $\overline{\text{VARKCLK}}$, $\overline{\text{WRITEVARK}}$ and VARKDATA which are a part of the communication line between the I/O controller 55 and the video memory section 57.

Figure 37:
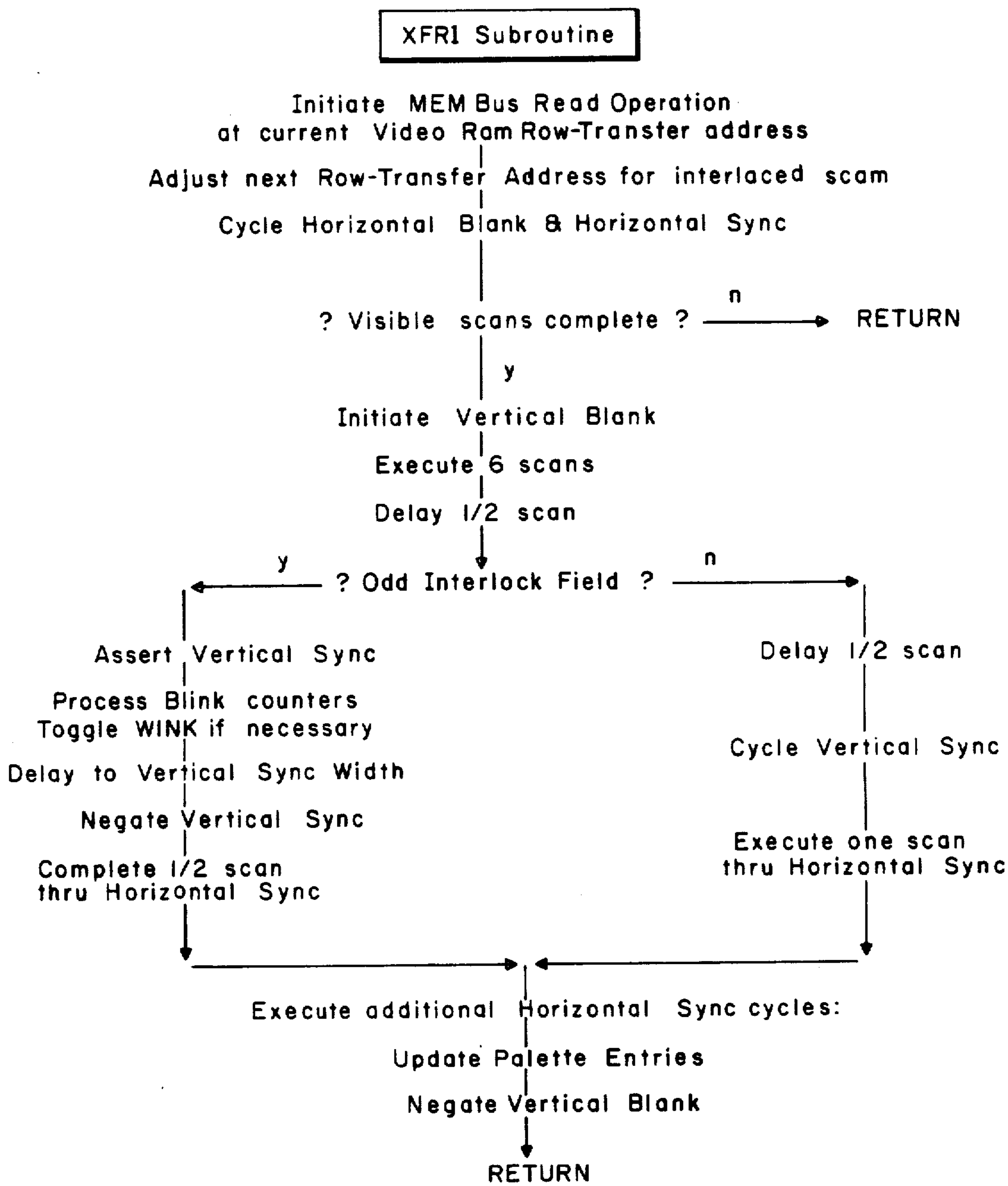

Referring now to FIGS. 36 and 37 there is shown a simplified flow chart of the routine in the program of the 8031 processor 121 which is used to control the video memory and to send out the necessary video timing and control signals.

As can be seen the program is realized by the calling of two particular subroutines at precise intervals, these subroutines being the XFR0 subroutine and the XFR1 subroutine.

The XFR0 subroutine initiates the memory bus read cycle at the turn to video RAM row transfer address so as to perform the cycle necessary for the video RAMS to update the serial shifter, then increments that address and adjusts it for the timing that depends on the fact that the scan is being interlaced, then performs the real time control of the horizontal blank and horizontal sync pulses and then returns.

The XFR1 subroutine is somewhat similar to the XFR0 subroutine, with the main difference being that the XFR1 subroutine checks to see if the number of scan lines that have been manipulated in the serial shifter is equal to the number of scan lines on the screen.

Figure 38B:
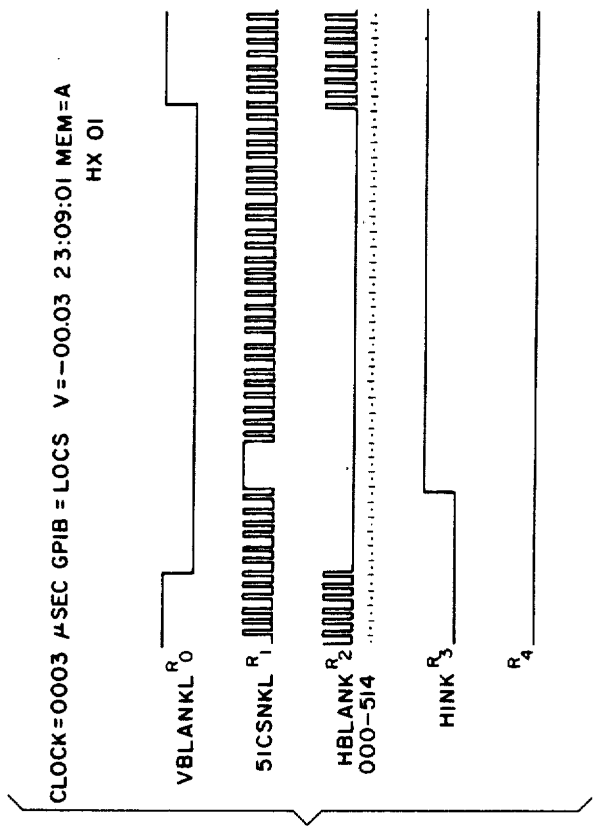
FIGS. 38(*a*) and 38(*b*), FIGS. 39(*a*) and 39(*b*) and FIGS. 40(*a*) and 40(*b*) are waveforms useful in understanding the invention.
Figure 38A:
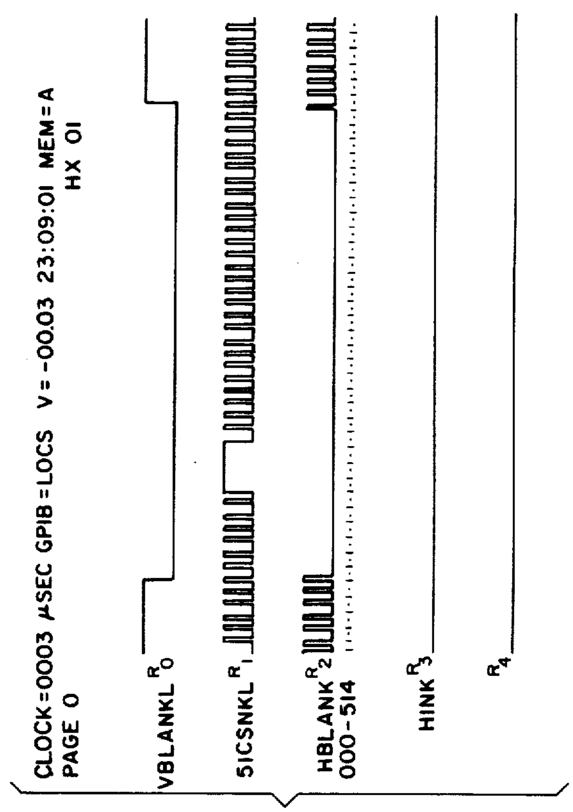
Figure 39B:
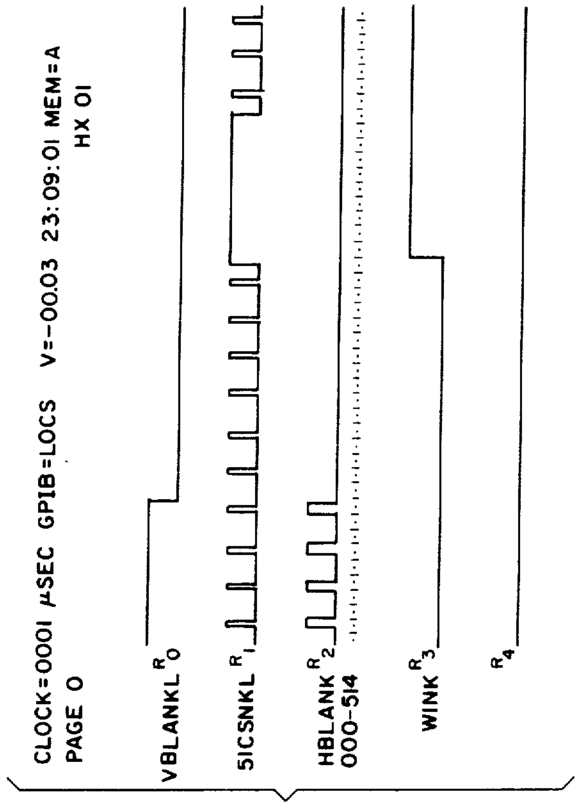
Figure 39A:
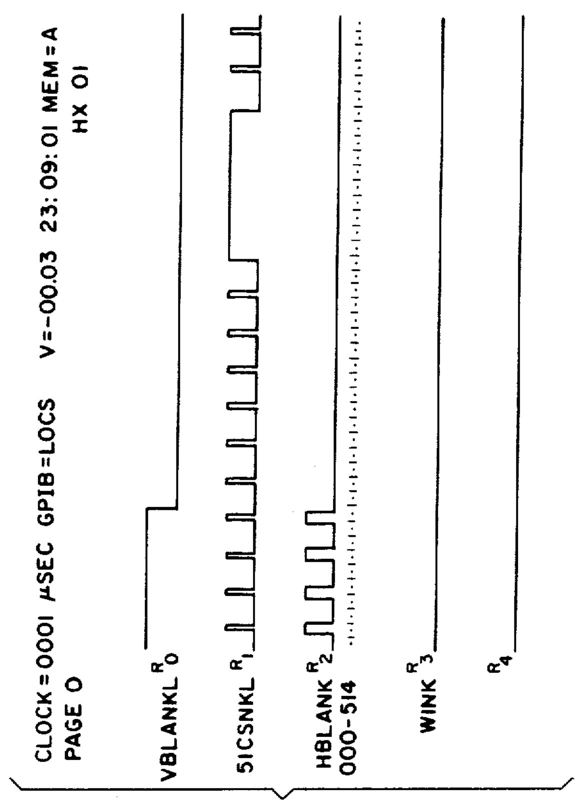
Figure 40A:
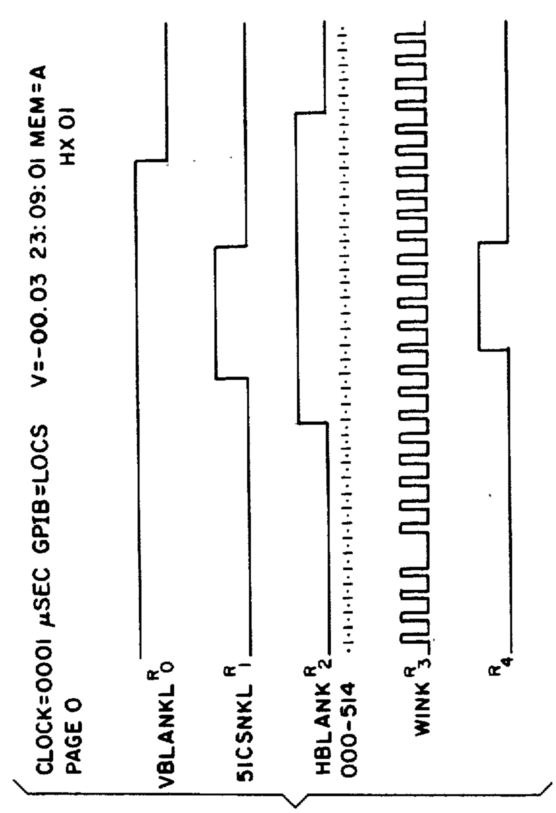
Figure 40B:
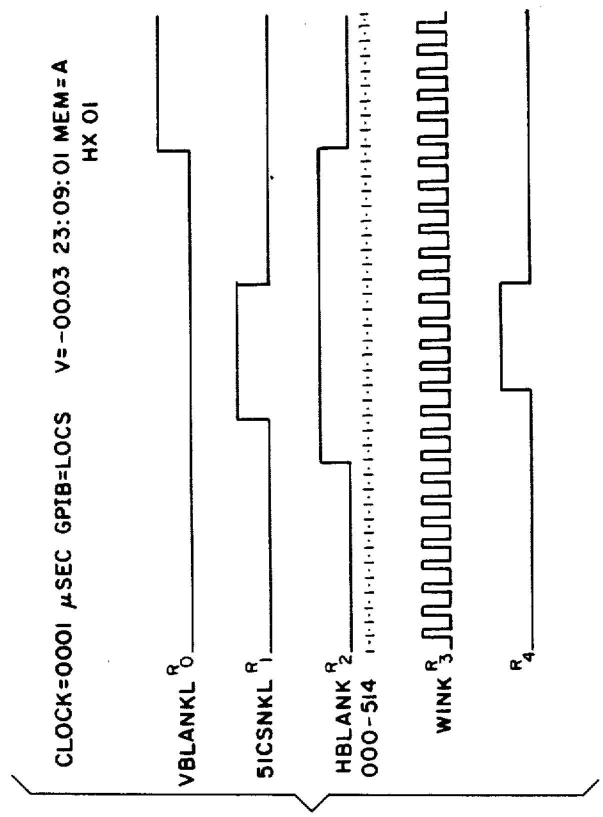

Referring now to FIGS. 38(*a*) and 38(*b*), 39(*a*) and 39(*b*) and 40(*a*) and 40(*b*), there are shown waveforms corresponding to what is produced from carrying out the routine in the flowcharts of FIGS. 36 and 37. The waveforms in FIGS. 38(*a*) and 38(*b*) and 39(*a*) and 39(*b*) show the vertical blanking interval, with FIGS. 39(*a*) and 39(*b*) being a magnification of the waveforms shown in FIGS. 38(*a*) and 38(*b*) and FIGS. 40(*a*) and 40(*b*) show the horizontal blanking interval.

The embodiment of the present invention is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. In a data processing system having a central processing unit, an input/output bus connected to said central processing unit, a memory bus connected to said central processing unit, a CRT display for displaying information and a video control section, said video control section controlling the operation of said CRT display and being connected to said memory bus and to said CRT display, an input/output controller for interfacing said data processing system to input/output devices, said input/output controller including:

a. a terminal control section, b. an input/output control section, c. a timing clock generator section, and d. a processor section, e. said terminal control section being connected to said central processing unit, to said video control section and to said processor section and including interface means for interfacing to a keyboard, f. said input/output control section being connected to said processor section and to said input/output bus and including:

i. peripheral device controller means for connecting said input/output control section to at least one input/output device, and ii. a data channel controller for interfacing said input/output control section to said input/output bus, g. said processor section managing the operations of said terminal control section and said input/output control section, and h. said timing clock generator section being connected to said processor section and generating clock signals for said processor section.

2. The system of claim 1 and wherein said peripheral device controller means comprises a plurality of peripheral device controllers, each for interfacing said input-/output control section to a separate input/output device.

3. The system of claim 2 and further including a signal line for connecting said data channel controller to said input/output bus.

4. The system of claim 3 and wherein said terminal control section is connected to said video control section by a pair of wires.

5. The system of claim 4 and wherein said terminal control section is connected to said central processing unit by a cable.

* * * * *